July 14, 1964 J. E. GREENE ETAL 3,141,152
CONTROL APPARATUS
Filed Dec. 21, 1959 44 Sheets-Sheet 11

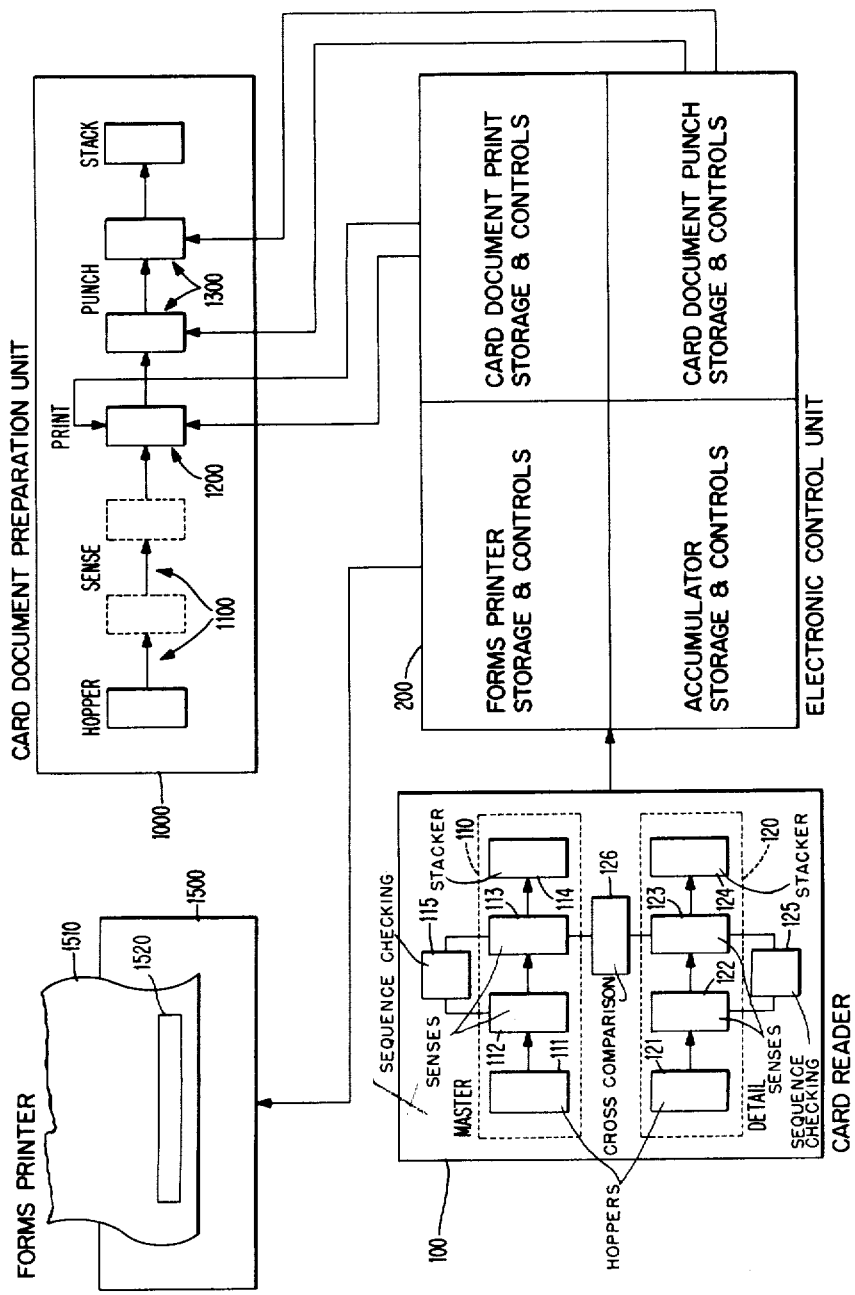

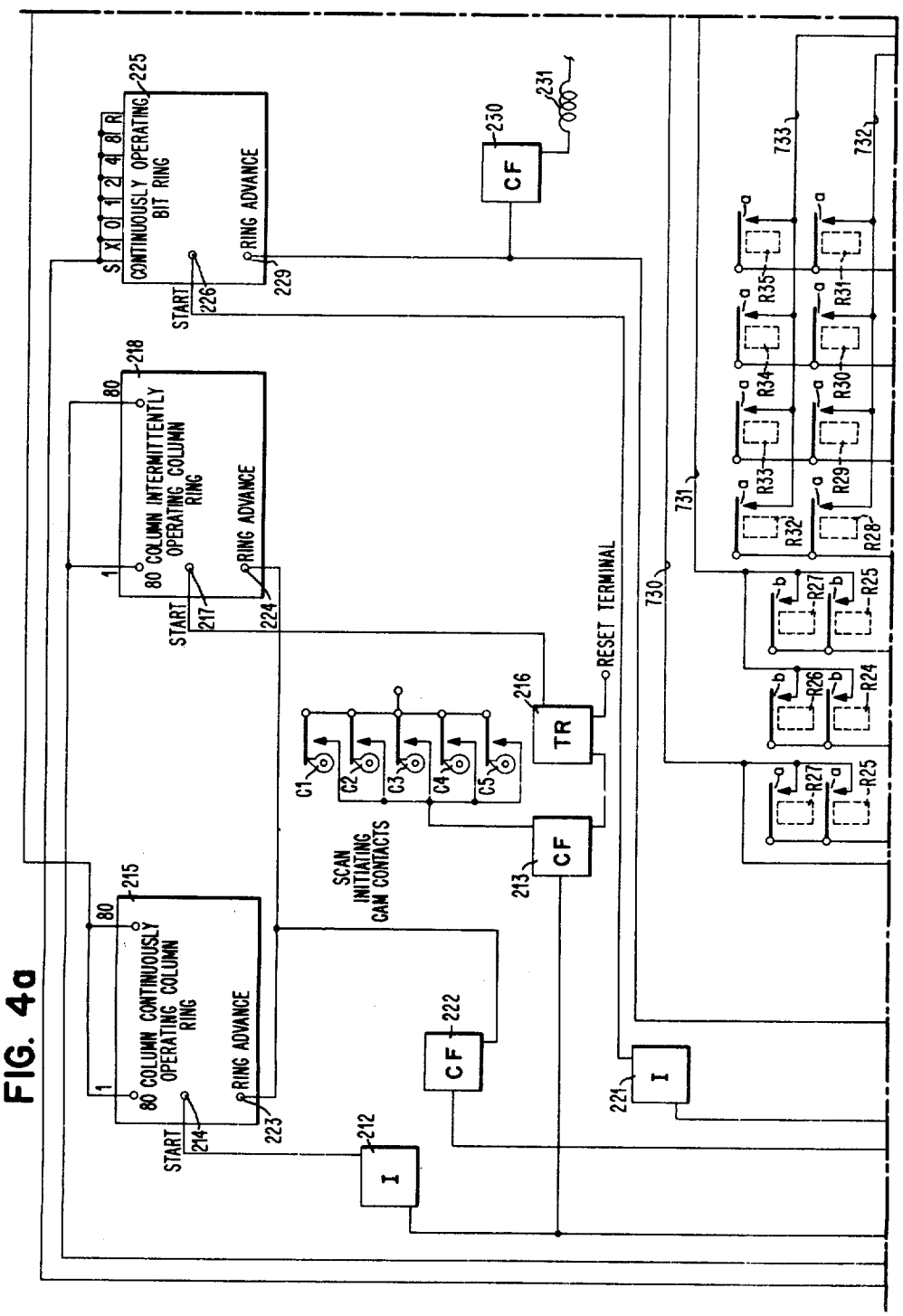

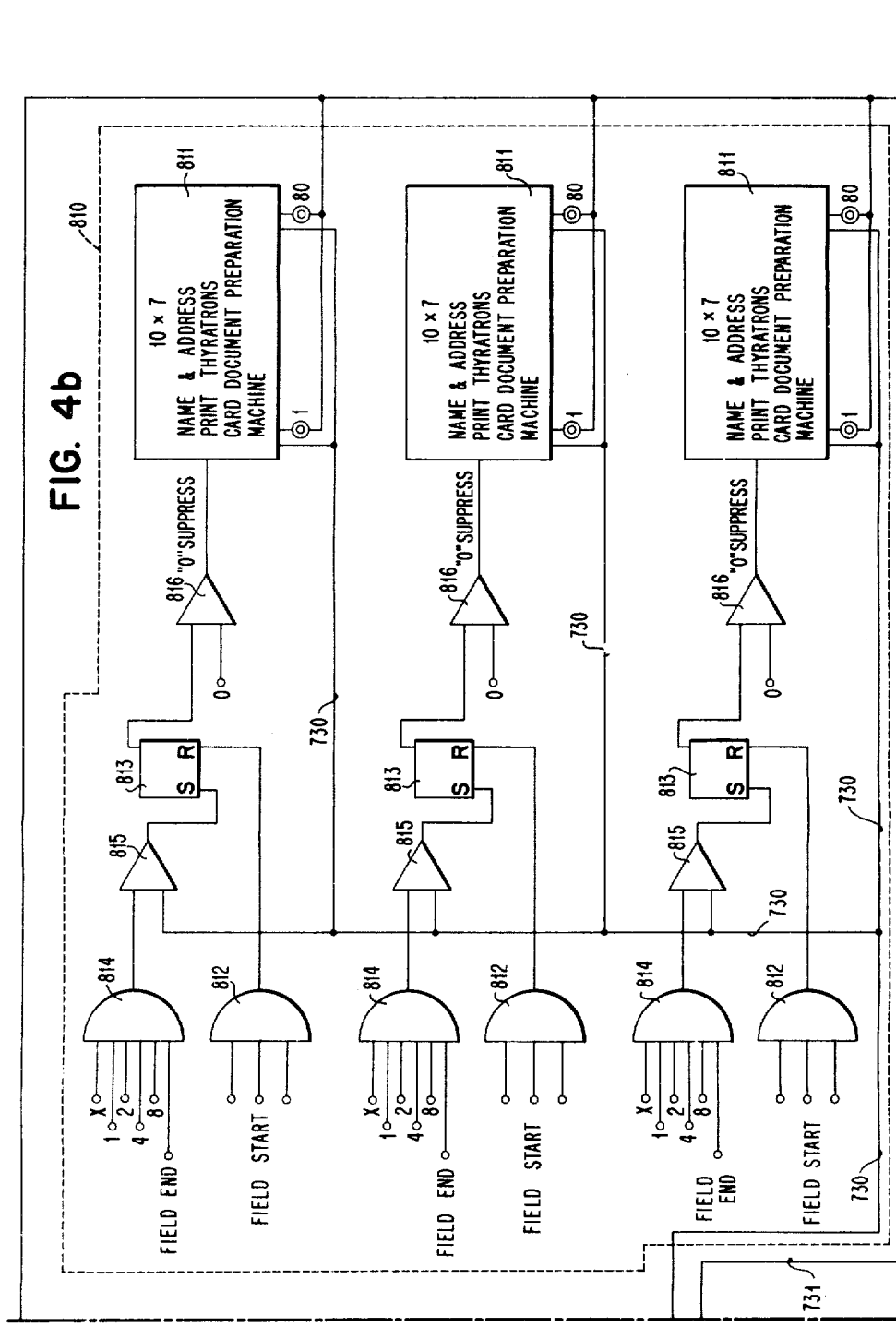

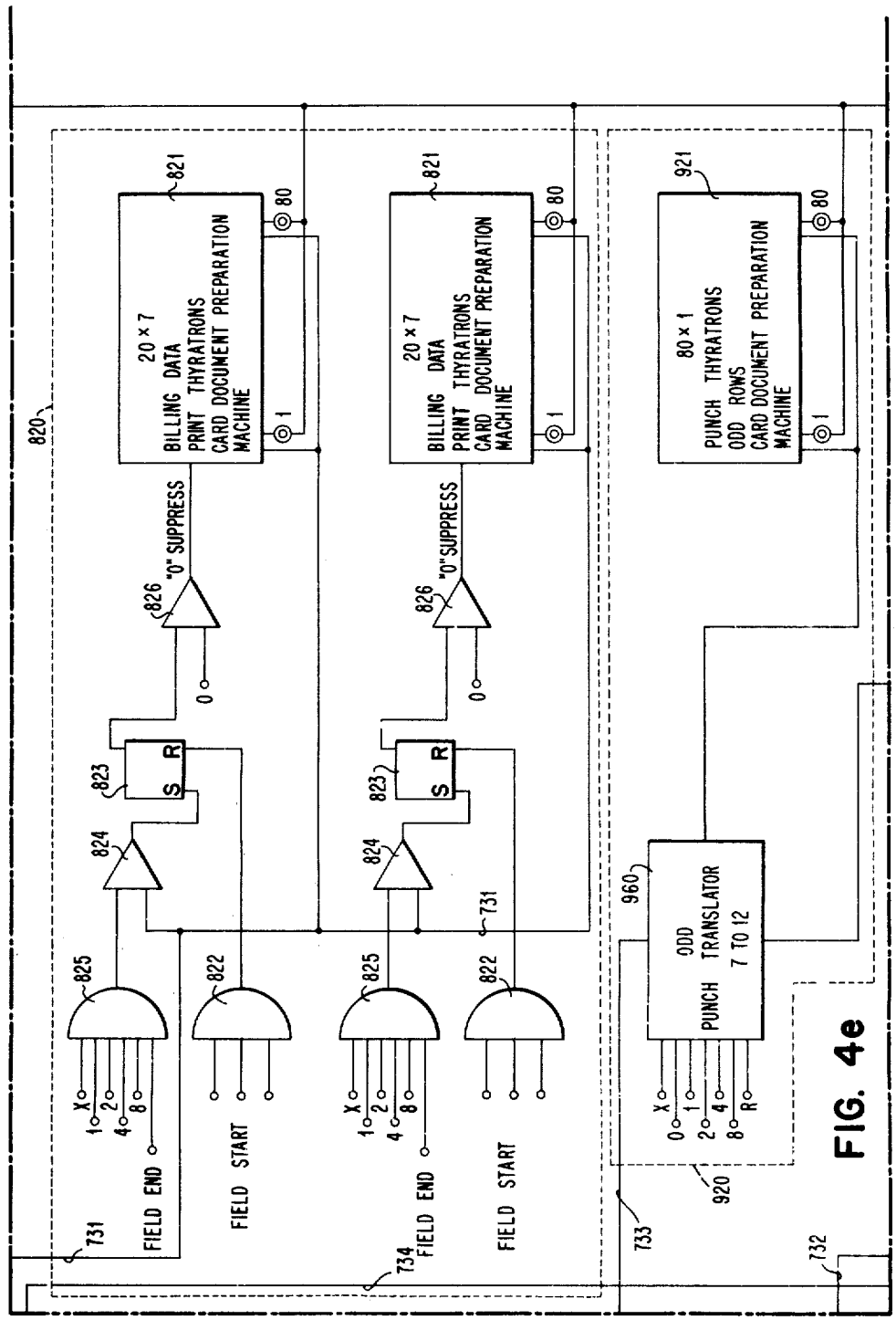

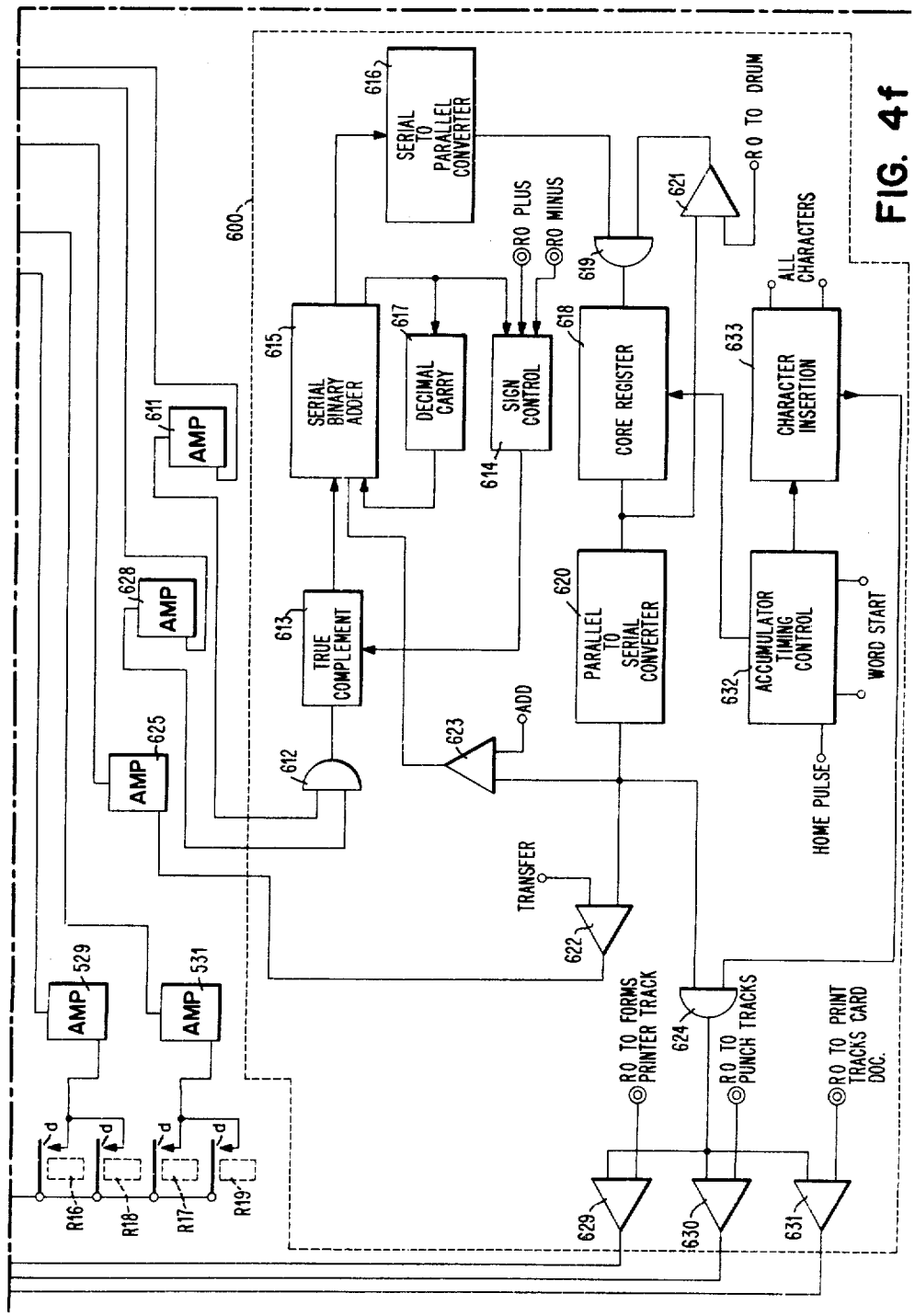

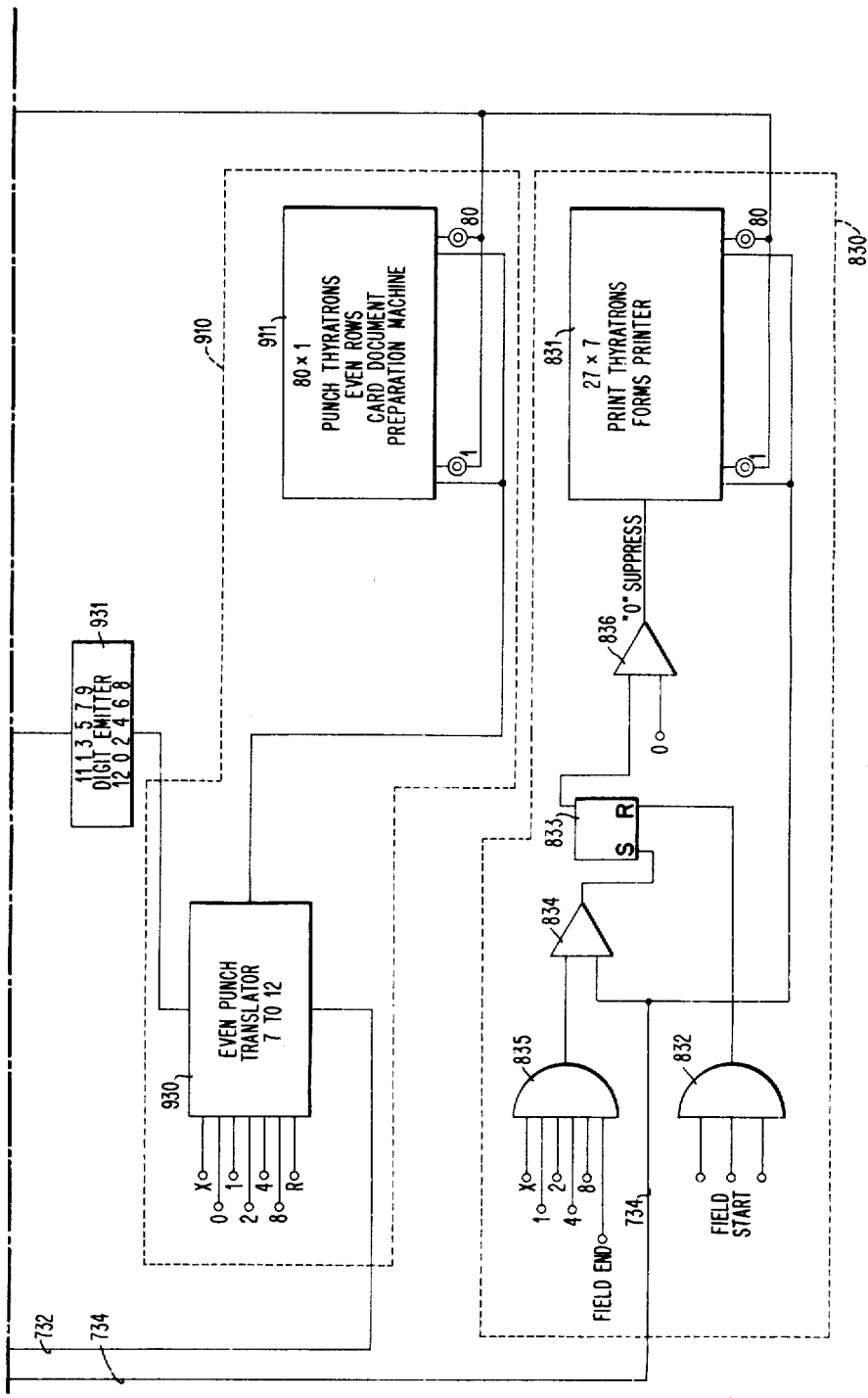

| FIG. 6a | FIG. 6b | FIG. 6c | FIG. 6d | FIG. 6e |
|---|---|---|---|---|
| FIG. 6f | FIG. 6g | FIG. 6h | FIG. 6i | FIG. 6j |

|  | FIG. 4a | FIG. 4b |
|---|---|---|
| FIG. 4c | FIG. 4d | FIG. 4e |
|  | FIG. 4f | FIG. 4g |

| FIG. 35a |
|---|
| FIG. 35b |
| FIG. 35c |

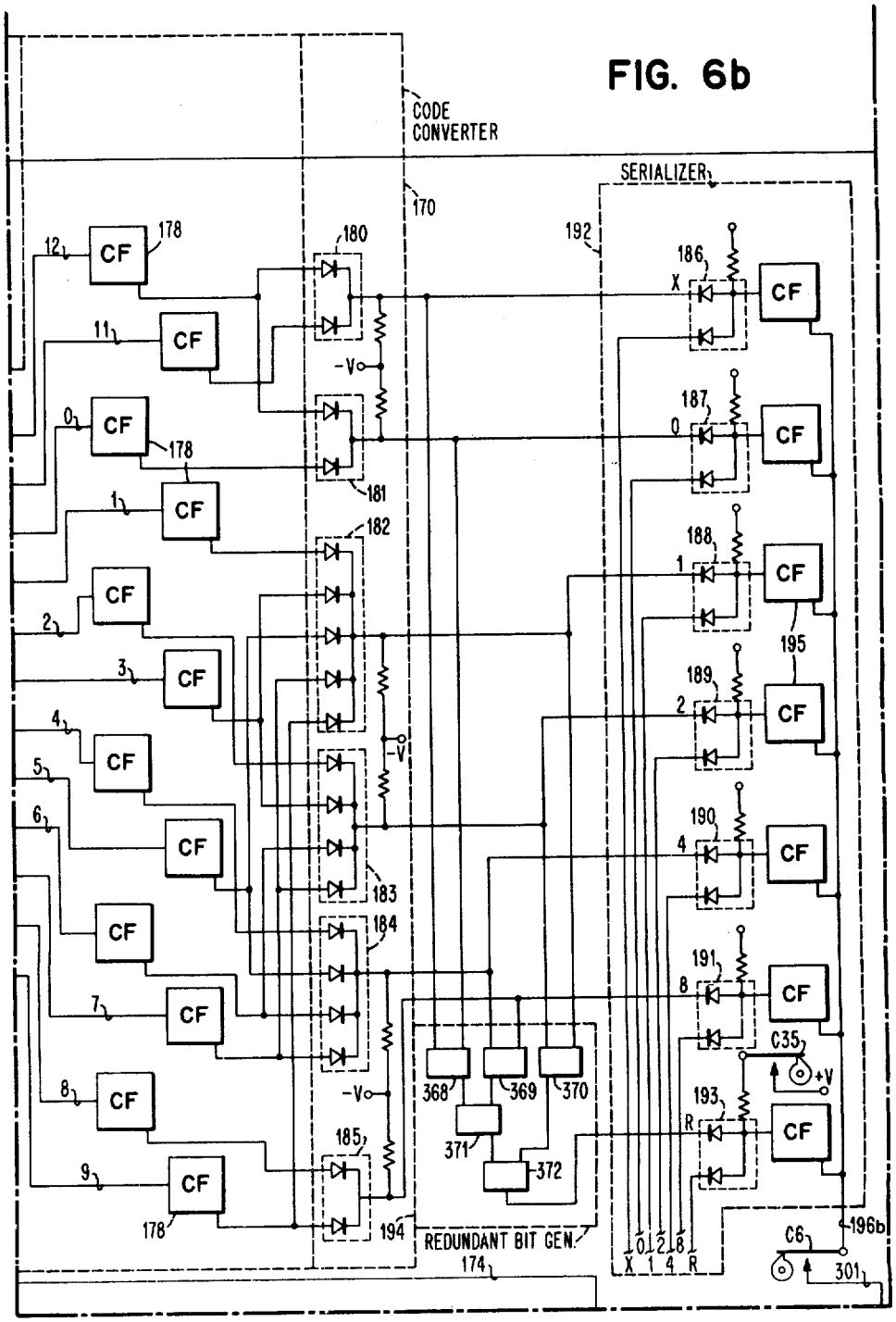

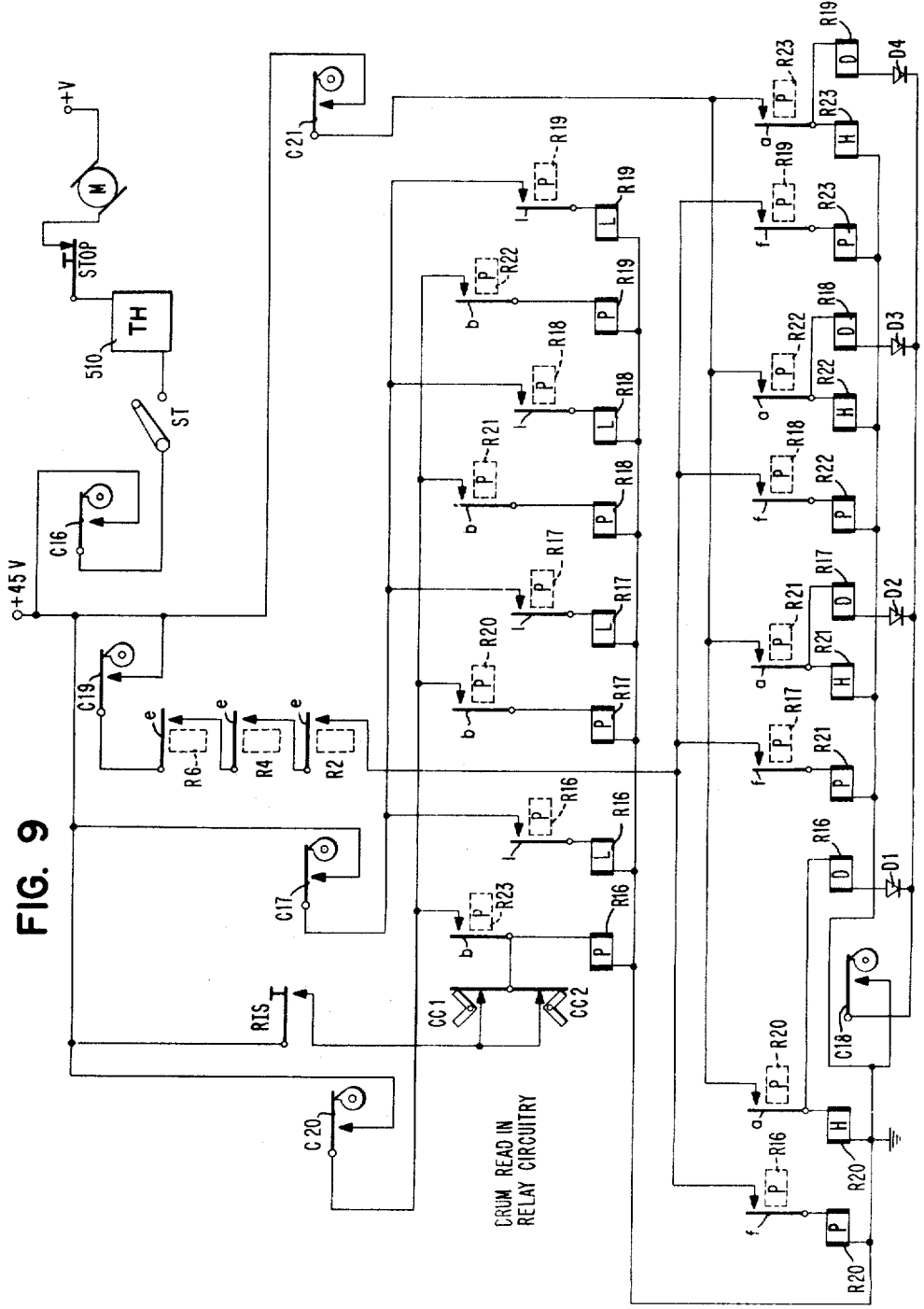

July 14, 1964  J. E. GREENE ETAL  3,141,152
CONTROL APPARATUS
Filed Dec. 21, 1959  44 Sheets-Sheet 24

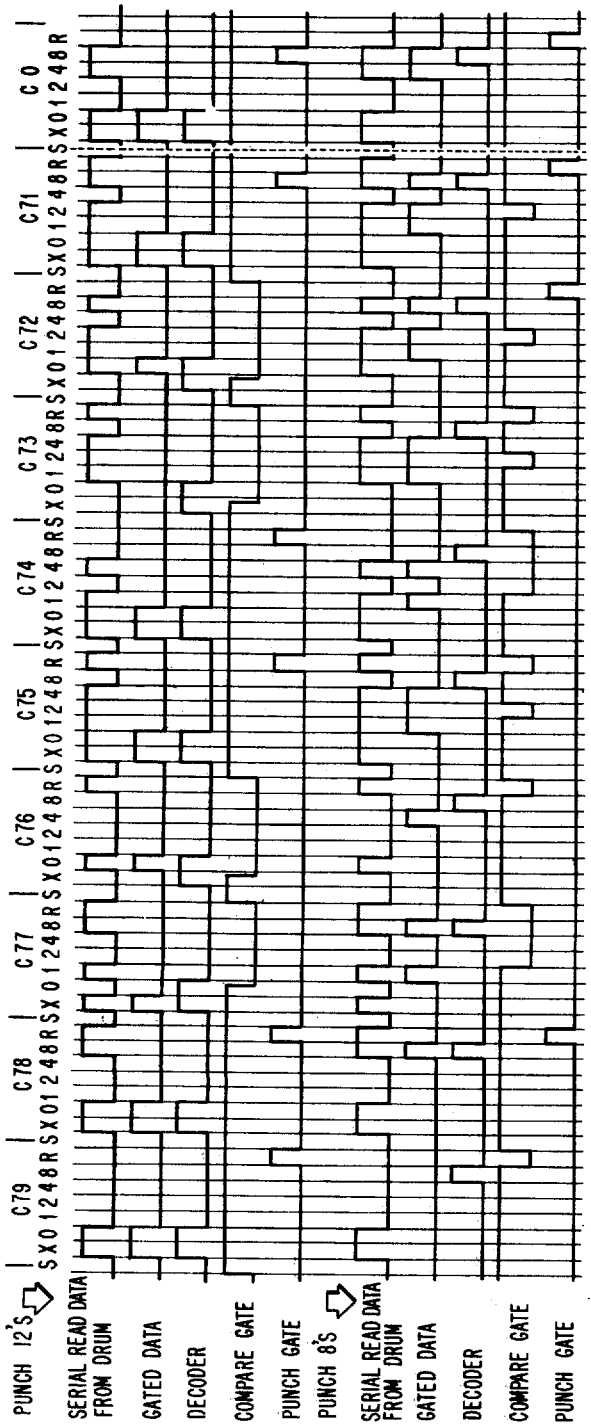
FIG. 17
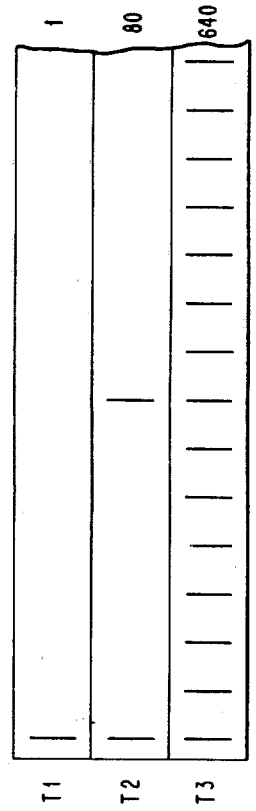
FIG. 19
| CHARACTER POSITION | DATA BITS | HOLES PUNCHED | CHARACTER REPRESENTED |
|---|---|---|---|
| C79 | X 0 | 12 | & |
| C78 | X 08 | 12-8 | — |
| C77 | X 1 8 | 11-9 | R |
| C76 | 0 4 | 0-4 | U |
| C75 | X 0124 | 12-7 | G |
| C74 | X 014 | 12-5 | E |
| C73 | 124 | 7 | 7 |
| C72 | 0128 | 0-3-8 | , (COMMA) |
| C71 | X 0128 | 12-3-8 | . (PERIOD) |
| C0 | X 048 | 12-4-8 | ¤ |
FIG. 18

| CHARACTER REPRESENTED | IBM CODE | BINARY CODE | CHARACTER REPRESENTED | IBM CODE | BINARY CODE |
|---|---|---|---|---|---|
| 1 | 1 | 1 | J | 11-1 | X-1 |
| 2 | 2 | 2 | K | 11-2 | X-2 |
| 3 | 3 | 1-2 | L | 11-3 | X-2-1 |
| 4 | 4 | 4 | M | 11-4 | X-4 |
| 5 | 5 | 1-4 | N | 11-5 | X-1-4 |
| 6 | 6 | 2-4 | O | 11-6 | X-2-4 |
| 7 | 7 | 1-2-4 | P | 11-7 | X-2-4-1 |
| 8 | 8 | 8 | Q | 11-8 | X-8 |
| 9 | 9 | 1-8-1 | R | 11-9 | X-1-8 |
| 0 | 0 | 0 | S | 11-3-8 | X-1-2-8 |
| # | 8-3 | 1-2-8 | * | 11-4-8 | X-4-8 |
|  |  |  | — | 11 | X |
| A | 12-1 | X-0-1 | / | 0-1 | 0-1 |
| B | 12-2 | X-0-2 | S | 0-2 | 0-2 |
| C | 12-3 | X-0-2-1 | T | 0-3 | 0-1-2 |
| D | 12-4 | X-0-4 | U | 0-4 | 0-4 |
| E | 12-5 | X-0-1-4 | V | 0-5 | 0-1-4 |
| F | 12-6 | X-0-2-4 | W | 0-6 | 0-2-4 |
| G | 12-7 | X-0-1-2-4 | X | 0-7 | 0-1-2-4 |
| H | 12-8 | X-0-8 | Y | 0-8 | 0-8 |
| I | 12-9 | X-0-1-8 | Z | 0-9 | 0-1-8 |
| • | 12-3-8 | X-0-1-2-8 | , | 0-3-8 | 0-1-2-8 |
| ☐ | 12-4-8 | X-0-4-8 | % | 0-4-8 | 0-4-8 |
| & | 12 | X-0 |  |  |  |

FIG. 20

July 14, 1964   J. E. GREENE ET AL   3,141,152
CONTROL APPARATUS
Filed Dec. 21, 1959   44 Sheets-Sheet 31

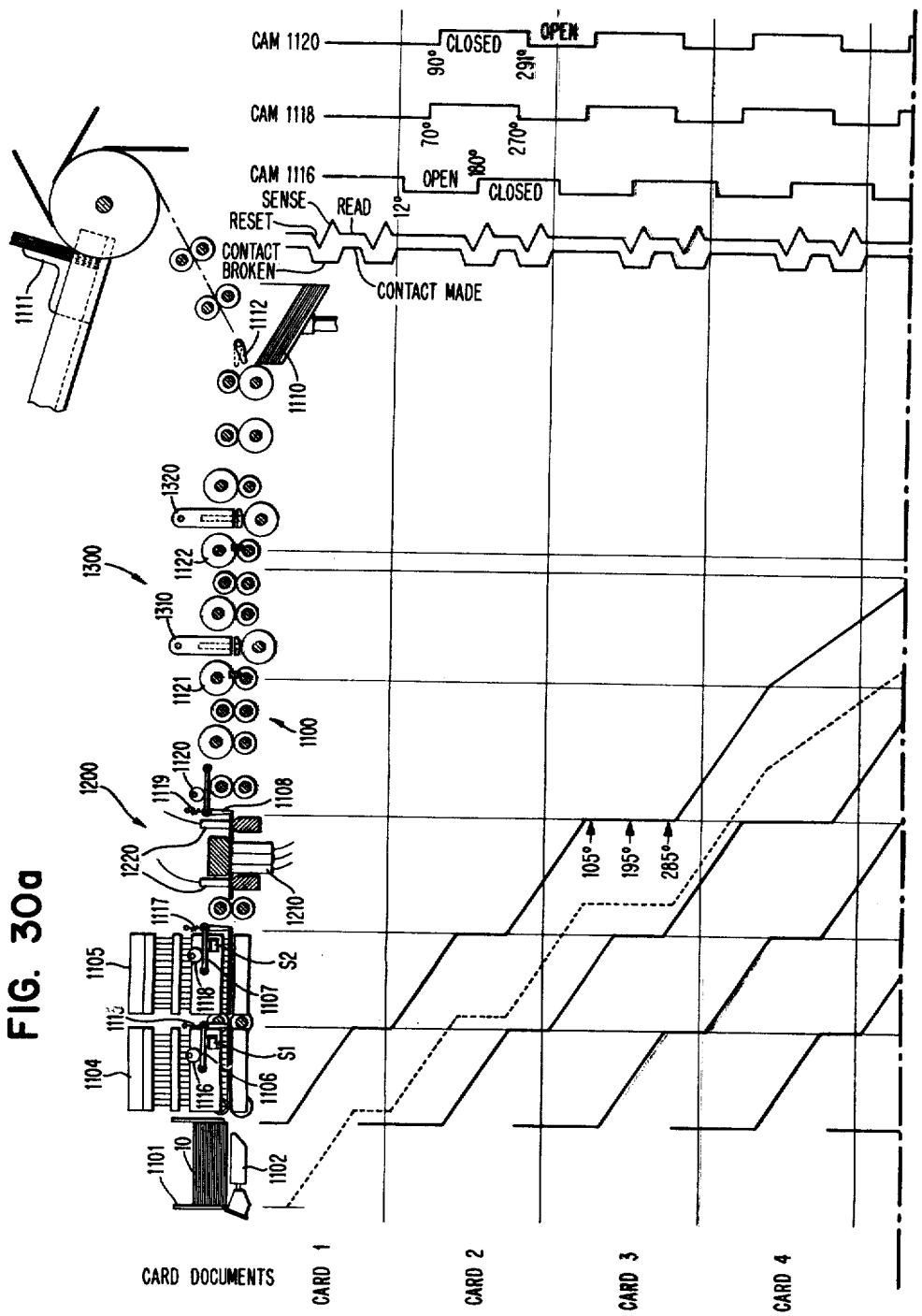

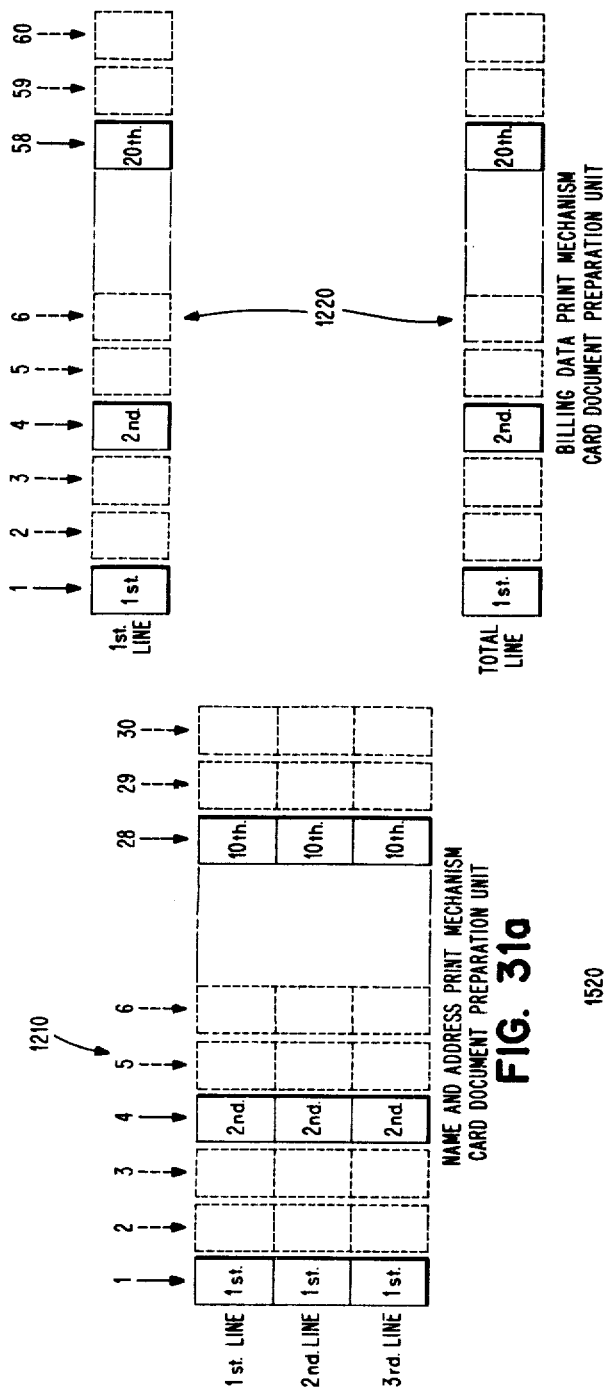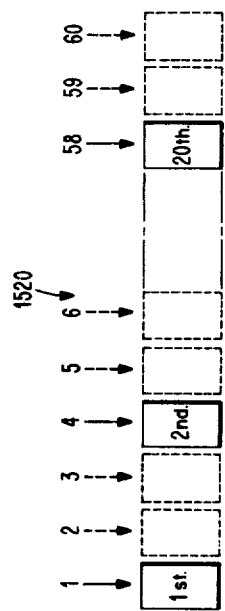

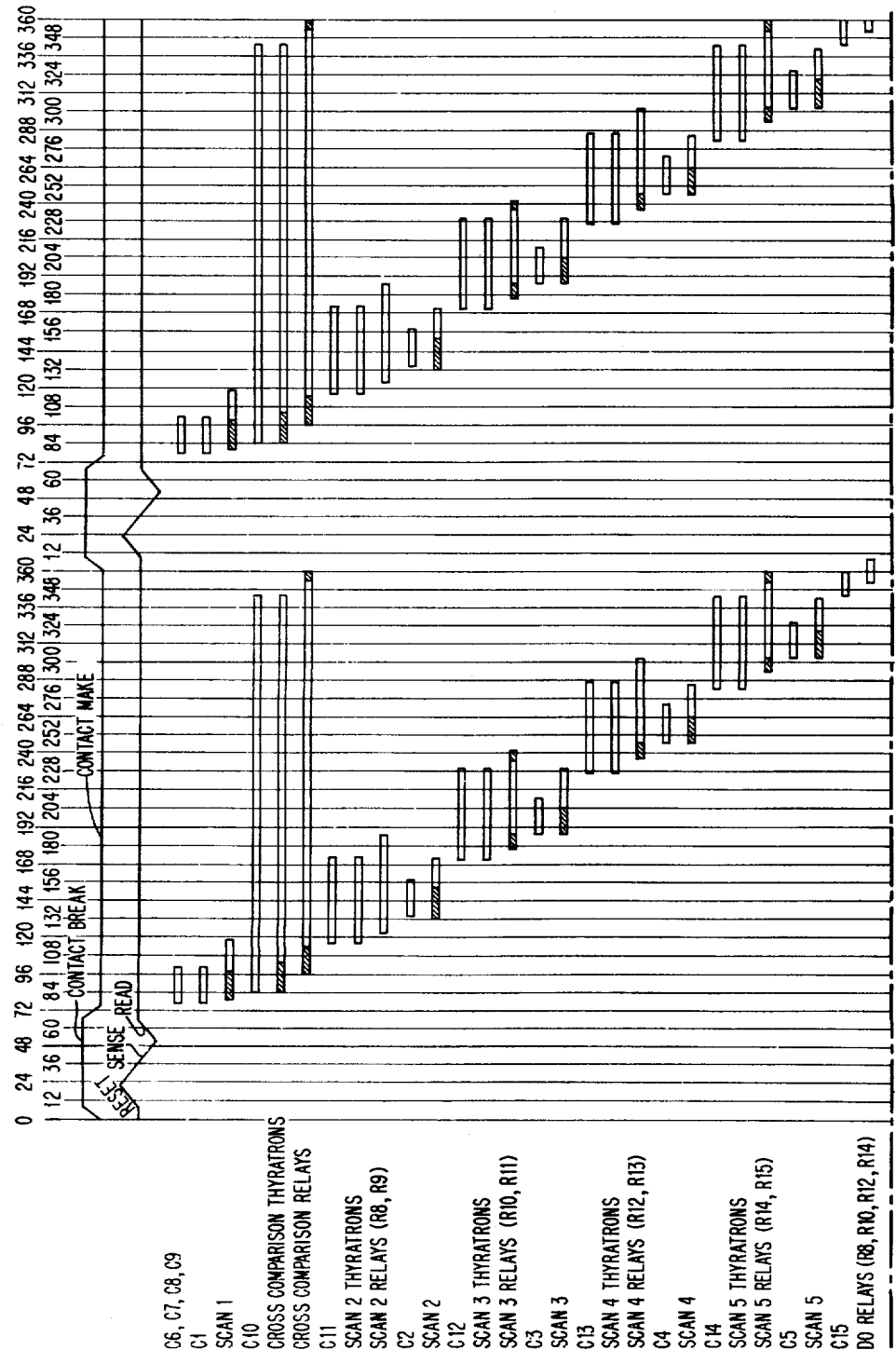

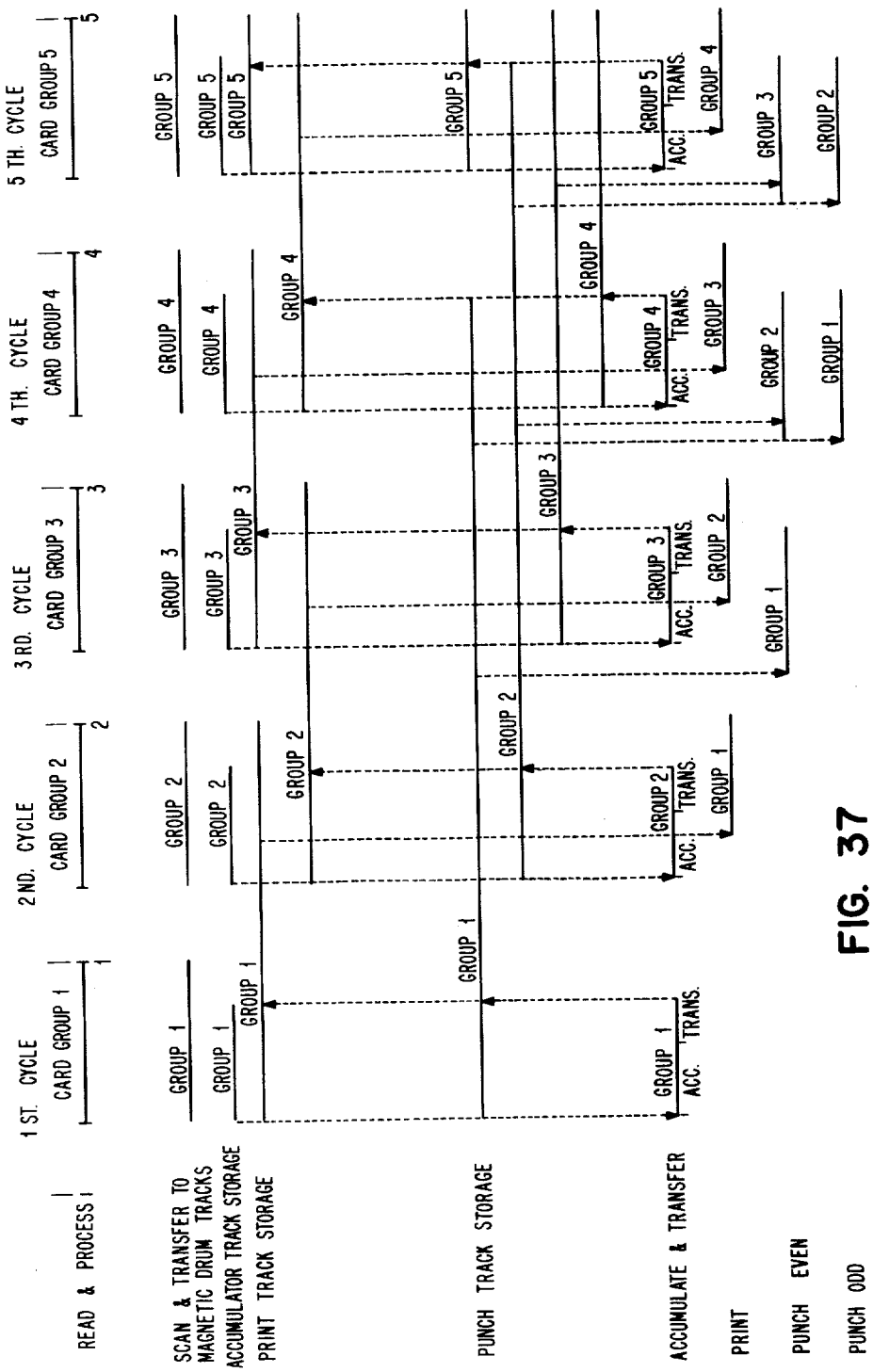

United States Patent Office 3,141,152
Patented July 14, 1964

3,141,152
CONTROL APPARATUS
Jack E. Greene, Vestal, and Joe J. Ingram, Jr., Johnson City, N.Y., assignors to International Business Machines Corporation, New York, N.Y., a corporation of New York
Filed Dec. 21, 1959, Ser. No. 860,810
26 Claims. (Cl. 340—172.5)

This invention relates to control apparatus for document producing devices and, more specifically, to control apparatus for data recording devices for printing and punching documents such as utility bills, insurance notices, and similar records in one system.

The present invention concerns the arrangement and utilization of data derived from a plurality of data sources and accounting functions to control printing and punching apparatus for recording the desired information into the record card documents. Additionally, control is provided for the printing of certain selected information of the information which is to appear on the card document being produced onto another record, such as a continuous form, to enable other accounting operations; for example, ledger posting.

Also, controls are provided so that the recording of the information in the card documents in printed and punched form takes place in a manner to utilize recording apparatus more effectively.

The information recorded in the record card documents and on the continuous forms is derived from a plurality of data sources, including master and detail record cards, and arithmetic devices, such as an accumulator. During the process of preparing the record card documents and the continuous forms, information from the various data sources is selectively made available to the printing and punching apparatus of a card document preparation unit and printing apparatus of a continuous forms print unit. The printing and punching apparatus of the card document preparation unit is arranged to record the information more effectively so as to increase the utility of the machine.

Since the information, which is to be carried by the record card documents in printed and punched form and by the continuous forms in printed form, must be available to the printing and punching apparatus as the record card documents and the continuous forms arrive in position to permit operations to be performed with respect thereto, it is necessary to provide appropriate storage apparatus to receive information derived from the plurality of data sources, retain the same in storage, and make the information or selective portions thereof available at the proper time to permit the operational apparatus to record the information on the record instruments.

In this connection, certain information carried by the record card documents is obtained from master and detail cards by static sensing devices. Pairs of spaced apart record sensing units are adapted to sense information from the master and detail cards which are advanced in synchronism therethrough. The static sensing devices of the record card sensing units are characterized by being able to retain the information obtained from the master and detail cards for a predetermined period of time. During the time that the information is retained by the static sensing units, the relationship of the information which the master and detail cards bear is determined by means of collating circuitry. Depending upon the results of the collating operation, certain acts follow. For instance, if the master card and detail card information is unrelated, clutch circuitry will be called into operation to bring a new set of master and/or detail cards into position to permit another collating operation. If it turns out that the information of the master card is related to that of the detail card, or vice versa, then the information contained by the static sensing devices may be selectively transferred to a more permanent storage device. In fact, the information is transferred several times, in differently arranged patterns, if desired, to different storage areas of the more permanent storage device. The selective transfer of the information from the static sensing devices to the more permanent storage device, in effect, permits editing of the information. Hence, the information will be selectively arranged and retained by the more permanent storage device in a manner so as to be available to the operational units of the card document preparation unit and the continuous forms print unit more advantageously. The information is arranged on the input to the more permanent storage device because the location of the information in the more permanent storage device determines the manner in which the information will flow to the data recording or operational units. This is because the permanent storage device is divided into a plurality of storage areas and each storage area is related to a particular output or data recording device.

Data sensed from the master and detail cards and temporarily stored in the static sensing units is transferred during a series of scans to the more permanent storage device which has the plurality of storage areas. During each scan, by a plugging arrangement, certain portions of data are transferred to selected storage areas of the permanent storage device. Hence, the information transferred in any one scan is selectively determined by the plugging arrangement. Further, by a switching arrangement, related storage areas of the permanent storage device become available at different times to receive the information from the static sensing units during the sequence of scans. The related storage areas are connected to be associated with a particular data recording device of the card document preparation unit and the continuous forms print unit. Each data recording device of these units may be thought of as a separate or isolated data recording device because it is particularly associated with a particular group of related storage areas of the more permanent storage device. Each storage area stores data just for an associated output device; hence, data is arranged therein to suit the output device. Switching circuitry is provided to permit the recording of data during a series of scans in certain predetermined storage areas while previously recorded data in certain other predetermined storage areas may be simultaneously transferred to the data recording devices of the card document preparation unit and of the continuous forms print unit.

It may also be noted that the static sensing devices permit the record cards already sensed to be conveyed to a stacking means while retaining the information sensed therefrom as other record cards are brought into position or readiness for analysis by the sensing devices.

The information selectively arranged in the more permanent storage device, which may take the form of a magnetic drum, whereupon the information is recorded in coded form and represented by magnetic spots, is selectively made available to the operational units of the card document preparation unit and the continuous forms print unit to utilize the same to the best advantage. In the instance where the more permanent storage device is in the form of a magnetic drum, groups of drum tracks are connected to be associated with a particular data recording device. Each group of drum tracks is divided into two portions to permit the recording of data during a series of scans while simultaneously permitting the transfer of previously stored data to the data recording devices of the card document preparation unit or the continuous forms print unit. The read-in and readout of information from the drum tracks of the magnetic drum is facilitated through switching circuitry. While a single drum track may provide sufficient storage to permit, through switching circuitry, the selective read-in of data relating to an instrument to be prepared and, through other switching circuitry, the selective readout of stored data relating to an instrument being prepared, in the example to be given, several drum tracks are associated with each data recording device. Actually, the number of drum tracks assigned to each data recording device or output unit depends upon the amount of storage and the number of cycles of delay required by each.

For an accumulation or arithmetic operation, information is transferred from the static sensing units during a predetermined scan through the switching circuitry to designated drum tracks for storing the information for an accumulation operation. The information is directly transferred from these drum tracks to the accumulator. Subsequently, information is transferred from the accumulator back to the particular drum tracks associated with the data recording devices through the switching circuitry disposed between the scan circuitry and the magnetic drum. Information transfer for an accumulation operation presents a greater problem than a direct transfer of information from the sensing units to the magnetic drum through the drum read-in switching circuitry. Information is transferred low order first to the accumulator. After the information is processed by the accumulator, the information is transferred high order first to the various drum tracks which already contain related information which will be subsequently transferred to the data recording devices. Of course, the information coming from the accumulator must be recorded on the proper drum track because the information relates to information already recorded on the magnetic drum tracks. Further, space must be provided on the drum tracks to accept this related information. For example, if scan 1 of the information in the static sensing units sets up controls for the collating operation and scan 2 transfers certain information to particular drum tracks, which will then contain the information for an accumulator operation, and scans 3, 4, and 5 enable the transfer of information from the storage tracks to the print units of the card document preparation unit and of the continuous forms print unit and punching devices of the card document preparation unit, then the drum tracks for receiving the information during scans 3, 4, and 5 must permit sufficient storage spaces to receive the information from the accumulator. The storage space left within a drum track is determined by plugging arrangement between the scan circuitry and means for reading out the information in the static sensing units. Information is transferred from both the master and detail card readers to the same track during scans 4 and 5. However, during any one character time, only one station is being read from. Hence, both stations can be read into the same track on the same scan. All printing is done on the cycle following the read-in to the drum track associated with the particular data recording device for recording information in printed form. Hence, information read into a group of drum tracks during a preceding cycle is printed while information of another card group is being read into another group of drum tracks associated with the printing devices. For punching, the information is being read into one track at the same time that a second track is holding the information. While the preceding card is being printed, a third track is being read to the punch unit for punching the odd rows in the second preceding card and a fourth track is being read from to punch the even rows in the third preceding card.

In the card document preparation unit, name and address information, for example, and billing or item information may be simultaneously printed upon the obverse and reverse faces of the card documents, respectively, at a single print station. The apparatus for setting the print mechanisms to print the name and address and billing information is operated in a manner to permit the printing to occur simultaneously on opposite faces of the record card documents. By this arrangement, the record card documents may be produced at a higher rate.

In view of the above, it is one of the prime objects of the invention to provide improved control apparatus for enabling data operably controlled devices to produce record card documents and printed continuous forms in one continuous operation bearing data derived from a plurality of data sources and accounting functions.

Another very important object of the invention is to provide an arrangement of apparatus for storing data derived from source record cards so as to enable the data to be made available at the proper time to operational devices of a card document preparation unit and a continuous forms printer where the sensing devices for deriving the data from the source records are capable of temporarily storing data for a predetermined period of time to facilitate the selective arrangement of the data in a more permanent storage device.

Still another very important object of the invention is to provide apparatus for selectively transferring data temporarily stored by sensing devices during successive scans of the information in the sensing devices to a more permanent storage device.

A further object of this invention is to provide an arrangement of apparatus for selectively arranging data as it is being stored in a relatively permanent type of storage device so that the recording of the data on record cards in printed and punched form will occur in the manner in which the data is arranged in the storage device.

Another object of the invention is to provide apparatus including a data storage device having a plurality of data storage areas where each data storage area is associated with a particular data recording device of a card document preparation unit and a continuous forms print unit.

Still another object of the invention is to provide apparatus to permit the read-in of information during successive scans of static sensing devices to a more permanent storage device while previously stored information is read out from the more permanent storage device to data recording devices.

Another object of the invention is to provide apparatus for storing data derived by static sensing units from record cards so that the data may subsequently be made available to devices for recording the data upon records in printed or punched form, wherein the device for storing the data has a capacity determined by the amount of storage and the number of cycles of delay required by the particular data recording devices.

Another object of this invention is to provide controls for operating printing apparatus which functions to effect simultaneously printing of name and address information on one face of record card documents and billing or item data on the opposite face at a single print station.

Still another object of this invention is to provide controls for operating punching apparatus which functions to punch a portion of information at one punch station and a remaining portion of the information at another punch station.

The foregoing and other objects, features and advantages of the invention will be apparent from the following more particular description of a preferred embodiment of the invention, as illustrated in the accompanying drawings.

In the drawings:

FIG. 3 is a view diagrammatically showing the card reader unit, the electronic control unit, the continuous forms print unit, and the card document preparation unit;

Figures 5, 7, 32, 36:
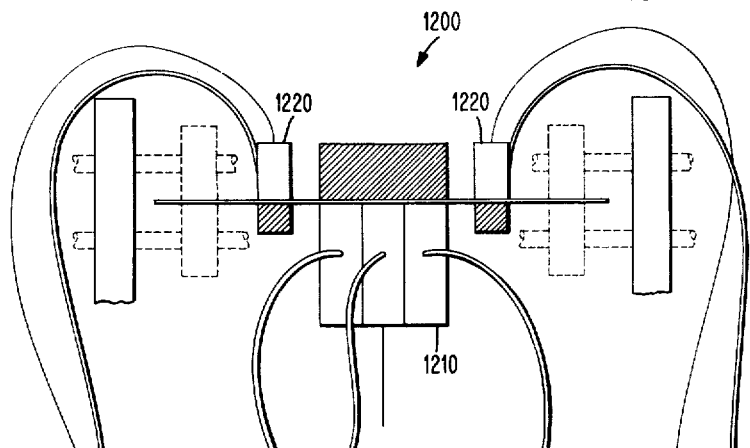
Figure 8:
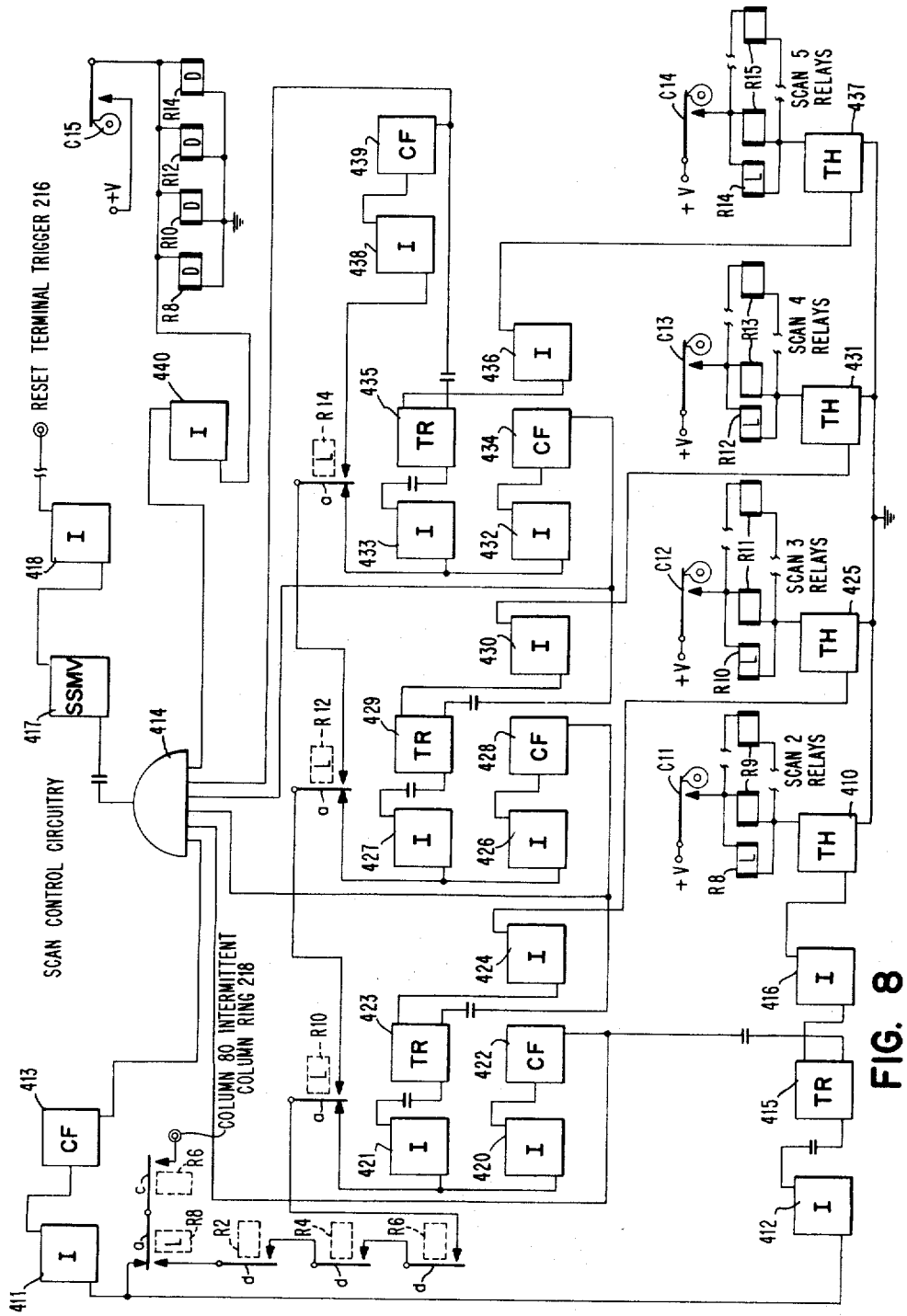
Figure 11:
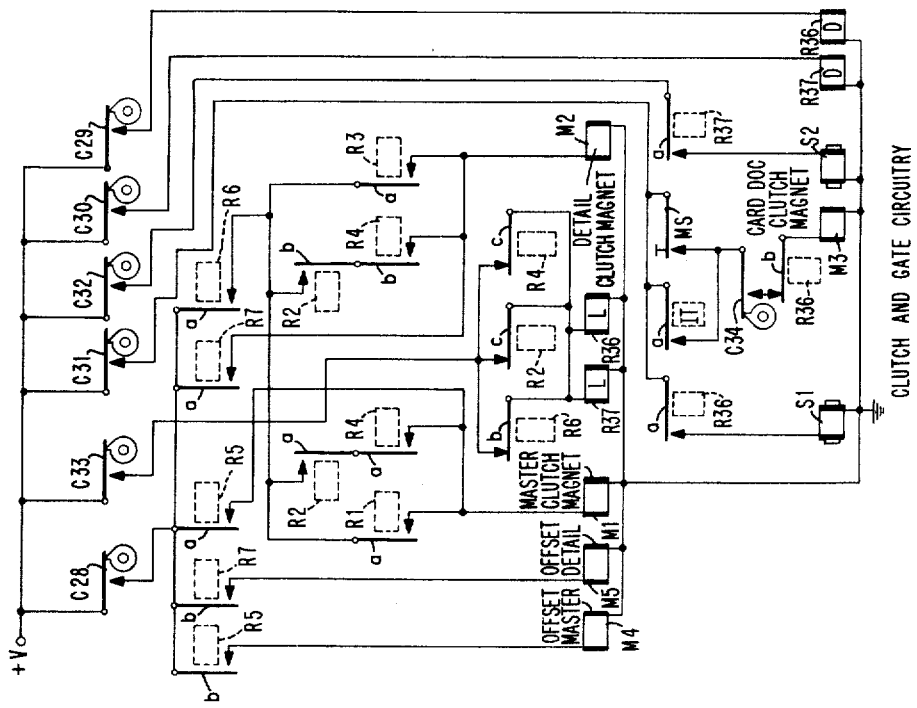
Figure 10:
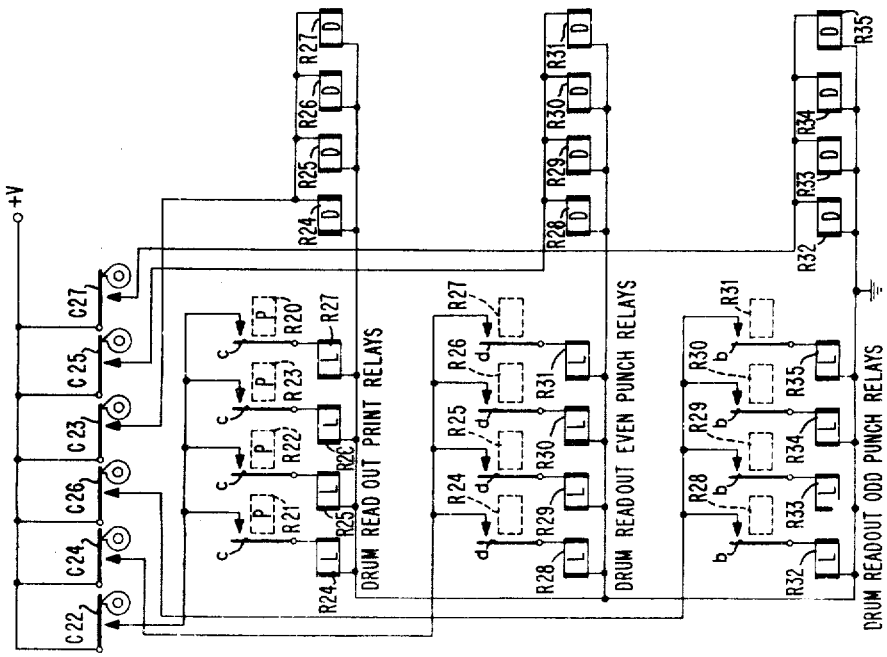
Figure 12:
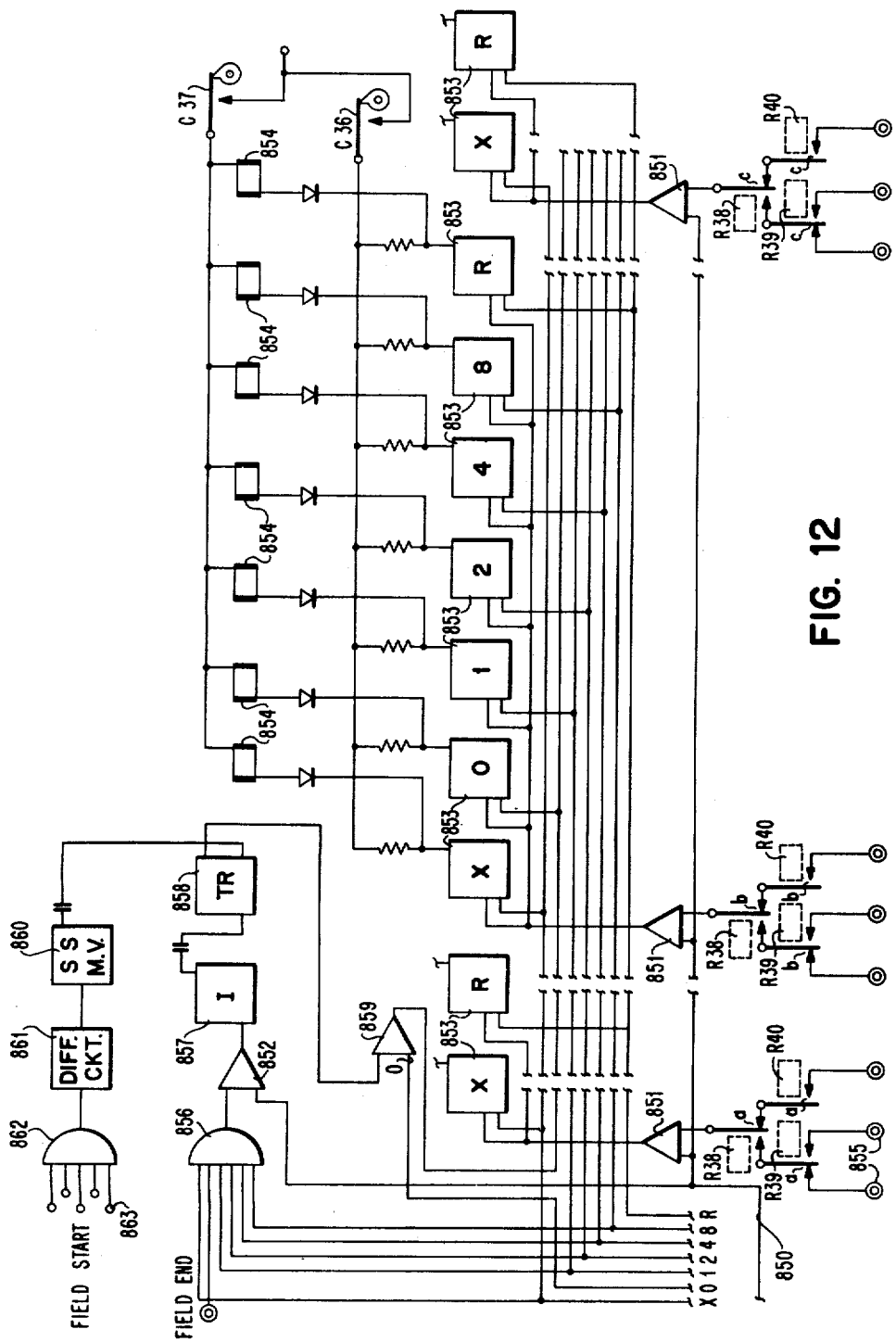
Figure 13:
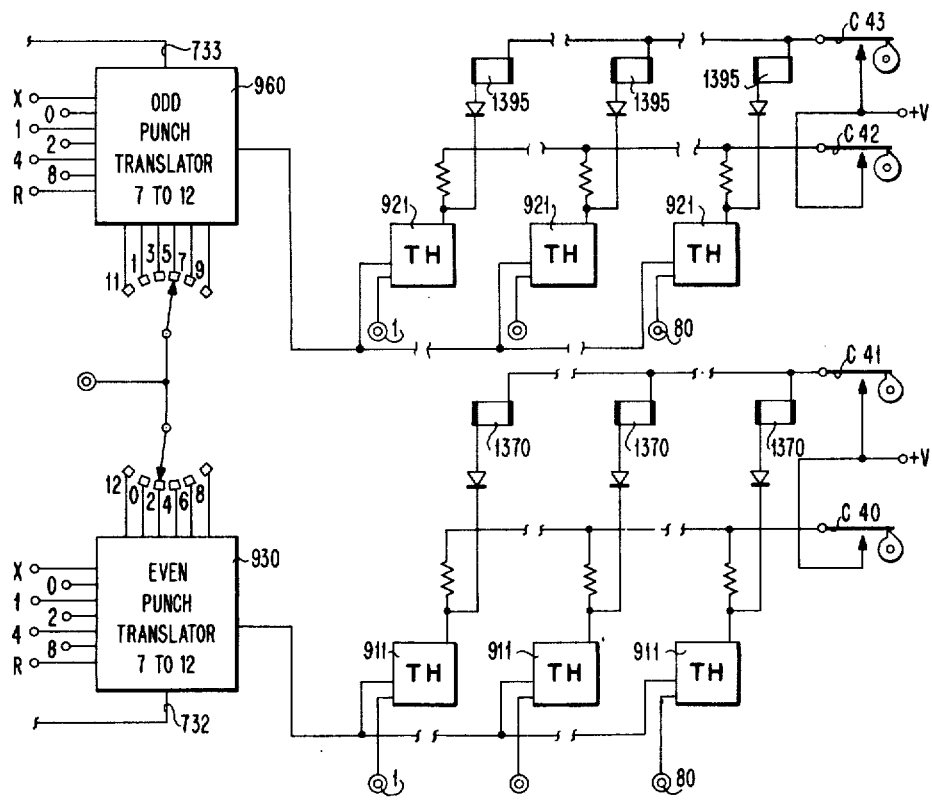
Figure 14:
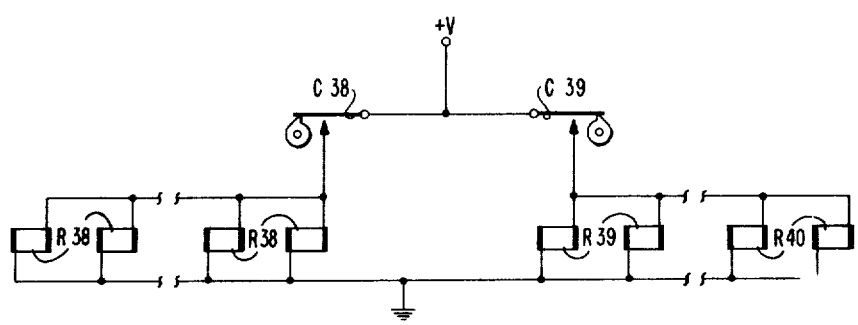
Figure 15:
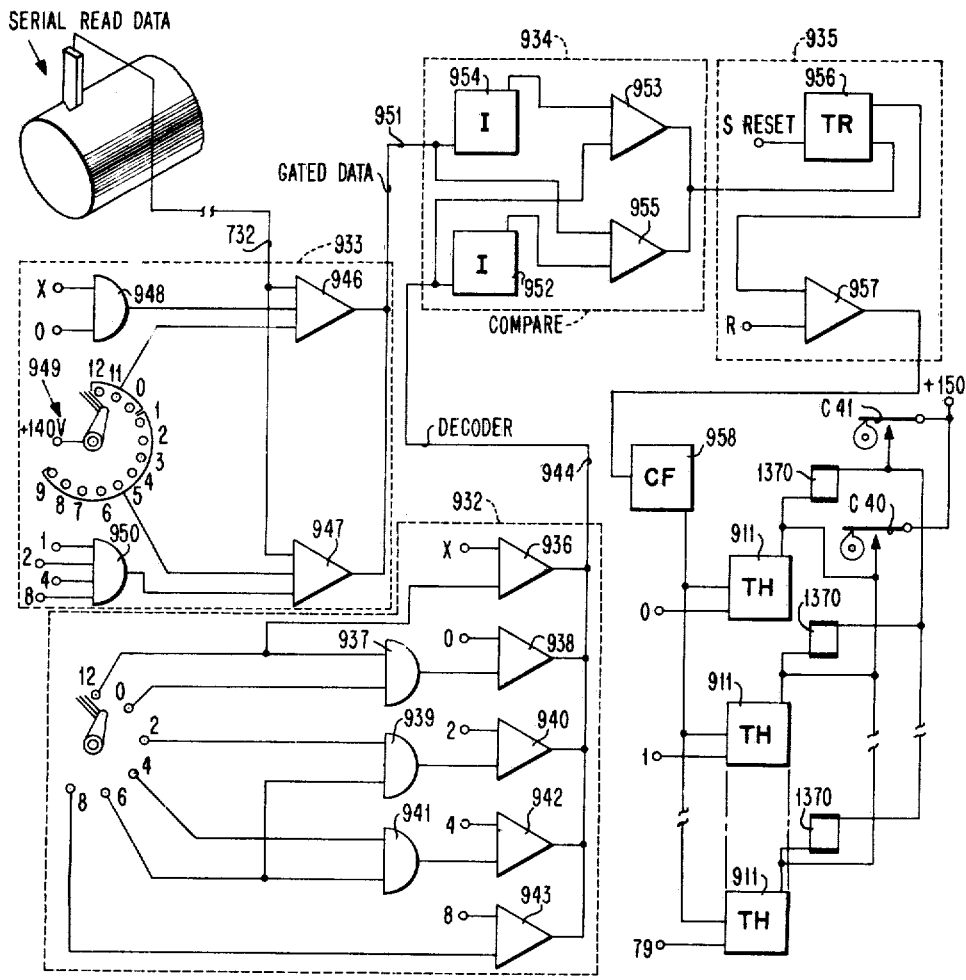
Figure 16:
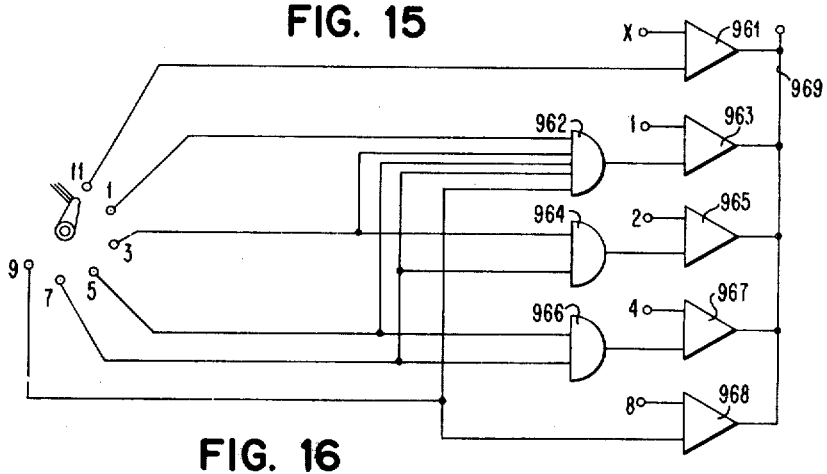
Figure 21:
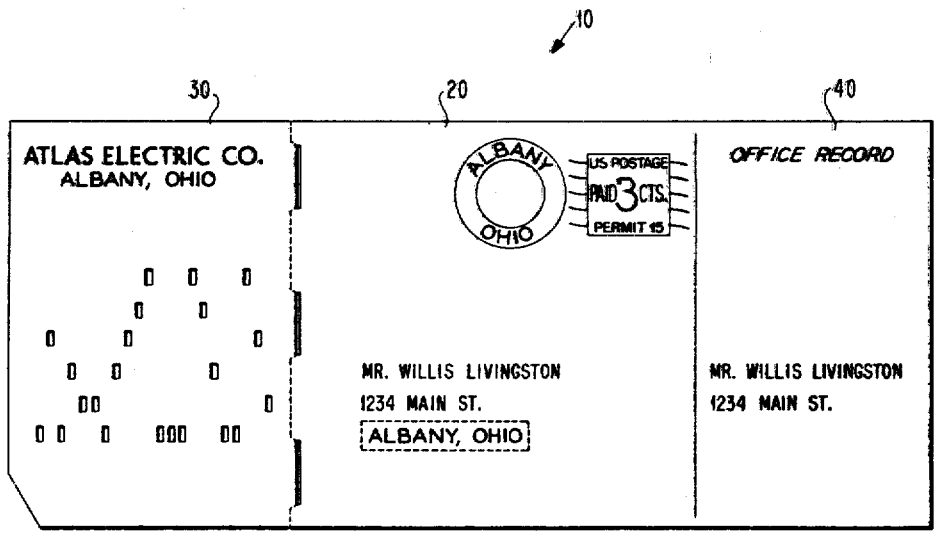
Figure 22:
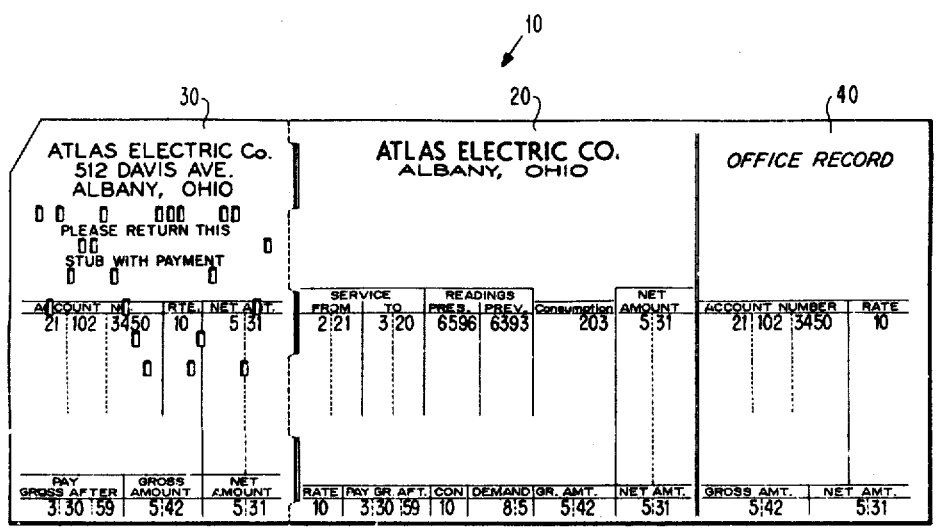
Figure 25:
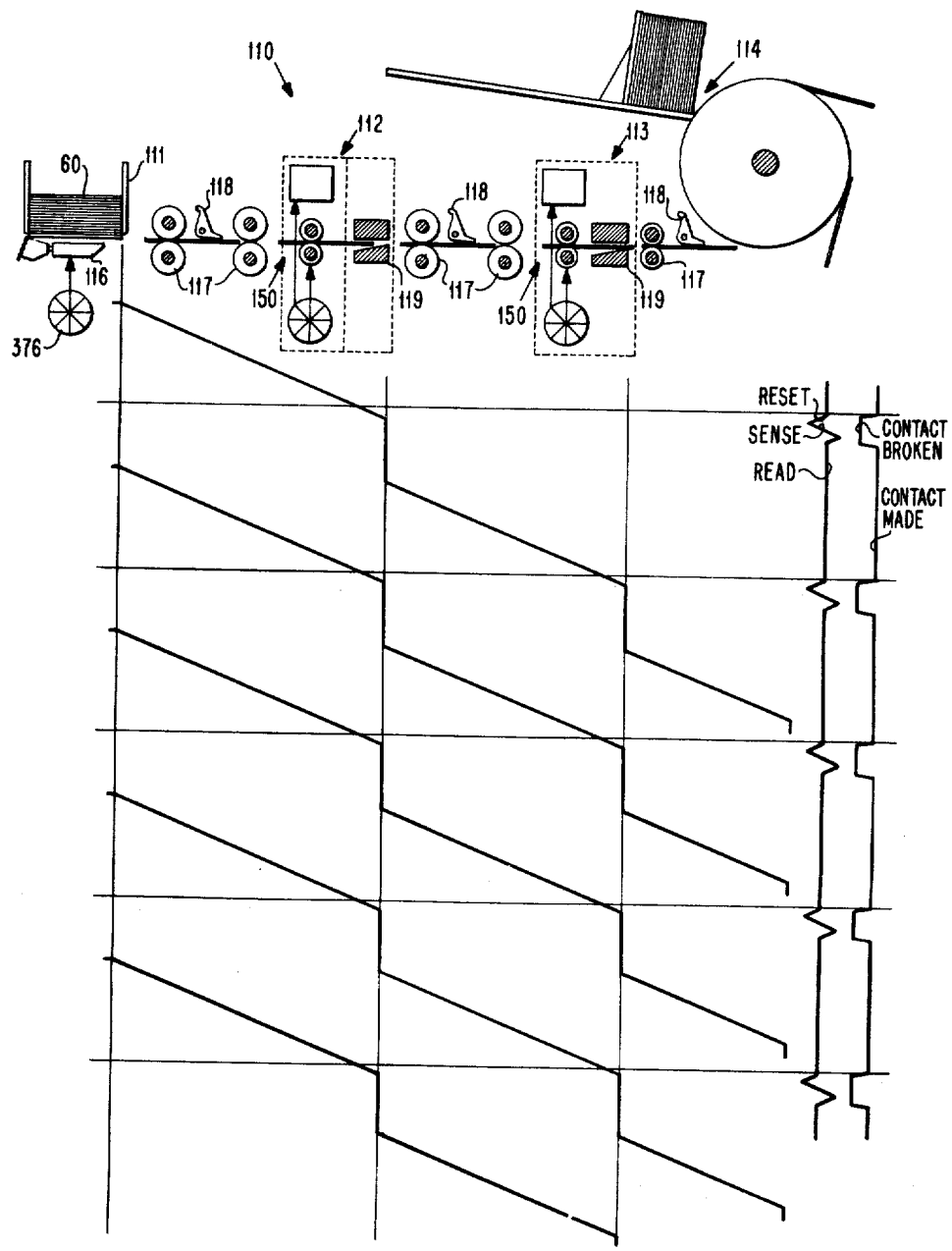
Figure 26:
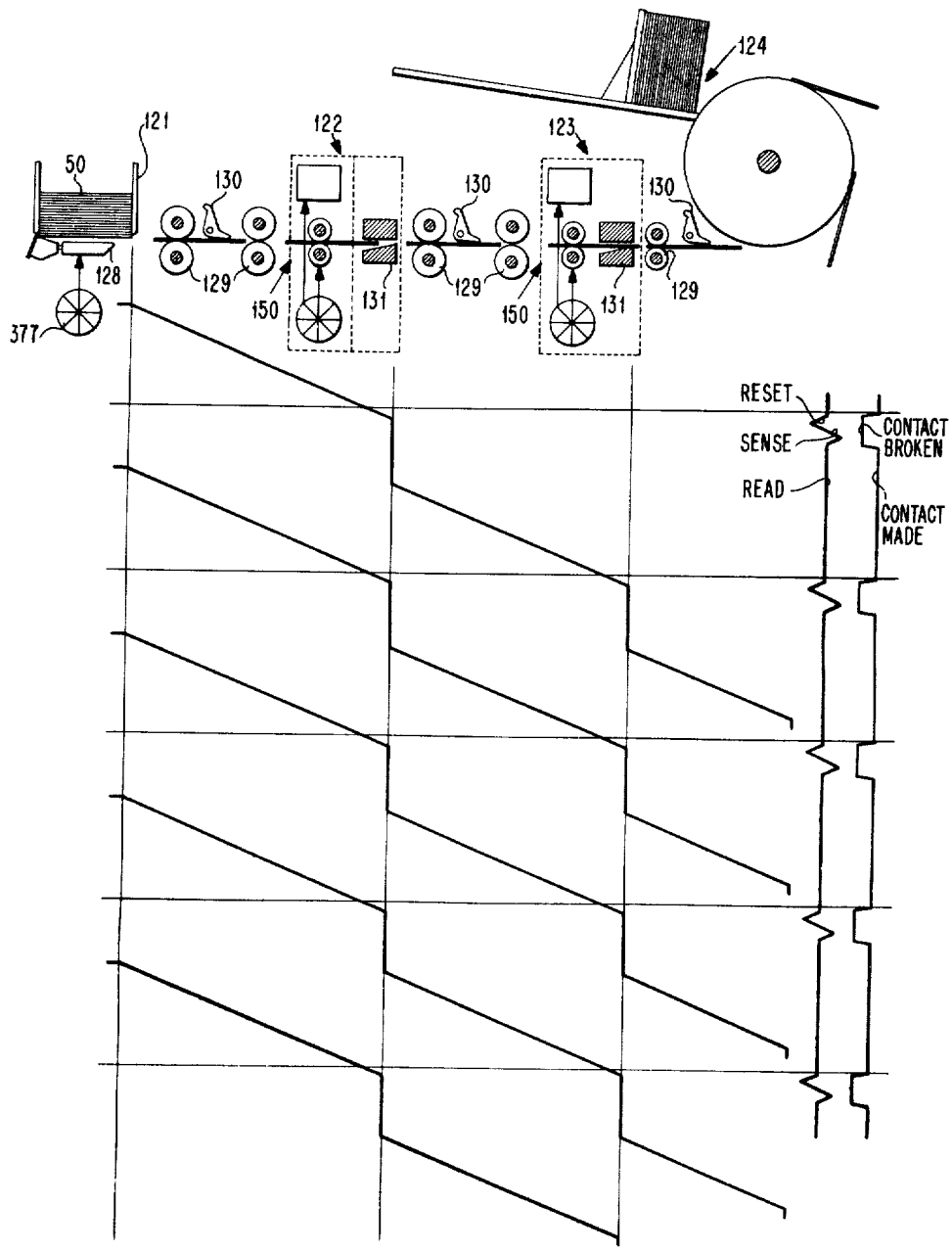
Figure 27:
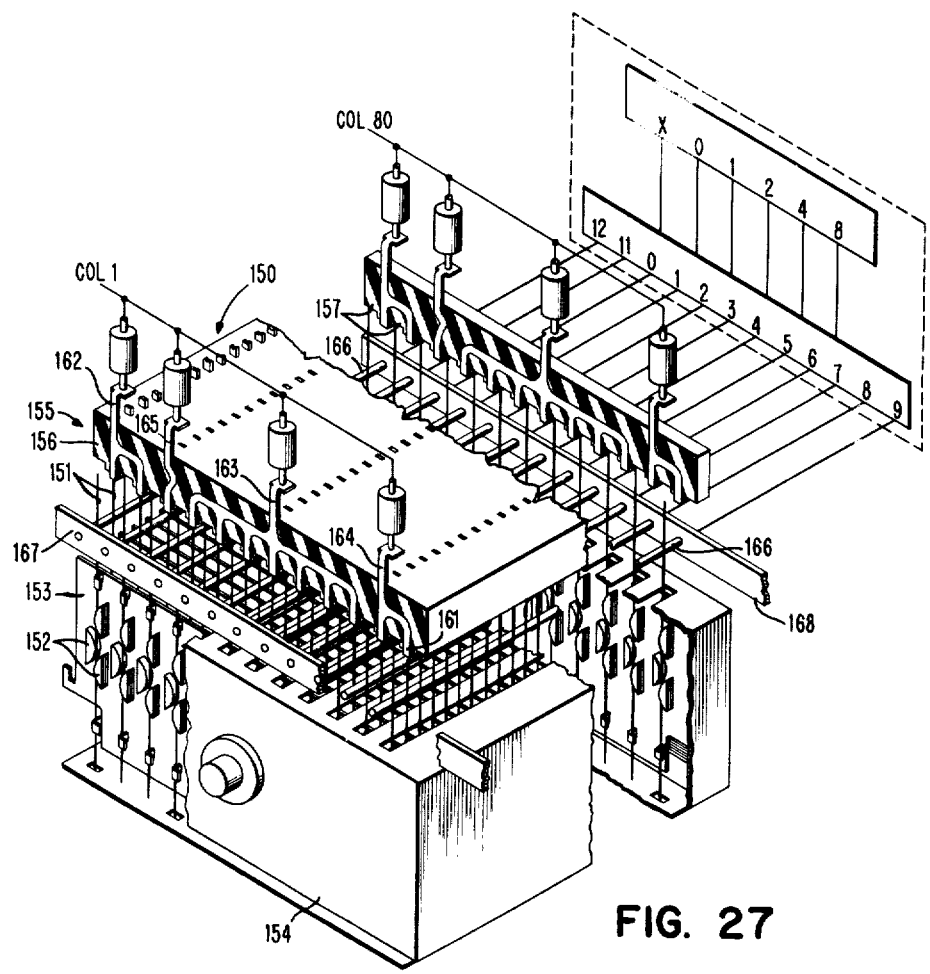
Figure 28A:
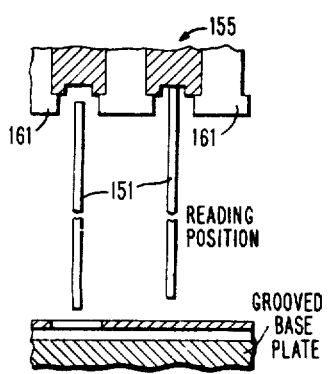
Figure 28B:
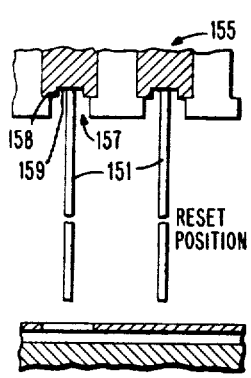
Figure 28C:
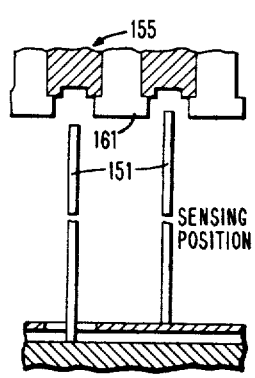
Figure 29:
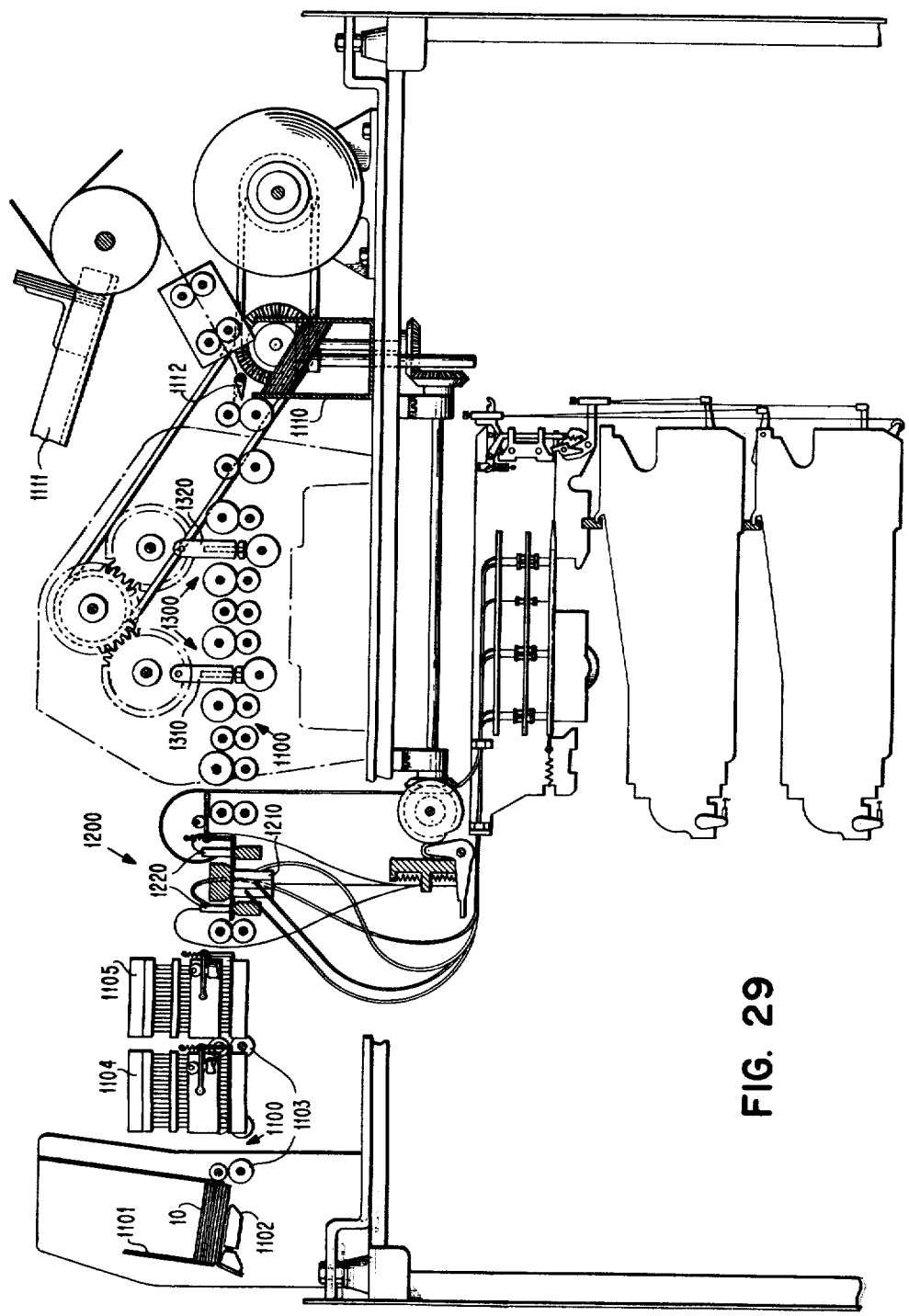
Figure 30B:
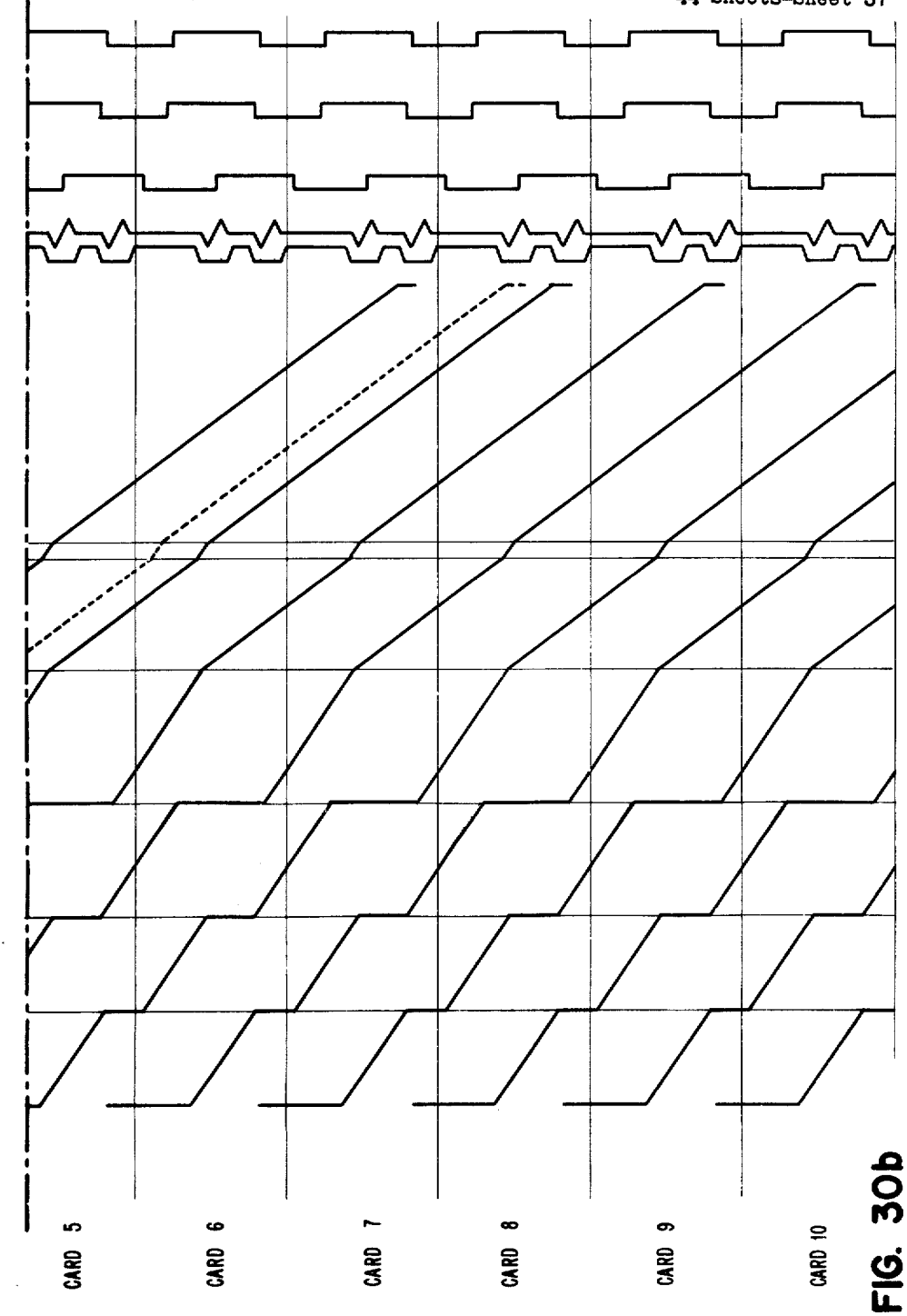
Figure 33:
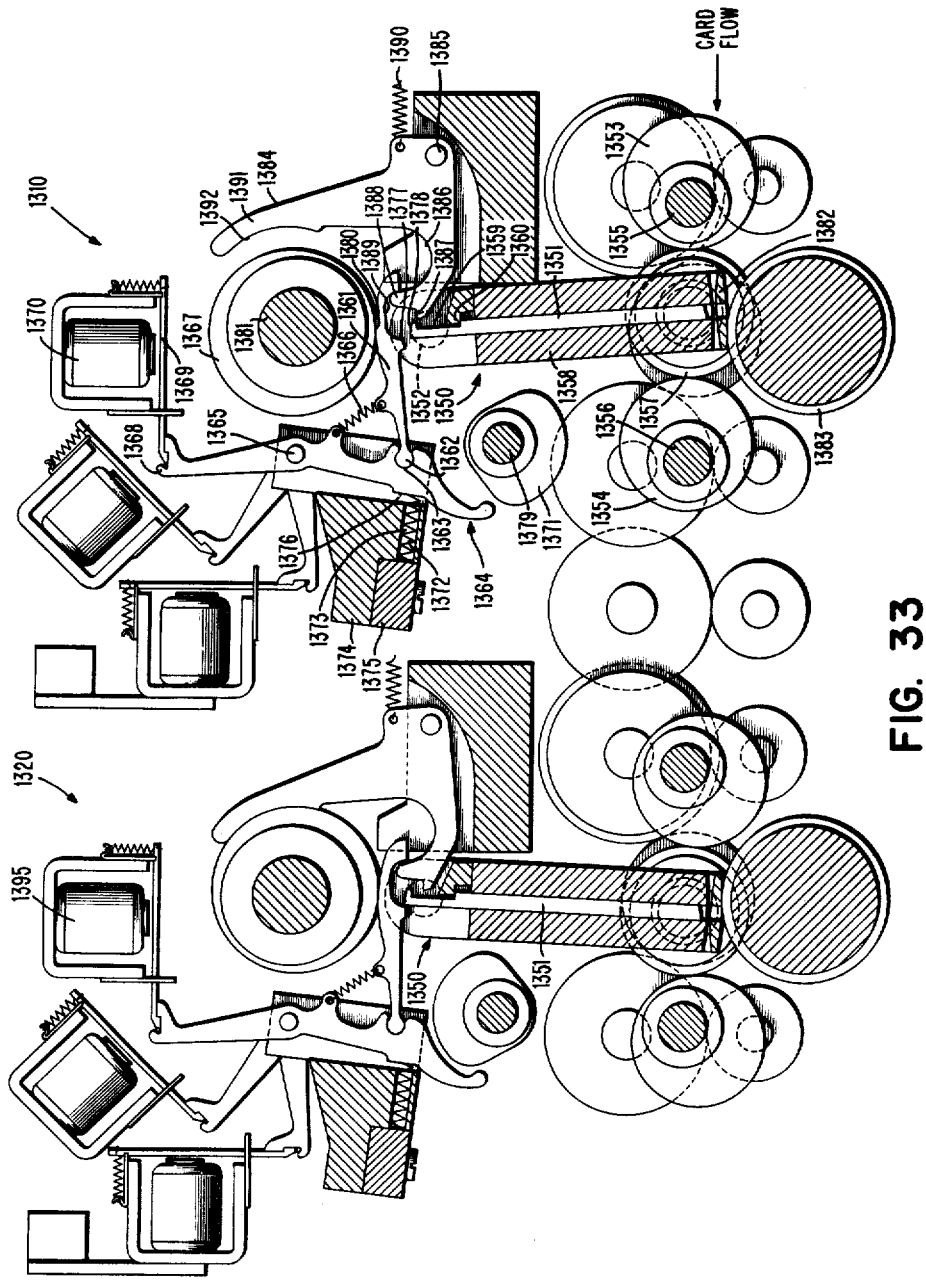
Figure 34:
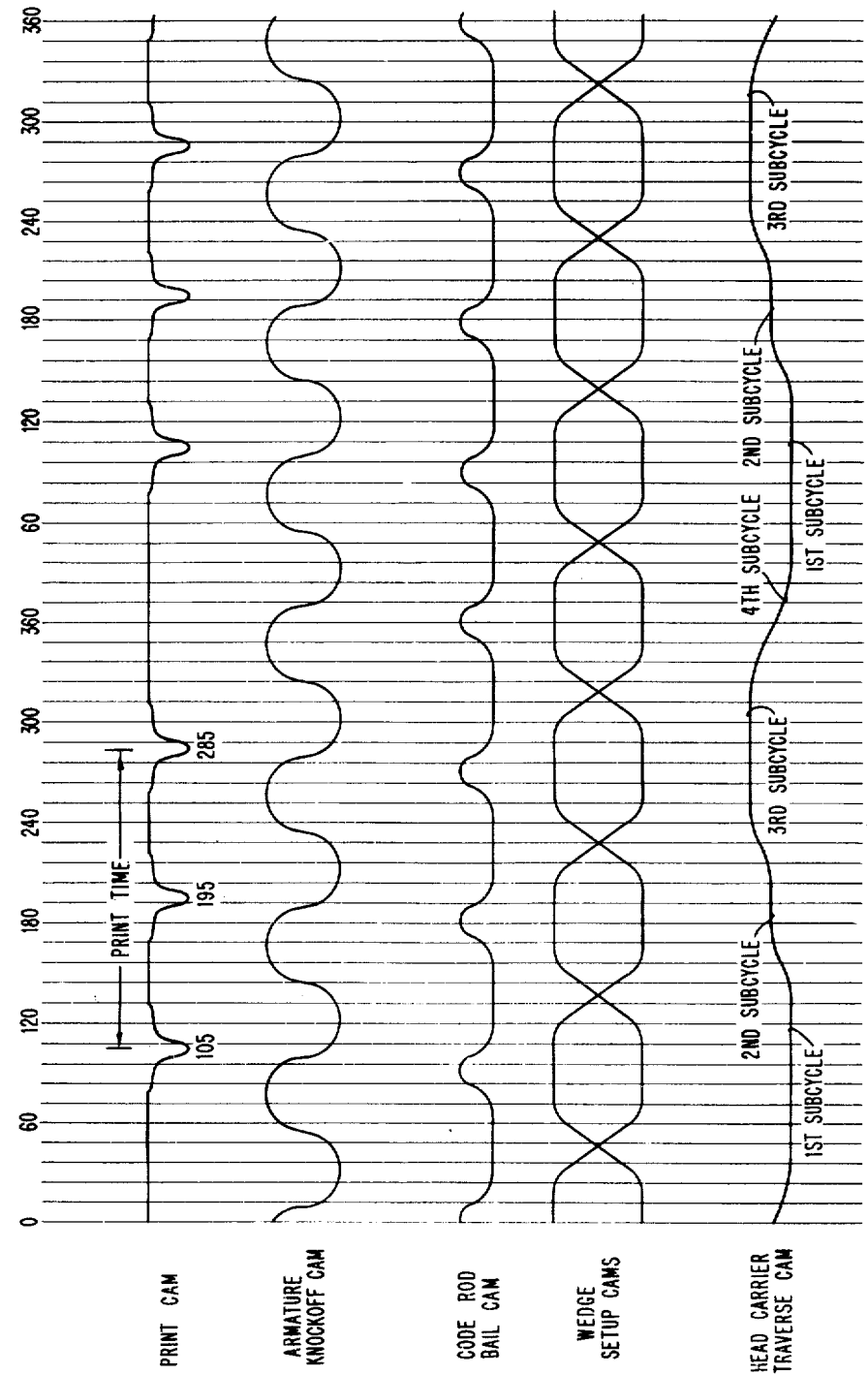
Figure 35B:
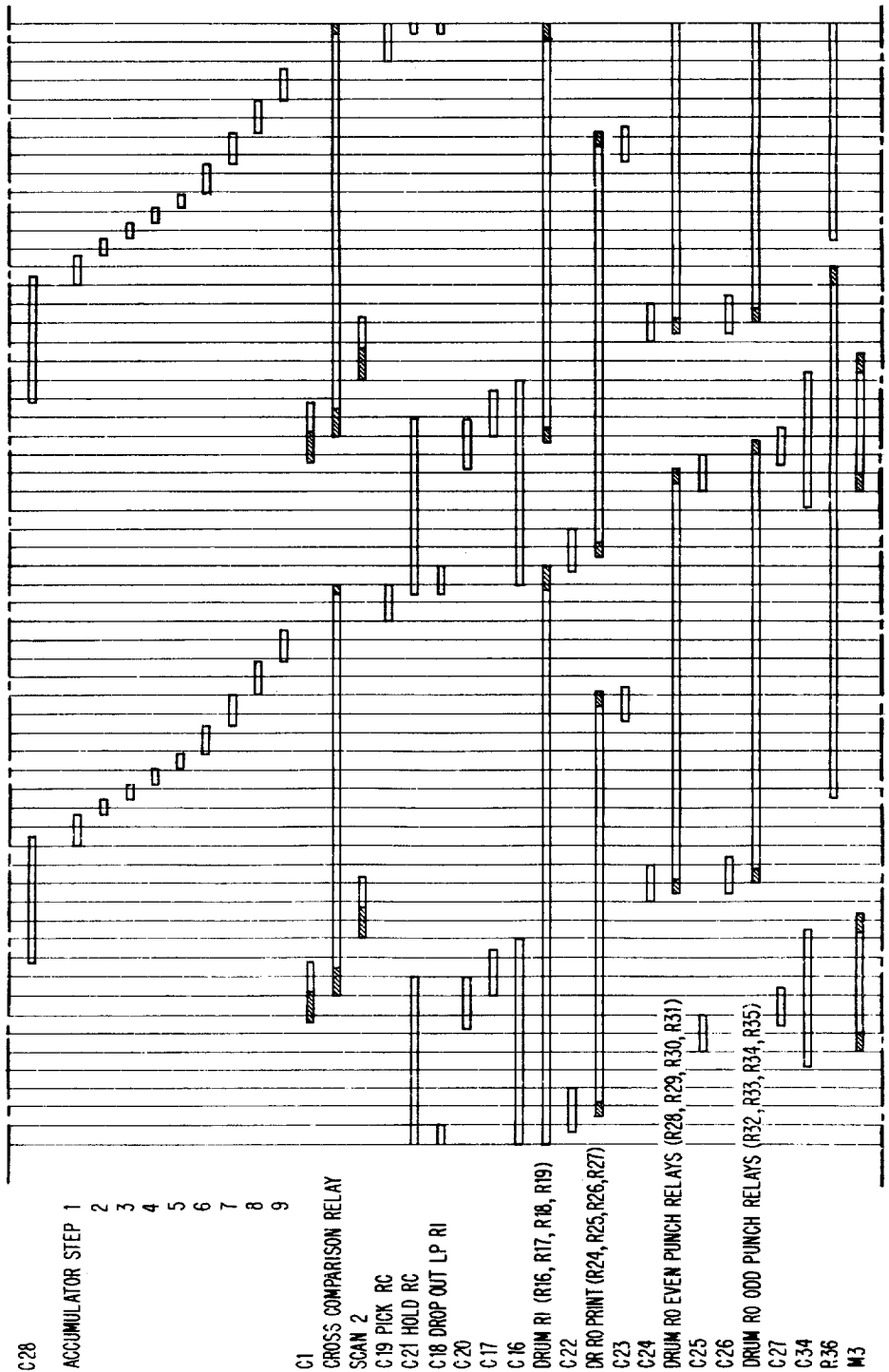
Figure 35C:
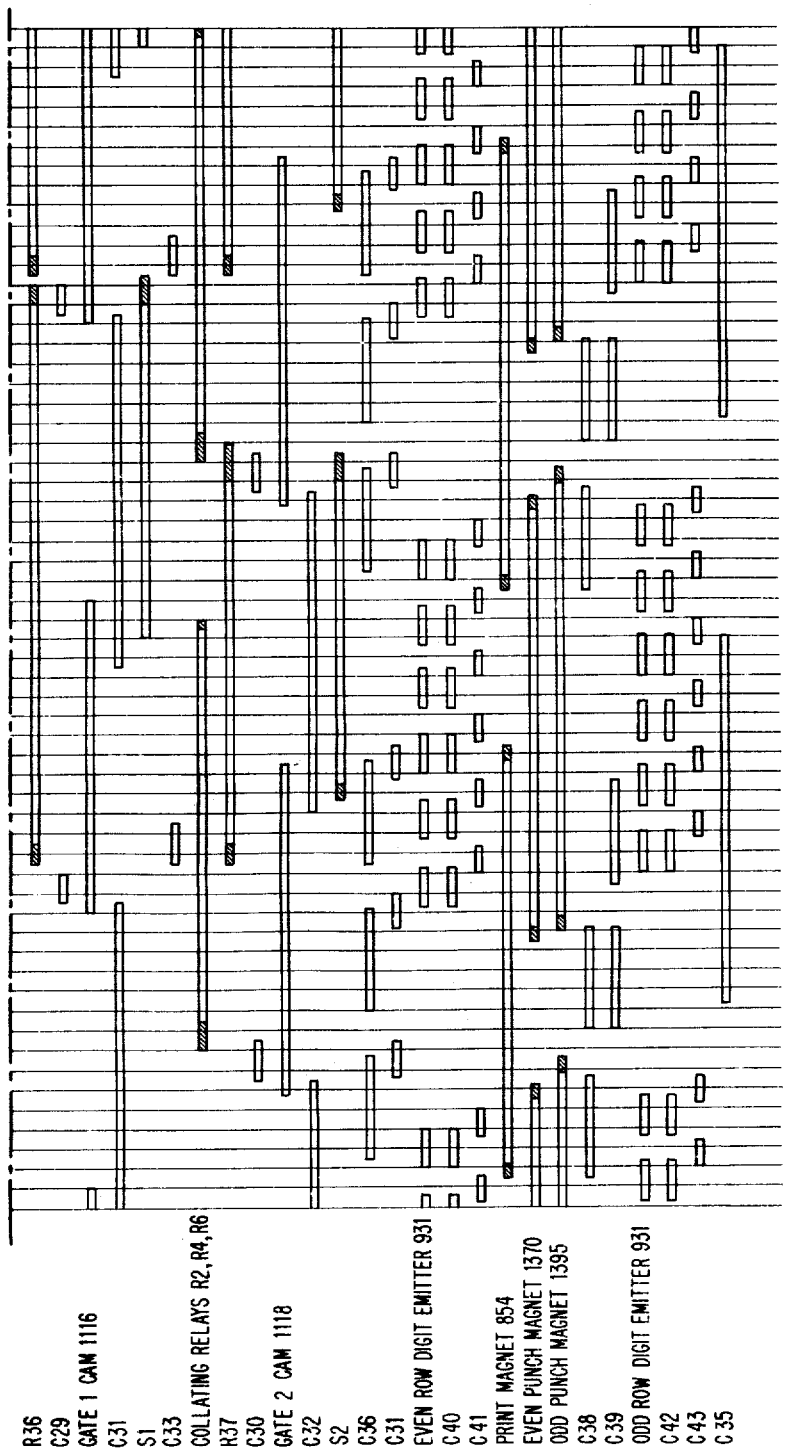

FIGS. 4a to 4g, inclusive, taken together as shown in FIG. 5, form a composite view showing schematically the sensing units of the master and detail card readers, the collating circuitry, scan circuitry, drum read-in control circuitry, drum storage, accumulator, drum readout control circuitry, print setup controls, and punch setup controls;

FIG. 5 is a diagram showing the relationship of FIGS. 4a, 4b, 4c, 4d, and 4e;

FIGS. 6a to 6j, inclusive, taken together as shown in FIG. 7, form a schematic diagram of the circuitry for the sensing units at the first and second sensing stations of the master and detail card readers, the circuitry for code conversion from IBM code to binary code, the circuitry for serializing the converted information, and the collating circuitry;

FIG. 7 is a diagram showing the relationship of FIGS. 6a to 6f, inclusive;

FIG. 8 is a schematic circuit diagram of the scan control circuitry;

FIG. 9 is a schematic circuit diagram of the drum read-in control or switching circuitry;

FIG. 10 is a schematic circuit diagram of the drum readout control or switching circuitry;

FIG. 11 is a schematic diagram of the clutch control circuitry for the master and detail card reader units and for the card document preparation unit;

FIG. 12 is a schematic circuit diagram of typical print setup controls for the print units of the card document preparation unit and the continuous forms print unit;

FIG. 13 is a schematic circuit diagram of the translator or code converter for translating from binary code to IBM code and of the punch setup controls for the punch units of the card document preparation unit;

FIG. 14 is a schematic diagram of the relay control circuitry for effecting subcycle printing through the print setup controls shown in FIG. 12;

FIG. 15 is a detailed circuit diagram of the translator for translating from binary to IBM code and of the punch setup controls for the first or even punch unit;

FIG. 16 is a partial circuit diagram of the translator for translating from binary to IBM code for the second or odd punch unit, only a partial showing is made because the remaining circuitry would be substantially identical to that for the even punch unit as shown in FIG. 15;

FIG. 17 is a diagram showing the character positions of a drum track, the data contained in each position in coded form, and the signals developed for converting the data contained in each character position to the IBM code for "12's" and "8's";

FIG. 18 is a diagram showing the character positions of a drum track, the binary data bits recorded in each position, the representation of the data bits in the IBM code, and the character represented thereby;

FIG. 19 is a diagram illustrating the relationship of the permanently recorded bits on the magnetic drum timing tracks T1, T2, and T3;

FIG. 20 is a diagram illustrating the representation of alphabetic, numeric and special characters in IBM and binary code form;

FIG. 21 is a plan view of a completed record card document showing the name and address face or obverse face thereof;

FIG. 22 is a plan view of a completed record card document showing the item or billing or reverse face thereof;

Figures 23, 24:
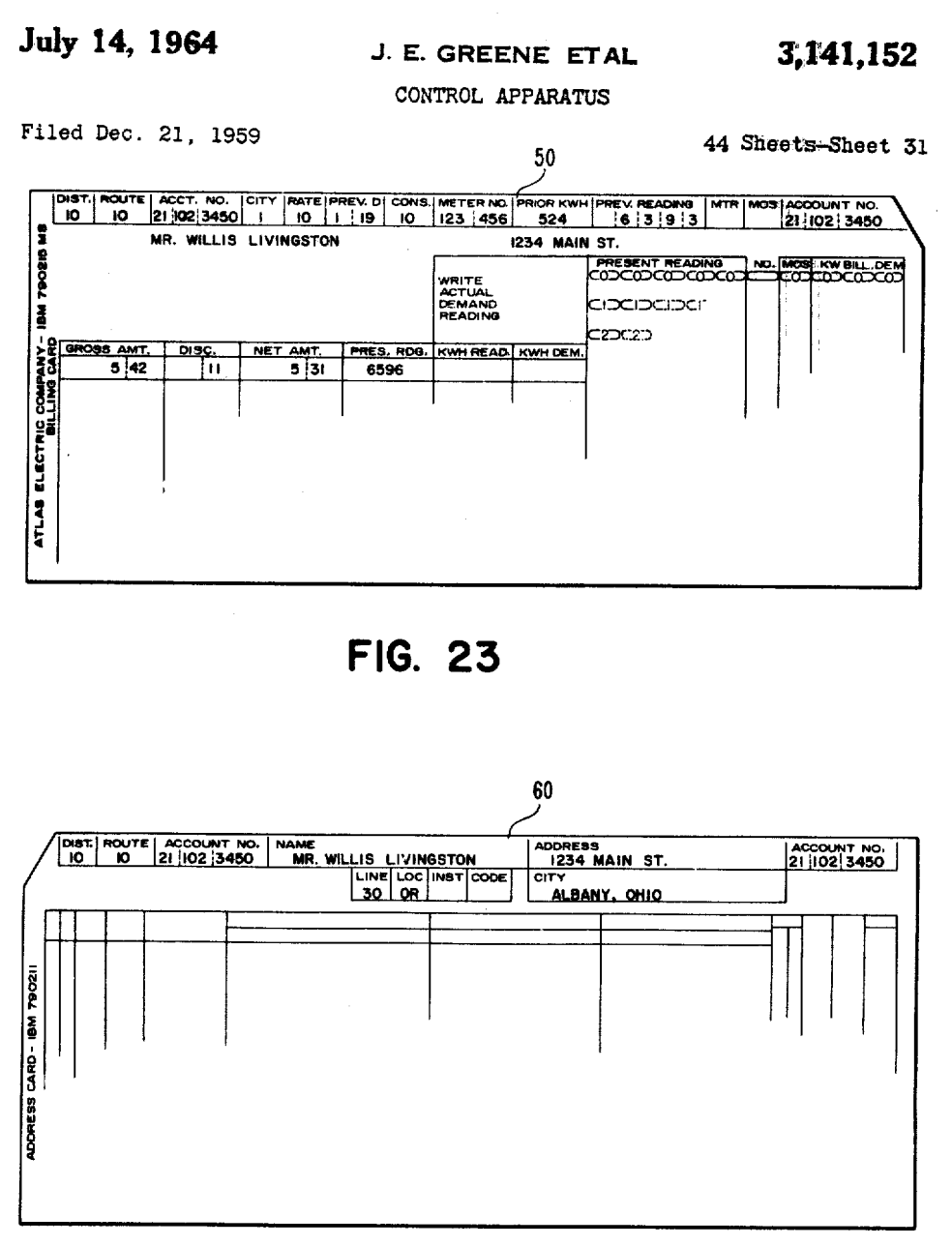

FIG. 23 is a plan view of a billing or item or detail card used in the preparation of the card document shown in FIG. 18;

FIG. 24 is a plan view of a name and address or master card used in the preparation of the card document shown inf FIG. 17;

FIG. 25 schematically illustrates the master card reader unit and the flow of master cards therethrough;

FIG. 26 schematically illustrates the detail card reader unit and the flow of detail cards therethrough;

FIG. 27 is a perspective view of the static sensing unit located at the first and second sensing stations of the master and detail card reader units;

FIGS. 28a, 28b, and 28c are views schematically illustrating the operation of the sensing unit of FIG. 27, FIG. 28a shows the sensing wires of the sensing unit after having sensed a record card and in the neutral position in preparation for a reading operation, FIG. 28b shows the sensing wires being restored to permit a subsequent sensing operation, and FIG. 28c shows the sensing wires moved to the position for sensing a record card;

FIG. 29 is a front elevational view of the card document preparation unit to show the various machine elements;

FIGS. 30a and 30b, taken together, with FIG. 30b disposed below FIG. 30a, schematically illustrate the card document preparation unit and the flow of card documents therethrough;

FIGS. 31, 31b, and 31c are views schematically illustrating the print head arrangement for the card document preparation unit and the continuous forms print unit, FIG. 31a schematically shows the print heads for printing the name and address on the card documents, FIG. 31b shows the print heads for printing the billing data, while FIG. 31c shows the print heads for printing upon the continuous forms;

FIG. 32 is a detail view showing the drive arrangement for the print heads of the card document preparation unit;

FIG. 33 is a detail view of the punching units including the punch magnets and punch setup mechanisms, which are located at the first and second punch stations of the card document preparation unit, the punch and die assembly at the first punching station is shown at the instant of starting the forward swing, while the punch and die assembly at the second punch station is still traveling forward, all elements are shown in their exact relative positions;

FIG. 34 is a timing diagram for the various print mechanisms of the print unit for serial-parallel printing on a subcycle basis;

FIGS. 35a, 35b, and 35c, taken together as shown in FIG. 36, constitute a timing diagram;

FIG. 36 is a diagram showing the relationship of FIGS. 35a, 35b, and 35c; and,

FIG. 37 is a diagram schematically illustrating information flow on a cycle basis.

GENERAL

The present invention is characterized by several coordinated units of apparatus, generally illustrated in FIG. 1, including a card reader unit 100 for sensing or analyzing source record cards 50 and 60, FIGS. 23 and 24, respectively, to derive address and item information therefrom and an electronic control unit 200, FIG. 1, for processing and storing data derived by the card reader unit 100 and subsequently making the data available at selected periods of time to a card document preparation unit 1000 and continuous forms print unit 1500.

Figure 1:
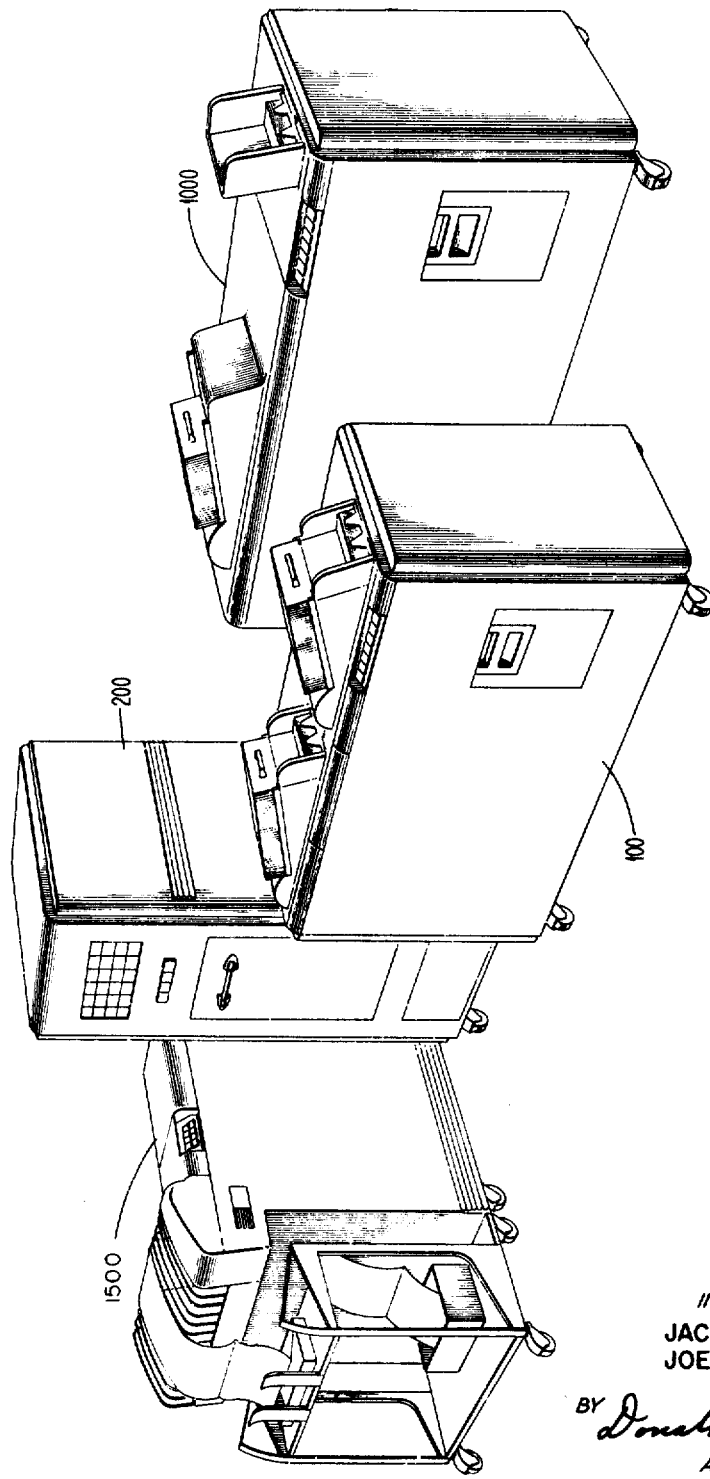
FIG. 1 is a view illustrating the general appearance of the machine units embodying the invention.

The card reader 100 is a dual unit, FIGS. 1 and 3, consisting of a card reader unit 110 for analyzing master cards 60 or those cards containing the name and address of a customer, or other like data, and a card reader unit 120 for analyzing detail cards 50 or those cards containing billing data, or similar data. The card reader units 110 and 120 include card hoppers or magazines 111 and 121, first sensing stations 112 and 122, second sensing stations 113 and 123, and card stackers 114 and 124, respectively.

Master and detail card sequence checking circuitry 115 and 125, respectively, which will be described as a portion of the electronic control unit 200, facilitates a determination as to whether or not the master and detail cards are in their proper ascending or descending order while cross-comparison circuitry 126, which makes a check between sensing stations 113 and 123, enables a determination as to whether or not the master card 60 presented at station 113 is related to the detail card 50 at station 123. The sequence checking circuitry 115 and 125 and the cross-comparison circuitry 126 comprise collating circuitry 127, shown as a block in FIG. 2. The electronic control unit 200, FIG. 1, includes apparatus to store data derived by the card reader 100 through the facility of a magnetic drum 201, shown as a block labeled Data Storage, FIG. 2, to provide timing control circuitry 250 including readout circuitry 251 and selective plugging circuitry 252, to provide code conversion circuitry 170, FIG. 4c, to provide the collating circuitry 127, clutching circuitry 375, FIG. 2, scan circuitry 400, read-in control or switching circuitry 500, an accumulator 600, readout control or switching circuitry 700, print setup control circuitry 800, and punch setup control circuitry 900.

The continuous forms print unit 1500, FIGS. 1 and 3, has the facility for feeding continuous forms 1510 and print mechanism 1520, FIG. 31c, for printing data on the continuous forms; while the card document preparation unit 1000, FIGS. 1, 3, and 29, includes a card feed and transport section 1100, print mechanism 1200, and punch mechanism 1300. The data recording devices, such as the print mechanism 1200 and punch mechanism 1300, for the card document preparation unit 1000, and the print mechanism 1520, for the continuous forms print unit 1500, are each considered as separate output devices for receiving data from the electronic control unit 200.

Figure 2:
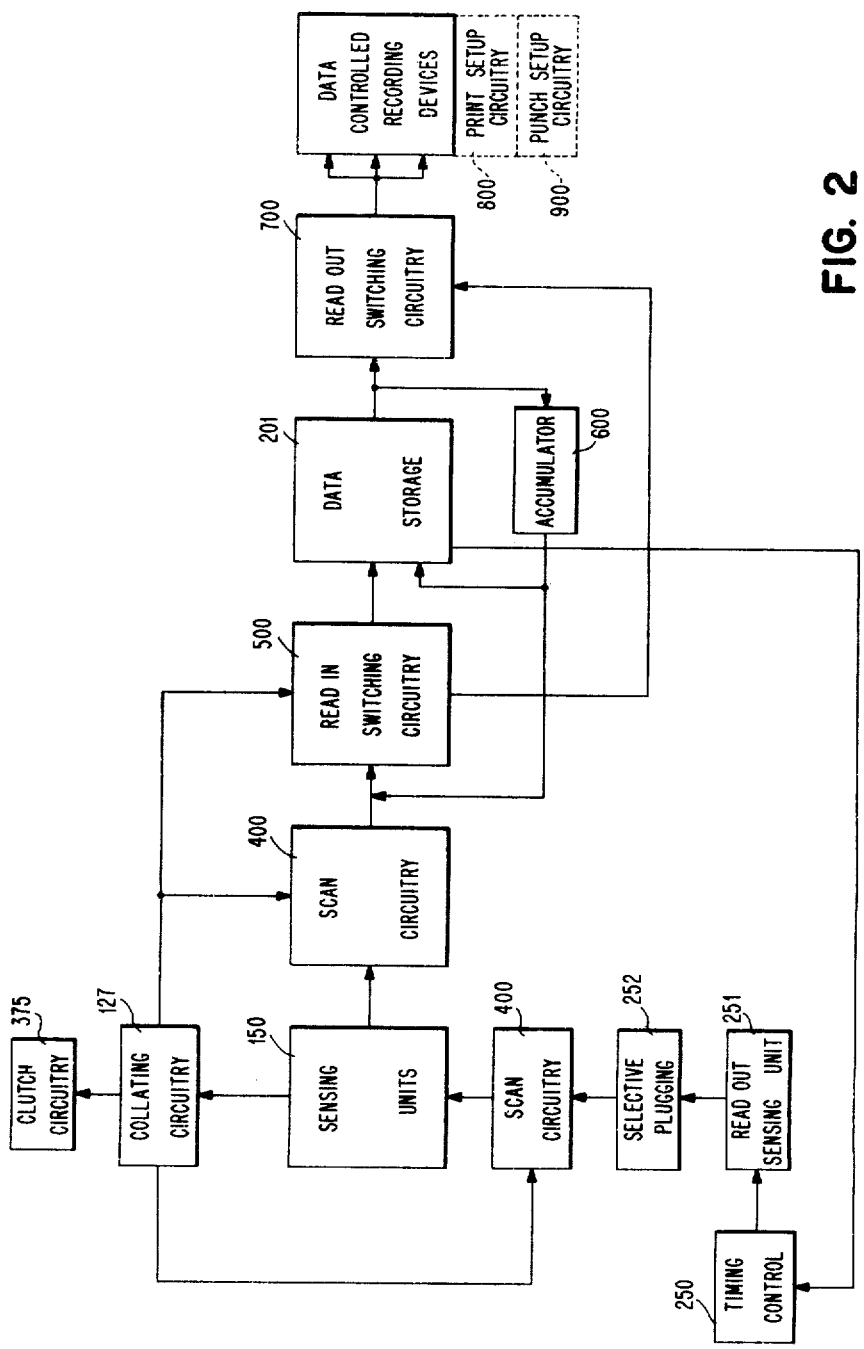
FIG. 2 is a very general schematic block diagram illustrating the flow of information from the sensing units to data storage and to the data controlled recording devices and the controls for passing the information.

The invention will be best understood by following the flow of data from the card reader 100, FIGS. 2 and 3, to the electronic control unit 200 and from this unit to the card document preparation unit 1000 and the continuous forms print unit 1500 and by studying the apparatus for controlling this flow of data. These relationships can readily be understood by examining FIG. 2, which is a very general schematic block diagram illustrating the controls for passing the information and the flow of information from the sensing units of the card reader 100 to data storage 201 of the electronic control unit 200 and to the print setup circuitry 800 and punch setup circuitry 900 for the data controlled recording devices. Sensing units 150 of the card readers 110 and 120 forming the card reader unit 100 are represented by a single block. To selectively arrange data as it is being stored upon the magnetic drum 201 of the electronic control unit 200, information is transferred from the static sensing units 150 positioned at the second sensing stations 113 and 123 of the master and detail card readers 110 and 120 in a series of sucessive scans; each scan, through the facility of scan circuitry 400, may be plugged independently so as to enable the selective transfer of information from the sensing units. In this example, timing control 250, FIG. 2, is obtained from permanently recorded magnetized spots upon the magnetic drum 201 in drum tracks T1, T2 and T3, FIG. 4d. The magnetic drum 201 is driven by suitable means, not shown, to rotate at approximately 9400 r.p.m. The basic frequency rate is 100 kc. The drum track T1 is provided with a permanently recorded magnetized spot. As this spot passes relative to a magnetic read head 210 disposed to sense magnetized spots recorded in drum track T1, a voltage signal is developed. This signal is capacitively coupled and entered into a voltage amplifier 211, and is termed the "home" impulse signal. The "home" impulse signal is utilized for timing purposes, as will be seen shortly. Drum track T2 is provided with 80 arcuately spaced permanently magnetized spots. These 80 spaced permanently recorded magnetized spots are related or referenced to the magnetized spot in track T1. Signals developed by these magnetized spots are identified as C signals and are utilized to drive timing rings for developing column impulses, which will be discussed in greater detail hereinafter. Drum track T3 contains 640 equally spaced permanently recorded magnetized spots. These permanently recorded magnetic spots are also referenced to the magnetized spot in drum track T1 and, consequently, are referenced to the magnetized spots in drum track T2. The signals developed by the magnetized spots in drum track T3 are identified as A signals and are utilized to drive another timing ring. The relationship of the permanently recorded magnetic spots in drum tracks T1, T2 and T3 is shown in FIG. 19. The magnetic drum 201 of the electronic control unit further includes tracks T4 through T15 for storing data which will be subsequently transferred to the card document preparation unit 1000 and the continuous forms print unit 1500.

Figure 4C:
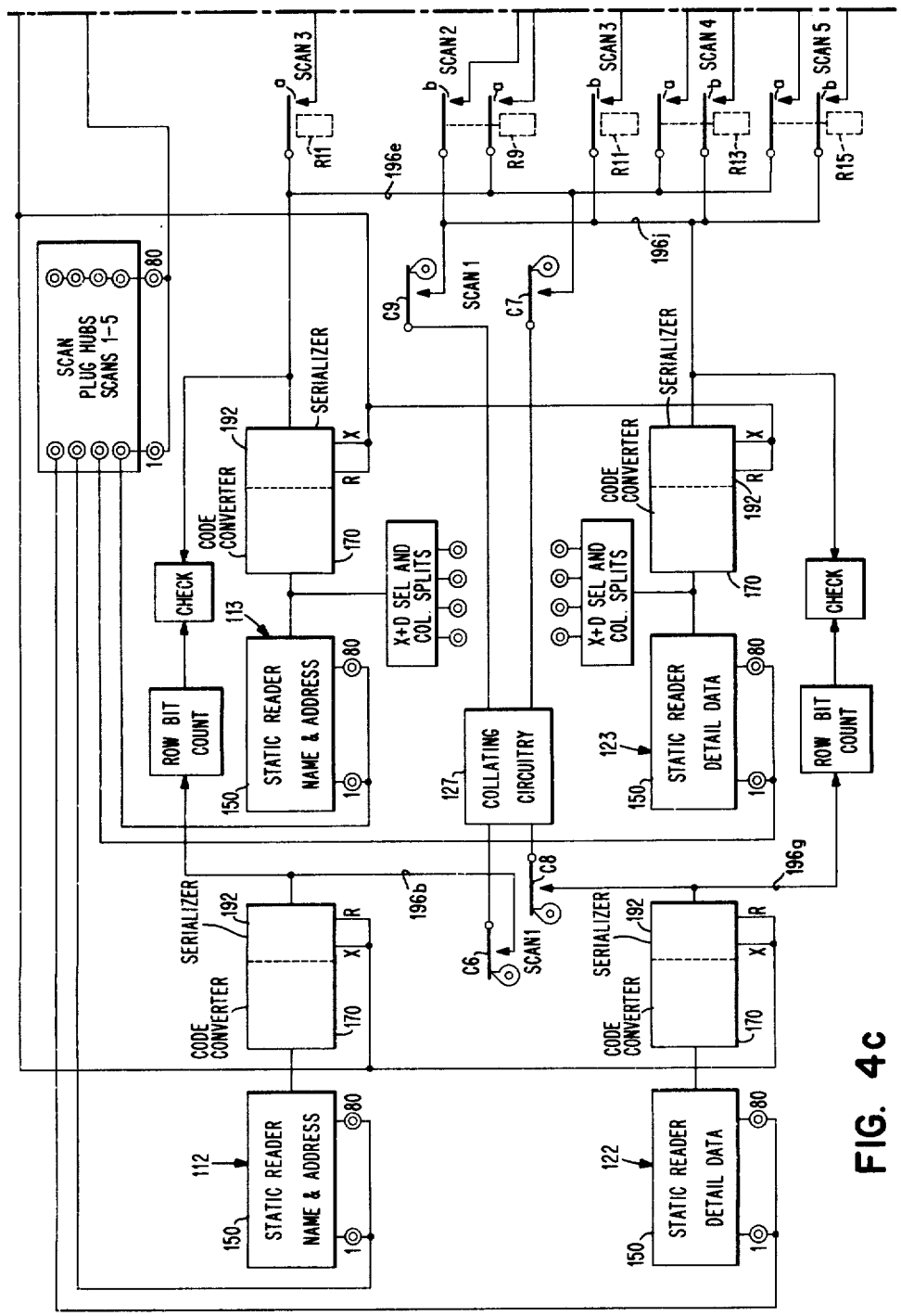
Figure 4D:
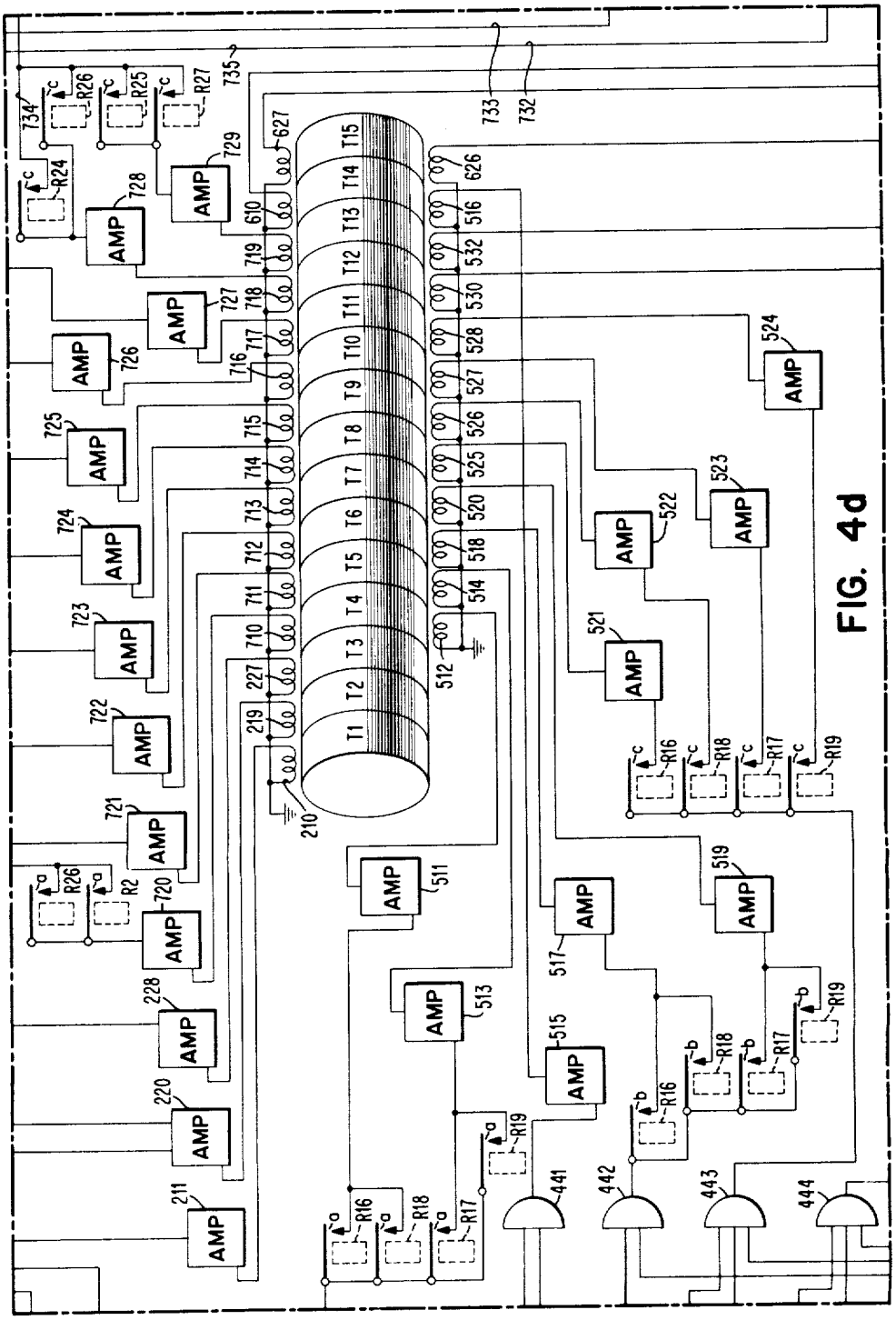

Tracks T4 and T5, FIG. 4d, are utilized to store information which will subsequently be transferred to the name and address print control mechanism 810, FIG. 4b, for controlling the print units 1210, FIGS. 3 and 29, for printing on the obverse face of the record card documents 10 passing through the acrd document preparation unit 1000. Drum tracks T6 and T7, FIG. 4d, are utilized to store data which will subsequently be transferred to billing data print control mechanism 820, FIG. 4e, for controlling the print unit 1220, FIGS. 3 and 29, for printing upon the reverse face of the card documents 10 passing through the card document preparation unit 1000. Tracks T8, T9, T10 and T11, FIG. 4d, are utilized for storing information which will be subsequently transferred to punch control or setup circuitry 910 and 920, FIGS. 4e and 4g, for controlling the punch mechanism 1300, FIGS. 3 and 29, for entering perforations into the card documents 10 passing through the card document preparation unit 1000. Drum tracks T12 and T13, FIG. 4d, are utilized to store information which will be transferred to the print control mechanism 830, FIG. 4g, for controlling the print mechanism 1520, FIGS. 3 and 31c, of the continuous forms print unit 1500. Drum track T14, FIG. 4d, is utilized to receive the information from the static sensing units 150 positioned at sensing stations 113 and 123 of the master and detail card readers 110 and 120, FIG. 4c, which will be transferred directly to the accumulator 600, FIG. 4f, while drum track T15 stores information for accumulation purposes and is considered a buffer storage track for the accumulator 600.

Information or data is transferred from the static sensing units 150 of the master and detail card readers 110 and 120, FIG. 4c, to the magnetic drum storage tracks T4 to T14, inclusive, in a series of sequential scans. However, the first scan is not utilized for transferring information to the magnetic drum 201; rather, it calls the collating circuitry 127 into play. The collating circuitry 127, FIGS. 2, 3 and 4c, essentially determines whether or not the master cards 60 and the detail cards 50 are in their proper sequence and whether or not the master cards 60 are related to the detail cards 50. Depending upon the results of the collating operation, clutch circuitry 375, FIG. 2, of the master and detail card readers 110 and 120 and of the card document preparation unit 1000 will be called into operation and the scan circuitry will either be permitted to continue a sequence of operation or will be reset for another collating operation after a new set of records are brought into sensing position. Also, if the collating circuitry permits, the drum read-in switching circuitry 500, FIG. 2, will be set up so that data will be read into the proper drum tracks of the magnetic drum 201.

Scan 2 is utilized to transfer selected information retained by the static sensing units 150 positioned at the record sensing stations 113 and 123 of the master and detail card readers 110 and 120 to drum track T14 for an accumulation operation, FIGS. 4c and 4d. This is the earliest time at which information may be transferred to drum track T14, which will immediately be transferred to the accumulator 600, FIG. 4f, because it was necessary to determine, by means of the collating operation, whether or not the master cards 60 and detail cards 50 were related and were in their proper sequence. While data transferred to drum track T14 is directly transferred therefrom to the accumulator 600, data transferred from the accumulator 600 to other storage areas of data storage or to other drum tracks of the magnetic drum 201 after an accumulation operation passes via the drum read-in switching circuitry 500, FIGS. 2, 4d and 4f. However, during an accumulation operation, data passes from the accumulator directly into drum track T15.

Scan 3 enables information to be transferred from the static sensing units 150 at the second sensing stations 113 and 123 of the master and detail card readers 110 and 120 to the drum tracks T4 and T5 to contain information which will be subsequently transferred to the print control mechanism 810 for setting the print units 1210 for printing information on the obverse face of the card documents 10 passing through the card document preparation unit 1000. Scan 3 also enables the recording of data on tracks T6 and T7, which will subsequently be transferred to the print control mechanism 820 for setting the print units 1220 of the card document preparation unit 1000 for printing on the reverse face of the card documents 10.

Information which will be subsequently entered into the card documents 10 in the form of perforations is transferred from the static sensing units at the second sensing stations 113 and 123 of the master and detail card readers 110 and 120 to drum tracks T8 through T11 during scan 4. Scan 5 is utilized to transfer the information from the static sensing units at the second sensing stations 113 and 123 of the master and detail card readers 110 and 120 to drum tracks T12 and T13, which will be subsequently transferred to the print control mechanism 830 for setting the print mechanism 1520 of the continuous forms print unit 1500.

The drum read-in switching circuitry 500, FIG. 2, is seen to control the drum readout switching circuitry 700. By this arrangement, data may be entered into certain drum tracks of the magnetic drum 201 while other data is simultaneously transferred from other drum tracks to the print and punch control mechanism 800 and 900 of the data controlled recording devices 1200 and 1300 of the card document preparation unit 1000 and the recording device 1520 of the continuous forms print unit 1500.

A general impression of the timing relationships may be obtained by reference to FIG. 37. Master and detail cards 60 and 50, respectively, are read by card groups. For the master and detail card readers 110 and 120, the master and detail cards advance from the card hoppers 111 and 121 to the first and second sensing stations during a card reader run-in operation. Information is read by the static sensing units 150 at the first sensing stations 112 and 122 and the second sensing stations 113 and 123 of the master and detail card readers 110 and 120 during a first cycle of operation after run-in and is held by the static sensing units 150 for the remainder of that cycle. All printing takes place during the cycle following the first cycle that the information had been read by the static sensing units at the first and second sensing stations. Punching starts in the third cycle of operation or the second cycle following the cycle that the information had been read and is completed on the next cycle.

Before continuing with the general impression of the timing relationships, these relationships may be better understood by interjecting further description of the general arrangement of the card document preparation unit 1000 and the continuous forms print unit 1500. The function of the card document preparation unit 1000, FIGS. 1, 3 and 29, is to prepare record card documents 10 in the form of utility bills, insurance notices, and other similar records which bear the information in both printed and punched form. The document 10 which is to be produced by the card document preparation unit 1000 is shown in FIGS. 21 and 22. The document 10 is a record or tabulating card having a main body portion 20 with a stub portion 30 easily detachable therefrom to permit the return thereof with the remittance and an office record portion 40 which is severed from the bill before sending the same to the customer.

The body portion 20, stub portion 30, and office record portion 40 bear data either in printed and/or punched form. The printed data is contained on both the obverse and reverse faces of the document 10. In examining the record card document shown in FIGS. 21 and 22, it is seen that the one face thereof, the obverse face, contains address information while the opposite, or reverse face, contains billing data. The use of the terms "obverse" and "reverse" is relative and does not have any particular significance other than that for purposes of identification or reference.

Certain information of the document is derived from source record cards, shown in FIGS. 23 and 24 as a detail card 50 and a master card 60, respectively, while other information is obtained as a result of an arithmetical or accumulating operation.

The card document preparation unit shown in FIGS. 1, 3 and 29 may be considered in separate portions or groups. There is the card document feed and transport portion 1100, a card document print portion 1200, and a card document punch portion 1300. With particular reference to FIGS. 29, 35a, 35b and 35c, blank record cards 10, or cards having some preprinted and/or prepunched information therein, are contained in a card hopper 1101 of the card document feed portion 1100. Card feeding mechanism 1102, for feeding the blank cards from the card hopper 1101 in seriatim, is clutch controlled. The record cards residing in the card hopper "12" edge first, obverse face down, are fed at a rate of approximately 500 cards per minute; and, therefore, each card cycle of the card document preparation unit is approximately 120 milliseconds. As the record cards 10 leave the card hopper 1101, card transport mechanism 1103, consisting of spaced apart feed rolls, conveys the cards to a first static sensing station 1104. The first static sensing station 1104 functions to read any prepunched information present in the card documents 10 so as to permit a check of the sequence of the record cards 10, as will be seen shortly, or to permit the record cards to be interpreted. The record cards 10 advance from the first static sensing station 1104 to a second static sensing station 1105 spaced therefrom along the card path and having the function to cooperate with the first sensing station for checking the sequence of the record cards. For example, the record cards 10 could contain prepunched information relating to account numbers. Then, the first and second static sensing units would be utilized to check the presentation of the account numbers in the record cards 10.

Upon leaving the second sensing station 1105, the record cards are conveyed to the print portion or station 1200. A single print station is utilized for simultaneously printing the name and address information upon the obverse face of the record card and billing or data information upon the reverse face thereof. The card is held in the printing station 1200 for approximately 70 milliseconds to permit the printing operation to take place. Printing takes place in serial-parallel fashion on a subcycle basis. Serial-parallel printing is defined as a print unit in which each type member prints more than one character for each line of printing. The print mechanisms 1210 and 1220 are of the wire printer type including print heads which are located on fixed centers with respect to each other but may be shifted laterally to complete the lines of printing for the name and address and for billing data, such as in the patent to R. Johnson, No. 2,802,414, dated August 13, 1957. The record cards 10 leave the print station 1200 after a print operation and are conveyed to a first punch station 1310 of the punch mechanism 1300 where data is recorded in the even rows of the record cards while the same are in flight. These types of punch units are already known in the prior art and the type of punch in the present invention is quite similar to the punch units described in the patents to C. D. Lake et al., No. 2,451,752 and No. 2,845,122, and the patent to G. F. Daly et al., No. 2,547,445. The cards 10 continue on to a second punch station 1320 wherein data is recorded in the odd rows of the cards 10 while the same are moving relative thereto. The cards 10 continue in their movement to card stackers 1110 and 1111. A card deflector 1112 is interposed between the two stackers 1110 and 1111 so as to permit card segregation. It may be desirable to select certain cards, such as duplicate cards or cards containing errors, and segregate the same from the rest of the cards. Card errors may be detected by the first and second sensing units 1104 and 1105, respectively.

The continuous forms print unit 1500, FIGS. 1 and 3, functions to list or print customer and billing data upon continuous forms for record purposes and to facilitate further accounting operations. This may take the form of a typical high-speed listing machine including a wire printer unit of the type described in the patent to R. Johnson, No. 2,802,414, and a form transporting carriage of the type disclosed in the patent to J. Cunningham et al., No. 2,747,717. The print mechanism 1520 comprises twenty print heads spaced apart, FIG. 31c, so as to cover sixty characters by subcycle printing.

To continue with the discussion of the timing relationships, and referring back to FIG. 37, during scan 1 of the first operating cycle, the collating operation is performed. Further, depending upon the results of the collating operation, information is scanned and transferred to the accumulator 600 during scan 2. During scan 3 of the first operational cycle, information is transferred to print track storage, which is shown to include all print storage; and, during scan 4, information is transferred to the punch track storage, shown as single storage for containing information for punch even and odd rows, while, during scan 5, information is again transferred to print track storage. The accumulation operation is performed within the first cycle and the information is transferred from the accumulator 600 to print track storage and punch track storage so as to be associated again with information of card group one. No printing or punching takes place during the first cycle. On the second cycle of operation, card group two is read and processed while card group one remains in storage and is read out at appropriate times, as will be seen shortly. Card group two information is transferred within the second cycle and after the collating operation to the accumulator 600 during scan 2, while during scan 3, information is transferred to the print track storage and, during scan 4, information is transferred to the punch track storage and, during scan 5, information is again transferred to print track storage. While these scans are taking place, information in storage relating to card group one is transferred to the print control mechanisms 810 and 820 for the print units 1210 and 1220 of the card document preparation unit 1000 and the print control mechanism 830 for the print unit 1520 of the continuous forms print unit 1500. Hence, it is seen that all printing is done on the cycle following read-in to storage while, at the same time, other information is read into print track storage. It is through the facility of the drum read-in and readout switching circuitry 500 and 700, respectively, which permits this action.

The third card group is read and processed during the third cycle. During the third cycle, information relating to the third card group is transferred to the accumulator 600 during scan 2 and transferred to print track storage during scans 3 and 5 and to punch track storage during scan 4. Since the information relating to card group one has been printed and is no longer needed, the third card group is read into print track storage which had been occupied by card group one. Also, during the third cycle of operation, the information relating to card group two is transferred from print track storage to the print control mechanisms 810 and 820 for the print units 1210 and 1220 of the card document preparation unit 1000 and the print control mechanism 830 for the print unit 1520 of the continuous forms print unit 1500. Further, information held in punch track storage for card group one is transferred to even punch control or setup mechanism 910 for the even punch mechanism 1310 of the card document preparation unit 1000 to permit the punching of the card document 10.

The fourth card group is read and processed during the fourth cycle of operation; and, during scan 2 of this cycle, the information of the fourth card group is transferred to the accumulator 600; and, during scans 3 and 5 of this cycle of operation, information of the fourth card group is transferred to print track storage and to punch track storage during scan 4. After the accumulation operation, which takes place within the fourth cycle for the fourth card group, information relating to the fourth card group is transferred from the accumulator 600 to print track storage and to punch track storage.

The fourth card group is read into that portion of print track storage which had been occupied by card group two. The information relating to card group two was printed during the third cycle. Also, during the fourth cycle, the information in print track storage relating to card group three is transferred to the print control mechanisms 810, 820 and 830 for the print mechanisms 1210, 1220 and 1520, respectively, to permit the printing of the information of card group three. Further, information is transferred from punch track storage to permit the even punching of card group two, and card group one information is transferred from punch track storage to permit the punching of odd information for card group one. Hence, the information of card group one is no longer needed and its storage space may become occupied by information relating to another or new card group, which, in this example, will be the fifth card group. Further, it is seen that each card group must be retained in punch track storage for four cycles of operation to provide the necessary delay of the information for the card document preparation unit 1000. During the fifth cycle, information of the fifth card group is read and processed. During scan 2 of this cycle, information of the fifth card group is transferred to the accumulator 600 and processed thereby. Further, card group five information, during scans 3 and 5, is transferred to print track storage while, during scan 4, information of card group five is transferred to punch track storage. Within the same cycle, the accumulating operation is completed and information of the fifth card group is transferred from the accumulator 600 to print track storage and to punch track storage. Also, during the fifth cycle of operation, card group two information is transferred from punch track storage to permit the completion of punching card group two while card group three information is transferred from punch track storage to permit the starting of punching of card group three information; and card group four information is transferred from print track storage to permit the printing of card group four information. Further, cycles of operation continue in the same or like manner.

While this general description is intended to set forth the invention in its entirety, it will be supplemented by detailed descriptions. Hence, this general description will actually be in two sections, or parts. In the first section, a very general impression is given; and, in the second section, a more detailed description is made. However, detailed descriptions under separate headings and subheadings will be given to facilitate individual examination of any one portion without referring to the general description. On the other hand, the more detailed portion of the general description will lend the continuity not obtainable by mere reference to the detailed descriptions.

The Card Reader will be described in detail under separate headings and subheadings entitled:

CARD READER UNIT
  Master and Detail Card Readers
  Static Sensing Unit
  Clutch Unit The Electronic Control Unit will be described in detail under separate headings and subheadings entitled:

ELECTRONIC CONTROL UNIT
  Magnetic Drum
  Timing Control
  Code Conversion from Static Sensing Units
  Serializer
  Redundancy Bit Generator
  Collating Circuitry—
    Sequence Checking
    Cross-Comparison
  Clutch Circuitry
  Scan Circuitry
  Drum Read-In Control Circuitry
  Accumulator
  Drum Readout Control Circuitry
  Print Setup Controls
  Punch Setup Controls
  Translator for Punch Setup Controls The Continuous Forms Print Unit will be described under the heading entitled:

CONTINUOUS FORMS PRINT UNIT

The Card Document Preparation Unit will be described under the headings and subheadings entitled:

CARD DOCUMENT PREPARATION UNIT
  Card Feed and Transport
  Print Mechanism
  Punch Mechanism Before getting into the detailed descriptions of the various units, the second section or a more detailed general description will be given to gain a more over-all understanding of the invention.

With reference to FIGS. 4a to 4g, inclusive, arranged as shown in FIG. 5, it is seen that, for timing control 250, FIG. 2, a magnetic read head 210, FIG. 4d, is disposed relative to track T1 of the magnetic drum 201 for sensing the permanently magnetized spot thereon. The signal developed by the magnetic read head 210 is transferred to an amplifier 211 having its output connected to an inverter 212, FIG. 4a, and to a cathode follower 213. This signal developed by the magnetic read head 210 is designated as the "home" impulse and functions to develop timing controls for the master and detail card readers 110 and 120 and for the accumulator 600. The output of the inverter 212 is connected to the start terminal 214 of an 80-column continuously operating column ring 215, while the output of the cathode follower 213 is connected to set a trigger 216 having its output associated with the reset side connected to the start terminal 217 of an 80-column intermittently operating column ring 218. The cathode follower 213 having its grid connected to receive the "home" impulse may be rendered conductive only when its plate is connected to a positive supply and, therefore, will only have an output when its plate is connected through cam-operated scan contacts C1 through C5 to a plus voltage. Hence, while the 80-column continuously operating column ring 215 is started by means of the "home" impulse, the 80-column intermittently operating column ring 218 starts only upon the combination of the "home" impulse and upon closure of any of the cam-operated scan contacts C1 through C5.

The 80-column continuously operating column ring 215 is a conventional closed ring which runs through 80 positions and starts over, while the 80-column intermittently operating column ring 218 is a conventional 80-position open ring which runs through its 80 positions and then is restarted upon the combination of the "home" impulse and a signal developed by any of the cam-operated scan contacts C1 through C5. The function of the continuously operating column ring 215 is to permit or to provide column or digit impulses for the output devices and to keep the accumulator 600 in step. The function of the intermittently operating column ring 218 is to enable card reader scanning. While it would be possible to utilize a single 80-position column ring, the use of two separate column rings permits a more flexible operation.

The 80-column continuously operating column ring 215 and the 80-column intermittently operating column ring 218 are advanced by the C impulses as a read head 219, FIG. 4d, reads the permanently recorded bits or magnetized spots upon the surface of the drum track T2. The C signals are amplified by an amplifier 220 having outputs connected to the input of an inverter 221, FIG. 4a, and to the input of a cathode follower 222. The output of the cathode follower 222 is connected to the ring advance terminals 223 and 224 of the 80-column continuously operating ring 215 and of the 80-column intermittently operating ring 218, respectively.

Further, the C signals are utilized to start a continuously operating bit ring 225, FIG. 4a. The output of the inverter 221 is connected to a start terminal 226 of the continuously operating bit ring 225 to start the same. The continuously operating bit ring 225 functions to provide bit time for code conversion and to permit the coded card reader information to be serialized. The continuously operating bit ring 225 is advanced by the A signals which are developed through a read head 227, FIG. 4d, associated with drum track T3 and connected to the input of an amplifier 228 having its output connected to a ring advance terminal 229, FIG. 4a, of the continuously operating bit ring 225.

For accumulation purposes, a B impulse is developed by feeding the A impulses coming from the amplifier 228, FIG. 4d, to the input of a cathode follower 230, FIG. 4a, having its output connected to an inductor 231. The inductor 231 delays the A impulses to develop B impulses which are of the same duration of the A impulses but delayed five microseconds. The A and B impulses, which are utilized for an accumulation operation, are both of five microseconds duration and are delayed five microseconds from each other. The A and B impulses, in effect, for accumulation purposes divide each bit impulse, bits S through R, respectively, of ten microseconds duration into A and B times. Since each bit impulse is of ten microseconds' duration, a character or column impulse is of 80 microseconds' duration. These relationships are compatible with the rotation of the magnetic drum 201 which makes one revolution in 6.4 milliseconds, there being 80 character spaces arranged about the periphery of the drum surface. Further, each character covers eight bit spaces, including the space bit S and the redundant bit R.

With a general understanding of the timing control 250, FIG. 2, in mind, the master and detail card readers 110 and 120, respectively, will be discussed further with a view toward indicating how data or information flows from the card readers 110 and 120 to the magnetic drum 201, FIGS. 4a to 4g, inclusive. Both the card reader 110, FIG. 25, for reading master cards 60 and the card reader 120, FIG. 26, for reading detail cards 50 have first sensing stations 112 and 122 and second sensing stations 113 and 123.

The master card reader 110 of the card reader unit 100 consists of the card hopper 111, FIG. 25, the two spaced apart sensing stations 112 and 113, the card stacker 114 provided with the feature for offsetting error cards, and means for feeding the cards relative to these units. The card feeding means includes a picker knife 116 controlled by clutch 376 for picking cards 60 in seriatim from card hopper 111 and presenting them to a pair of cooperating feed rollers 117. A second pair of cooperating feed rollers 117 spaced from the first pair feeds the master cards 60 into the first sensing station 112 where the same are arrested for a sensing operation by a card gate 119. The sensing operation takes place through the facility of the sensing unit 150, shown in FIG. 27. A card sensing lever 118 is positioned between the first and second pairs of feed rollers 117 to detect the presence and absence of cards in the card path. The master cards 60 leave the first sensing station 112, when permitted by the card gate 119, to enter the bite of a third pair of cooperating feed rollers 117. The third pair of feed rollers 117 feeds the master cards 60 to a fourth pair of feed rollers 117 which, in turn, feed the cards 60 into the second sensing station 113. The master cards 60 are arrested at the second sensing station by a second card gate 119. After a sensing operation takes place at the second sensing station 113 and when permitted by the second card gate 119, the master cards 60 leave the second sensing station 113 to engage a fifth pair of cooperating feed rollers 117. The fifth pair of cooperating feed rollers 117 feeds the master cards 60 relative to a card sensing lever 118 for detecting the presence or absence of a card; and, after the cards pass the card sensing lever 118, they enter the rotary drum stacker 114. The flow of master cards 60 through the master card reader 110 is also shown in FIG. 25. It is seen that the first master card will be positioned at the second sensing station 113 for a sensing operation at the same time a second master card is in sensing position at the first sensing position 112. It is by this mechanical operation and the fact that the sensing units 150 positioned at the sensing stations 112 and 113 are able to temporarily store the data sensed that sequence checking may take place.

The detail card reader 120 of the card reader unit 100 consists of the card hopper 121, FIG. 26, the two spaced apart sensing stations 122 and 123, the card stacker 124 provided with the feature for offsetting error cards, and means for feeding the cards relative to these units. The card feeding means includes a picker knife 128 controlled by a clutch 377 for picking cards 50 in seriatim from the card hopper 121 and presenting them to a pair of cooperating feed rollers 129. A second pair of cooperating feed rollers 129 spaced from the first pair of feed rollers feeds the detail cards into the first sensing station 122 where the same are arrested for a sensing operation by a card gate 131. The sensing operation is facilitated by the sensing unit 150, shown in FIG. 27. A card sensing lever 130 is positioned between the first and second series of feed rollers 129 to detect the presence or absence of cards in the card path. The detail cards 50 leave the first sensing station 122 after a sensing operation and, when permitted by the card gate 131, to enter between a third pair of cooperating feed rollers 129 which feeds the detail cards 50 to a fourth pair of cooperating feed rollers 129. A card sensing lever 130, positioned between the third and fourth pair of cooperating feed rollers, functions to detect the presence or absence of cards in the card path. The fourth pair of cooperating feed rollers 129 feeds the detail cards into the second sensing station 123 whereat the same are arrested for a sensing operation by a second card gate 131. When the detail cards 50 are permitted to leave the second sensing station 123, they engage a fifth pair of cooperating feed rollers 129 which conveys the same past a card sensing lever 130 to a drum-type stacker 124. The detail cards 50 flow through the detail card reader 121 in a manner similar to the flow of master cards 60 through the master card reader 110. Hence, the first detail card will be in sensing position at the second sensing station 123, while the second detail card is in sensing position at the first sensing station 122. This arrangement facilitates the sequence checking collating operation. However, it is not critical that there be a card in sensing position at the second sensing station simultaneously with a card in sensing position at the first sensing station because the sensing units 150 at these sensing stations have the facility for storing the information.

At each of the sensing stations 112, 113, 122 and 123, a static-type sensing device 150, as shown in FIG. 27, is provided. The static sensing device 150 is adapted to read IBM punched record cards having 12 rows and 80 columns, or 960 index positions, which may be perforated to represent data in a coded form, as represented or shown in FIG. 20. Referring back to FIGS. 4a to 4g, inclusive, and to FIGS. 25, 26 and 27, in the beginning of a cycle, the static sensing unit 150 is reset during approximately the first 24° of a cycle and is then moved downwardly toward the card to sense the same and subsequently moved upward to read the data sensed. The data is then held in the sensing unit for the remainder of the cycle until it is reset within the next cycle.

Briefly, the static sensing unit 150, FIG. 27, is adapted to sense the 960 index positions of the record cards. Hence, there are 960 sensing wires 151 arranged in 80 columns with 12 wires to a column. Each of the 12 sensing wires in a column are maintained in a spaced relationship and embraced by friction holding members 152 fixed to a holding plate 153. The 80 holding plates 153 are spacedly mounted within a common carrier member 154 adapted for cyclic vertical reciprocating movement. By reciprocating the common carrier member 154 downwardly or toward the record cards, the sensing wires 151 are brought into sensing position for analyzing the record card supported upon a grooved base plate, as shown in FIGS. 27 and 28c.

The sensing wires 151 which encounter the card surface will be forced upward relative to the holding plate 153 or in a direction opposite to the movement of the carrier 154. The sensing wires 151 which encounter a perforation in the record cards pass therethrough and will not be moved or displaced relative to the associated plate 153.

After the carrier 154 has brought the sensing wires 151 into position for a sensing operation relative to the record cards, the common carrier 154 is moved upwardly or in an opposite direction to its initial movement to bring the sensing wires 151 into a position, as shown in FIG. 28a, to permit a reading unit 155 to read the condition of the sensing wires 151 which, in effect, will be a determination of the information sensed by the wires 151.

The reading unit 155, FIG. 27, for analyzing the sensing wires 151 essentially consists of a rectangular element 156 of dielectric material having 12 spaced longitudinal grooves 157. The grooves 157 each have a stepped portion 158 and a recessed portion 159, best shown in FIGS. 28a, 28b and 28c. A conductive element 161 for each index position or for each sensing wire 151 is embedded, as by molding, into the rectangular element 156 so that one end of the conductive element 161, T-shaped in form, is exposed at and abuts the stepped portion 158 of the groove 157 and the opposite end either extends beyond the rectangular element 156, as for the zero index positions, or is connected to a common conductor, in a manner for code conversion, each having a portion extending beyond the rectangular element 156.

The information in the record cards is in the form of perforations entered at the index positions according to the well-known IBM code, the character being represented as shown in FIG. 20, and this information is to be converted to binary form, the representation also shown in FIG. 20. To facilitate this code conversion, which will be described in detail later herein, the conductive elements 161, FIG. 27, in one column, for each column, for index positions 12 and 11 are connected to a common conductor 162, while those for index positions 1 to 7, inclusive, are connected to another common conductor 163; and those for index positions 8 and 9 are connected to a common conductor 164. The 0-position conductive element 161 is by itself and emerges from the rectangular element 156 as conductor 165.

With the sensing wires 151 moved to the position as shown in FIG. 28a, those sensing wires 151 which did not encounter a perforation in the record cards reside in the recessed portion 159 of the grooves 157, while those sensing wires 151 which engaged perforations in the record card are at the level of the stepped portion 158. In order for the reading unit 155 to sense the condition of the sensing wires 151, the same are urged laterally by spaced longitudinal rods 166, one for each row of sensing wires, FIG. 27, fixed between spaced pull plates 167 and 168. The pull plates 167 and 168 are cyclically reciprocated horizontally by mechanism, not shown, in a timed relationship to the cyclic vertical reciprocation of the common carrier 154 for the holding plates 153.

Those sensing wires 151 which are in the recessed portion 159 of the grooves 157 will be urged, but cannot be moved, into contact with the associated conductive elements 161; however, those sensing wires 151 at the stepped portion 158 of the grooves 157 may be moved into contact with the associated conductive elements 161.

In FIG. 28b, the sensing wires 151 are shown in the reset positions. The setting of the sensing wires also occurs cyclically. Hence, in any one cycle, the sensing wires 151 are first reset, then brought into sensing position relative to the record card, and then moved to a position to facilitate a determination of the condition of the sensing wires 151 by the reading unit 155. With the sensing wires 151 in this position, they are urged laterally as the pull plates 167 and 168 are moved laterally to bring the rods 166 into engagement with the sensing wires 151, whereby, through continued movement, the same are urged in a lateral direction. Of course, only those sensing wires 151 which encountered perforations were not displaced relative to the holding plates 153 and, therefore, are in position to move laterally under action of the rods 166. The sensing wires 151 which were moved into contact with the associated conductive elements 161 remain in contact therewith for the remainder of the cycle. Contact between those laterally displaced sensing wires 151 and the associated conductive elements 161 starts to open or break at 0° of one cycle and is broken at approximately 8° of that same cycle. Contact then remains broken as a new sensing operation takes place. The newly laterally displaced sensing wires start to make contact with the conductive elements 161 at approximately 66° of that same cycle and establish contact at approximately 72° of the same cycle. Contact then remains from approximately 72° until 360°.

During the time that the information is held by the static sensing unit 150, the information is first scanned for a collating operation. The information flows from the static sensing units 150 at the first and second sensing stations 112 and 113 of the master card reader 110 and the first and second sensing stations 122 and 123 of the detail card reader 120, FIG. 4c, to the collating circuitry 127 via a translator or code converter 170 which converts the information sensed by the static sensing units 150 in IBM code to binary code and a serializer 192 which places the binary coded information in serial-by-bit form.

The sensing wires 151 and the conductive elements 161 associated therewith at the individual index positions corresponding to the index positions of the record cards are represented as pairs of normally open contacts X and Y, the X contacts being the conductive elements 161 and the Y contacts being the sensing wires 151, as seen in FIGS. 6a, 6d, 6f and 6i. The Y contacts are commonly connected in rows through the facility of the rods 166 for rows 12, 11 and 0 through 9; while the X contacts, or conductive elements 161, are connected in a pattern as indicated above for columns 1 through 80. The common conductors 162, 163, 164 and 165 are connected through back circuit eliminating diodes 171 to a conductor 172 connected to the output of a cathode follower 173 which acts as a column driver. The cathode followers 173, or column drivers, form the Read Out Sensing Unit block 251 in FIG. 2. Referring back to FIGS. 6a, 6d, 6f and 6i, the cathode follower 173 has its plate connected to a positive potential while its grid is connected by a conductor 174 to scan 1 plug hubs, in FIG. 6h. There are four scan 1 plug hubs for each column position as there are four plug hubs for each column position for scans 2 through 5. The scan plug hubs are connected by means of scan relay contacts of scan relays R9, R11, R13 and R15 to column plug hubs 175 connected to a cable 176 leading from the 80-column intermittently operating column ring 218. The scan contacts of scan relays R9, R11, R13 and R15 are transfer contacts with the normally closed contacts connected in series to the scan 1 plug hubs. However, when relays R9 become energized, the scan 2 plug hubs become connected to the 80-column intermittently operating column ring. Likewise, when relays R11, R13 and R15 become sequentially energized, the scan 3, 4 and 5 plug hubs become sequentially connected to the 80-column intermittently operating column ring.

It is through the facility of the scan plug hubs that each scan may be selectively connected to the sensing units for any of the 80 columns. Further, there are five plug hubs connected to each grid of the cathode followers, or column drivers 173. By means of these five plug hubs, the column drivers 173 are selectively connected to any of the scan plug hubs so that information in a single column may be duplicated, if desired, in more than one scan. For instance, if we assume that the first 20 columns of the cards contain an identification or serial number, these columns may be plugged for scan 1 for a collating operation and may also be plugged for scans 3, 4 or 5 for the transfer of the information to the drum 201 for subsequent printing and punching operations, whereby the serial number may be recorded in printed and punched form in the card documents 10 and in printed form on the continuous forms 1510.

In FIGS. 6a, 6d, 6f and 6i, the X contacts are shown only for the first 16 columns; however, there are four additional groups of columns with 16 columns in each group, whereby all five groups constitute 80 columns.

For code conversion purposes, the common connections afforded by the rods 166 lead to back circuit eliminating diodes 177 which, in turn, are connected to cathode followers 178, FIGS. 6b, 6e, 6g and 6j. The outputs of the cathode followers connect to logical OR circuits 180, 181, 182, 183, 184 and 185 of the code converter 170 for converting the digits 12 and 11 to binary X; digits 12 and 0 to binary 0; digits 1, 3, 5, 7 and 9 to binary 1; digits 2, 3, 6 and 7 to binary 2; digits 4, 5, 6 and 7 to binary 4; and digits 8 and 9 to binary 8. The outputs of the logical OR circuits 180, 181, 182, 183, 184 and 185 are connected as inputs to logical AND circuits 186, 187, 188, 189, 190 and 191, respectively, of a serializer 192 for serializing the binary coded data. The serializer 192 also includes a logical AND circuit 193 having inputs from a redundancy bit generator 194 and from the R bit line of the continuously operating bit ring 225. The X, 0, 1, 2, 4 and 8 bit lines of the continuously operating bit ring 225 are connected as inputs to the logical AND circuits 186, 187, 188, 189, 190 and 191, respectively. The outputs of the logical AND circuits 186, 187, 188, 189, 190 and 191 are connected as inputs to cathode followers 195 having their outputs commonly connected by conductors 196b, 196e, 196g and 196j which lead to the cam-operated contacts C6, C7, C8 and C9, respectively. Hence, it is by means of the serializers 192 that data flows over the conductors 196b, 196e, 196g and 196j serially and in binary form by means of the code converters 170.

Because it is not desirable to have the redundant bit R present during the collating operation, the logical AND circuits 193 are connected to the positive potential supply through a cam-operated contact C35, which makes at approximately 123° and breaks at approximately 148° each cycle. Hence, the redundant bit R will be present on the information lines 196b, 196e, 196g and 196j except during scan 1.

The function of the collating operation, as previously stated, is to perform a sequence check of both master and detail cards between the first and second sensing stations 112 and 122 and 113 and 123, respectively, of the master and detail card readers 110 and 120 and to perform a cross-comparison check between the master and detail cards 60 and 50 positioned at the second sensing stations 113 and 123 of the card readers 110 and 120. The information which will be read from the static sensing units 150 is determined by the condition of the scan relay contacts of the scan relays R9, R11, R13 and R15 and by the way each scan is plugged.

The collating operation takes place during scan 1 when the scan relays R9, R11, R13 and R15 are de-energized and the cam-operated contacts C6, C7, C8 and C9 are closed. When the cam-operated contacts C6, C7, C8 and C9 are closed, FIGS. 4c, 6b, 6e, 6g and 6j, the information lines 196b, 196e, 196g and 196j become connected to the collating circuitry 127, FIGS. 4c, 6c and 6h.

The master card reader sequence checking circuitry 115, shown in FIG. 3, receives information over lines or conductors 301 and 302 which lead from the cam-operated contacts C6 and C7. Hence, information comes into the master card reader sequence checking circuitry 115 from the sensing units 150 positioned at the first and second sensing stations 112 and 113 of the master card reader 110. The information flowing over conductors 301 and 302 is determined by the manner in which scan 1 is plugged. For collating purposes, regardless what columns corresponding to the master cards are plugged, scan 1 is plugged low order first. Hence, the information will be flowing low order by bit and low order by digit in serial form over the lines 301 and 302 to the master card reader sequence checking circuitry 115. The information line 301 starting at cam-operated contact C6, FIG. 6b, crosses into FIG. 6g and then into the master sequence collating circuitry 115 located in FIG. 6h. The information line 302 starting at cam-operated contact C7, FIG. 6e, leads to the left into FIG. 6d and continues into FIG. 6c and then crosses down into FIG. 6h and continues on into the master sequence collating circuitry 115.

Figure 6A:
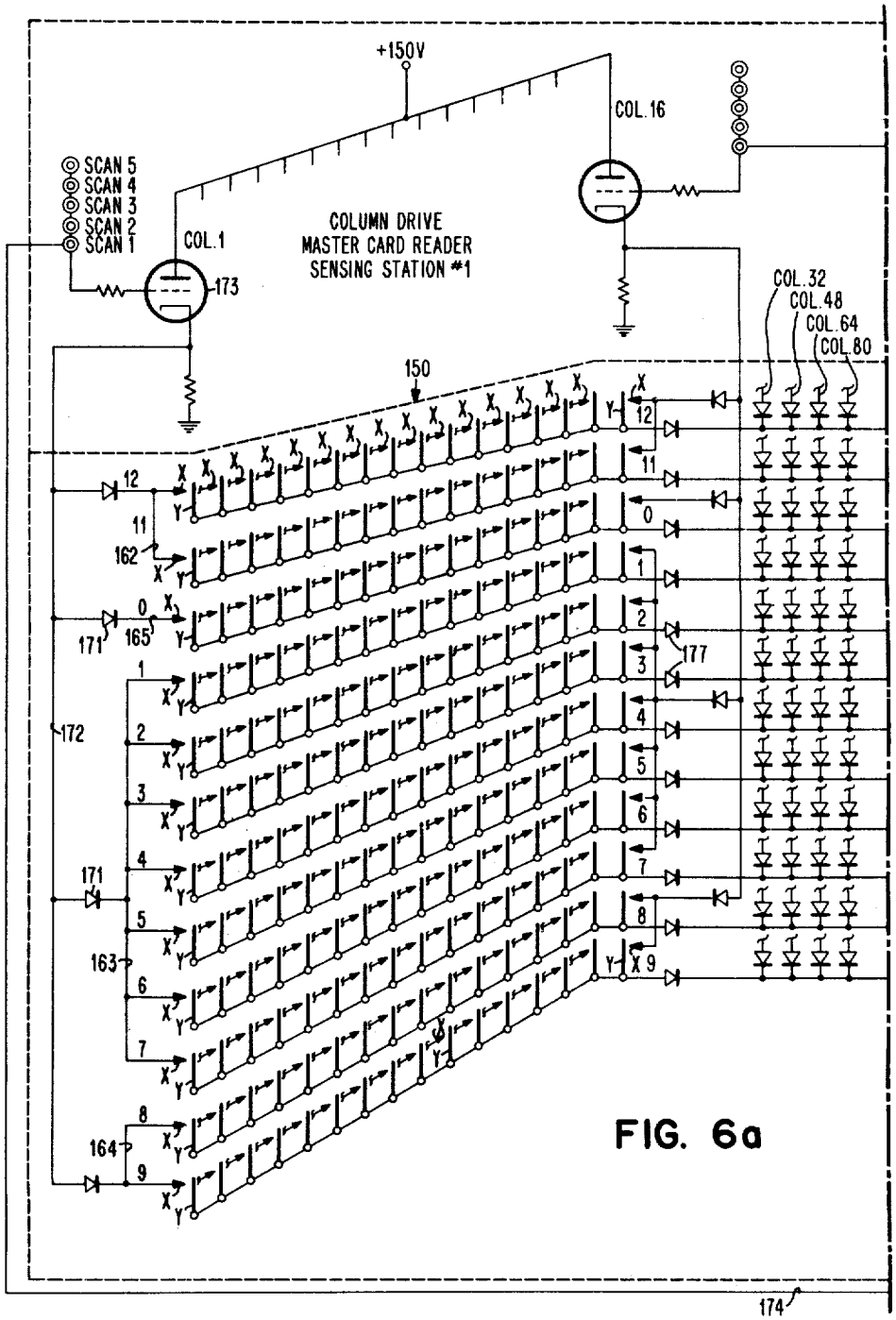
Figure 6C:
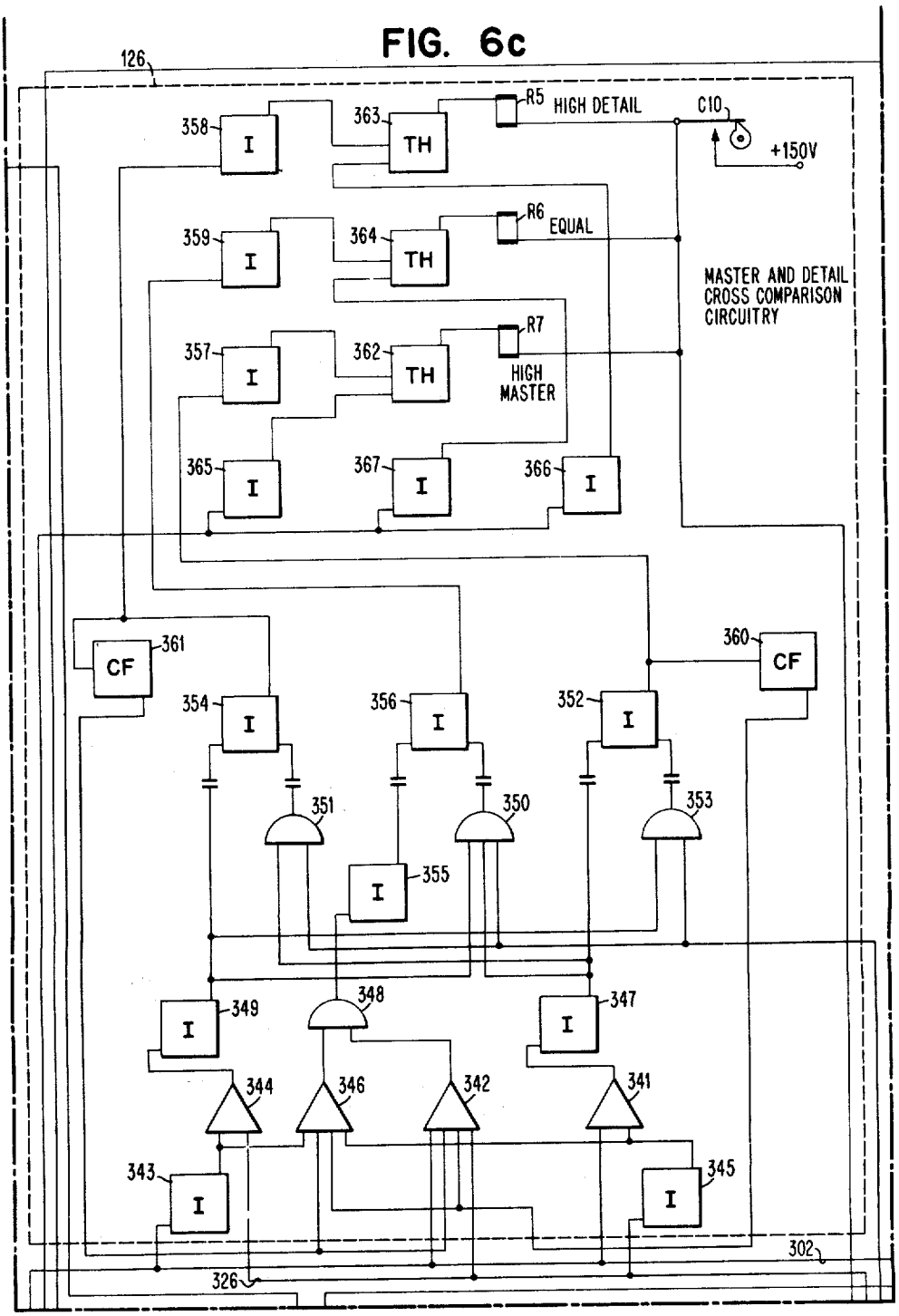
Figure 6D:
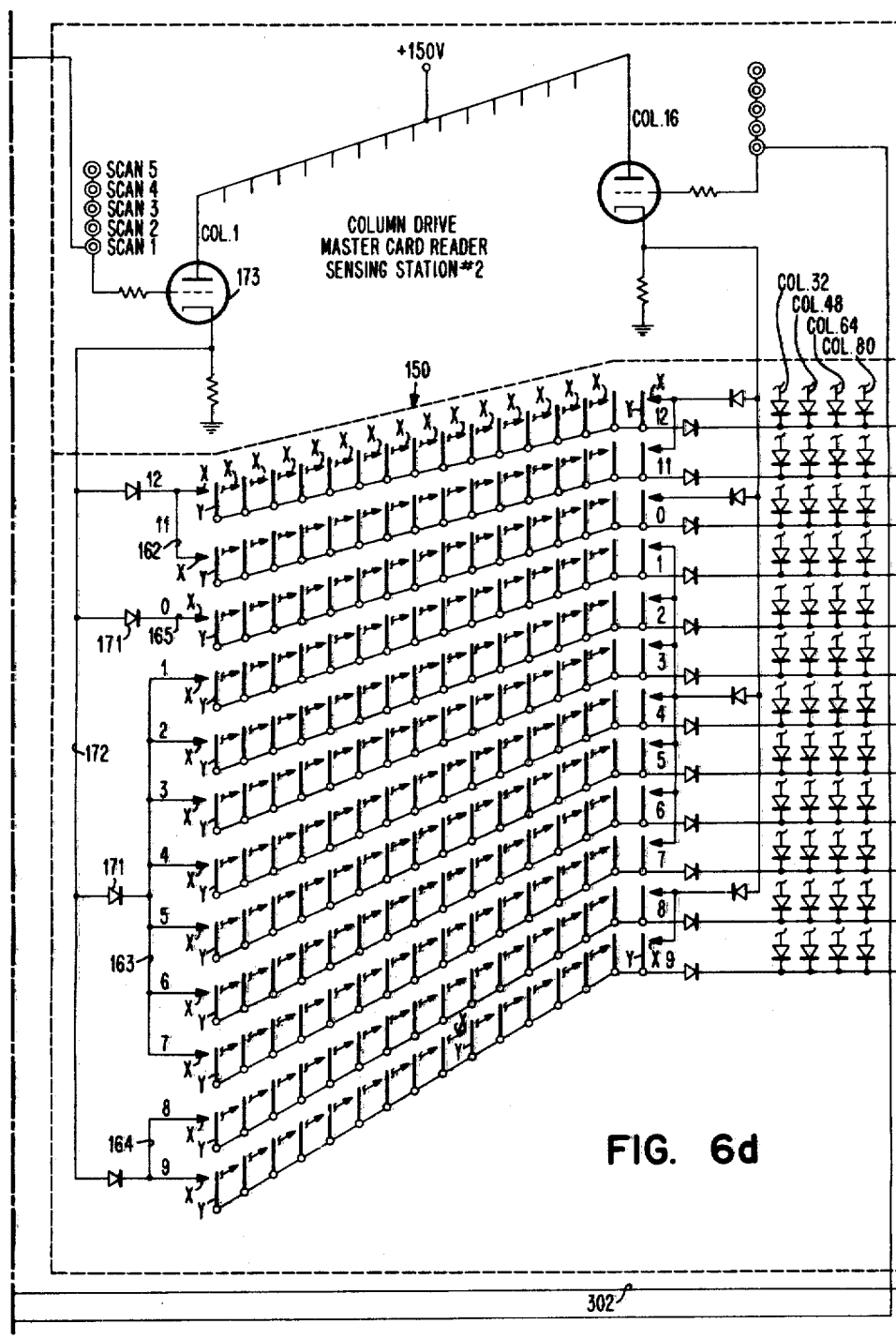
Figure 6E:
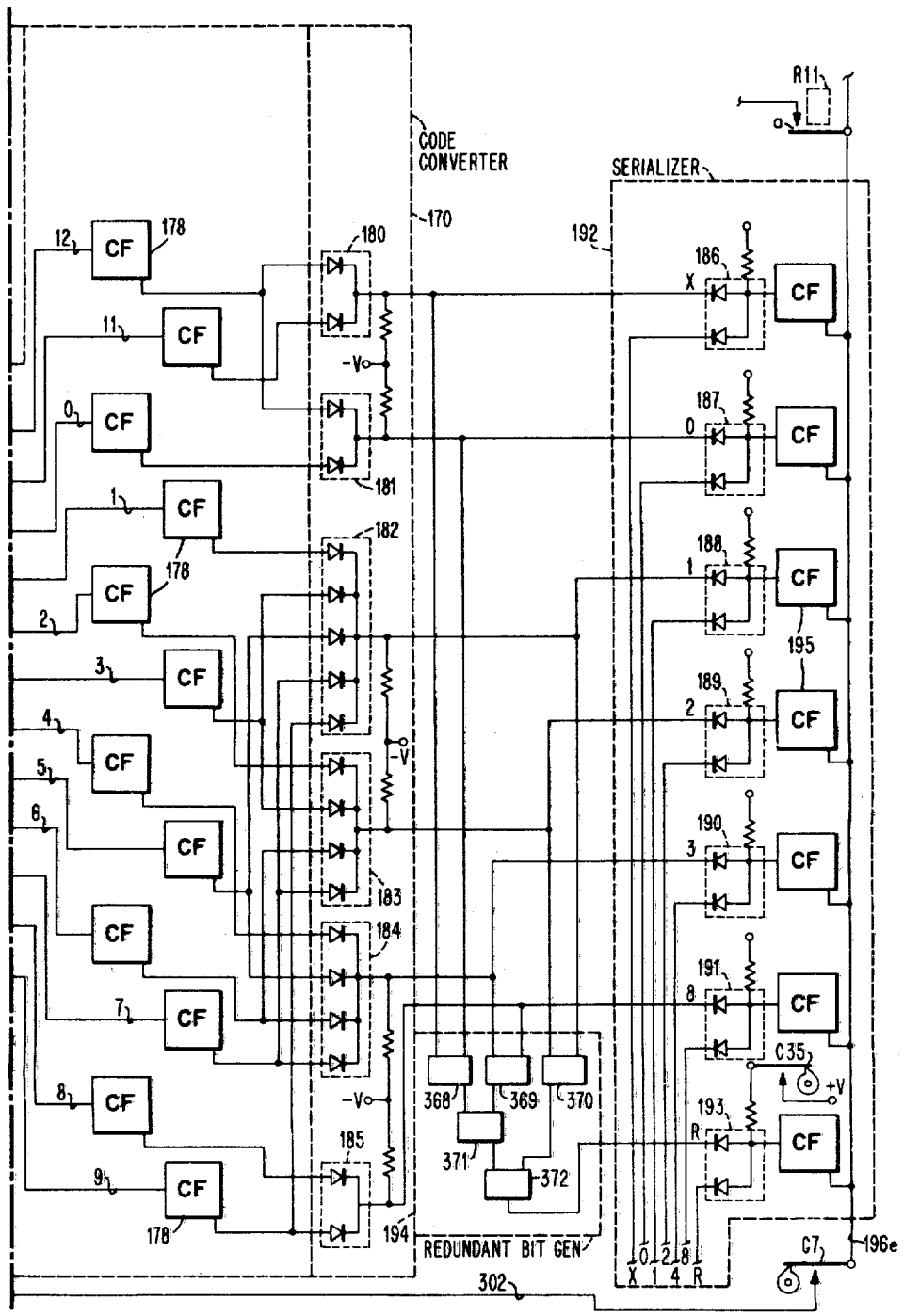
Figure 6F:
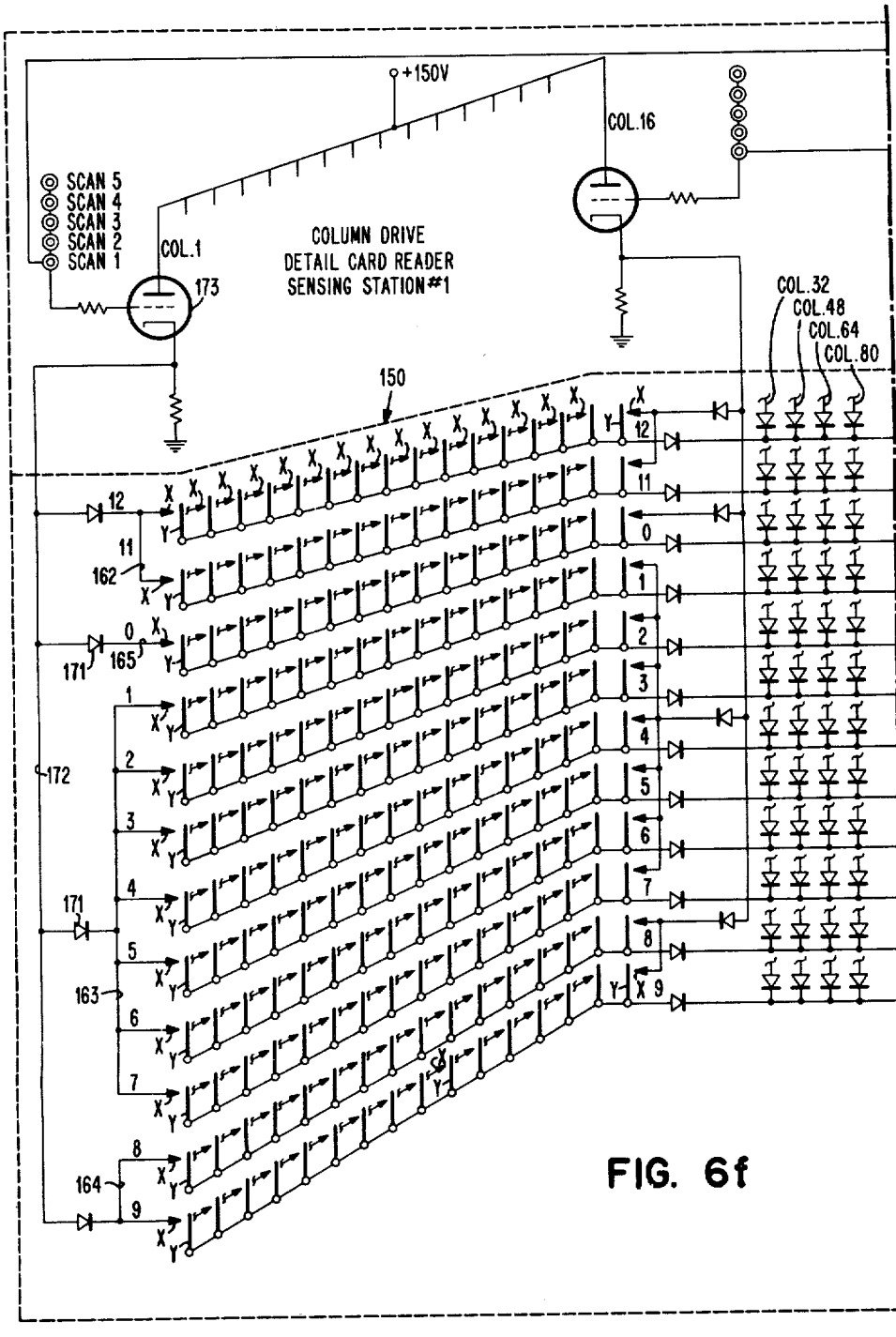
Figure 6G:
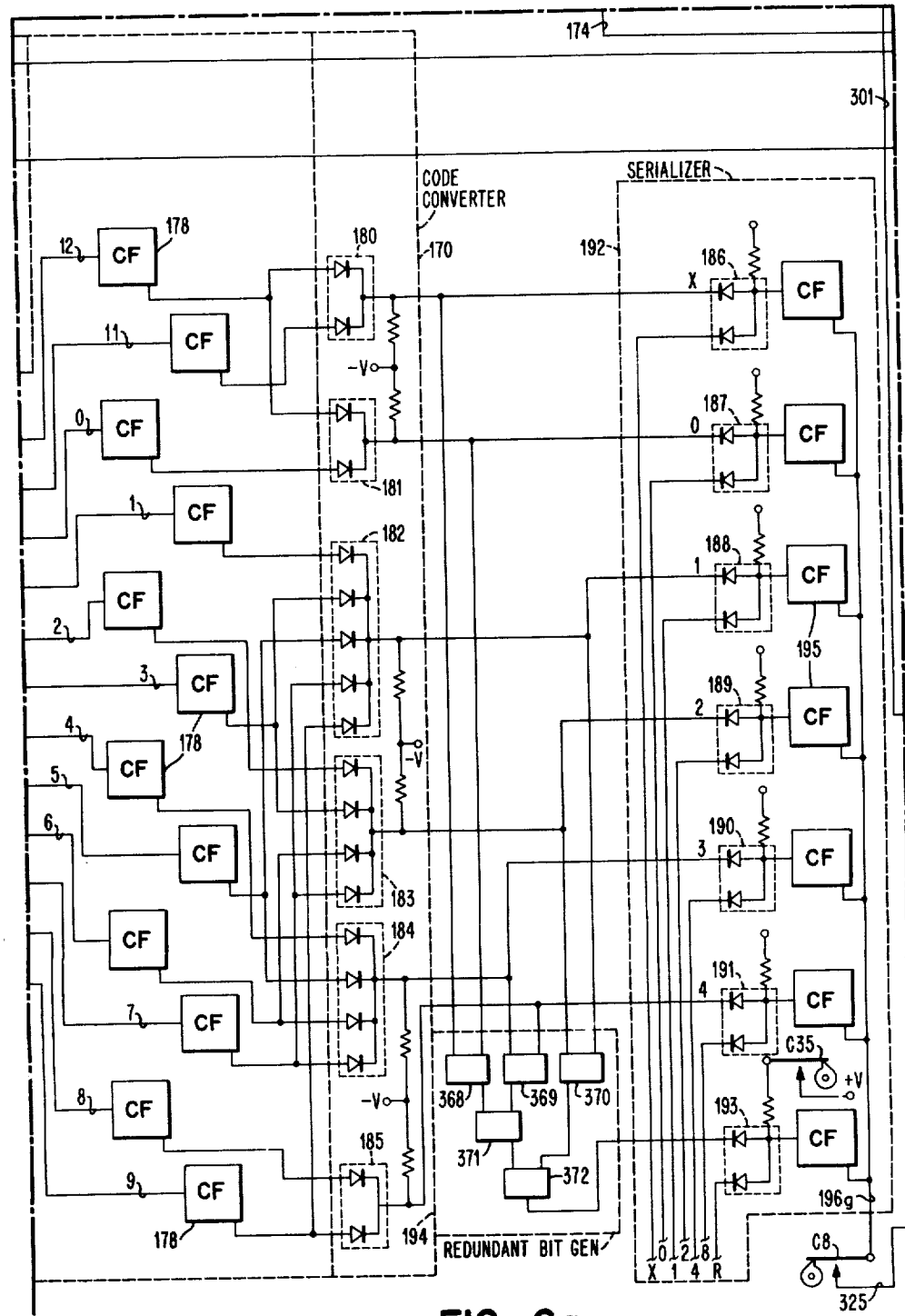
Figure 6H:
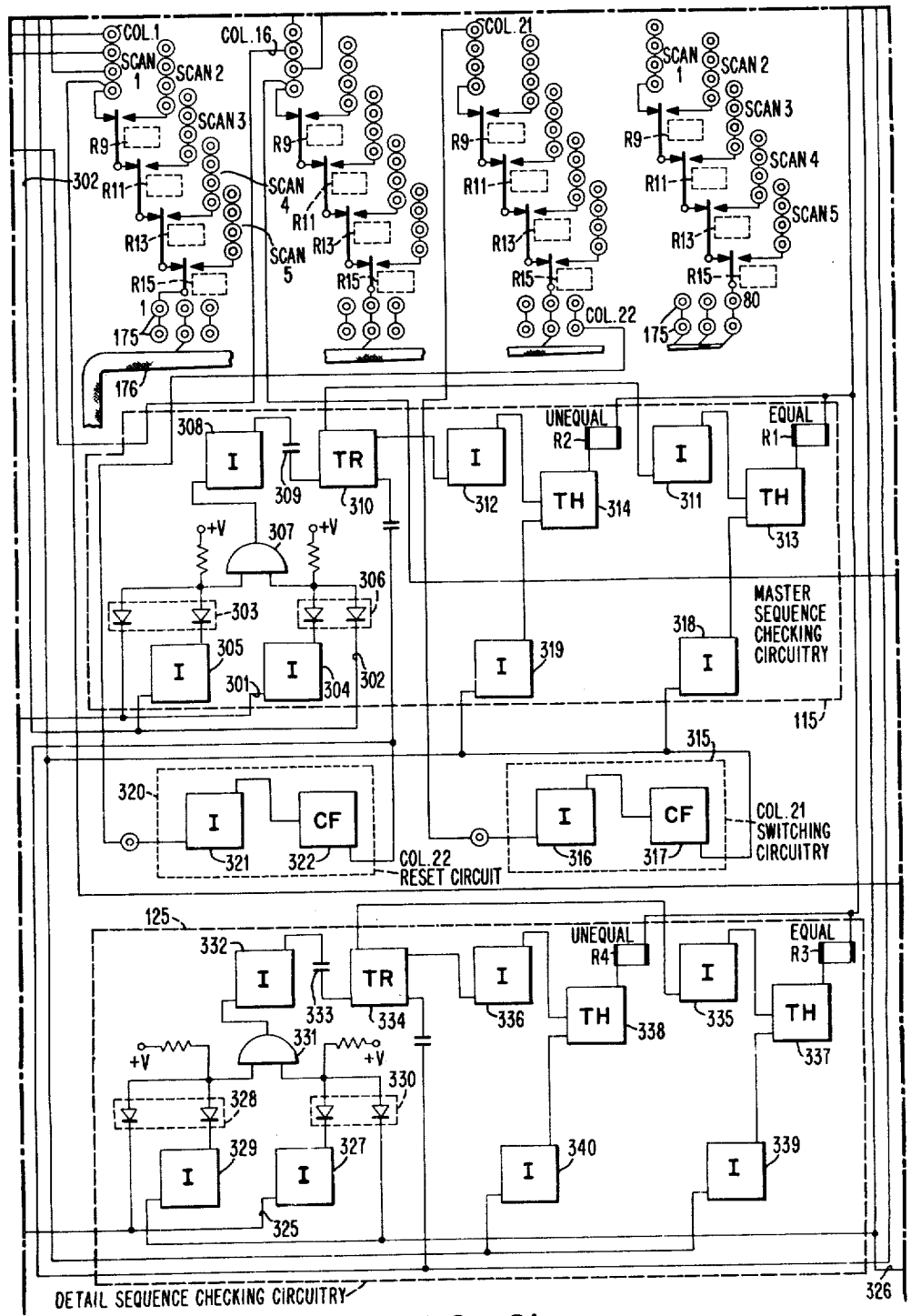
Figure 6I:
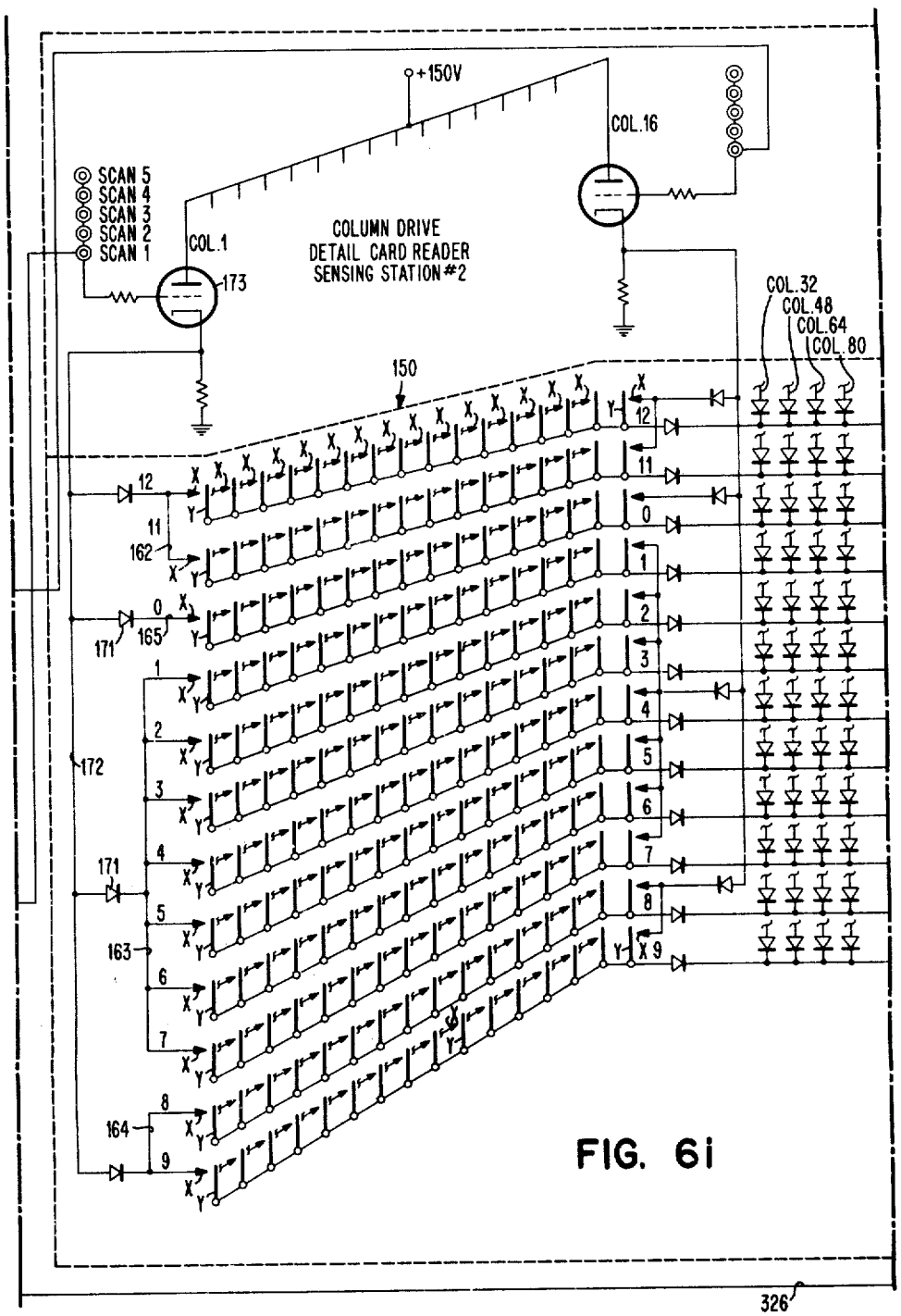

The master sequence collating circuitry 115, FIG. 6h, compares the information flowing over line 301 with that flowing over line 302. Line 301 leads to one input of a diode logical AND circuit 303 and the input of an inverter 304, while line 302 leads to the input of an inverter 305 and to one input of a diode logical AND circuit 306. The outputs of the inverters 304 and 305 are connected as inputs to the logical AND circuits 306 and 303, respectively. By this arrangement, there will not be an output from either of the logical AND circuits 303 and 306 when the information on line 301 compares with that on line 302. The outputs of the logical AND circuits 303 and 306 are connected as inputs to a logical OR circuit 307 having its output connected to an inverter 308. The output of the inverter 308 is capacitively coupled by capacitor 309 to the set side of a trigger 310. The output of the trigger 310 associated with the set side is connected as an input to an inverter 311 while the output of the trigger 310 associated with the reset side is connected as an input to an inverter 312. The output of the inverter 311 is connected to the control grid of a thyratron 313, while the output of the inverter 312 is connected as an input to the control grid of a thyratron 314. The shield grids of the thyratrons 313 and 314 are conditioned by column 21 switching circuitry 315. In this example, the first 20 columns are plugged for scan 1 or for the collating operation. The account or serial number for each master and detail card will be punched in the first 20 columns. Hence, the column 21 switching circuitry 315 functions to condition the thyratrons 313 and 314 for firing at column 21 only and then places the thyratrons 313 and 314 in a nonconditioned state. The column 21 switching circuitry 315 consists of an inverter 316 having its output connected to the input of a cathode follower 317. The input of the inverter 316 is connected to a scan 1 plug hub for column 21 and the output of the cathode follower 317 is connected to the inputs of inverters 318 and 319 having their outputs connected to the shield grids of the thyratrons 313 and 314, respectively. The thyratrons 313 and 314 have relays R1 and R2 connected in their plate circuits, respectively. The relay R1 is the equal relay, while the relay R2 is the unequal relay.

The condition of the trigger 310, in effect, will determine which relay, R1 or R2, will be energized at column 21 time. Of course, the condition of the trigger 310 is determined by whether or not the information on line 301 compares with that on line 302. The trigger 310 is reset at column 22 time by column 22 reset circuitry 320. The column 22 reset circuitry consists of an inverter 321 having its output connected to the input of a cathode follower 322. The inverter 321 has its input connected to a column 22 plug hub 175 which, in turn, is connected to cable 176 leading from the 80-column intermittently operating column ring 218. The output of the cathode follower 322 is connected to the reset side of the trigger 310. The trigger 310 is of the type which is switched by negative signals or negative-going impulses. Hence, the trigger 310 resets at column 22 time.

The detail card reader sequence checking circuitry 125, shown in FIG. 3, receives information over lines or conductors 325 and 326 which lead from the cam-operated contacts C8 and C9. Hence, information comes into the detail card reader sequence checking circuitry 125 from the sensing units 150 positioned at the first and second sensing stations 122 and 123 of the detail card reader 120. The information flowing over conductors 325 and 326 is determined by the manner in which scan 1 is plugged. As previously indicated, scan 1 is plugged low order first. Hence, the information will be flowing low order by bit and low order by digit in serial form over the lines 325 and 326 to the detail card reader sequence checking circuitry 125. The information line 325 starting at the cam-operated contact C8, FIG. 6g, crosses into FIG. 6h and then into the detail card reader sequence checking circuitry in FIG. 6h. The information line 326, leading from the com-operated contact C9, FIG. 6j, leads into FIG. 6i, and from FIG. 6i into FIG. 6h and on into the detail sequence collating circuitry 125 in FIG. 6h. The detail sequence collating or checking circuitry, FIG. 6h, compares the information flowing over line 325 with that flowing over line 326. Line 325 leads to the input of an inverter 327 and to one input of a diode logical AND circuit 328. The information line 326 leads to the input of an inverter 329 and to one input of a logical AND circuit 330. The outputs of the inverters 327 and 329 are connected as inputs to the logical AND circuits 328 and 330, respectively. The outputs of the logical AND circuits 328 and 330 are connected as inputs to a logical OR circuit 331 having its output connected to an inverter 332. The output of the inverter 332 is capacitively coupled by means of a capacitor 333 to the set side of a trigger 334. The output of the trigger 334 associated with the set side is connected to the input of an inverter 335, while the output of the trigger 334 associated with the reset side is connected to the input of an inverter 336. The output of the inverter 335 is connected to the control grid of a thyratron 337, while the output of the inverter 336 is connected to the control grid of a thyratron 338. The shield grids of the thyratrons 337 and 338 are also conditioned by the column 21 switching circuitry 315. The output of the cathode follower 317 is connected to the inputs of inverters 339 and 340. The outputs of the inverters 339 and 340 are connected to the shield grids of thyratrons 337 and 338, respectively. The thyratrons 337 and 338 have relays R3 and R4 connected in their plate circuits. The relay R3 is an equal relay while the relay R4 is an unequal relay. If the information on line 325 compares with that on line 326, the thyratron 337 will fire at column 21 time, whereby the equal relay R3 becomes energized. However, if the information on line 325 does not equal that on line 326, the thyratron 328 will fire, whereby the unequal relay R4 becomes energized. The trigger 334 is reset at column 22 time by means of the column 22 reset circuitry 320.

The cross-comparison collating circuitry 126, shown in FIGS. 3 and 6c, functions to compare the master cards 60 while at the second sensing station 113 of the master card reader 110 with the detail card 50 positioned at the second sensing station 123 of the detail card reader 120. Information flows to the cross-comparison collating circuitry 125 over information lines 302 and 326. Information line 302, FIG. 6c, leads to and becomes inputs of logical AND circuits 341 and 342 and leads to the input of an inverter 343. The information line 326 continues from FIG. 6h upward into FIG. 6c to an input of the logical AND circuit 342, to an input of a logical AND circuit 344 and to the input of an inverter 345. The output of the inverter 345 is connected as an input to the logical AND circuit 341 and as an input to a logical AND circuit 346. The output of the inverter 343 is connected as an input to logical AND circuits 344 and 346. The output of the logical AND circuit 341 is connected to the input of an inverter 347; and the output of the logical AND circuit 342 is connected as an input to a logical OR circuit 348, while the output of the logical AND circuit 344 is connected as an input to an inverter 349. The output of the logical AND circuit 346 is connected as another input to the logical OR circuit 348.

The output of the inverter 347 is connected as an input to logical OR circuits 350 and 351 and to the set side of a trigger 352. The output of the inverter 349 is connected as an input to the logical OR circuit 350 and to a logical OR circuit 353 and as an input to the set side of a trigger 354. The output of the logical OR circuit 348 is connected as an input to an inverter 355 having its output connected to the set side of a trigger 356. The outputs of the logical OR circuits 350, 351 and 353 are connected to the reset sides of triggers 356, 354 and 352, respectively. The outputs of the triggers 352, 354 and 356 associated with the reset sides thereof are connected to the inputs of inverters 357, 358 and 359, respectively. The outputs of the triggers 352 and 354, associated with the reset sides thereof, are also connected as inputs to cathode followers 360 and 361, respectively. The outputs of the cathode followers 360 and 361 are connected to inputs of logical AND circuits 342 and 346. The outputs of inverters 357, 358 and 359 are connected to the control grids of thyratrons 362, 363 and 364, respectively. The shield grids of the thyratrons 362, 363 and 364 are conditioned by the column 21 switching circuitry. The cathode follower 317 of the column 21 switching circuitry 315 has its output connected to the inputs of inverters 365, 366 and 367. The outputs of the inverters 365, 366 and 367 are connected to the shield grids of thyratrons 362, 363 and 364, respectively. The thyratrons 362, 363 and 364 have relays R7, R5 and R6 connected in their plate circuits, respectively. However, the relays R5, R6 and R7 are connected to the positive supply potential through a cam-operated contact C10. The relay R5 is for indicating high detail or low master and the relay R6 is for indicating equal detail and master, whereas relay R7 indicates high master or low detail. By this arrangement, thyratron 362 fires and relay R7 becomes energized when the cam-operated contact C10 is closed and the master card at the sensing station 113 compares high to the detail card at the second sensing station 123. Similarly, the thyratron 363 fires and the relay R5 becomes energized when the cam-operated contact C10 is closed and the detail card at the second sensing station 123 compares high with the master card at the second sensing station 113. Further, the thyratron 364 fires and the relay R6 becomes energized when the cam-operated contact C10 closes and the master card at the second sensing station 113 compares equal to the detail card at the second sensing station 123. Of course, the thyratrons 362, 363 and 364 are permitted to fire only at column 21 time or at the time that the shield grids of these thyratrons are conditioned for firing.

Information flowing over lines 196b, 196e, 196g and 196j during scans 2 to 5, inclusive, is in binary form flowing serially by bit and serial by digit where each digit may or may not include the redundant bit R generated by the redundancy bit generator 194, FIG. 6b, according to whether an even or odd bit check system is used. In this example, an even redundancy check system is used. Hence, all characters made up of an odd number of bits will include the redundancy bit R. The redundancy bit R is added, if appropriate, only for scans 2 to 5, inclusive.

The redundancy bit generator 194 includes a half adder 368 having inputs from the outputs of logical OR circuits 180 and 181, a half adder 369 having inputs from the outputs of logical OR circuits 184 and 185, and a half adder 370 having inputs from the outputs of logical OR circuits 182 and 183. These half adders render an output for an odd number of inputs on the input lines. The outputs from half adders 368 and 369 are connected as inputs to a half adder 371. The outputs from half adder 371 and from half adder 370 are connected as inputs to a half adder 372. The output of the half adder 372 is the output of the redundancy bit generator 194 and is connected as an input to the logical AND circuit 193, which also has an R bit input from the continuously operating bit ring 225.

The function of the redundancy bit generator 194 will be understood by the following example. With reference to FIG. 20, it is seen that the character N is represented in the binary code by binary bits $X$—1—4. Hence, the X bit flows to the half adder 368, the 1 bit flows to half adder 370 and the 4 bit flows to half adder 369. Since half adders 368, 369 and 370 each have only one or an odd input present, there will be an output from each. Hence, the half adder 371 will have two or an even number of inputs and, therefore, will not have an output. Consequently, the half adder 372 will have only one or an odd number of inputs present and it will generate an output. This output will be an R bit flowing to the logical AND circuit 193. It is necessary to have an R bit present along with the other bits representing the character N because N is composed of an odd number of binary bits and an even number redundancy bit check system is being used.

During a collating operation, if the master card at the second sensing station 113 equals the detail card at the second sensing station 123 and the master card at the second sensing station 113 is not equal to the master card at the first sensing station 112 and the detail card at the second sensing station 123 is not equal to the detail card at the first sensing station 122, of the master and detail card readers 110 and 120, all scans will be completed and, thereafter, the clutch circuitry 375 will be called into play to run the feeds for the master and detail card readers 110 and 120 and for the card document preparation unit 1000. Further, the drum read-in switching or control circuitry 500 will be called into play for setting up new drum tracks to receive information for a new card group.

If, during a collating operation, the master card and detail card at the second sensing stations 113 and 123 of the master and detail card readers 110 and 120 are equal and the master cards at the first and second sensing stations 112 and 113 of the master card reader 110 and the detail cards at the first and second sensing stations 122 and 123 of the detail card reader 120 are equal, only scans 1 and 2 will be completed and the clutch circuitry 375 will be called into operation to advance the cards. Scan 1, of course, is completed to permit the collating operation while scan 2 is completed to transfer information to the accumulator 600 via the magnetic drum 201. When the master card at the second sensing station 123 compares equal to the master card at the first sensing station 113, it means that the two cards are related, as in the instance where the detail cards at the first and second sensing stations 122 and 123 compare equal, and, when the detail cards do compare equal, the information will be sent to the accumulator 600.

If the master and detail cards at the second sensing stations 113 and 123 of the master and detail card readers 110 and 120, respectively, compare equal and the master cards at the first and second stations 112 and 113 of the master card reader 110 compare equal and the detail cards at the first and second sensing stations 122 and 123 of the detail card reader do not compare equal, then scans 1 and 2 are completed and the master card reader clutch circuitry is called into play to advance the cards.

If, during the collating operation, the master and detail cards at the second sensing stations 113 and 123 of the master and detail card readers 110 and 120 compare equal and the master cards at the first and second sensing stations 112 and 113 of the master card reader 110 do not compare equal but the detail cards at the first and second stations 122 and 123 of the detail card reader 120 compare equal, then scans 1 and 2 are performed and the clutch circuitry 375 is called into play for the detail card reader 120 only to advance the detail cards.

If, during a collating operation, the master card 60 at the second sensing station 113 does not equal the detail card 50 at the second sensing station 123 of the master and detail card readers 110 and 120, respectively, scan 1, of course, is completed for the collating operation, but no further scans take place; and the card reader clutch circuitry 375, which compares low, this could be either the master or detail card reader, is called into play to advance another card; and circuitry for offsetting the advanced card comes into operation so that the same may be segregated from the other cards within the card stacker.

The clutch circuitry 375, FIG. 2, for advancing the master and detail cards according to the results of the collating circuitry 127 is shown in detail in FIG. 11. The clutches for the master and detail card readers are conventional one revolution clutches 376 and 377, schematically shown in FIGS. 25 and 26, which are operated by clutch magnets M1 and M2, shown in FIG. 11. The clutch magnet M1 is connected between ground potential and the positive potential supply through a normally open contact R1a of relay R1, the equal master sequence relay, and a normally open contact R6a of relay R6, the equal master-detail cross-comparison relay, which connects to a cam-operated contact C28, making at 116.4° of a cycle and breaking at approximately 198° of the same cycle for every machine cycle. The master clutch magnet M1 may also be energized through normally open contacts R4a of relay R4, the unequal detail sequence relay, and R2a of relay R2, the unequal master sequence relay, which are connected in series with the normally open contact R6a. Further, the master clutch magnet M1 may be energized through a normally open contact R5a of relay R5, the high detail cross-comparison relay, connected in series with the cam-operated contact C28. The relays R2 and R4, of course, are the unequal relays for the master and detail sequence checking circuitry 115 and 125; and the relay R5 is the high detail relay of the master and detail cross-comparison circuitry 126. Hence, in order for the master clutch magnet M1 to be energized, both relays R1 and R6 must be energized or relays R4, R2 and R6 must be energized or relay R5 must be energized and, in each instance, the cam-operated contact C28 must be closed.

The detail clutch magnet M2 is connected between ground potential and the positive potential supply through a normally open contact R3a of the relay R3, the equal detail sequence checking relay, and the normally open contact R6a of relay R6, which, of course, is connected to the cam-operated contact C28. The detail clutch magnet M2 may also be energized through normally open contacts R4b and R2b, which are connected in series with normally open contact R6a. Further, the detail clutch magnet M2 may also be energized through a normally open contact R7b of relay R7, the high master cross-comparison relay, connected in series with the cam-operated contact C28. Hence, in order for the detail clutch magnet M2 to become energized, the relay R3 must be energized together with the relay R6 or relays R2, R4 and R6 must be simultaneously energized or the relay R7 must be energized and the cam-operated contact C28 must be closed in each instance.

As indicated above, when the master card at the second sensing station 113 does not compare equal with the detail card at the second sensing station 123 of the master and detail card readers 110 and 120, respectively, the low reader feed clutch is engaged and circuitry is called into play to offset the fed card. To accomplish this offsetting of the cards in the stackers, magnets M4 and M5 are utilized. Magnet M4 is for offsetting master cards 60 in the card stacker 114 and is connected between ground potential and the positive potential supply through a normally open contact R5b of relay R5, the high detail relay of the master-detail cross-comparison circuitry 126, which is connected to the cam-operated contact C28. The magnet M5 is for offsetting detail cards 50 in the card stacker 124 and is connected between ground potential and the plus potential supply through a normally open contact R7b of relay R7, the high master relay of the master-detail cross-comparison circuitry 126, which is also connected to the cam-operated contact C28.

A clutch magnet M3 controls the clutch for the card document preparation unit 1000. However, before discussing the connections for the card document preparation unit clutch magnet M3, reference should be made to FIG. 30a, which shows the flow of card documents 10 through the card document preparation unit 1000. It is seen that, in FIG. 30a, solenoid-controlled gates 1106 and 1107 are positioned at the sensing stations 1104 and 1105. The gate 1106 is controlled by a solenoid S1 which is connected to be energized, FIG. 11, through a normally open contact R36a of a latch pick relay R36 connected in series with a cam-operated contact C31 which is connected to the positive potential supply. The gate 1107 is operated by a solenoid S2 which is connected to become energized through a normally open contact R37a of a latch pick relay R37 connected to a cam-operated contact C32 which, in turn, is connected to the positive potential supply. The latch pick relays R36 and R37 are connected in parallel to the positive supply through parallelly connected normally closed contacts R2c, R4c and R6b which, in turn, are connected to a cam-operated contact C33. The latch pick relays R36 and R37, once energized, remain energized unless dropout coils R36D and R37D for the relays R36 and R37 become energized. The dropout coils R36D and R37D are connected between ground potential and the positive potential supply through cam-operated contacts C29 and C30, respectively. The clutch magnet M3 for the card document preparation unit 1000 is connected to ground potential and to a normally closed contact R36b of relay R36 which, in turn, is connected to a cam-operated contact C34. The cam-operated contact C34 is connected to a manually operated switch MS and to a normally open contact ITa of an interlock relay IT. The manual switch MS and the normally open contact ITa are connected in parallel to a cam-operated contact C31. The manual switch MS facilitates operation when the interlock relay IT is de-energized. It is thus seen that the card document preparation unit latch magnet M3 is principally under control of the cam-operated contact C34 and the normally open contact R36b of the relay R36, the relay R36 being under control of the cam-operated contact C29.

With reference to FIGS. 30a and 30b, it is seen that, when the clutch magnet M3 of the card document preparation unit 1000 is energized, the picker knife 1102 is operated to advance a card document from the hopper 1101 to the first sensing station 1104. The card document 10 is arrested at the first sensing station 1104 by the solenoid-controlled card gate 1106 normally biased by a spring 1115 out of the card path. A solenoid S1, FIG. 11, controls the card gate 1106. The card gate 1106 is also under control of a cam 1116. The cam 1116 functions to move the gate 1106 into the card path at approximately 180° of a cycle and holds the gate 1106 in the card path until approximately 120° of the next cycle. Hence, the card document 10 dwells at the first sensing station 1104 for a sufficient period to permit a sensing operation to take place. After the sensing operation takes place, the card document 10 is advanced to the second sensing station 1105 and is arrested thereat by means of the solenoid-controlled card gate 1107 normally biased by a spring 1117 out of the card path. A solenoid S2, FIG. 11, controls the card gate 1107. The card gate 1107 is also under control of a cam 1118 which functions to move the card gate 1107 into the card path at approximately 70° of a cycle and holds the card gate 1107 into the card path until approximately 270° of the same cycle. A second card document is advanced from the hopper 1101 so as to come into the first sensing station at approximately the time that the first card document 10 will leave the second sensing station 1105. The first card document 10 leaves the second sensing station 1105 to enter the print station 1200 and is arrested thereat by means of a cam-operated card gate 1108. The card gate 1108 is normally biased out of the card path by a spring 1119 and is moved into the card path by a cam 1120 at approximately 90° of a cycle and is held in the card path until approximately 291°. The first card document dwells at the print station 1200 for a sufficient period of time, approximately 70 milliseconds, to permit a printing operation to take place on a subcycle basis in series parallel fashion. Printing during the first subcycle occurs at approximately 105° of a cycle, which is well after the card is arrested. Printing takes place during the second subcycle at approximately 195° and during the third subcycle at approximately 285°, which is well before the card documents 10 leave the print station 1200 at 291°. When permitted by the card gate 1108, or at approximately 291° of a cycle, the first card document 10 leaves the print station 1200 and is conveyed by the feed mechanism 1100 to pass relative to the first punching mechanism 1310, which is adapted to punch the even rows 12, 0, 2, 4, 6 and 8 of the card document as the same passes relative thereto. The card document 10 continues on to pass relative to the second punch mechanism 1320, which is adapted to punch the odd rows 11, 1, 3, 5, 7 and 9 of the card document 10 while the same passes relative thereto. The card document 10 continues and is conveyed either to the stacker 1110 or to the stacker 1111. It is to be noted that, once the card document 10 leaves the print station 1200, it continues in movement without interruption. However, its velocity is changed prior to passing the first and second punch mechanisms 1310 and 1320 by means of aligning feed rollers 1121 and 1122, which will be discussed later herein.

It is obvious from the clutch circuitry, shown in FIG. 11, that the card document preparation unit clutch magnet M3 is under control of the collating circuitry 127. Now, assuming that the results of the collating operation are such that scans 2 to 5, inclusive, may take place, the manner in which these scans will take place will be described.

The scan relays R9, R11, R13 and R15 for operating the scan relay contacts, shown in FIGS. 4c and 6h, are shown in FIG. 8. The scan relays R9, R11, R13 and R15 are connected to operate sequentially and provision is made whereby the scan relays cannot operate out of sequence. Of course, the scan relays R9, R11, R13 and R15 will not start a sequence of operation unless permitted to do so by the collating circuitry 127. Because of the numerous contacts required for each scan, it is not feasible to utilize a single relay for each scan. In this example, the scan relays are plural position relays. Each scan is provided with seven relays. Each relay is provided with 12 positions. Hence, there are a total of 84 positions for each scan. Eighty positions of the relays are utilized for connecting the scan plug hubs, FIG. 6h, to the plug hubs 175 for receiving connections from the cable 176 leading from the intermittently operating column ring 218. Further, another two positions are utilized to provide connections between, for all practical purposes, the sensing units 150 at the second sensing stations 113 and 123 and the read-in switching circuitry 500, as shown in FIG. 2. The remaining two positions remain as spare positions.

Referring again to FIG. 8, the scan 2 relays R9 are connected in the plate circuit of a thyratron 410 and to the positive supply potential through cam-operated contact C11, which makes and breaks at approximately 114.4° and 174.8° of a cycle, respectively. A latch pick relay R8 is also connected in the plate circuit of the thyratron 410. The function of the latch pick relay R8 is to condition the circuitry for energizing the scan 3 relays R11 and to prevent re-energization of the scan 2 relays after the same have once become de-energized. For energizing the scan 2 relays R9, the 80th position or column of the intermittently operating column ring 218 is connected to a normally open contact R6c of the relay R6, the equal cross-comparison relay. The normally open contact R6c is connected to the transfer spring associated with normally open and closed contacts R8a of the latch pick relay R8. The normally closed contact R8a is connected to the inputs of inverters 411 and 412. The output of the inverter 411 is connected as an input to a cathode follower 413 having its output connected to a logical OR circuit 414. The logical OR circuit 414, as will be seen shortly, passes signals for resetting the trigger 216, shown in FIG. 4a. The trigger 216 controls the starting of the intermittently operating column ring 218. The intermittently operating column ring 218 starts for scan 2 upon the simultaneous closure of the cam-operated contact C2 and a "home" impulse applied to the grid of the cathode follower 213, FIG. 4a, to cause the same to conduct and thereby cause the trigger 216 to be set. The setting of the trigger 216 causes the starting of the 80-column intermittently operating column ring 218. The cam-operated contact C2 makes and breaks at approximately 134.4° and 158.4° of a cycle, respectively. Referring again to FIG. 8, in the circuitry for energizing the scan 2 relays R9, the output of the inverter 412 is connected to the set side of a trigger 415. The output of the trigger 415 associated with the reset side thereof is connected as an input to an inverter 416 having its output connected to the control grid of the thyratron 410. It is seen by this arrangement that the scan 2 relays will not become energized unless the equal cross-comparison relay R6 is energized. The trigger 415, in effect, stores the signal for energizing the thyratron 410 so that the same will fire when the cam-operated contact C11 becomes closed. Further, it is seen that the impulse coming from the 80th position of the intermittently operating column ring 218 will reset the trigger 216 so that, upon the simultaneous occurrence of a "home" impulse and the closure of the cam-operated contact C3, the trigger 216 will be set so that the intermittently operating column ring 218 will start for another operation. The cam-operated contact C3 makes and breaks at approximately 190.8° and 214.8° of a cycle, respectively. For resetting the trigger 216, the output of the OR circuit 414 is connected to the input of a single-shot multivibrator 417 having its output connected to an inverter 418. The output of the inverter 418 is connected to the reset terminal of the trigger 216.

The latch pick relay R8 remains energized until the dropout coil R8D becomes energized. Of course, the latch pick relay R8 becomes energized as the thyratron 410 fires through the closure of the cam-operated contact C11. With the latch pick relay R8 energized, the normally open contact R8a closes. The normally open contact R8a is connected to a normally open contact R2d of relay R2, the unequal master sequence relay. The normally open contact R2d of relay R2 is connected to a normally open contact R4d of the relay R4, the unequal detail sequence relay. The normally open contact R4d of relay R4 is connected to a normally open contact R6d of relay R6, the equal cross-comparison relay. The normally open contact R6d of relay R6 is connected to the transfer spring associated with normally open and closed contacts R10a of relay R10. The relay R10 is a latch pick relay connected to become energized when the scan 3 relays R11 become energized. The latch pick relay R10 functions in a manner similar to the latch pick relay R8; that is, it facilitates the energization of the scan 4 relays and, after the same become de-energized, it prevents re-energization of the scan 4 relays within a cycle of operation.

The normally closed contact R10a is connected to the inputs of inverters 420 and 421; the output of the inverter 420 is connected as an input to a cathode follower 422 having its output connected to the reset side of the trigger 415 and to an input of the logical OR circuit 414. In this manner, during scan 3, the trigger 415 will be reset and an impulse will be provided at the proper time for resetting the trigger 216. The output of the inverter 421 is connected as an input to the set side of a trigger 423. The output of the trigger 423 associated with the reset side thereof is connected as an input to an inverter 424 having its output connected to the control grid of a thyratron 425. The thyratron 425 has the scan 3 relays R11 and the latch pick relay R10 connected in its plate circuit and in series with the cam-operated contact C12, which is connected to the positive supply potential. The cam-operated contact C12 closes at approximately 170.8° of a cycle and remains closed until approximately 231.2° of the same cycle. By the arrangement just described, it is seen that the scan 3 relays may become energized only after the scan 2 relays have become energized, because the latch pick relay R8 must first become energized and only if the relays R2, R4 and R6 become energized. While the scan 3 relays drop out when the cam-operated contact C12 opens, the latch pick relay R10 remains energized until the dropout coil R10D becomes energized. The normally open contact R10a is connected to the transfer spring associated with normally open and closed contacts R12a of the latch pick relay R12. The latch pick relay R12 is connected to become energized when the scan 4 relays R13 become energized. The normally closed contact R12a is connected to the input of inverters 426 and 427, respectively. The output of the inverter 426 is connected to the input of a cathode follower 428 having its output connected to the reset side of the trigger 423 and to the input of the logical OR circuit 414. By this arrangement, at scan 4 time, the trigger 424 is reset, as well as the trigger 216. The output of the inverter 427 is connected to the set side of a trigger 429 having its output associated with the reset side thereof connected to the input of an inverter 430. The output of the inverter 430 is connected to the control grid of a thyratron 431 having the scan 4 relays R13 and the latch pick relay R12, connected in its plate circuit in series with the cam-operated contact C13 which, in turn, is connected to the plus supply potential. The cam-operated contact C13 closes at approximately 227.2° of a cycle and remains closed until approximately 287.6° of the same cycle. It is seen that the scan 4 relays R13 may become energized only upon energization of the scan 3 relays because the latch pick relay R10 must first be energized.

The normally open contact R12a, which closes upon energization of the relay R12, is connected to the transfer spring associated with normally open and closed contacts R14a of the latch pick relay R14. The latch pick relay R14 is connected to become energized together with the scan 5 relays R15 and, once energized, remains energized until the dropout coil R14D becomes energized. The normally closed contact R14a of the relay R14 is connected to the inputs of inverters 432 and 433, respectively. The output of the inverter 432 is connected to the input of a cathode follower 434 having its output connected to the reset side of the trigger 429 and to an input of the logical OR circuit 414. It is by this arrangement that the triggers 429 and 216 are reset.

The output of the inverter 433 is connected as an input to the set side of a trigger 435. The output of the trigger 435 associated with the reset side thereof is connected as an input to an inverter 436 having its output connected to the control grid of a thyratron 437. The thyratron 437 has the scan 5 relays R15 and the latch pick relay R14, connected in its plate circuit in series with the cam-operated contact C14 which, in turn, is connected to the plus potential supply. The cam-operated contact C14 closes at approximately 283.6° of a cycle and remains closed until approximately 343.6° of the same cycle. The normally open contact R14a, which closes upon energization of the latch pick relay R14, is connected to the input of an inverter 438. The output of the inverter 438 is connected to the input of a cathode follower 439 having its output connected to the reset side of the trigger 435 and to the input of the logical OR circuit 414. Again, it is by this arrangement that the trigger 435 and the trigger 416 are reset.

The latch pick relays R8, R10, R12 and R14 remain energized to permit the completion of scans 2 to 5, inclusive. The dropout coils R8D, R10D, R12D and R14D for dropping out the latch pick relays R8, R10, R12 and R14, respectively, are connected to become energized through a cam-operated contact C15. The cam-operated contact C15 closes at approximately 345° of one cycle and remains closed until approximately 360° of the same cycle. In order to reset the trigger 46 to permit restarting of the operating column ring 218 in the event that scans 2 to 5, inclusive, do not occur, a connection from the cam-operated contact C15 leads to the input of an inverter 440 having its output connected to the logical OR circuit 414.

While the scan relay contacts of scan relays R9, R11, R13 and R15 function to selectively connect the scan plug hubs to the plug hubs 175, which are connected to the cable 176 leading from the intermittently operating column ring 218, FIG. 6h, they also function to connect the information lines 196e and 196j, FIG. 4c, to the drum read-in control circuitry 500. In order to connect the information lines 196e and 196j, FIG. 4c, to the drum read-in control circuitry 500, normally open scan 2 relay R9 contacts R9a and R9b are connected to the inputs of a logical OR circuit 441, FIG. 4d. The information line 196e is connected to the normally open contact R9a, while the information line 196j is connected to the normally open contact R9b. Similarly, for scan 3, the information line 196e is connected to a normally open contact R11a, while the information line 196j is connected to a normally open contact R11b. The normally open contact R11a of scan 3 relay R11 is connected to normally open contacts R16a, R17a, R18a and R19a of drum read-in relays R16, R17, R18 and R19, respectively. The normally open contact R11b of the scan 3 relay R11 is connected to the input of a logical OR circuit 442. The output of the logical OR circuit 442 is connected to normally open contacts R16b, R17b, R18b and R19b of the drum read-in relays R16, R17, R18 and R19, respectively. The information line 196e is also connected to a normally open contact R13a of the scan 4 relay R13, while the information line 196j is connected to a normally open contact R13b of the scan 4 relay R13. The normally open contact R13a of relay R13 is connected to the input of a logical OR circuit 443. Further, the normally open contact R13b of scan 4 relay R13 is also connected as an input to the logical OR circuit 443. The output of the logical OR circuit 443, FIG. 4d, is connected to normally open contacts R16c R17c, R18c and R19c of the drum read-in relays R16, R17, R18 and R19, respectively. The information line 196e is connected to a normally open contact R15a of the scan 5 relay R15, while the information line 196j is connected to a normally open contact R15b of the scan 5 relay R15. The normally open contacts R15a and R15b are connected as inputs to a logical OR circuit 444. The output of the logical OR circuit 444 is connected to normally open contacts R16d, R17d, R18d and R19d of the drum read-in relays R16, R17, R18 and R19, respectively. It is seen that each drum read-in relay has four normally open contacts associated therewith. Hence, when one of the drum read-in relays; for example, relay R16, becomes energized, the normally open contacts R16a, R16b, R16c and R16d close. However, circuits to these closed normally open contacts R16a, R16b, R16c and R16d will be completed according to the scan relay contacts of scan relays R9, R11, R13 and R15. By this arrangement just described and by the description which is to follow, it is seen, and it will be seen, that the drum read-in relays R16, R17, R18 and R19 determine which drum tracks will receive information and the scan relays R9, R11, R13 and R15 also determine which drum tracks will receive the information and also the time when these drum tracks will receive the information.

The drum read-in relays R16, R17, R18 and R19, shown in FIG. 4d, are part of the read-in switching circuitry 500, FIG. 2, and are connected to become energized through the facility of the circuitry shown in FIG. 9.

The drum read-in relay R16 is connected to be energized under control of a run-in switch RIS connected between the +45 volt supply and connected in series with parallelly connected normally closed card reader contacts CC1 and CC2, respectively. The drum read-in relay R16 is held energized through a latch coil R16L connected in series with a normally open contact R16e of the relay R16 which, in turn, is connected in series with a cam-operated contact C17, the same being connected to the +45 volt supply. The cam-operated contact C17 closes at approximately 96° of a cycle and remains closed until approximately 126° of the same cycle. A dropout coil R16D for the latch coil R16L is connected to ground through a cam-operated contact C18, making at approximately 345° of one cycle and breaking at approximately 12° of the following cycle, and a back circuit diode D1 and to the +45 volt supply through a normally open contact R20a of a cycle relay R20, connected in series with cam-operated contact C21 which, in turn, is connected to the +45 volt supply. The cam-operated contact C21 closes at approximately 354° of one cycle and opens at approximately 108° of the following cycle. The cycle relay R20 functions to permit energization of the subsequent or drum read-in relay R17. The cycle relay R20 is connected to be energized through a normally open contact R16f connected in series with normally open contacts R2e, R4e and R6e of the relays R2, R4 and R6, respectively, the same being the unequal master sequence relay, the unequal detail sequence relay, and the equal cross-comparison relay, respectively. The cycle relay R20 is held through its normally open contact R20a, which is connected in series with the cam-operated contact C21.

The drum read-in relay R17 is connected to be energized through a normally open contact R20c connected in series with a cam-operated contact C20 which, in turn, is connected to the +45 volt supply. The cam-operated contact C20 closes at approximately 74° of a cycle and remains closed until approximately 108° of the same cycle. The drum read-in relay R17 is held through a latch coil R17L connected to be energized through a normally open contact R17e, connected in series with the cam-operated contact C17. The dropout coil R17D for the relay R17 is connected to ground through a back circuit eliminating diode D2 connected in series with the cam-operated contact C18 and to the +45 volt supply through a normally open contact R21a of a cycle relay R21 which, in turn, is connected to the cam-operated contact C21. The cycle relay R21 functions to permit energization of the drum read-in relay R18. The cycle relay R21 is connected to be energized through a normally open contact R17f of the drum read-in relay R17. The cycle relay R21 remains energized through its normally open contact R21a, which is connected to the cam-operated contact C21.

The drum read-in relay R18 is connected to be energized through a normally open contact R21b of the cycle relay R21, connected in series with the cam-operated contact C20. The drum read-in relay R18 is held by means of a latch coil R18L, connected to be energized through a normally open contact R18e, connected in series with the cam-operated contact C17. The relay R18 is dropped out by means of a dropout coil R18D connected to ground through back circuit eliminating diode D3, connected in series with the cam-operated contact C18 and connected to the +45 volt supply through the normally open contact R22a of cycle relay R22. The cycle relay R22 functions to permit energization of the drum read-in relay R19. The cycle relay R22 is connected to become energized through a normally open contact R18f of the drum read-in relay R18. The cycle relay R22 is held through its normally open contact R22a, which is connected in series with the cam-operated contact C21. The drum read-in relay R19 is connected to be energized through a normally open contact R22b of the cycle relay R22 which, in turn, is connected in series with the cam-operated contact C20.

The drum read-in relay R19 is held energized through a latch coil R19L connected to be energized through a normally open contact R19e, connected in series with the cam-operated contact C17. The relay R19 is dropped out by means of a dropout coil R19D connected to ground through a back circuit eliminating diode D4, connected in series with the cam-operated contact C18 and to the +45 volt supply through a normally open contact R23a of a cycle relay R23 which, in turn, is connected to the cam-operated contact C21. The cycle relay R23 functions to permit energization of the drum read-in relay R16 after the run-in switch RIS has been closed and is subsequently permitted to open, because the normally closed card reader contacts CC1 and CC2 are opened as the master and detail cards pass through the card readers 110 and 120. The cycle relay R23 is connected to become energized through a normally open contact R19f connected in series with the series connected normally open contacts R2e, R4e and R6e of the relays R2, R4 and R6 which, in turn, are connected in series with the cam-operated contact C19. The cycle relay R23 is held through its normally open contact R23a, connected in series with the cam-operated contact C21. The read-in relay R16 is also connected to become energized through a normally open contact R23b of the cycle relay R23 which, in turn, is connected to the cam-operated contact C20.

From the circuitry just described, it is seen that the drum read-in relays R16, R17, R18 and R19 become energized through the facility of the cycle relays R20, R21, R22 and R23. The cycle relays R20, R21, R22 and R23 become energized under control of the collating relays R2, R4 and R6. It is by this arrangement that the read-in switching circuitry 500 functions in a manner that the information derived from the name and address or master cards 60 and the detail cards 50 forming the card groups remains distinct. Hence, information of one card group will be recorded upon one drum track and that of another card group will be recorded on another track; and, of course, the recording takes place during the scans 2 through 5. Since a card group may consist of one or more data or detail cards associated with one or more master cards, any one of the drum read-in relays R16, R17, R18 and R19 may be energized for one or more machine cycles. However, only one drum read-in relay will be energized at any one time.

The motor M for the card reader unit 100, which consists of the master and detail card readers 110 and 120, is connected between the plus potential supply and in series with a stop switch STP, which is connected in the plate circuit of a thyratron 510. The grid of the thyratron 510 is connected to a start switch ST which is connected in series with a cam-operated contact C16; the same, in turn, is connected to the +45 volt supply. By this arrangement, upon closure of the start switch ST, the thyratron 510 will not fire to start the motor M until the cam-operated contact C16 is closed. The cam-operated contact C16 closes at approximately 0° of a cycle and remains closed until approximately 132° of the same cycle. The motor M may be stopped at any time by opening the stop switch STP.

In continuing with the description of the drum read-in switching circuitry 500, it is seen, in FIG. 4d, that the normally open contacts R16a and R18a are commonly connected to the input of an amplifier 511 having its output connected to a magnetic write head 512 disposed to record data in the form of magnetized spots upon drum track T4. The normally open contacts R17a and R19a of the drum read-in relays R17 and R19 are commonly connected to the input of an amplifier 513 having its output connected to a magnetic write head 514 disposed to record data in the form of magnetized spots upon drum track T5. The logical OR circuit 441, having inputs from the normally open contacts R9a and R9b of the scan 2 relay R9, has its output connected to the input of an amplifier 515 whose output is connected to a magnetic write head 516 disposed to record data in the form of magnetized spots upon drum track T14. The normally open contacts R16b and R18b of the drum read-in relays R16 and R18 are commonly connected to the input of an amplifier 517 having its output connected to a magnetic write head 518 disposed to record data in the form of magnetized spots upon drum track T6. The normally open contacts R17b and R19b of the drum read-in relays R17 and R19 are commonly connected to the input of amplifier 519 having its output connected to a magnetic write head 520 disposed to record data in the form of magnetized spots upon drum track T7. The normally open contacts R16c, R18c, R17c and R19c of drum read-in relays R16, R18, R17 and R19 are connected to the inputs of amplifiers 521, 522, 523 and 524, respectively. The outputs of the amplifiers 521, 522, 523 and 524 are connected to magnetic write heads 525, 526, 527 and 528 disposed to record data in the form of magnetized spots upon drum tracks T8, T9, T10 and T11, respectively. The normally open contacts R16d and R18d are commonly connected to the input of an amplifier 529, FIG. 4f, having its output connected to a magnetic write head 530, FIG. 4d, disposed to record data in the form of magnetized spots upon the drum track T12. The normally open contacts R17d and R19d are commonly connected to the input of an amplifier 531 having its output connected to a magnetic write head 532 disposed to record data in the form of magnetized spots upon drum track T13.

The drum readout switching circuitry 700, FIGS. 2, 4a, 4d and 10, under control of the drum read-in switching circuitry 500, functions to permit the simultaneous read-in and readout of data from the magnetic drum 201. With reference to FIG. 4d, it is seen that magnetic read heads 710 to 719, inclusive, for reading data recorded on drum tracks T5 to T13, inclusive, in the form of magnetized spots, are connected to the inputs of ampli-fiers 720 to 729, inclusive, respectively. The output of the amplifier 720 is connected to normally open contacts R24a and R26a of drum readout print relays R24 and R25, respectively. The amplifier 721 has its output connected to normally open contacts R25a and R27a of drum readout print relays R25 and R27, respectively, FIG. 4a. The normally open contacts R24a and R26a of relays R24 and R26, FIG. 4d, and the normally open contacts R25a and R27a of relays R25 and R27, FIG. 4a, are connected to a conductor or information line 730, which leads to the right and into FIG. 4b, to furnish data to the print setup or control mechanism 810, which controls the print mechanism 1210, for printing the name and address upon the obverse face of the card documents 10.

The output of amplifier 722 is connected to normally open contacts R24b and R26b of relays R24 and R26, respectively, while the output of the amplifier 723 is connected to normally open contacts R25b and R27b of relays R25 and R27, respectively. The normally open contacts R24b, R25b, R26b and R27b of relays R24, R25, R26 and R27 are connected to a common conductor or information line 731, FIG. 4a, which leads to the right into FIG. 4b and then downward into FIG. 4e to the print setup or control mechanism 820 for controlling the print mechanism 1220, which prints billing data upon the reverse face of the card documents 10. The outputs of amplifiers 724, 725, 726 and 727 are connected to normally open contacts R28a, R29a, R30a and R31a of drum readout even punch relays R28, R29, R30 and R31, respectively. The normally open contacts R28a, R29a, R30a and R31a are connected to a common conductor or information line 732, which leads downward into FIG. 4d and then to the right into FIG. 4e and then downward into FIG. 4g and to an even punch translator 930.

The amplifiers 724, 725, 726 and 727 also have their outputs connected to normally open contacts R32a, R33a, R34a and R35a of drum readout odd punch relays R32 R33, R34 and R35, respectively. The normally open contacts R32a, R33a, R34a and R35a are connected to a common conductor or information line 733, which leads from FIG. 4a downward into FIG. 4d and to the right into FIG. 4e and in FIG. 4e to an odd punch translator 960. The output of the amplifier 728 is connected to normally open contacts R24c and R26c of the drum readout print relays R24 and R26, respectively. The output of the amplifier 729 is connected to normally open contacts R25c and R27c of the drum readout print relays R25 and R27, respectively. The normally open contacts R24c, R25c, R26c and R27c are commonly connected to a conductor or information line 734, which leads to the right from FIG. 4d into FIG. 4e and downward in FIG. 4e to the continuous forms print setup or control mechanism 830 in FIG. 4g, for controlling the print mechanism 1520 for printing upon the continuous forms print unit 1510.

The circuitry for controlling the energization of the drum readout relays is shown in FIG. 10. The drum readout print relays R24, R25, R26 and R27 are of the latch type and are connected to be energized through normally open contacts R21c, R22c, R23c and R20c connected in parallel with each other and in series with a cam-operated contact C22 which, in turn, is connected to the plus potential supply. The cam-operated contact C22 closes at approximately 9° of one cycle and opens at approximately 36° of the same cycle. The drum readout print relays R24, R25, R26 and R27 are dropped out through the facility of dropout coils R24D, R25D, R26D and R27D, respectively. The dropout coils R24D, R25D, R26D and R27D are connected in parallel with each other and in series with a cam-operated contact C23. The cam-operated contact C23 closes at approximately 273° of a cycle and opens at approximately 294° of the same cycle. It is thus seen that the drum readout print relays R24, R25, R26 and R27 are under the control of the drum read-in cycle relays R21, R22, R23 and R20, respectively. Further, the drum readout print relays R24, R25, R26 an R27 are utilized to cycle the energization of the drum readout even punch relays R28, R29, R30 and R31. The drum readout even punch relays R28, R29, R30 and R31 are of the latch type and are connected to be energized through parallelly connected normally open contacts R24d, R25d, R26d and R27d of relays R24, R25, R26 and R27 which, in turn, are connected in series with a cam-operated contact C24. The cam-operated contact C24 closes at approximately 156° of a cycle and remains closed until approximately 180° of the same cycle. The drum readout even punch relays R28, R29, R30 and R31 remain energized until dropout coils R28D, R29D, R30D and R31D are energized. The dropout coils R28D, R29D, R30D and R31D are connected in parallel with each other and in series with a cam-operated contact C25, which closes at approximately 60° of a cycle and opens at approximately 84° of the same cycle. Hence, the drum readout even punch relays become energized upon the drum readout print relays R24, R25, R26 and R27 being energized and the simultaneous closure of the cam-operated contact C24 and remain energized until the dropout coils R28D, R29D, R30D and R31D become energized upon closure of the cam-operated contact C25. Further, the drum readout even punch relays R28, R29, R30 and R31 function to cycle the drum readout odd punch relays R32, R33, R34 and R35, respectively. The drum readout odd punch relays R32, R33, R34 and R35 are connected in parallel with parallelly connected normally open contacts R28b, R29b, R30b and R31b, which are connected in series with a cam-operated contact C26. The cam-operated contact C26 closes at approximately 162° of a cycle and opens at approximately 186° of the same cycle. The drum readout odd punch relays R32, R33, R34 and R35 are of the latch type and remain energized until dropped out through the facility of the dropout coils R32D, R33D, R34D and R35D, respectively. The dropout coils R32D, R33, R34D and R35D are connected in parallel with each other and in series with a cam-operated contact C27. The cam-operated contact C27 closes at approximately 78° of one cycle and opens at approximately 102° of the same cycle. Hence, the drum readout odd punch relays become energized upon the drum readout even punch relays R28, R29, R30 and R31 being energized and the simultaneous closure of the cam-operated contact C26 and remain energized until the dropout coils R32D, R33D, R34D and R35 D become energized upon closure of the cam-operated contact C27.

The information passing over lines 730, 731, 732, 733 and 734 will also include information developed by the accumulator 600, FIGS. 2 and 4f. The details of the circuitry of the accumulator 600 are shown in FIG. 4f. The requirements of the accumulator 600 are dependent upon the type of instrument to be prepared by the card document preparation unit 1000. In this example, for preparation of the utility bill, it is only necessary for the accumulator 600 to add and subtract. The detail cards will furnish net amounts. However, if net amounts were to be computed, this would impose upon the accumulator the requirements of being able to perform the mathematical computation of multiplication; and, in some instances, the mathematical computation of division may also be required.

As previously indicated, data derived by the static sensing units 150 is transferred during scan 2 via the logical OR circuit 441, FIG. 4d, and the amplifier 550 to the magnetic write head 516 which records the data in the form of magnetized spots upon drum track T14. A magnetic read head 610 is disposed relative to track T14 to read the data recorded thereon in the form of magnetic spots in coded form. The magnetic read head 610 is connected to the input of an amplifier 611 having its output connected to a logical OR circuit 612, FIG. 4f. The output of the logical OR circuit 612 is connected to true and complement circuitry 613. The true and complement circuitry 613 functions to pass data either in true or complement form and is controlled by sign control circuitry 614. The sign control circuitry 614 controls the true and complement circuitry 613 in a manner that information passed thereto from drum track T14 passes in true form to a serial-binary adder 615 if accompanied by a plus sign; whereas, if accompanied by a minus sign, the information is complemented on the way to serial-binary adder 615. Information flows from the serial-binary adder to the sign control circuitry 614, to a serial-to-parallel converter 616 and to a decimal carry circuit 617. The serial-binary adder 615 essentially consists of two binary-serial full adders and a shifting register for decimal carry recognition, not shown. The first binary adder develops sum and carry outputs on two different lines. Since the sum of two binary numbers in the code utilized in this example may be greater than ten, but less than sixteen, the sum line must feed the shifting register, which stores the sum for a sufficient period of time; i.e., one digit time, to determine whether a decimal carry impulse must be generated. If the sum is greater than ten, a corrective six is added to it in the second binary adder, whose sum output then enters the serial-to-parallel converter 616. Simultaneously, a carry impulse is generated at one bit time of the next digit; and this is the decimal carry to the next higher order. The carry impulse from the high order digit field is ignored insofar as arithmetic operations are concerned. However, the carry impulse is used to set the sign of a field in a trigger, not shown. The serial-to-parallel converter 616 is of conventional form and functions to permit the entry of data into a core register 618 in parallel form. It will be recalled that information is normally flowing serial by bit and serial by digit. The output of the serial-to-parallel converter 616 is connected to a logical OR circuit 619 having its output connected to the core register 618. The core register 618 is a 3-dimensional array of ferrite cores and the readout therefrom is destructive. Accordingly, regeneration takes place through the adder 615 whereby, if the other adder input lines are held off, the same number returns to storage as was read out. Information, or data, flowing from the core register 618 does not enter the serial-binary adder 615 through the true and complement circuitry 613. Information flowing from the core register 618 accompanied by a plus sign indicates that the information is in true form, whereas that accompanied by a minus sign is an indication that the information is in complement form. The output of the core register is connected to a parallel-to-serial converter 620 and to a logical AND circuit 621. The output of the logical AND circuit 621 is connected as an input to the logical OR circuit 619. The logical AND circuit 621 also has an input for receiving a signal indicating that information from the core register 618 should be read out to appropriate tracks of the magnetic drum from which the information will be subsequently transferred to the print setup mechanisms 810, 820 and 830 and to the punch setup mechanisms 910 and 920. The output of the parallel-to-serial converter 620 is connected to logical AND circuits 622 and 623 and to the input of a logical OR circuit 624. The logical AND circuit 622 also has an input for receiving a signal indicating that the information flowing from the parallel-to-serial converter 620 is to be transferred to the drum track T15. Accordingly, the output of the logical AND circuit 622 is connected to the input of an amplifier 625 having its output connected to a magnetic write head 626 disposed relative to drum track T15 for recording data thereon in the form of magnetized spots. A magnetic read head 627 is disposed relative to the drum track T15 so as to read data recorded thereon. The magnetic read head 627 is connected to the input of an amplifier 628 having its output connected to the logical OR circuit 612.

The output of the logical AND circuit 623 is connected to the serial-binary adder 615. When information is to be passed from the core register 618 to the serial-binary adder 615, an add signal is developed and is transmitted as an input to the logical AND circuit 623.

The output of the logical OR circuit 624 is connected as inputs to logical AND circuits 629, 630 and 631. The output of the logical AND circuit 629 is connected as an input to the logical OR circuit 444 which functions to pass information during scan 5 through the drum read-in switching circuitry 500 to drum tracks T12 or T13. The logical AND circuit 629 also has an input for receiving a signal indicating that information from the core register 618 should pass to the drum tracks T12 or T13. The output of the logical AND circuit 630 is connected as an input to the logical OR circuit 443 which passes information during scan 4 via the drum read-in switching circuitry 500 to drum tracks T8 or T9 or T10 or T11. The logical AND circuit 630 also has an input for receiving a signal for indicating that the information in the core register 618 should be read out to the punch tracks T8 or T9 or T10 or T11. The output of the logical AND circuit 631 is connected as an input to the logical OR circuit 442 for passing information during scan 3 via the drum read-in switching circuitry 500 to drum tracks T6 or T7. The logical AND circuit 631 also has an input for receiving a signal indicating that the information in the core register 618 is to be read out to the print tracks T6 or T7.

The core register 618 is a 3-dimensional core matrix of eight words; each word is a plane matrix of sixteen cores, four bits by four digits. Total storage then equals 32 numerical digits divided into eight words of four digits each. These words may be combined to develop eight or twelve digit fields. Triggers, not shown, are utilized to store the sign of each field in order that it may be available at either high or low order digit time. This method simplifies the testing for negative balance. A plus sign is associated with numeric zero. The use of the core register 618 for storage in the accumulator 600 permits arithmetic operations with the information presented serial by digit, low order first. When data is read out from the core register 618 to the logical AND circuits 629, 630 and 631, the information flows in reverse order; i.e., high order digit first, to facilitate zero print or punch suppression. Further, during readout of data from the core register 618 to the logical AND circuits 629, 630 and 631, zeros are inserted in all blank digits. Readout is controlled by plugboard wiring of synchronization impulses coming from the timing track T1 of the magnetic drum 201. The "home" impulse from timing track T1 is utilized to develop special timing impulses within the accumulator 600. Accumulator timing control is indicated by the block 632, in FIG. 4f. Accumulator timing control 632 essentially controls readout from the core register 618 and also controls a character insertion unit 633. The character insertion unit 633 is adapted to provide special characters in the appropriate places in the information flowing from the core register 618. When information is to be read out from the core register 618 to the logical AND circuits 629, 630 and 631 and special characters are to be inserted in this information, the accumulator timing control 632 interrupts the readout of the information from the core register 618 to permit the insertion of characters from the character insertion unit 633. The output of the character insertion unit 633 is connected to the logical OR circuit 624 which also has an input for receiving information from the core register 618.

Accumulator timing control 632 essentially consists of a program ring and a special digit ring, not shown. The program ring steps along for each drum revolution. The program ring is a 7-point ring and, by the use of logical AND and OR circuits, not shown, nine program steps are developed. Steps 1, 6, 7, 8 and 9 are a full drum revolution while steps 2, 3, 4 and 5 are a one-half drum revolution. Since a drum revolution is 6.4 milliseconds, the nine program steps occupy or take 44.8 milliseconds. The program ring is an open end ring and is started once each cycle with a "home" impulse coming from the drum track T1. The ring outputs are combined by logical AND and OR circuits, not shown, as desired with other gates to produce the program steps. By restricting the initiation of the internal program steps at "home" pulse time, the maximum delay will be one drum revolution after the beginning of the process time before accumulator operations start. The special digit ring, not shown, is a 5-point open end ring which provides digit impulses utilized for read-in and readout of the core register 618. It is started with the same plugged digit impulses that start all field gates. The fifth position of the ring is necessary to accommodate read-in to the core register 618 after one digit of delay is picked up during the time the information flows through the serial-binary adder 615. This special digit ring also facilitates the readout to the logical AND circuits 629, 630 and 631, during which time the digit sequence of a field must be reversed over that for normal operation of read-in and readout from the core register 618. This latter readout requires high order digit first whereas, in normal operation, information is flowing low order digit first. This special digit ring also facilitates character insertion, which permits the insertion of characters, such as commas or periods, between digits of an accumulator field. When character insertion is required, a one digit delay is established between successive digits. This delay is accomplished by holding the special digit ring in one position for more than one digit time. Further, since the machine operator plugwires the field start impulses, it is possible to allow as many digits of time between the fields as there are spaces inserted for special characters. The total permissible number of spaces inserted during any one readout from the core register is the difference between the number of character impulses per drum revolution and the number of digits stored in the register. The principal restriction on flexibility imposed by this method is that readout of any one field must be completed before readout of another field is started.

During an accumulating operation, during step 1 thereof, card fields are added to fields contained in the core register 618. During step 2, selective fields of the core register are transferred to the drum track T15; while, during step 3, the fields from drum track T15 and from the core register 618 are added. During step 4, destructive readout from the core register 618 to drum track T15 takes place. For step 5, the core register 618 receives true information from the drum track T15. Steps 6, 7 and 8 are utilized to read out data from the core register 618 to the logical AND circuits 629, 630 and 631, respectively. Specifically, during step 6, data is read out from the core register 618 to the logical AND circuit 631. The information is also regenerated during step 6 so that, during step 7, information be read out from the core register 618 to the logical AND circuit 630. The information is also regenerated during step 7 to permit the readout of information from the core register 618 during step 8 to the logical AND circuit 629. There is no regeneration of the information during step 8. In step 9, the core register 618 is emptied and, by means of plugwiring selective fields, may be reentered into core storage 618. These fields are contained on the drum track T15. Steps 4 and 5 are necessary in order to change the negative numbers in the core register 618 from complement to true form for readout to the logical AND circuits 629, 630 and 631. At step 4 time, destructive readout from the core register occurs and the information is transferred to the drum track T15. During step 5, the information is taken from the drum track T15 to the true and complement circuitry 613, through the adder 615 and back to the core register 618 in true form.

37

As indicated earlier herein, each drum track stores 80 digits of information, one digit for each card column. Those columns assigned to accumulator readout would not be plugged during read-in to the drum tracks for scans 3, 4 and 5. Hence, there are adequate spaces on the drum tracks to permit the insertion of data coming from the accumulator 600.

From the foregoing description, it is seen that information from the accumulator 600 will be transferred via the logical AND circuits 629, 630 and 631 and the logical OR circuits 444, 443 and 442 and the drum read-in switching circuitry 500 to the drum 201 so as to be associated with information relating to the same card group. This information of the particular card group is subsequently read out through the readout switching circuitry 700 to the print setup circuitry 800 and the punch setup circuitry 900, FIG. 2.

More particularly, the information coming from drum tracks T4 or T5 is passed by the drum readout switching circuitry 700 over information line 730, in FIG. 4a, which extends into FIG. 4b. The information line 730, FIG. 4b, leads to the three units comprising the print setup or control mechanism 810 for the print unit 1210 of the card document preparation unit 100. The print control mechanism 810 facilitates the unit 1210 to operate on a serial-parallel basis. The print control mechanism 810 consists of three identical sets of setup mechanisms which include banks of print thyratrons 811 for selectively energizing print magnets of the print unit 1210 and zero suppression circuitry which includes field start plug hubs connected as inputs to a logical OR circuit 812. The output of the logical OR circuit 812 is connected to the reset side of a trigger 813. The zero suppression circuitry further includes a logical OR circuit 814 having an end-of-field input and the bit inputs X, 1, 2, 4 and 8 from the bit ring 225. The output of the logical OR circuit 814 is connected as an input to a logical AND circuit 815 which also has an input from the information line 730. The output of the logical AND circuit 815 is connected to the set side of the trigger 813. The output of the trigger 813, associated with the reset side thereof, is connected as an input to a logical AND circuit 816 also having a 0 bit input. The manner in which the zero suppression circuitry operates and in which the print magnets become energized will be described in connection with the operation of typical zero suppression circuitry and print magnet control circuitry.

The information line 731, FIG. 4a, passes information received from drum tracks T6 or T7 via the drum readout switching circuitry 700. The information line 731 leads to the right in FIG. 4a and enters into FIG. 4b and leads downward in FIG. 4b to enter FIG. 4c. The information line 731 leads to the print setup or control mechanism 820 for the print unit 1220 of the card document preparation unit 1000. The print control mechanism 820 is very similar to the print control mechanism 810 in that it consists of two banks of print thyratrons 821 and a zero suppression circuit associated with each bank of print thyratrons 821, including a logical OR circuit 822 having inputs from field start plug hubs. The output of the logical OR circuit 822 is connected to the reset side of a trigger 823. The set side of the trigger 823 is connected to the output of a logical AND circuit 824 having an input from the information line 731 and an input from a logical OR circuit 825. The inputs to the logical OR circuit 825 include the bits X, 1, 2, 4 and 8 and an end-of-field input. The output of the trigger 823, associated with the reset side thereof, is connected as an input to the logical AND circuit 826 having, also, an input from the zero position of the continuously operating bit ring 225. The two banks of print thyratrons 821 control print magnets of the print unit 1220 for printing the billing data on the reverse side of the card documents processed by the card document preparation unit 1000. Before describing how the information flows

38 from the drum 201 to the even and odd punch control or setup mechanisms 910 and 920 for the even and odd punch mechanisms 1310 and 1320, respectively, of the card document preparation unit 1000, the information flowing from the magnetic drum to the print setup or control mechanism 830 for the print unit 1520 of the continuous forms print unit 1500 will be described. Information passed by information line 734 comes from drum tracks T13 or T14 via the drum readout switching circuitry 700. The information line 734, in FIG. 4d, leads to the right in FIG. 4e and downward in FIG. 4e into FIG. 4g. The information line 734 enters the print setup or control mechanism 730 for the print unit 1520 of the continuous forms print unit 1500. The print setup or control mechanism 830 for the continuous forms print unit 1520 includes a single bank of print thyratrons 831 and a zero suppression circuitry including a logical OR circuit 832 having input connections from field start hubs. The output of the logical OR circuit 832 is connected to the reset side of a trigger 833. The set side of the trigger 833 is connected to the output of a logical AND circuit 834 having inputs from the information line 734 and an input from the output of a logical OR circuit 835. The logical OR circuit has bit inputs X, 1, 2, 4 and 8 and an input from an end-of-field plug hub. The output of the trigger 833, associated with the reset side thereof, is connected as an input to a logical AND circuit 836. The logical AND circuit 836 also has an input to receive the bit zero from the continuously operating bit ring 225. The print thyratrons 831 control the energization of print magnets for the print unit 1520 of the continuous forms print unit 1500.

The print control mechanisms 810, 820 and 830 are substantially identical, the main difference being the number of print thyratrons to a bank and the number of banks of print thyratrons. Also, the zero suppression circuitry for each of the print control mechanisms 810, 820 and 830 is substantially identical. Hence, a typical print control mechanism for a typical print unit will be described. The typical print control mechanism is shown in FIG. 12. Information is presented to the typical print control mechanism by information line 850. Information line 850 leads to inputs of logical AND circuits 851 and to the input of a logical AND circuit 852. The logical AND circuits 851 are associated with the typical print thyratrons while the logical AND circuit 852 is associated with the zero suppression circuitry. Before continuing with the description of the typical print control mechanism a description of the typical print mechanism will be interjected so that the print control mechanism may be more readily understood. The typical print mechanism is a serial-parallel type of printing mechanism, such as the type described in the patent to R. Johnson, Patent No. 2,802,414, dated August 13, 1957. The print heads for the typical print mechanism are of the wire printing type. The print heads are located on fixed centers. Printing takes place while the record is held in an arrested position relative to the print heads. Printing takes place on a subcycle basis and the print heads are indexed relative to the card document. The print ends of the matrix wires for forming the characters are carried in the movable print heads, while the control ends of the matrix wires are positioned in line to be preset, whereby print ends form the desired character, by means of a code rod. The code rod facilitates the selective displacement of the matrix wires axially. After the selected matrix wires are displaced axially to form the desired character, all of the matrix wires are locked against free endwise movement relative to the print heads in order for the matrix wires to hold their setting after the characters are formed, because the code rods are withdrawn for adjustment to a new character setting. The print heads are then moved toward a platen to carry the print ends of the matrix wires against an inked ribbon disposed adjacent to the record card document. The control ends of the matrix wires, or the ends which are associated with the code rods, are held by rigid guide means; and, from this guide means, the control ends of the wires extend within guide tubes which are secured at their ends to the print heads; the print ends of the matrix wires forming the character patterns project from their associated guide tubes so that they will be the only matrix wires to engage the ribbon and thereby create print impressions as the print heads are moved toward the platen.

The print heads of the print mechanism 1210 for printing the name and address upon the obverse face of the card documents 10 and the print heads of the print mechanism 1520 for printing upon the continuous forms 1510 are driven toward the platen in the conventional manner, as described in the aforementioned patents to Johnson. However, the print heads of the print mechanism 1220 for printing the billing information upon the reverse face of the card documents lie above the card line in the card document preparation unit 1000. The matrix wires of the print heads are quite flexible and are looped over the card document preparation unit side frame members without any problem. Because of the desirability to retain the print setup mechanism and the drive mechanism for the print heads below the card line and reduce the amount of mechanism necessary for driving the print heads, the print heads of the print mechanism 1220 are driven toward the platens by means of "bowden" wires, as shown in FIG. 32. Hence, it is unnecessary to provide mechanism above the card line for driving the print heads of the print mechanism 1220 toward the reverse face of the card documents. This arrangement provides extreme flexibility and conserves upon mechanism which would otherwise be duplicated above the card line.

After the preset matrix wires have been carried forward by the print heads to form the print impressions, the matrix wires are restored to a nonset condition. The control end of the matrix wires extend through inertia slugs which aid the matrix wires both in forming print impressions and are also utilized in the restoration or resetting of the matrix wires to the nonset condition. During the time the print impressions are effected, the code rods are adjusted to form the new characters. After the code rods have been set with their new character settings, they are moved against the control ends of the restored matrix wires to form new character patterns on the print ends of the matrix wires. The code rod is movable in an axial direction to one of eight positions, and it is also rotated to one of seven angular positions. The code rods for presetting the matrix wires are set up through linkage arrangements described in the patents to Johnson, No. 2,785,627 and No. 2,802,414. The linkages therein described are actuated through six magnets. Each of the six magnets is controlled by an associated thyratron which, when fired, energizes the associated magnet. Additionally, a seventh thyratron and magnet are included for checking purposes. If the redundancy bit is present, the seventh thyratron is fired to energize the seventh magnet. When the code rod then operates, it transfers a checking contact and the printer continues to operate. However, if the information read from the drum, which energizes a checking relay, and the code rod setup, which transfers the checking contact, do not agree, the operation of the printer is stopped. With this general understanding of the typical print mechanism, the description of the print setup or control mechanism will continue.

Referring again to FIG. 12, there are seven logical AND circuits 851 associated with seven thyratrons 853 for the bit positions X, 0, 1, 2, 4, 8 and R. The thyratrons 853 have print magnets 854 connected in their plate circuits. Because information on the information line 850 is flowing serial by bit and serial by digit, the thyratrons 853 are permitted to fire under control of a cam-operated contact C36, which makes at 30° of one cycle and breaks at 93° of the same cycle. With the thyratrons 853 fired, the magnets 854 will not become energized but are permitted to become energized when a cam-operated contact C37 closes. The cam-operated contact C37 makes at 81° of a cycle and breaks at approximately 102° of the same cycle. Of course, in order for the thyratrons 853 to fire, impulses must be applied to both the control grid and the shield grid thereof. The outputs of the logical AND circuits 851 are connected to the control grids of the thyratrons 853. The shield grids of the thyratrons are connected to receive bit impulses corresponding to the bit position of the thyratron; i.e., the X-position thyratron 853 receives an X bit on its shield grid while the 0-position thyratron 853 receives a 0 bit upon its shield grid, and so forth. The logical AND circuits 851 are selectively conditioned to pass the information coming over the information line 850. The selective conditioning of the logical AND circuits 851 is accomplished through subcycle relay circuitry, shown in FIG. 14.

Printing takes place on a subcycle basis under control of subcycle relays, shown in FIG. 14. Since printing is accomplished in three subcycles while the fourth subcycle is utilized to return the print mechanism to a home position, there are three groups of subcycle relays. These groups include relays R38, R39 and R40, respectively. The relays R38 are connected to be energized under control of a cam-operated contact C38, while the groups of relays R39 and R40 are connected to be energized under control of a cam-operated contact C39. The cam-operated contacts C38 and C39 have two make and break periods. The cam-operated contact C38 makes at 18° and breaks at 81° and remakes at 108° and breaks again at 171° of a cycle. The cam-operated contact C39 makes for the first time at 108° and breaks at 171°, which coincides with the second make and break periods for the cam-operated contact C38, and again makes at 198° and breaks for the second time at 271° of a cycle. The logical AND circuits 851 are conditioned to pass information coming over the line 850 by signals coming from the continuously operating column ring 215. Plug hubs 855 are selectively plugged to the outputs of the 80-column continuously operating column ring 215. The plug hubs 855 are connectable to the input of the logical AND circuits 851 in groups of three. Hence, each logical AND circuit 851 may be conditioned by three different plug hubs according to the manner in which the subcycle relays R38, R39 and R40 are energized. For instance, the first plug hub of a group of three plug hubs is connected to a normally closed contact R39a of relay R39 while the normally open contact R39a is connected to the second plug hub in the group. The third plug hub in the group is connected to a normally open contact R40a. The normally closed contact R39a is connected by means of the transfer spring associated with the normally open and closed contacts R39a to a normally open contact R38a of subcycle relay R38. The normally open contact R40a is connected to a normally closed contact R38a of relay R38. The transfer spring associated with the normally open and closed contacts R38a is connected to the input of the logical AND circuit 851. Information will be passed by the logical AND circuits 851 for the first time or during the first subcycle when relays R38 become energized as the cam-operated contact C38 closes for the first time at 18°. The logical AND circuits 851 will pass information coming over line 850 for the second time for the second subcycle 2 printing when both relays R38 and R39 simultaneously become energized at 108° upon closure of the cam-operated contacts C38 and C39. Although the relays R40 will also become energized at this time, there will not be a complete circuit to the logical AND circuits 851. The logical AND circuits 851 will be conditioned for the third time to pass information coming over the informa- tion line 850 to permit the subcycle 3 printing to take place when the relays R40 are energized upon closure of the cam-operated contact C39 at 198° of a cycle. Again, although relays R39 also become energized at this time, a circuit path will not be completed to the logical AND circuits 851 as a result of the relays R39 becoming energized. Hence, the control grids of the thyratrons 853 will be conditioned to permit the thyratrons 853 to be fired at three different intervals, where each interval lasts for approximately 63° of a cycle. During these intervals, the bit impulses X, 0, 1, 2, 4, 8 and R will be flowing to the corresponding thyratrons for bit positions X, 0, 1, 2, 4, 8 and R. Hence, if there is information on the information line 850 containing corresponding bits, the thyratrons 853 will become energized upon closure of the cam-operated contact C36. While a subcycle lasts for approximately 30 milliseconds, print time occurs well within the 70 milliseconds during which the card documents are arrested at the print station 1200, because the code rods are set to form a new character while the previously formed character is being printed. Printing occurs on a subcycle basis at 105°, 195° and 285°, while the card documents 10 are in the print station 1200 from 90° until 291°.

The zero print suppression circuitry for the typical print setup or control mechanism, shown in FIG. 12, includes a logical OR circuit 856 having inputs from the continuously operating bit ring 225 of X, 1, 2, 4 and 8 and an input for receiving an end-of-field signal. The output of the logical OR circuit 856 is connected as an input to the logical AND circuit 852 which also has an input from the information line 850. The output of the logical AND circuit 852 is connected to an inverter 857 having its output capacitively coupled to the set side of a trigger 858. The output of the trigger 858, associated with the reset side thereof, is connected to a logical AND circuit 859 also having an input from the zero position of the continuously operating bit ring 225. The output of the logical AND circuit 859 is connected to the control grids of the thyratrons 853 for the zero positions. Hence, a 0 bit will pass to the control grids of the thyratrons 853 for the zero positions only if the logical AND circuit 859 is conditioned to pass the 0 bits. Whether or not the logical AND circuit 859 is conditioned to pass the 0 bits is dependent upon the condition or state of the trigger 858. The reset side of the trigger 858 is capacitively coupled to the output of a single-shot multivibrator 860 having an input from a differentiating circuit 861. The differentiating circuit 861 receives its input from the output of a logical OR circuit 862. The inputs of the logical OR circuit 862 are connected to field start plug hubs 863.

The logical OR circuit 856 will pass the bits X, 1, 2, 4 and 8 and the end-of-field signal if the end-of-field hub is plugged. Hence, the logical AND circuit 852 will be conditioned, during the times that the signals are passed by the logical OR circuit 856, to pass any corresponding data coming over the information line 850. If information is passed, the inverter 857 is caused to conduct, whereby a negative signal will be transferred to the set side of the trigger 858. The trigger 858 is of the type which will be transferred by a negative signal. Hence, the output, associated with the reset side of the trigger 858, will be switched to become positive. With the trigger 858 in this condition, the logical AND circuit 859 is conditioned to pass the 0 bit impulse. By this arrangement, if a 0 were the only bit present on the information line 850, the logical AND circuit 852 would not be conditioned to cause conduction of the inverter 857 and, consequently, the transfer of the trigger 858. Hence, the logical AND circuit 859 would not be conditioned to pass the 0 bit. When the 0 bit has been preceded in the immediate field by bits of a digit other than zero, or, if the end-of-field hub is plugged, the trigger 858 will be transferred and the 0 bit for the particular digit will be passed by the logical AND circuit 859. Once the trigger 858 is transferred to condition the logical AND circuit 859, the same will remain conditioned until the trigger 858 is reset. The trigger 858 is reset by field start impulses plugged to the field start plug hubs 863. The field start signal will be transferred by the logical OR circuit 862 to the differentiating circuit 861 which will effect a signal from the single-shot multivibrator 860 to reset the trigger 858. Hence, the trigger 858 will be reset between fields if desired.

By the arrangement just described, printing will take place on a subcycle basis, and the character spaces utilized for printing depend upon how the hubs 855 are plugged to the continuously operating column ring 215. During the first subcycle, reference to FIGS. 31a, 31b and 31c, it is seen that columns 1, 4, etc., would be printed; while, during the second subcycle, columns 2, 5, etc., would be printed, whereas, during the third subcycle, columns 3, 6, etc., would be printed so as to complete the total line of printing.

The print mechanism 1210 for printing the name and address on the obverse face of the card documents is shown in FIG. 31a. There are three rows of print heads with ten print heads to each row. The first column of print heads is positioned in column 1 while the second column of print heads is positioned in column 4, and so on, until the tenth column of print heads, which is positioned in column 28. Hence, the first print heads print columns 1, 2 and 3 while the second print heads print columns 4, 5 and 6, and the tenth print heads print columns 28, 29 and 30. The print heads are mounted in the usual fashion on a carriage capable of moving laterally in three, one-tenth inch increments.

The print mechanism 1220 for printing the first line of billing information and the total line of billing information is shown in FIG. 31b. The two rows of print heads are vertically spaced to cover the first and total lines of printing, and there are 20 print heads to a row. Since the print heads operate on a subcycle basis, there will be 60 characters printed for each row. The first print head is positioned in column 1 while the second print head is positioned in column 4, and so on, where the 20th print head is positioned in column 58. Hence, during the first subcycle, print head 1 will print in column 1, print head 2 will print in column 4, and print head 20 will print in column 58. During the second subcycle, print head 1 will print in column 2, print head 2 will print in column 5, and print head 20 will print in column 59. Whereas, during the third subcycle, print head 1 will print in column 3, print head 2 will print in column 6, and print head 20 will print in column 60, to complete the line of printing.

The print mechanism 1520 of the continuous forms print unit 1500 consists of a single row of print heads with 20 print heads to the row. The first print head is positioned in column 1 while the second print head is positioned in column 4, and so on, where the 20th print head is positioned in column 58. Hence, during the first subcycle, the first print head will print in column 1, the second print head will print in column 4, and so on, where the 20th print head prints in column 58. During the second subcycle, the print heads are shifted to the right one column space where the first print head will then print in column 2, the second print head will print in column 5 and the 20th print head will print in column 59. During the third subcycle, the first print head will print in column 3, the second print head will print in column 6, and so on, where the 20th print head will print in column 60, to complete a line of printing on the continuous form 1510. The information which will be printed, of course, is determined by the information in the character position on the drum track. With reference to FIG. 18, for instance, if the particular drum track associated with the particular print unit contained the bits X, 1, 8 in character position 77, the letter "R" would be printed. Likewise, if the character position 73 contained data bits 1, 2 and 4, the character printed would be a "7."

Before describing how the information passes from the magnetic drum 201 over information lines 732 and 733 via the drum readout switching circuitry 700 to the punch setup or control mechanisms 910 and 920, the punching units at the first and second punching stations 1310 and 1320 will be described. First and second punch stations 1310 and 1320 of the punch mechanism 1300, FIGS. 3, 29, 30 and 33, have the function of recording selective information into the card documents 10 in the form of perforations. In this example, a maximum of 80 digits of information may be entered into the card documents 10. The particular kind of information which will be entered into the card documents 10 is at the discretion of the machine operator. More than likely, the account number for each card document being prepared will be entered therein in the form of perforations. The information which is to be entered into the card documents in the form of perforations will be coming from either drum track T8, T9, T10 or T11, FIG. 4d. The information is made available in such a manner that a portion of the information may be entered into one of the card documents at the first punch station 1310 and the remainder of the information is entered into the second punching station 1320. This arrangement is quite significant because this permits a higher output rate of the completed card documents 10. Each of the individual punch units at the corresponding first and second punching stations 1310 and 1320 will be operating at 4000 strokes per minute at eight strokes per card. Normally, it is quite difficult to provide a punch unit which is capable of performing selective punching of record cards at the rate of 4000 strokes per minute; and, for the most part, punch units for selectively punching cards at a higher rate of speed have not been successfully developed. Therefore, by this arrangement, it is possible to achieve the higher punching rate by proportioning the amount of information punched into the card documents at any one punch station.

In this example, the punch unit at the first punch station 1310 punches the index positions of the card documents 10 in flight for the even rows, or rows 12, 0, 2, 4, 6 and 8; and the punch unit at the second punch station 1320 punches the index positions of the card documents 10 in flight for the odd rows, or rows 11, 1, 3, 5, 7 and 9. The punch units at the first and second punch stations 1310 and 1320 are identical in principle of operation and substantially identical in structure.

The punch and die assembly 1350 of each punch unit operates to oscillate back and forth while a vertically reciprocating punch element 1351 moves up and down, FIG. 33, both the vertical and horizontal movements being timed with the feeding of the card documents 10 so as to make it unnecessary to stop the card documents during the punching operation. These types of punch units are already known in the prior art and the type of punch unit in the present invention is quite similar to the punch units described in the patents to C. D. Lake et al., No. 2,451,752 and No. 2,845,122, and the patent to G. F. Daly et al., No. 2,547,445.

Referring to FIG. 33, it is seen that the punch units comprise the punch and die assembly 1350 supported by a pivot 1352 having oscillatory motion. Oscillations of the punch and die assembly 1350 are effected by complementary cams 1353 and 1354 fixed to be rotated by shafts 1355 and 1356, respectively. The complementary cams 1353 and 1354 are adapted to act upon a roller 1357 carried or supported by punch and die assembly 1350 and thereby oscillate the same about the pivot 1352 in a pendulum-like manner. The rate of angular oscillation is such that the cutting end of the vertically reciprocal punch member 1351 is moving at the speed of the card documents and, while in contact therewith, on the forward stroke or oscillation. This rate of oscillation is provided by the particular contour of the complementary cams 1353 and 1354. The forward stroke occupies approximately two-thirds of a cycle point while the return stroke requires only one-third of a cycle point. The punch member 1351 is guided in a frame 1358 of the punch and die assembly 1350 for vertical reciprocable movement. The punch member 1351 is provided with a notch 1352 at its upper end and limited in its upward movement by a fixed projection 1360 extending inwardly from the frame, which engages the lower side of the notch 1359. However, it should be pointed out that the punch member 1351 is never driven against the fixed projection 1360; it is merely carried thereagainst by its own inertia. A punch interposer element 1361 permits selective reciprocation of the punch member 1351. The interposer 1361 is provided with a ball end 1362 adapted to reside in an outwardly opening socket 1363 of a punch selector lever 1364 pivotally mounted intermediate of its ends by a pin 1365. A spring 1366, attached at one end to the punch selector lever 1364 and at its other end to the punch interposer lever 1361, holds the punch interposer in a slightly elevated position and against the cam surface of a punch cam 1367, the ball end 1362 being capable of pivoting in the socket 1363.

The punch selector lever 1364 is provided with a forked end 1368 adapted to be engaged by the end of an armature 1369 of an even punch selector magnet 1370. The other end of the punch selector lever 1364 is adapted to engage a selector cam 1371. Additionally, the punch selector lever 1364 is urged to pivot in a counterclockwise direction by means of a compression spring 1372 in a bore 1373 within a fixed block 1374, with one end engaging a block 1375 to seal off the bore 1373; and the other end in engagement with the shoulder 1376 of the selector lever 1364.

The armature 1369 of the magnet 1370, with the magnet energized, prevents the spring 1372 from moving the punch selector lever 1364 counterclockwise about the pivot 1365. With the punch selector lever 1364 in its restrained or latched position, a depending projection 1377 on the punch interposer 1361 lies out of engagement with the top or upper end 1378 of the punch member 1351. However, when the magnet 1370 is energized to attract its armature 1369, the punch selector lever 1364 is free to be pivoted counterclockwise by the spring 1372. The selector cam 1371 is mounted on a shaft 1379 to be rotated counterclockwise. The impulses for energizing the magnet 1370 come at a predetermined time; and, therefore, the selector cam 1371 is timed to actuate the punch selector lever 1364 so as to free the forked end 1368 of the armature 1369 and thereby permit the magnet 1370 to attract the armature 1369 rapidly. While the armature 1369 is held attracted to the magnet 1370, the punch selector lever 1364 is urged by the spring 1372 to follow the selector cam 1371. Following the punch selector cam 1371, the punch selector lever 1364 is pivoted counterclockwise and the punch interposer 1361 is shifted to the right to bring the depending projection 1377 over the top end 1378 of the punch member 1351.

The punch interposer 1361 has a surface 1380 which follows the punch cam 1367 fixed to be rotated counterclockwise by a shaft 1381. As the surface 1380 of the punch interposer 1361 follows the cam 1367, the punch interposer 1361 will be displaced downwardly. It is thus seen that, if the depending projection 1377 on a punch interposer 1361 is not over the top end 1378 of the punch member 1351, the same will not be moved through a punch stroke. However, with the depending projection 1377 over the top end 1378 of the punch member 1351, the punch member 1351 will be displaced downwardly by the punch cam 1367 and enter a die member 1382 of the punch and die assembly 1351. The die member 1382 is supported to withstand the downward pressure of the punch member 1351 during a punching operation by a rotatable die support roll 1383. The linear velocity of the die member 1382 during the time the punch member 1351 enters therein matches the peripheral velocity of the support roll 1383.

As the punch member 1351 reaches the end or limit of its downward stroke, the punch selector lever 1364 is pivoted clockwise by the selector cam 1371, which overcomes the urging of the spring 1372 to pivot the punch selector lever 1364 counterclockwise. The punch selector lever 1364, as it pivots clockwise by action of the selector cam 1371, is shifted to the left and thereby displaces the depending projection 1377 from its position over the top end 1378 of the punch member 1351. Furthermore, as the punch selector lever 1364 is pivoted clockwise, the left fork of the forked end 1368 of the punch selector lever 1364 contacts the beveled end of the armature 1369 to carry it away from the magnet 1370 if it happens to remain attracted thereto through residual magnetism. In this manner, the punch selector lever 1364 will again be restrained from pivotal movement by the armature 1369.

The punch member 1351 is positively restored or withdrawn from the die member 1382 by means of a bell crank 1384 pivotally mounted by a pin 1385 and having an arm 1386 which carries the projection 1387 for engaging the upper surface of the notch 1359 in the punch member 1351 and a projection 1388 for engaging an arcuate surface 1389 of the punch interposer 1361. A spring 1390, attached on one end to the bell crank 1384 and on its other end to a fixed pin, not shown, tends to pivot the bell crank 1384 clockwise to hold the projection 1388 in constant contact with the arcuate surface 1389 of the punch interposer 1361. The bell crank 1384 also has an arm 1391 provided with a curved surface 1392 to be engaged by the punch cam 1367. As the punch cam 1367 engages the curved surface 1392, the bell crank 1384 is pivoted clockwise so that the projection 1387 engages the upper surface of the notch 1359 in the punch member 1351 and carries the punch member 1351 upward. The punch member 1351 is thereby restored in a position to permit the depending projection 1377 of the punch interposer 1361 to be brought over the top end 1378 thereof by the punch selector lever 1364 when the magnet 1370 is again energized. From the foregoing, it is seen that the punch and die assembly 1350 is oscillated about the pivot 1352 by the complementary cams 1353 and 1354 at a rate so that the cutting end of the punch 1351 is moving at the speed of the card document 10 while in contact therewith on a forward stroke of the oscillation. The punch cam 1367 is rotated in a particular manner to actuate the punch member 1351 through a punch stroke at the time the punch and die assembly 1350 is moving at the same rate as the card documents 10. The punch cam 1367 also functions to restore the punch member 1351 through the bell crank 1384. Additionally, it is seen that selector cam 1371 performs three distinct functions. The selector cam 1371 controls the positioning of the depending projection 1377 of the punch interposer 1361 over the top end 1378 of the punch member 1351, it controls the withdrawal or the shifting of the punch interposer 1361, and it provides positive restoration of the armature 1369 when the punch magnet 1370 is de-energized.

The punch members 1351 are carried spacedly apart and in line in the frame member 1358; and each punch member 1351 is associated with its own punch magnet 1370, punch selector lever 1364, punch interposer 1361, and bell crank 1384. Hence, by selectively energizing the punch magnets 1370, selected punch members 1351 will be actuated through a punch stroke.

The punch magnets 1370 at the first punch station 1310 and punch magnets 1395 at the second punch station 1320 are selectively energized by information coming from the drum tracks T8, T9, T10 or T11, respectively, to enable selectively punching of the card documents 10. However, the information coming from these drum tracks is in the 7-bit binary code and must be translated to the IBM code so at to enable the proper energization of the punch magnets. Because punching occurs at two different punch stations to complete the entry of information of a card group in the form of perforations into the card documents 10, each drum track must be scanned twice; once for even row punching and once for odd row punching. It takes four cycles of operation to complete the punching of the card documents 10. Hence, in order to permit information to be read into the one drum track for one card group while information is being read out from another drum track for another card group, four tracks are provided to permit this operation. Information coming from the drum tracks T8, T9, T10 or T11 is flowing serial by bit and serial by digit in binary form. Information entered into the card documents in the form of perforations is entered in the IBM code in parallel fashion, or row by row. Information coming from drum tracks T8, T9, T10 or T11, which is to be passed by the drum readout switching circuitry 700 to the even punch setup mechanism 910, passes over information line 732; while information coming from the same drum tracks via the drum readout switching circuitry 700, which is to be transmitted to the odd punch setup mechanism 910, passes over the information line 733.

The information line 732, FIG. 4a, leads downward into FIG. 4d and from FIG. 4d to the right into FIG. 4e and downward in FIG. 4e to the even translator 930 in FIG. 4g. The output of the translator 930, which functions to translate the information from binary code to the IBM code, is connected to a bank of punch thyratrons 911. The translator 930 is connected to receive the even digits from a digit emitter 931 and to receive the bit impulses X, 0, 1, 2, 4, 8 and R, respectively. The details of the even translator 930 are shown in FIG. 15. The translator 930 consists of a decoder portion 932, a gating portion 933 for gating the data coming over the information line 732, a compare portion 934 for comparing the decoded information with the gated information, and a compare gate portion 935. The decoder portion 932 is adapted to receive the even digits from the digit emitter 931. The digit 12 terminal of the digit emitter 931 is connected to the input of a logical AND circuit 936 and to the input of a logical OR circuit 937. The logical AND circuit 936 also has a bit input from the X position of the continuously operating bit ring 225. The logical OR circuit 937 also has an input connected to the digit 0 terminal of the digit emitter 931. The output of the logical OR circuit 937 is connected to the input of the logical AND circuit 938 having also an input from the 0 position of the bit ring 225. The digit 2 terminal of the digit emitter 931 is connected as an input to a logical OR circuit 939 also having an input from the digit 6 terminal of the digit emitter 931. The output of the logical OR circuit 939 is connected to an input of a logical AND circuit 940 also having an input from the 2 position of the bit ring 225. A logical OR circuit 941 has an input from the digit 4 terminal of the digit emitter 931 and an input from the digit 6 terminal of the digit emitter 931. The output of the logical OR circuit 941 is connected as an input to a logical AND circuit 942 also having an input from the 4 position of the bit ring 225. A logical AND circuit 943 has an input from the digit 8 position of the digit emitter 931 and also has an input from the 8 position of the bit ring 225. The logical AND circuits 936, 938, 940, 942 and 943 are commonly connected by a conductor 944 which leads to the compare portion 934.

However, before describing the compare portion 934, the portion for gating the data passing over the information line 732 will be described. The portion 933 for gating the data passing over information line 732 consists of logical AND circuits 946 and 947 having inputs from the information line 732. The logical AND circuit 946 also receives an input from the output of a logical OR circuit 948 having inputs from the X and 0 positions of the bit ring 225. The logical AND circuit 946 also has an input from a conductor commonly connecting digit terminals 12, 11 and 0 of a digit emitter 949. The logical AND circuit 947 has an input from a logical OR circuit 950 which has inputs from the 1, 2, 4 and 8 positions of the bit ring 225. The logical AND circuit 947 also has an input from a conductor commonly connecting the digit terminals 1 through 9 of the digit emitter 949. The outputs of the logical AND circuits 946 and 947 are commonly connected by a conductor 951 which leads to the compare portion 934. The conductor 944 is connected to the input of an inverter 952 and to the input of a logical AND circuit 953, while the conductor 951 is connected to the input of an inverter 954 and to the input of a logical AND circuit 955. The output of the inverter 952 is connected as an input to the logical AND circuit 955, and the output of the inverter 954 is connected as an input to the logical AND circuit 953. The outputs of the logical AND circuits 953 and 955 are commonly connected to the set side of a trigger 956 of the compare gate portion 935. The reset side of the trigger is connected to the S position of the bit ring 225. The output of the trigger 956, associated with the set side thereof, is connected to the input of a logical AND circuit 957 also having an input from the R bit position of the bit ring 225. The trigger 956, when in the reset condition, conditions the logical AND circuit 957 to pass the R bit coming from the bit ring 225. However, when the trigger 956 is in the set condition, the logical AND circuit 957 will not be conditioned to pass the R bit. The R bit may be considered as a punch gate which, if passed by the logical AND circuit 957, will condition the thyratrons 911 for firing. The output of the logical AND circuit 957 is connected as an input to a cathode follower 958. The output of the cathode follower 958 is connected to the shield grids of the thyratrons 911. The control grids of the thyratrons 911 are connected to plug hubs, not shown, which are selectively plugged to the positions as desired of the 80-column continuously operating column ring 215.

The firing of the thyratrons 911 is under the control of a cam-operated contact C40 which makes for 25°; for instance, starting at 184°, it remains made until 209° and then breaks for every 15°. Hence, it would break at 209° and remain broken until 224°, at which time it would again make and remain made until 249°, etc. Although the thyratrons 911 are energized or fired under control of the cam-operated contact C40, the punch magnets 1370 are energized under control of the cam-operated contact C41. The cam-operated contact C41 does not make until 20° after the cam-operated contact C40 makes. Hence, this 20° difference, or 6.67 milliseconds, permits a complete drum revolution, whereby the 80-column continuously operating column ring 215 will run through all its positions before the punch magnets 1370 become energized. The cam-operated contact C41 makes, for instance, at 204° and remains made for 16°, or until 220°, and then breaks for 24°, or until 244° when again it makes and remains made for 16°, and then breaks for 24° before being made again, etc. If the trigger 956 remains in the reset condition, the logical AND circuit 957 will be conditioned to pass the R bit coming from the R position of the continuous bit ring 225. However, if the trigger 956 is set by an impulse coming from the compare portion 934, the logical AND circuit 957 will not be conditioned to pass the R bit. If the R bit is not passed, the thyratrons 911 will not be conditioned for firing; and, consequently, the punch magnets 1370 will not become energized. If the information passed along information line 944 equals the information or gated data on line 951, then there will not be an output from either of the logical AND circuits 953 and 955 to set the trigger 956. Hence, the trigger 956 will condition the AND circuit 957 to pass the R bit. If the information on line 944 does not equal the information on line 951, the logical AND circuits 953 and 955 will pass an impulse to set the trigger 956.

The principles of operation and function of the translator 930 will be readily understood with reference to FIGS. 17 and 18. In FIG. 17, it is seen that character positions are shown together with the bit positions for each character position, and it will be recalled that there are 80 character positions around the drum track and that each character position is made up of eight bit positions. For instance, the character position 79 includes bits X and 0. Since this is an even number of bits, the redundancy bit R is not present. For a punching operation at the even punch station 1310, all of the character positions C–0 through C–79, or 80 character positions, will be looked at six different times, or, in other words, for the row 12 position, row 0 position, row 2 position, row 4 position, row 6 position and the row 8 position.

In FIG. 17, the character positions C–0 through C–79 are looked at for 12's and 8's. Character positions C–79, C–78, C–75, C–74, C–71 and C–0 each contain a "12." Since the serial read data coming from the drum 201, or the gated data, compares with the decoded data, the compare gate remains up to pass a punch gate at R time for each of the character positions C–79 and C–78. In position C–77, it is seen that the gated data does not compare with the decoded data; and, consequently, the compare gate is not up at R time to pass the R bit to form a punch gate. However, in positions C–75 and C–74, the gated data does compare with the decoded data, and the compare gate is up at R time to pass the R bit which forms the punch gate. Character positions C–78, C–72, C–71 and C–0 each contain an "8"; and, by examining these character positions, it is seen that a punch gate is developed since the compare gate is up as a result of a comparison between the gated data and the decoded data so as to pass an R bit at R time to develop the punch gate.

Information flows to the odd punch setup or control mechanism 920 over information line 733. Information line 733, FIG. 4a, leads downward into FIG. 4d and then to the right into FIG. 4e to the translator 960, which has an output connected to the punch thyratrons for the odd rows, or a bank of punch thyratrons 921 for the punch setup mechanism 920. The odd punch translator 960 receives the odd digit impulses from the digit emitter 931 and, also, has inputs from the X, 0, 1, 2, 4, 8 and R positions of the bit ring 225. Except for the decoder portion, the odd punch translator 960 is substantially identical to the even punch translator 930. The decoder portion of the odd punch translator 960 is shown in FIG. 16. The digit 11 terminal of the digit emitter 931 is connected as an input to a logical AND circuit 961 also having an input from the X position of the bit ring 225. The digit 1 terminal of the digit emitter 931 is connected to a logical OR circuit 962 also having inputs from the digit 3, digit 7 and digit 9 terminals of the digit emitter 931. The output of the logical OR circuit 962 is connected as an input to a logical AND circuit 963 also having an input from the bit 1 position of the bit ring 225. The digits 3 and 7 terminals of the digit emitter 931 are connected as inputs to a logical OR circuit 964. The output of the logical OR circuit 964 is connected to the input of a logical AND circuit 965 also having an input from the bit 2 position of the bit ring 225. The digit 5 and 7 terminals of the digit emitter 931 are collected to the inputs of a logical OR circuit 966. The output of the logical OR circuit 966 is connected to the input of a logical AND circuit 967 also having an input from the bit 4 position of the bit ring 225. The digit 9 terminal of the digit emitter 931 is connected as an input to a logical AND circuit 968 also having an input from the bit 8 position of the bit ring 225. The outputs of the logical AND circuits 961, 963, 965, 967 and 968 are commonly connected by a conductor 969. The conductor 969 would lead to a compare unit similar to that of the compare unit 934 for the even punch translator. The odd punch translator would also include units similar to the units 933 and 935 of the even punch translator.

Referring to FIG. 13, the output of the translator 960 is connected to the shield grids of the thyratrons 921. The control grids of the thyratrons 921 are connected to plug hubs which are plugged to the 80-column continuously operating column ring 215. The thyratrons 921 have the odd punch magnets 1395 connected in their plate circuit. The firing of the thyratrons 921 is controlled by a cam-operated contact C42, while energization of the odd punch magnets 1395 is under the control of a cam-operated contact C43. The cam-operated contact C42 makes, for instance, at 204° of a cycle and remains made for 25°, or until 229° of that cycle, and then breaks until 244°, or remains broken for 15°, and then remakes to remain made for another 25°, or until 269°, and so on. The cam-operated contact C42 makes 20° after each make of the cam-operated contact C43, or, in other words, the cam-operated contact C43 makes at 224° and remains in the make condition for 16°, or until 240°, and then breaks for 24°, or until 264°, at which time it makes again and remains made until 280°, and so on. Hence, the thyratrons 921 will be conditioned for firing through the cam-operated contact C42 for six different intervals to permit the odd punching for the rows 11, 1, 3, 5, 7 and 9; while the cam-operated contact C43 will condition the magnets 1395 for energization for the periods of time to permit the punching of the rows just mentioned.

The foregoing describes in general how the information is derived from the master and detail cards 60 and 50, respectively, by the sensing units 150 of the master and detail card readers 110 and 120. The description continues by describing the sensing units 150 with their facility for temporarily storing the information derived from the master and detail cards to permit a collating operation by the collating circuitry 127 which, in turn, calls clutch circuitry 375 into play, together with scan circuitry 400. The data is then scanned from the sensing units 150 in a series of scans 2 through 5 and is then transferred to the drum storage 201 through the read-in switching circuitry 500. During scan 2, the information is transferred to the drum 201 and then directly to the accumulator. The information transferred to the drum during scans 2, 3, 4 and 5 is later read out through the readout switching circuitry 700 and transferred as appropriate to the print setup circuitry 800 and to the punch setup circuitry 900. With this general background, the detailed descriptions, as previously outlined, follow.

CARD READER UNIT

The card reader unit 100, as shown in FIGS. 1 and 3, consists of a master card reader 110, FIG. 3, for analyzing master or name and address record cards 60 and a detail card reader 120, FIG. 26, for analyzing item or detail cards 50. The master and detail card readers 110 and 120 are essentially identical and are mounted on a common frame and driven by a common drive shaft.

Master and Detail Card Readers

The master card reader 110 has two spaced apart static sensing units located at sensing stations 112 and 113 and a card stacker 114 provided with the feature for offsetting error cards. The master cards 60 contained in the card hopper 111 are advanced in seriatim by a conventional picker knife 116 controlled by a clutch 376 to a pair of first cooperating continuously running feed rolls 117. The first pair of feed rolls 117 feed the master cards to a second pair of continuously running cooperating feed rolls 117 spaced from the first pair of feed rolls 117 to engage the cards before the same are released from the first pair of feed rolls 117. A card sensing lever 118 is disposed intermediate of the first and second pair of feed rollers 117 for the purpose of sensing the presence or absence of cards in the card reader. The second pair of rollers 117 feeds the master cards 60 into the first sensing station 112, at which a static sensing unit 150 is located, the same functions to analyze the master cards 60. A first gate 119 located at the first sensing station 112 operates to arrest the master card fed to the first sensing station 112 by the second pair of cooperating feed rollers 117. After the master cards 60 are analyzed by the sensing unit 150 at the first sensing station 112, they are advanced when released by the first gate 119 to a third pair of cooperating feed rollers 117. The third pair of feed rollers 117 advances the cards to a fourth pair of cooperating feed rollers 117 spaced sufficiently from the feed rollers 117 to engage the card prior to the card being released from the third pair of feed rollers 117. A card sensing lever 118 is positioned intermediate of the third and fourth pair of feed rollers to sense the presence and absence of the master cards. The fourth pair of feed rollers 117 feeds the record cards into a second sensing station 113. A static sensing unit 150 is positioned at the second sensing station 113 to analyze the master cards. The master cards are arrested relative to the sensing mechanism 150 located at the second sensing station 113 by a second card gate 119.

The clutch 376 for controlling the picker knife 116 is operated in the manner that cards will be picked from the hopper 121 so that the second master card will arrive at the first sensing station 112 when the first master card arrives at the second sensing station 113. Further, the sensing units 150 positioned at the first and second sensing stations 112 and 113 have the facility for analyzing the master cards positioned relative thereto and for retaining the information derived from the master cards for a sufficient period of time to permit the card to be advanced from the sensing unit prior to the utilization of the information derived from the card.

As the master cards are advanced from the second sensing station 113, they engage a fifth pair of cooperating feed rollers 117 which feed the cards relative to a card sensing lever 118 and then to a drum-type stacker 114. If the master cards are in their proper order and are properly related to detail cards passing through the detail card reader 120, they will be stacked in succession. However, any master card which is in error will be offset by the stacker 114 through the facility of a magnet M4, FIG. 11.

The detail card reader 120 of the card reader unit 100 consists of the card hopper 121, FIG. 26, two spaced apart sensing stations 122 and 123, a card stacker 124 provided with the feature for offsetting error cards, and means for feeding the cards relative to these units. The card feeding means includes a picker knife 128 controlled by a clutch 377 for picking cards 50 in seriatim from the card hopper 121 and presenting them to a pair of cooperating feed rollers 129. A second pair of cooperating feed rollers 129 spaced from the first pair of feed rollers feeds the detail cards into the first sensing station 122 where the same are arrested for a sensing operation by a card gate 131. The sensing operation is facilitated by a sensing unit 150, shown in detail in FIG. 27. A card sensing lever 130 is positioned between the first and second series of feed rollers 129 to detect the presence or absence of cards in the card path.

The detail cards 50 leave the first sensing station 122 after a sensing operation and, when permitted by the card gate 131, enter between a third pair of cooperating feed rollers 129 which feed the detail cards 50 to a fourth pair of cooperating feed rollers 129. A card sensing lever 130, positioned between the third and fourth pair of cooperating feed rollers, functions to detect the presence or absence of cards in the card path. The fourth pair of cooperating feed rollers 129 feeds the detail cards into the second sensing station 123 whereat the same are arrested for a sensing operation by a second card gate 131. When the detail cards 50 are permitted to leave the second sensing station 123, they engage a fifth pair of cooperating feed rollers 129 which convey the same past a card sensing lever 130 to a drum-type stacker 124. Any detail card which is in error will be offset by the stacker 124 through the facility of a magnet M5, FIG. 11.

The clutch 377 controls the picker knife 128 in such a manner that the detail cards 50 arrive at the second station 123 while other detail cards 50 arrive at the first sensing station 122. Card movement for the master and detail card readers 110 and 120 is shown in FIGS. 25 and 26. In most instances, such as where there is a single detail card accompanying a single name and address or master card, the detail cards and the master cards will move through their respective card readers together; however, when more than one detail card accompanies a single name and address or master card, the master card is held up at the second sensing station 113 and, subsequently, moves from this sensing station as the last-in-line associated detail card leaves the second sensing station 123. Of course, when a master card is held at the second sensing station 113, the preceding master card is held at the first sensing station 112; and the picker 116 is not operated by the clutch 376 and, therefore, will not pick a master card from the card hopper 111.

*Static Sensing Unit*

The static sensing units 150 for both the master and detail card readers 110 and 120 are identical. While the structural details of the static sensing units will be described in general, reference may be had to the patent to R. B. Johnson et al.; U.S. Patent No. 2,889,110; dated June 2, 1959; for Bill Feeding and Piercing Devices.

At each of the sensing stations 112, 113, 122 and 123, a static-type sensing device 150, as shown in FIG. 27, is provided. The static sensing device 150 is adapted to read IBM punched record cards having 12 rows and 80 columns, or 960 index positions, which may be perforated to represent data in coded form, as represented or shown in FIG. 20. Referring to FIGS. 25, 26 and 27, the static sensing unit 150 is reset during approximately the first 24° of a cycle and is then moved downwardly toward the card to sense the same and, subsequently, moved upward to read the data sensed. The data is then held in the sensing unit 150 for the remainder of the cycle until it is reset within the next cycle.

The static sensing unit 150, FIG. 27, is adapted to sense the 960 index positions of the record cards. Hence, there are 960 sensing wires 151 arranged in 80 columns with 12 wires to a column. Each of the 12 sensing wires in a column are maintained in a spaced relationship and embraced by friction holding members 152 fixed to a holding plate 153. The 80 holding plates 153 are spacedly mounted within a common carrier member 154 adapted for cyclic vertical reciprocating movement. By reciprocating the common carrier member 154 downwardly, or toward the record cards, the sensing wires 151 are brought into sensing position for analyzing the record cards supported upon a grooved base plate, as shown in FIGS. 27 and 28c.

The sensing wires 151, which encounter the card surface, will be forced upward relative to the holding plate 153, or in a direction opposite the movement of the carrier 154. The sensing wires 151, which encounter a perforation in the record cards, pass therethrough and will not be moved or displaced relative to the associated plate 153.

After the carrier 154 has brought the sensing wires 151 into position for a sensing operation relative to the record cards, the common carrier 154 is moved upwardly or in an opposite direction to its initial movement to bring the sensing wires 151 into a position, as shown in FIG. 28a, to permit a reading unit 155 to read the condition of the sensing wires 151 which, in effect, will be a determination of the information sensed by the wires 151.

The reading unit 155, FIG. 27, for analyzing the sensing wires 151 essentially consists of a rectangular element 156 of dielectric material having 12 spaced longitudinal grooves 157. The grooves 157 each have a stepped portion 158 and a recessed portion 159, best shown in FIGS. 28a, 28b and 28c. A conductive element 161 for each index position or for each sensing wire 151 is embedded, as by molding, into the rectangular element 156 so that one end of the conductive element 161, T-shaped in form, is exposed at and abuts the stepped portion 158 of the groove 157, and the opposite end either extends beyond the rectangular element 156, as for the 0 index positions, or is connected to a common conductor, in a manner for code conversion, each having a portion extending beyond the rectangular element 156.

The information in the record cards is in the form of perforations entered at the index positions according to the well-known IBM code, the character being represented as shown in FIG. 20; and this information is to be converted to binary form, the representation also shown in FIG. 20. To facilitate this code conversion, which will be described in detail later herein, the conductive elements 161, FIG. 27, in one column for each column, for index positions 12 and 11, are connected to a common conductor 162; while those for index positions 1 to 7, inclusive, are connected to another common conductor 163; and those for index positions 8 and 9 are connected to a common conducotr 164. The 0-position conductive element 161 is by itself and emerges from the rectangular element 156 as conductor 165.

With the sensing wires 151 moved to the position as shown in FIG. 28a, those sensing wires 151 which did not encounter a perforation in the record cards reside in the recessed portion 159 of the grooves 157; while those sensing wires 151 which engaged perforations in the record cards are at the level of the stepped portion 158. In order for the reading unit 155 to sense the condition of the sensing wires 151, the same are urged laterally by spaced longitudinal rods 166, one for each row of sensing wires, FIG. 27, fixed between spaced pull plates 167 and 168. The pull plates 167 and 168 are cyclically reciprocated horizontally by mechanism, not shown, in a timed relationship to the cyclic vertical reciprocation of the common carrier 154 for the holding plates 153.

Those sensing wires 151 which are in the recessed portion 159 of the grooves 157 will not be urged but cannot be moved to contact with the associated conductive elements 161; however, those sensing wires 151 at the stepped portion 158 of the grooves 157 may be moved into contact with the associated conductive elements 161.

In FIG. 28b, the sensing wires 151 are shown in the reset position. The setting of the sensing wires also will occur cyclically. Hence, in any one cycle, the sensing wires 151 are first reset, then brought into sensing position relative to the record card, and then moved to a position to facilitate a determination of the condition of the sensing wires 151 by the reading unit 155. With the sensing wires 151 in this position, they are urged laterally as the pull plates 167 and 168 are moved laterally to bring the rods 166 into engagement with the sensing wires 151, whereby, through continued movement, the same are urged in a lateral direction. Of course, only those sensing wires 151 which encounter perforations were not displaced relative to the holding plates 153 and, therefore, are in position to move laterally under action of the rods 166. The sensing wires 151, which are moved into contact with the associated conductive elements 161, remain in contact therewith for the remainder of the cycle. Contact between those laterally displaced sensing wires 151 and the associated conductive elements 161 starts to open or break at approximately 0° of one cycle and is broken at approximately 8° of that same cycle. Contact then remains broken as a new sensing operation takes place. The newly laterally displaced sensing wires start to make contact with the conductive elements 161 at approximately 66° of that same cycle and establish contact at approximately 72° of that same cycle. Contact then remains from approximately 72° until 360°. During the time that the information is held by the static sensing unit 150, the information is first scanned for a collating operation.

Clutch Unit

The clutches 376 and 377 of the master and detail card readers 110 and 120 are conventional one revolution dog-type clutches operably controlled by magnets M1 and M2, shown in FIG. 11. The clutch circuitry will be described in detail later herein. The clutches 376 and 377 are operated to control the picker knives 116 and 128 in a manner that the first cards removed from the card hoppers 111 and 121, respectively, will reach the second sensing stations 113 and 123 while the second cards removed from the card hoppers will simultaneously reach the first sensing stations 112 and 122, respectively.

ELECTRONIC CONTROL UNIT

Magnetic Drum

In this example, the magnetic drum 201, FIG. 4d, is a cylindrical member with a plated surface having excellent magnetic qualities. The drum 201 is mounted on bearings about a shaft and adapted to be driven at a speed of approximately 9400 r.p.m. Hence, the drum 201 makes a revolution in approximately 6.4 milliseconds. The drum 201 is longitudinally divided into areas designated as tracks which extend circumferentially about the surface of the drum. There are 15 drum tracks; the first three drum tracks are timing tracks while the remaining drum tracks are divided into groups where each group is associated with a particular data recording device of the card document preparation unit 1000 and the continuous forms print unit 1500.

The timing tracks T1, T2 and T3 have magnetic spots permanently recorded upon their surfaces. Drum track T1 has a single permanently recorded magnetized spot thereon for developing a "home" impulse. Drum track T2 is provided with 80 arcuately spaced permanently magnetized spots. These 80 spaced permanently recorded magnetized spots are related or referenced to the magnetized spot track T1. Signals developed by these magnetized spots are identified as C signals and are utilized to drive timing rings for developing column impulses. Drum track T3 contains 640 equally spaced permanently recorded magnetized spots. These permanently recorded magnetized spots are also referenced to the magnetized spot in drum track T1 and, consequently, are referenced to the magnetized spots in drum track T2. The signals developed by the magnetized spots in drum track T3 are identified as A signals and are utilized to drive another timing ring. The relationship of the permanently recorded magnetic spots in drum tracks T1, T2 and T3 is shown in FIG. 19.

Drum tracks T4 to T15, inclusive, each are divided into 80 character positions and each character position is divided into eight bits S, X, 0, 1, 2, 4, 8 and R. A showing of this arrangement is in FIG. 17. Drum tracks T4 and T5, FIG. 4d, are utilized to store information which will be subsequently transferred to the name and address print control mechanism 810, FIG. 4b, for controlling the print units 1210, FIGS. 3 and 29, for printing on the obverse face of the record card documents 10 passing through the card document preparation unit 1000.

Drum tracks T6 and T7, FIG. 4d, are utilized to store data which will be subsequently transferred to billing data print control mechanism 820, FIG. 4e, for controlling the print units 1220, FIGS. 3 and 29, for printing on the reverse face of the card documents 10 passing through the card document preparation unit 1000. Drum tracks T8, T9, T10 and T11, FIG. 4d, are utilized for storing the information which will be subsequently transferred to punch control or setup circuitry 900, FIGS. 4e and 4g, for controlling the punch mechanism 1300, FIGS. 3 and 29, for entering perforations into the card documents 10 passing through the card document preparation unit 1000.

Drum tracks T12 and T13, FIG. 4d, are utilized to store information which will be transferred to the print control mechanism 830, FIG. 4g, for controlling the print mechanism 1520, FIGS. 3 and 31c, of the continuous forms prints unit 1500. Drum track T14, FIG. 4d, is utilized to receive the information from the static sensing units 150 positioned at the sensing stations 113 and 123 of the master and detail card readers 110 and 120, FIG. 4c, which will be transferred directly to the accumulator 600, FIG. 4f; while drum track T15 stores information for accumulation purposes and is considered a buffer storage track for the accumulator 600.

Timing Control

In this example, timing control 250, FIG. 2, is obtained from permanently recorded magnetized spots upon the magnetic drum 201 and drum tracks T1, T2 and T3, FIG. 4d. The magnetic drum 201 is driven by suitable means, not shown, to rotate at approximately 9400 r.p.m. The basic frequency rate is 100 kc. The drum track T1 is provided with a permanently recorded magnetized spot. A magnetic read head 210, FIG. 4d, is disposed relative to track T1 of the magnetic drum 201 for sensing the permanently magnetized spot thereon. The signal developed by the magnetic read head 210 is transferred to an amplifier 211 having its output connected to an inverter 212, FIG. 4a, and to a cathode follower 213. The signal developed by a magnetic read head 210 is designated as the "home" impulse and functions to develop timing controls for the master and detail card readers 110 and 120 and for the accumulator 600.

The output of the inverter 212 is connected to the start terminal 214 of an 80-column continuously operating column ring 215, while the output of the cathode follower 213 is connected to a set side of a trigger 216 having its output associated with the reset side connected to the start terminal 217 of an 80-column intermittently operating column ring 218. The cathode follower 213, having its grid connected to receive the "home" impulse, may be rendered conductive only when its plate is connected to a positive supply and, therefore, will only have an output when its plate is connected through cam-operated scan contacts C1 through C5 to a plus voltage. Hence, while the 80-column continuously operating column ring 215 is started by means of the "home" impulse, the 80-column intermittently operating column ring 218 starts only upon the combination of the "home" impulse and upon closure of any of the cam-operated scan contacts C1 through C5.

The 80-column continuously operating column ring 215 is a conventional closed ring which runs through 80 positions and starts over, while the 80-column intermittently operating column ring 218 is a conventional 80-position open ring which runs through its 80 positions and then is restarted upon the combination of the "home" impulse and a signal developed by any of the cam-operated scan contacts C1 through C5. The function of the continuously operating column ring 215 is to permit or to provide column or digit impulses for the output devices of the card document preparation unit 1000 and of the continuous forms print unit 1500 and to keep the accumulator 600 in step. The function of the intermittently operating column ring 218 is to enable card reader scanning. While it would be possible to utilize a single 80-position column ring, the use of two separate column rings permits a more flexible operation.

The 80-column continuously operating column ring 215 and the 80-column intermittently operating column ring 218 are advanced by the C impulses as a read head 219, FIG. 4d, reads the permanently recorded bits or magnetized spots upon the surface of the drum track T2. The C signals are amplified by amplifier 220 having outputs connected to the input of an inverter 221, FIG. 4a, and to the input of a cathode follower 222. The output of the cathode follower 222 is connected to the ring advance terminals 223 and 224 of the 80-column continuously operating column ring 215 and of the 80-column intermittently operating column ring 218, respectively.

Further, the C signals are utilized to start a continuously operating bit ring 225, FIG. 4a. The output of the inverter 221 is connected to a start terminal 226 of the continuously operating bit ring 225 to start the same. The continuously operating bit ring 225 functions to provide bit time for code conversion and to permit the coded card reader information to be serialized. The continuously operating bit ring 225 is advanced by A signals which are developed through a read head 227, FIG. 4d, associated with drum track T3 and connected to the input of an amplifier 228 having its output connected to a ring advance terminal 229, FIG. 4a, of the continuously operating bit ring 225.

For accumulation purposes, a B impulse is developed by feeding the A impulses coming from the amplifier 228, FIG. 4d, to the input of a cathode follower 230, FIG. 4a, having its output connected to an inductor 231. The inductor 231 delays the A impulses to develop B impulses, which are of the same duration of the A impulses but delayed five microseconds. The A and B impulses, which are utilized for an accumulation operation, are both of five microseconds' duration and are delayed for five microseconds from each other. The A and B impulses, in effect, for accumulation purposes, divide each bit impulse, bits S through R, respectively, of ten microseconds' duration into A and B times. Since each bit impulse is of ten microseconds' duration, a character or column impulse is of 80 microseconds' duration. These relationships are compatible with the rotation of the magnetic drum 201 which makes one revolution in 6.4 milliseconds, there being 80 character spaces arranged around the periphery of the drum surface. Each character space covers eight bit spaces including the space bit S and the redundant bit R.

*Code Conversion From Static Sensing Units*

A translator or code converter 170 converts the information sensed by the static sensing units 150 in IBM code to binary code. The sensing wires 151 and the conductive elements 161, FIG. 27, associated therewith at the individual index positions corresponding to the index positions of the record cards, are represented as pairs of normally open contacts X and Y, the X contacts being the conductive elements 161 and the Y contacts being the sensing wires 151, as seen in FIGS. 6a, 6d, 6f and 6i. The Y contacts are commonly connected in rows through the facility of the rods 166 for rows 12, 11 and 0 through 9; while the X contacts or conductive elements 161 are connected in a pattern as indicated above for columns 1 through 80. The common conductors 162, 163, 164 and 165 are connected through back circuit eliminating diodes 171 to a conductor 172 connected to the output of a cathode follower 173, which acts as a column driver. The cathode followers 173 have their plates connected to a positive potential while their grids are selectively connected by conductors to scan plug hubs. There are four scan plug hubs for each of the scans 1 through 5, inclusive, to accommodate the four sensing units 150 at sensing stations 112, 113, 122 and 123. There are five plug hubs connected to each grid of the cathode followers or column drivers 173 to accommodate scans 1 through 5.

The X contacts are shown only for the first 16 columns; however, there are four additional groups of columns with 16 columns in each group, whereby all five groups constitute 80 columns. For code conversion purposes, the common connections afforded by the rods 166 lead to back circuit eliminating diodes 177 which, in turn, are connected to cathode followers 178, FIGS. 6b, 6e, 6g and 6j. The outputs of the cathode followers connect to logical OR circuits 180, 181, 182, 183, 184 and 185 of the code converter 170 for converting the digits 12 and 11 to binary X; digits 12 and 0 to binary 0; digits 1, 3, 5, 7 and 9 to binary 1; digits 2, 3, 6 and 7 to binary 2; digits 4, 5, 6 and 7 to binary 4; and digits 8 and 9 to binary 8. The outputs of the logical OR circuits 180, 181, 182, 183, 184 and 185 are connected as inputs to logical AND circuits 186, 187, 188, 189, 190 and 191, respectively, of a serializer 192 for serializing the binary coded data.

*Serializer*

A serializer 192 functions to serialize the binary coded data flowing from the code converter 170. Information flows from the code converter serial by digit but parallel by bit. However, information is to pass to the magnetic drum 201 serial by bit and serial by digit. Hence, the data must be serialized before passing to the magnetic drum 201. The serializer 192 consists of logical AND circuits 186, 187, 188, 189, 190 and 191 having their inputs connected to the outputs of logical OR circuits 180, 181, 182, 183, 184 and 185, respectively. The serializer 192 also includes a logical AND circuit 193 having inputs from a redundancy bit generator 194 and from the R bit line of the continuously operating bit ring 225. The X, 0, 1, 2, 4 and 8 bit lines of the continuously operating bit ring 225 are conencted as inputs to the logical AND circuits 186, 187, 188, 189, 190 and 191, respectively. The outputs of the logical AND circuits 186, 187, 188, 189, 190 and 191 are connected as inputs to cathode followers 195 having their outputs commonly connected by conductors 196b, 196e, 196g and 196j, which lead to the cam-operated contacts C6, C7, C8 and C9, respectively.

Because it is not desirable to have the redundant bit R present during the collating operation, the logical AND circuits 193 are connected to the positive potential supply through a cam-operated contact C35, which makes at approximately 123° and breaks at approximately 148° each cycle. Hence, the redundant bit R will be present on the information lines 196b, 196e, 196g and 196j except during scan 1.

*Redundancy Bit Generator*

Information flowing over lines 196b, 196e, 196g and 196j, FIGS. 4c, 6b, 6e, 6g and 6j, during scans 2 to 5, inclusive, is in binary form flowing serial by bit and serial by digit, where each digit may or may not include the redundant bit R generated by a redundancy bit generator 194, FIG. 6b, according to whether an even or odd bit check system is used. In this example, an even redundancy check system is used. Hence, all characters made up of an odd number of bits will include the redundancy bit R. The redundancy bit R is added, if appropriate, only for scans 2 and 5, inclusive.

The redundancy bit generator 194 includes a half adder 368 having inputs from the outputs of the logical OR circuits 180 and 181, a half adder 369 having inputs from the outputs of the logical OR circuits 184 and 185, and a half adder 370 having inputs from the outputs of the logical OR circuits 182 and 183. These half adders render an output for an odd number of inputs on the input lines. The outputs from half adders 368 and 369 are connected as inputs to a half adder 371. The output from half adder 371 and from half adder 370 are connected as inputs to a half adder 372. The output of the half adder 372 is the output of the redundancy bit generator 194 and is connected as an input to the logical AND circuit 193, which also has an R bit input from the continuously operating bit ring 225.

The function of the redundancy bit generator 194 will be understood by the following example. With reference to FIG. 20, it is seen that the character N is represented in the binary code by binary bits $X-1-4$. Hence, the X bit flows to the half adder 368, the 1 bit flows to the half adder 370 and the 4 bit flows to the half adder 369. Since half adders 368, 369 and 370 each have only one or an odd number of inputs present, there will be an output from each. Hence, the half adder 371 will have two or an even number of inputs and, therefore, will not have an output. Consequently, the half adder 372 will have only one or an odd number of inputs present and it will generate an output. This output will be an R bit flowing to the logical AND circuit 193. It is necessary to have an R bit present along with the other bits representing the character N because N is composed of an odd number of binary bits and an even number redundancy bit check system is being used.

*Collating Circuitry*

The collating circuitry 127, FIG. 2, consists of the master sequence checking circuitry 115, the detail sequence checking circuitry 125, and the cross-comparison checking circuitry 126, as shown in FIG. 3. The function of the collating circuitry is to perform a sequence check of both master and detail cards between the first and second sensing stations 112, 122 and 113, 123, respectively, of the master and detail card readers 110 and 120 and to perform a cross-comparison check between the master and detail cards 60 and 50 positioned at the second sensing stations 113 and 123 of the card readers 110 and 120. The collating circuitry 127, FIG. 2, controls the clutch circuitry 375, the scan circuitry 400, and the read-in switching circuitry 500 which, in turn, controls the readout swtiching circuitry 700.

The collating operation takes place during scan 1 when the scan relays R9, R11, R13 and R15 are de-energized and the cam-operated contacts C6, C7, C8 and C9 are closed. When the cam-operated contacts C6, C7, C8 and C9 are closed, FIGS. 4c, 6b, 6e, 6g and 6j, the information lines 196b, 196e, 196g and 196j become connected to the collating circuitry 127, FIGS. 4c, 6c and 6h.

The master card reader sequence checking circuitry 115, shown in FIG. 3, receives information over lines or conductors 301 and 302 which lead from the cam-operated contacts C6 and C7, FIGS. 6b, 6d, 6g and 6i. Hence, information comes into the master card reader sequence checking circuitry 115 from the sensing units 150 positioned at the first and second sensing stations 112 and 113 of the master card reader 110. The information flowing over conductors 301 and 302 is determined by the manner in which scan 1 is plugged. For collating purposes, regardless of what columns corresponding to the master cards are plugged, scan 1 is plugged low order first. Hence, the information will be flowing low order by bit and low order by digit in serial form over the lines 301 and 302 to the master card reader sequence checking circuitry 115. The information line 301 starting at cam-operated contact C6, FIG. 6b, crosses into FIG. 6g and then to the master sequence collating circuitry 115, located in FIG. 6h. The information line 302 starting at cam-operated contact C7, FIG. 6e, leads to the left into FIG. 6d and continues into FIG. 6c and then crosses down into FIG. 6h and continues on in FIG. 6h to the master sequence collating circuitry 115.

The master sequence collating circuitry 115, FIG. 6h, compares the information flowing over line 301 with that flowing over line 302. Line 301 leads to one input of a diode logical AND circuit 303 and to the input of an inverter 304, while line 302 leads to the input of an inverter 305 and to one input of a diode logical AND circuit 306. The outputs of the inverters 304 and 305 are connected as inputs to the logical AND circuits 306 and 303, respectively. By this arrangement, there will not be an output from either of the logical AND circuits 303 and 306 when the information on line 301 compares with that on line 302. The outputs of the logical AND circuits 303 and 306 are connected as inputs to a logical OR circuit 307 having its output connected to an inverter 308. The output of the inverter 308 is capacitively coupled by capacitor 309 to the set side of a trigger 310. The output of the trigger 310, associated with the set side, is connected as an input to an inverter 311 while the output of the trigger 310, associated with the reset side, is connected as an input to an inverter 312. The output of the inverter 311 is connected to the control grid of a thyratron 313, while the output of the inverter 312 is connected as an input to the control grid of a thyratron 314. The shield grids of the thyratrons 313 and 314 are conditioned by column 21 switching circuitry 315. In this example, the first 20 columns are plugged for scan 1 or for the collating operation. The account or serial number for each master and detail card will be punched in the first 20 columns. Hence, the column 21 switching circuitry 315 functions to condition the thyratrons 313 and 314 for firing at column 21 only and then places the thyratrons 313 and 314 in a nonconditioned state. The column 21 switching circuitry 315 consists of an inverter 316 having its output connected to the input of a cathode follower 317. The input of the inverter 316 is connected to a scan 1 plug hub for column 21, and the output of the cathode follower 317 is connected to the inputs of inverters 318 and 319 having their outputs connected to the shield grids of the thyratrons 313 and 314, respectively. The thyratrons 313 and 314 have relays R1 and R2 connected in their plate circuits, respectively. The relay R1 is the equal relay, while the relay R2 is the unequal relay.

The condition of the trigger 310, in effect, will determine which relay R1 or R2 will be energized at column 21 time. Of course, the condition of the trigger 310 is determined by whether or not the information on line 301 compares with that on line 302. The trigger 310 is reset at column 22 time by column 22 reset circuitry 320. The column 22 reset circuitry consists of an inverter 321 having its output connected to the input of a cathode follower 322. The inverter 321 has its input connected to a column 22 plug hub 175 which, in turn, is connected to cable 176 leading from the 80-column intermittently operating column ring 218. The output of the cathode follower 322 is connected to the reset side of the trigger 310. The trigger 310 is of the type which is switched by negative signals or negative-going impulses. Hence, the trigger 310 resets at column 22 time.

Figure 6J:
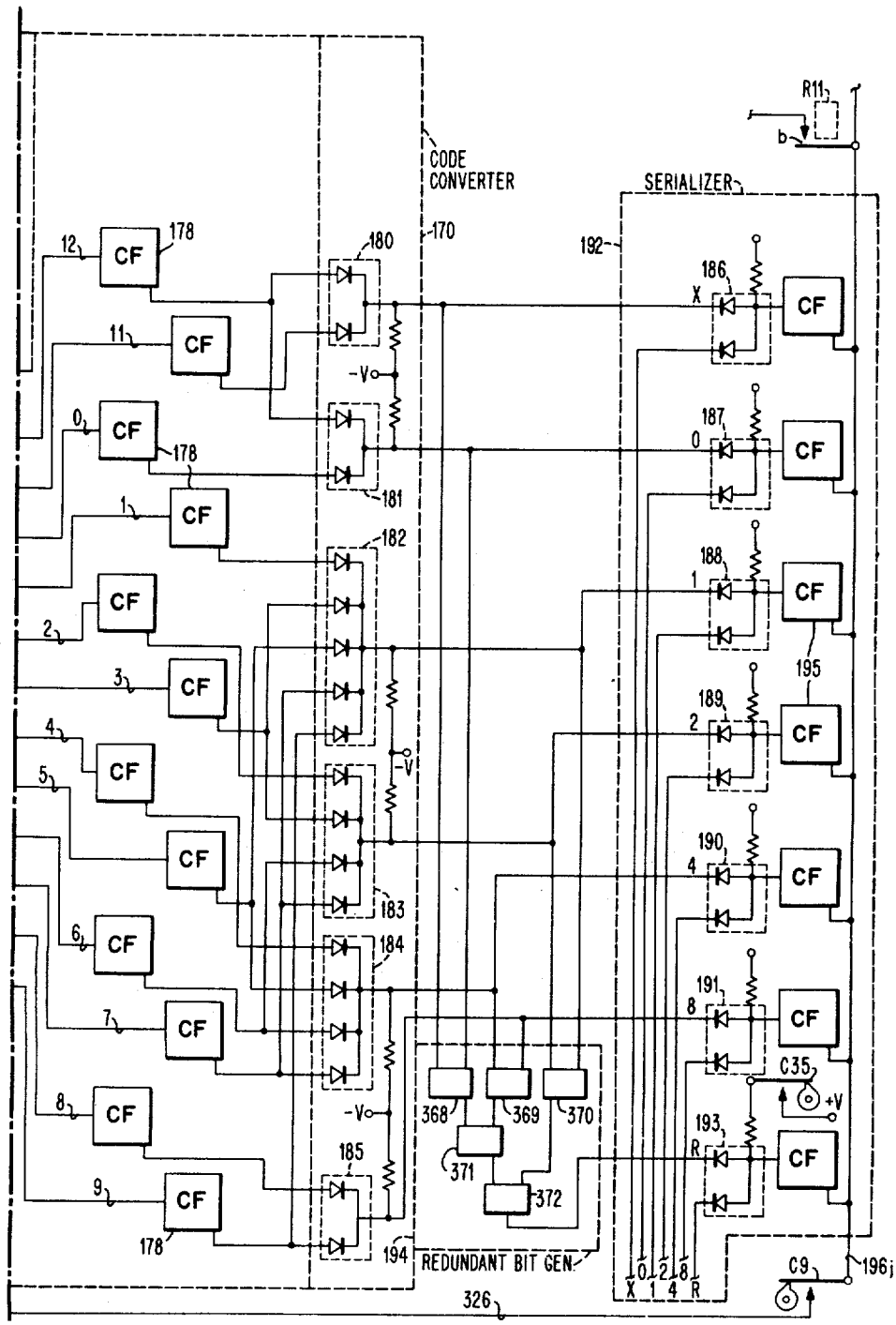

The detail card reader sequence checking circuitry 125, shown in FIG. 3, receives information over lines or conductors 325 and 326, FIGS. 6g and 6j, which lead from the cam-operated contacts C8 and C9. Hence, information comes into the detail card reader sequence checking circuitry 125 from the sensing units 150 positioned at the first and second sensing stations 122 and 123 of the detail card reader 120. The information flowing over conductors 325 and 326 is determined by the manner in which scan 1 is plugged. As previously indicated, scan 1 is plugged low order first. Hence, the information will be flowing low order by bit and low order by digit in serial form over the lines 325 and 326 to the detail card reader sequence checking circuitry 125. The information line 325, starting at the cam-operated contact C8, FIG. 6g, crosses into FIG. 6h and then to the detail card reader sequence checking circuitry 125, in FIG. 6h. The information line 326, leading from the cam-operated contact C9, FIG. 6j, leads into FIG. 6i and from FIG. 6i into FIG. 6h and to the detail sequence collating circuitry 125 in FIG. 6h. The detail sequence collating or checking circuitry 125, FIG. 6h, compares the information flowing over line 325 with that flowing over the line 326. Line 325 leads to the input of an inverter 327 and to one input of a diode logical AND circuit 328. The information line 326 leads to the input of an inverter 329 and to one input of a logical AND circuit 330. The outputs of the inverters 327 and 329 are connected as inputs to the logical AND circuits 328 and 330, respectively. The outputs of the logical AND circuits 328 and 330 are connected as inputs to a logical OR circuit 331 having its output connected to an inverter 332. The output of the inverter 332 is capacitively coupled by means of a capacitor 333 to the set side of a trigger 334. The output of the trigger 334, associated with the set side, is connected to the input of an inverter 335; while the output of the trigger 334, associated with the reset side, is connected to the input of an inverter 336. The output of the inverter 335 is connected to the control grid of a thyratron 337, while the output of the inverter 336 is connected to the control grid of a thyratron 338. The shield grids of the thyratrons 337 and 338 are also conditioned by the column 21 switching circuitry 315. The output of the cathode follower 317 is connected to the inputs of inverters 339 and 340. The outputs of the inverters 339 and 340 are connected to the shield grids of thyratrons 337 and 338, respectively. The thyratrons 337 and 338 have relays R3 and R4 connected in their plate circuits. The relay R3 is an equal relay, while the relay R4 is an unequal relay. If the information on line 325 compares with that on line 326, the thyratron 337 will fire at column 21 time, whereby the equal relay R3 becomes energized. However, if the information on line 325 does not equal that on line 326, the thyratron 328 will fire, whereby the unequal relay R4 becomes energized. The trigger 334 is reset at column 22 time by means of the column 22 reset circuitry 320.

The cross-comparison collating circuitry 126, shown in FIGS. 3 and 6c, functions to compare the master cards 60 while at the sensing station 113 of the master card reader 110 with the detail cards 50 positioned at the second sensing station 123 of the detail card reader 120. Information flows to the cross-comparison collating circuitry 125 over information lines 302 and 326. Information line 302, FIG. 6e, leads to the left across FIG. 6d and into FIG. 6c and becomes inputs of logical AND circuits 341 and 342 and also leads to the input of an inverter 343. The information line 326 continues from FIG. 6h upward into FIG. 6c to an input of the logical AND circuit 342, to an input of a logical AND circuit 344, and to the input of an inverter 345. The output of the inverter 345 is connected as an input to the logical AND circuit 341 and as an input to a logical AND circuit 346. The output of the inverter 343 is connected as an input to logical AND circuits 344 and 346. The output of the logical AND circuit 341 is connected to the input of an inverter 347; and the output of the logical AND circuit 342 is connected as an input to a logical OR circuit 348, while the output of the logical AND circuit 344 is connected as an input to an inverter 349. The output of the logical AND circuit 346 is connected as another input to the logical OR circuit 348.

The output of the inverter 347 is connected as an input to logical OR circuits 350 and 351 and to the set side of a trigger 352. The output of the inverter 349 is connected as an input to the logical OR circuit 350 and to a logical OR circuit 353 and as an input to the set side of a trigger 354. The output of the logical OR circuit 348 is connected as an input to an inverter 355 having its output connected to the set side of a trigger 356. The outputs of the logical OR circuits 350, 351 and 353 are connected to the reset sides of triggers 356, 354 and 352, respectively. The outputs of the triggers 352, 354 and 356, associated with the reset sides thereof, are connected to the inputs of inverters 357, 358 and 359, respectively. The outputs of the triggers 352 and 354, associated with the reset sides thereof, are also connected as inputs to cathode followers 360 and 361, respectively. The outputs of the cathode followers 360 and 361 are connected to inputs of logical AND circuits 342 and 346. The outputs of inverters 357, 358 and 359 are connected to the control grids of thyratrons 362, 363 and 364, respectively. The shield grids of the thyratrons 362, 363 and 364 are conditioned by the column 21 switching circuitry. The cathode follower 317 of the column 21 switching circuitry 315 has its output connected to the inputs of inverters 365, 366 and 367. The outputs of the inverters 365, 366 and 367 are connected to the shield grids of thyratrons 362, 363 and 364, respectively. The thyratrons 362, 363 and 364 have relays R7, R5 and R6 connected in their plate circuits, respectively. However, the relays R5, R6 and R7 are connected to the positive supply potential through a cam-operated contact C10. The relay R5 is for indicating high detail or low master cards; and the relay R6 is for indicating equal detail and master, whereas relay R7 indicates high master or low detail. By this arrangement, thyratron 362 fires and relay R7 becomes energized when the cam-operated contact C10 is closed and the master card at the sensing station 113 compares high to the detail card at the second sensing station 123. Similarly, the thyratron 363 fires and the relay R5 becomes energized when the cam-operated contact C10 is closed and the detail card at the second sensing station 123 compares high with the master card at the second sensing station 113. Further, the thyratron 364 fires and the relay R6 becomes energized when the cam-operated contact C10 closes and the master card at the second sensing station 113 compares equal to the detail card at the second sensing station 123. Of course, the thyratrons 362, 363 and 364 are permitted to fire only at column 21 time or at the time that the shield grids of these thyratrons are conditioned for firing.

During a collating operation, if the master card at the second sensing station 113 equals the detail card at the second sensing station 123 and the master card at the second sensing station 113 is not equal to the master card at the first sensing station and the detail card at the second sensing station 123 is not equal to the detail card at the first sensing station 122, of the master and detail card readers 110 and 120, all scans will be completed and, thereafter, the clutch circuitry will be called into play to run the feeds for the master and detail card readers 110 and 120 and for the card document preparation unit 1000. Further, the drum read-in switching or control circuitry 500 will be called into play for setting up new drum tracks to receive the information for a new card group.

If, during a collating operation, the master card and detail card at the second sensing stations 113 and 123 of the master and detail card readers 110 and 120 are equal and the master cards at the first and second sensing stations 112 and 113 of hte master card reader 110 and the detail cards at the first and second sensing stations 122 and 123 of the detail card reader 120 are equal, only scans 1 and 2 will be completed and the clutch circuitry 375 will be called into operation to advance the cards.

Scan 1, of course, is completed to permit the collating operation while scan 2 is completed to transfer information to the accumulator 600 via the magnetic drum 201. When the master card at the second sensing station 123 compares equal to the master card at the first sensing station 113, it means that the two cards are related, as in the instance where the detail cards at the first and second sensing stations 122 and 123 compare equal; and, when the detail cards do compare equal, the information will be sent to the accumulator 600.

If the master and detail cards at the second sensing stations 113 and 123 of the master and detail card readers 110 and 120, respectively, compare equal and the master cards at the first and second sensing stations 112 and 113 of the master card reader 110 compare equal and the detail cards at the first and second sensing stations 122 of the detail card reader do not compare equal, then scans 1 and 2 are completed and the master card reader clutch circuitry is called into play to advance the cards.

If, during the collating operation, the master and detail cards at the second sensing stations 113 and 123 of the master and detail card readers 110 and 120 compare equal and the master cards at the first and second sensing stations 112 and 113 of the master card reader 110 do not compare equal but the detail cards at the first and second sensing stations 122 and 123 of the detail card reader 120 compare equal, then scans 1 and 2 are performed and the clutch circuitry 375 is called into play for the detail card reader 120 only to advance the detail cards.

If, during a collating operation, the master card at the second sensing station 113 does not equal the detail card 50 at the second sensing station 123 of the master and detail card readers 110 and 120, respectively, scan 1, of course, is completed for the collating operation but no further scans take place; and the card reader clutch circuitry 375, which compares low, this could be either the master or detail card reader, is called into play to advance another card; and circuitry for offsetting the advanced card comes into operation so that the same may be segregated from the other cards within the card stacker.

Clutch Circuity

CLUTCH CIRCUITRY FOR THE CARD READERS

The clutches 376 and 377, FIGS. 25 and 26, for the master and detail card readers 110 and 120 are conventional one revolution clutches. The clutches 376 and 377 are controlled by clutch magnets M1 and M2, FIG. 11, the clutch magnet M1 being for the master card reader 110 while the clutch magnet M2 is for the detail card reader 120. The clutch circuitry 375, FIG. 2, for advancing the master and detail cards according to the results of the collating circuitry 127 is shown in detail in FIG. 11. The clutch magnet M1 is connected between ground potential and the positive potential supply through a normally open contact R1a of the relay R1, the equal master sequence relay, and a normally open contact R6a of relay R6, the equal master-detail cross-comparison relay, which connects to a cam-operated contact C28, making at 116.4° of a cycle and breaking at approximately 198° of the same cycle for every machine cycle. The master clutch magnet M1 may also be energized through normally open contacts R4a of relay R4, the unequal detail sequence relay, and R2a of relay R2, the unequal master sequence relay, which are connected in series with the normally open contact R6a of relay R6. Further, the master clutch magnet M1 may be energized through a normally open contact R5a of the relay R5, the high detail cross-comparison relay, connected in series with the cam-operated contact C28. The relays R2 and R4, of course, are the unequal relays for the master and detail sequence checking circuitry 115 and 125; and the relay R5 is the high detail relay of the master and detail cross-comparison circuitry 126. Hence, in order for the master clutch magnet M1 to be energized, both relays R1 and R6 must be energized or relays R4, R2 and R6 must be energized or relay R5 must be energized and, in each instance, the cam-operated contact C28 must be closed.

The detail clutch magnet M2 is connected between ground potential and the positive potential supply through a normally open contact R3a of the relay R3, the equal detail sequence checking relay, and the normally open contact R6a of relay R6 which, of course, is connected to the cam-operated contact C28. The detail clutch magnet M2 may also be energized through normally open contacts R4b and R2b which are connected in series with the normally open contact R6a. Further, the detail clutch magnet M2 may also be energized through a normally open contact R7b of relay R7, the high master cross-comparison relay, connected in series with the cam-operated contact C28. Hence, in order for the detail clutch magnet M2 to become energized, the relay R3 must be energized together with the relay R6 or relays R2, R4 and R6 must be simultaneously energized or the relay R7 must be energized and the cam-operated contact C28 must be closed in each instance.

When the master card at the second sensing station 113 does not compare equal with the detail card at the second sensing station 123 of the master and detail card readers 110 and 120, respectively, the low reader feed clutch is engaged and circuitry is called into play to offset the fed card. To accomplish this offsetting of the cards in the stackers, magnets M4 and M5 are utilized. Magnet M4 is for offsetting master cards 60 in the card stacker 114 and is connected between ground potential and the positive potential supply through a normally open contact R5b of relay R5, the high detail relay of the master-detail cross-comparison circuitry 126, which is connected to the cam-operated contact C28. The magnet M5 is for offsetting detail cards 50 in the card stacker 124 and is connected between ground potential and the plus potential supply through a normally open contact R7b of relay R7, the high master relay of the master-detail cross-comparison circuitry 126, which is also connected to the cam-operated contact C28.

CLUTCH CIRCUITRY FOR THE CARD DOCUMENT PREPARATION UNIT

The card feeding mechanism for the card document preparation unit 1000 is controlled by a conventional one revolution clutch. A clutch magnet M3 controls the clutch for the card document preparation unit 1000. However, before discussing the connections for the card document preparation unit clutch magnet M3, reference should be made to FIG. 30a, which shows a flow of card documents 10 through the card document preparation unit 1000. It is seen that, in FIG. 30a, solenoid-controlled gates 1106 and 1107 are positioned at the sensing stations 1104 and 1105. The gate 1106 is controlled by a solenoid S1 which is connected to be energized, FIG. 11, through a normally open contact R36a of a latch pick relay R36 connected in series with a cam-operated contact C31, which is connected to the positive potential supply. The gate 1107 is operated by a solenoid S2 which is connected to become energized through a normally open contact R37a of a latch pick relay R37 connected to a cam-operated contact C32 which, in turn, is connected to the positive potential supply. The latch pick relays R36 and R37 are connected in parallel to the positive supply through parallelly connected normally closed contacts R2c, R4c and R6c which, in turn, are connected to a cam-operated contact C33. The cam-operated contact C33 closes at approximately 210° of one cycle and remains closed until 192° of the following cycle. The latch pick relays R36 and R37, once energized, remain energized unless dropout coils R36D and R37D for the relays R36 and R37 become energized. The dropout coils R36D and R37D are connected between ground potential and the positive potential supply through cam-operated contacts C29 and C30, respectively. The cam-operated contact C29 makes at approximately 186° of a cycle and breaks at approximately 204° of the same cycle, while the cam-operated contact C30 closes at approximately 78° of a cycle and remains closed until approximately 102° of the same cycle. The clutch magnet M3 for the card document preparation unit 1000 is connected to ground potential and to a normally closed contact R36b of relay R36 which, in turn, is connected to a cam-operated contact C34. The cam-operated contact C34 closes at approximately 51° of a cycle and remains closed until approximately 138° of the same cycle. The cam-operated contact C34 is connected to a manually operated switch MS and to a normally open contact ITa of an interlock relay IT. The manual switch MS and the normally open contact ITa are connected in parallel to a cam-operated contact C31. The cam-operated contact C31 closes at approximately 330° of a cycle and remains closed until approximately 186° of the following cycle. The manual switch MS facilitates operation when the interlock relay IT is de-energized. It is thus seen that the card document preparation unit clutch magnet M3 is principally under control of the cam-operated contact C34 and the normally open contact R36b of the relay R36, the relay R36 being under control of the cam-operated contact C29.

*Scan Circuitry*

The scan relays R9, R11, R13 and R15 for operating the scan relay contacts, shown in FIG. 4c and FIG. 6h, are shown in FIG. 8. The scan relays R9, R11, R13 and R15 are connected to operate sequentially and provision is made whereby the scan relays cannot operate out of sequence. Of course, the scan relays R9, R11, R13 and R15 will not start a sequence of operation unless permitted to do so by the collating circuitry 127. Because of the numerous contacts required for each scan, it is not feasible to utilize a single relay for each scan. In this example, the scan relays are plural positioned relays. Each scan is provided with seven relays. Each relay is provided with 12 positions. Hence, there are a total of 84 positions for each scan. Eighty positions of the relays are utilized for connecting the scan plug hubs, FIG. 6h, to the plug hubs 175 for receiving connections from the cable 176 leading from the intermittently operating column ring 218. Further, another two positions are utilized to provide connections between, for all practical purposes, the sensing units 150 at the second sensing stations 113 and 123 and the read-in switching circuitry 500, as shown in FIG. 2. The remaining two positions remain as spare positions.

Referring again to FIG. 8, the scan 2 relays R9 are connected in the plate circuit of a thyratron 410 and to the positive supply potential through cam-operated contacts C11, which makes and breaks at approximately 114.4° and 174.8° of a cycle, respectively. A latch pick relay R8 is also connected in the plate circuit of a thyratron 410. The function of the latch pick relay R8 is to condition the circuitry for energizing the scan 3 relays R11 and to prevent re-energization of the scan 2 relays after the same have once become de-energized. For energizing the scan 2 relays R9, the 80th position or column of the intermittently operating column ring 218 is connected to a normally open contact R6c of the relay R6, the equal cross-comparison relay. The normally open contact R6c is connected to the transfer spring associated with the normally open and closed contacts R8a of the latch pick relay R8. The normally closed contact R8a is connected to the inputs of inverters 411 and 412. The output of the inverter 411 is connected as an input to a cathode follower 413 having its output connected to a logical OR circuit 414. The logical OR circuit 414, as will be seen shortly, passes signals for resetting the trigger 216, shown in FIG. 4a. The trigger 216 controls the starting of the intermittently operating column ring 218. The intermittently operating column ring 218 starts for scan 2 upon the simultaneous closure of the cam-operated contact C2 and a "home" impulse applied to the grid of the cathode follower 213, FIG. 4a, to cause the same to conduct and thereby cause the trigger 216 to be set. The setting of the trigger 216 causes the starting of the 80-column intermittently operating column ring 218. The cam-operating contact C2 makes and breaks at approximately 134.4° and 158.4° of a cycle, respectively. Referring again to FIG. 8, in the circuitry for energizing the scan 2 relays R9, the output of the inverter 412 is connected to the set side of a trigger 415. The output of the trigger 415, associated with the reset side thereof, is connected as an input to an inverter 416 having its output connected to the control grid of the thyratron 410. It is seen by this arrangement that scan 2 relays will not become energized unless the equal cross-comparison relay R6 is energized. The trigger 415, in effect, stores the signal for energizing the thyratron 410 so that the same will fire when the cam-operated contact C11 becomes closed. Further, it is seen that the impulse coming from the 80th position of the intermittently operated column ring 218 will reset the trigger 216 so that, upon the simultaneous occurrence of the "home" impulse and the closure of the cam-operated contact C3, the trigger 216 will be set so that the intermittently operating column ring 218 will start for another operation. The cam-operated contact C3 makes and breaks at approximately 190.8° and 214.8° of a cycle, respectively. For resetting the trigger 216, the output of the OR circuit 414 is connected to the input of a single-shot multivibrator 417 having its output connected to an inverter 418. The output of the inverter 418 is connected to the reset terminal of the trigger 216.

The latch pick relay R8 remains energized until the dropout coil R8D becomes energized. Of course, the latch pick relay R8 becomes energized as the thyratron 410 fires through the closure of the cam-operated contact C11. With the latch pick relay R8 energized, the normally open contact R8a closes. The normally open contact R8a is connected to a normally open contact R2d of relay R2, the unequal master sequence relay. The normally open contact R2d of the relay R2 is connected to a normally open contact R4d of the relay R4, the unequal detail sequence relay. The normally open contact R4d of relay R4 is connected to a normally open contact R6d of relay R6, the equal cross-comparison relay. The normally open contact R6d of the relay R6 is connected to the transfer spring associated with the normally open and closed contacts R10a of a relay R10. The relay R10 is a latch pick relay connected to become energized when the scan 3 relays R11 become energized. The latch pick relay R10 functions in a manner similar to the latch pick relay R8; that is, it facilitates the energization of the scan 4 relays and, after the same become de-energized, it prevents re-energization of the scan 4 relays within a cycle of operation.

The normally closed contact R10a is connected to the inputs of inverters 420 and 421; the output of the inverter 420 is connected as an input to a cathode follower 422 having its output connected to the reset side of the trigger 415 and to an input of a logical OR circuit 414. In this manner, during scan 3, trigger 415 will be reset and an impulse will be provided at the proper time for resetting the trigger 216. The output of the inverter 421 is connected as an input to the set side of a trigger 423. The output of the trigger 423, associated with the reset side thereof, is connected as an input to an inverter 424 having its output connected to the control grid of a thyratron 425. The thyratron 425 has the scan 3 relays R11 and the latch pick relay R10 connected in its plate circuit and in series with the cam-operated contact C12, which is connected to the positive supply potential. The cam-operated contact C12 closes at approximately 170.8° of a cycle and remains closed until approximately 231.2° of the same cycle. By the arrangement just described, it is seen that the scan 3 relays may become energized only after the scan 2 relays have become energized, because the latch pick relay R8 must first become energized, and only if the relays R2, R4 and R8 become energized. While the scan 3 relays drop out when the cam-operated contact C12 opens, the latch pick relay R10 remains energized until the dropout coil R10D becomes energized.

The normally open contact R10a is connected to the transfer spring associated with normally open and closed contacts R12a of the latch pick relay R12. The latch pick relay R12 is connected to become energized when the scan 4 relays R13 become energized. The normally closed contact R12a is connected to the input of inverters 426 and 427, respectively. The output of the inverter 426 is connected to the input of the cathode follower 428 having its output connected to the reset side of the trigger 423 and to the input of the logical OR circuit 414. By this arrangement, at scan 4 time, the trigger 424 is reset, as well as the trigger 216. Scan 4 starts upon the simultaneous action of a "home" impulse and the closure of the cam-operated contact C4. The cam-operated contact C4 closes at approximately 247.2° and opens at approximately 271.2° of the same cycle. The output of the inverter 427 is conected to the set side of a trigger 429 having its output, associated with the reset side thereof, connected to the input of an inverter 430. The output of the inverter 430 is connected to the control grid of a thyratron 431 having the scan 4 relays R13 and the latch pick relay R12 connected in its plate circuit in series with the cam-operated contact C13 which, in turn, is connected to the plus potential supply. The cam-operated contact C13 closes at approximately 227.2° of a cycle and remains closed until approximately 287.6° of the same cycle. It is seen that the scan 4 relays R13 may become energized only upon energization of the scan 3 relays because the latch pick relay R10 must first be energized.

The normally open contact R12a, which closes upon energization of the relay R12, is connected to the transfer spring associated with the normaly open and closed contacts R14a of the latch pick relay R14. The latch pick relay R14 is connected to become energized together with the scan 5 relays R15 and, once energized, remains energized until the dropout coil R14D becomes energized. The normally closed contact R14a of the relay R14 is connected to the inputs of inverters 432 and 433, respectively. The output of the inverter 432 is conected to the input of a cathode follower 434 having its output connected to the reset side of the trigger 429 and to an input of the logical OR circuit 414. It is by this arrangement that triggers 429 and 216 are reset.

Scan 5 starts when the cam-operated contact C5 is closed and a "home" impulse is developed. The cam-operated contact C5 closes at approximately 303.6° of a cycle and opens at approximately 327.6° of the same cycle. The output of the inverter 433 is connected as an input to the set side of the trigger 435. The output of the trigger 435, associated with the reset side thereof, is connected as an input to an inverter 436 having its output connected to the control grid of a thyratron 437. The thyratron 437 has the scan 5 relays R15 and a latch pick relay R14 connected in its plate circuit in series with the cam-operated contact C14 which, in turn, is connected to the plus potential supply. The cam-operated contact C14 closes at approximately 283.6° of a cycle and remains closed until approximately 343.6° of the same cycle. The normally open contact R14a, which closes upon energization of the latch pick relay R14, is connected to the input of an inverter 438. The output of the inverter 438 is connected to the input of a cathode follower 439 having its output connected to the reset side of the trigger 435 and to the input of the logical OR circuit 414. Again, it is by this arrangement, that the trigger 429 and the trigger 216 are reset.

The latch pick relays R8, R10, R12 and R14 remain energized to permit the completion of scans 2 to 5, inclusive. The dropout coils R8D, R10D, R12D and R14D for dropping out the latch pick relays R8, R10, R12 and R14, respectively, are connected to become energized through a cam-operated contact C15. The cam-operated contact C15 closes at approximately 340° of one cycle and remains closed until approximately 360° of the same cycle. In order to reset the trigger 216 to permit restarting of the intermittently operating column ring 218 in the event that scans 2 to 5, inclusive, do not occur, a connection from the cam-operated contact C15 leads to the input of an inverter 440 having its output connected to the logical OR circuit 414.

While the scan relay contacts for scan relays R9, R11, R13 and R15 function to selectively connect the scan plug hubs to the plug hubs 175, which are connected to the cable 176 leading from the intermittently operating column ring 218, FIG. 6h, they also function to connect the information lines 196e and 196j, FIG. 4c, to the drum read-in control circuitry 500. In order to connect the information lines 196e and 196j, FIG. 4c, to the drum read-in control circuitry 500, normally open scan 2 relay R9 contacts R9a and R9b are connected to the inputs of a logical OR circuit 441, FIG. 4d. The information line 196e is connected to the normally open contact R9a, while the information line 196j is connected to the normally open contact R9b. Similarly, for scan 3, the information line 196e is connected to a normally open contact R11a, while the information line 196j is connected to a normally open contact R11b. The normally open contact R11a, of scan 3 relays R11, is connected to the normally open contacts R16a, R17a, R18a and R19a of drum read-in relays R16, R17, R18 and R19, respectively. The normally open contact R11b of the scan 3 relay R11 is connected to the input of a logical OR circuit 442. The output of the logical OR circuit 442 is connected to normally open contacts R16b, R17b, R18b and R19b of the drum read-in relays R16, R17, R18 and R19, respectively. The information line 196e is also connected to a normally open contact R13a of the scan 4 relay R13, while the information line 196j is connected to a normally open contact R13b of the scan 4 relay R13. The normally open contact R13a of the relay R13 is connected to the input of a logical OR circuit 443. Further, the normally open contact R13b of scan 4 relay R13 is also connected as an input to the logical OR circuit 443. The output of the logical OR circuit 443, FIG. 4d, is connected to normally open contacts R16c, R17c, R18c and R19c of the drum read-in relays R16, R17, R18 and R19, respectively. The information line 196e is connected to a normally open contact R15a of the scan 5 relay R15, while the information line 196j is connected to a normally open contact R15b of the scan 5 relay R15. The normally open contacts R15a and R15b are connected as inputs to a logical OR circuit 444. The output of the logical OR circuit 444 is connected to normally open contacts R16d, R17d, R18d and R19d of the drum read-in relays R16, R17, R18 and R19, respectively.

Scan contacts of the scan relays enable information to be read out from the sensing units 150 five different times, and the information read out each time may be read out in any manner desired. Further, each time information is read out, it will be directed by the scan contacts of the scan relays over selected or predetermined circuit paths to the drum 201.

*Drum Read-In Control Circuitry*

The drum read-in control circuitry functions in a manner that the information derived from the name and address or master cards and data or detail cards forming the card group remains distinct. Hence, information of one card group will be recorded upon one drum track of the magnetic drum 201 and that of another card group will be recorded upon another track. Since a card group may consist of one or more data cards associated with a single name and address or master card, any one of the drum read-in relays may be energized for one or more machine cycles. However, only one drum read-in relay will be energized at any one time. In connection with the description of the scan circuitry, it was seen that each drum read-in relay has four normally open contacts associated therewith. Hence, when one of the drum read-in relays; for example, relay R16, becomes energized, the normally open contacts R16a, R16b, R16c and R16d close. However, circuits to these closed normally open contacts R16a, R16b, R16c and R16d will be completed according to the scan relay contacts of scan relays R9, R11, R13 and R15. By this arrangement, the drum read-in relays R16, R17, R18 and R19 determine which drum tracks will receive the information gated by the scan relays R9, R11, R13 and R15. The drum read-in relays R16, R17, R18 and R19, shown in FIG. 4d, are a part of the read-in switching circuitry 500, FIG. 2, and are connected to become energized through the facility of the circuitry shown in FIG. 9.

The drum read-in relay R16 is connected to be energized under control of a run-in switch RIS connected between the +45 volt supply and connected in series with parallelly connected normally closed card reader contacts CC1 and CC2, respectively. The drum read-in relay R16 is held energized through a latch coil R16L connected in series with a normally open contact R16e of the relay R16 which, in turn, is connected in series with a cam-operated contact C17, the same being connected to the +45 volt supply. The cam-operated contact C17 closes at approximately 96° of a cycle and remains closed until approximately 126° of the same cycle. A dropout coil R16D for the latch coil R16L is connected to ground through a cam-operated contact C18, making at approximately 354° of one cycle and breaking at approximately 12° of the following cycle, and a back circuit diode D1 and to the +45 volt supply through a normally open contact R20a of a cycle relay R20, connected in series with a cam-operated contact C21 which, in turn, is connected to the +45 volt supply. The cam-operated contact C21 closes at approximately 354° of one cycle and opens at approximately 108° of the following cycle. The cycle relay R20 functions to permit energization of the subsequent or drum read-in relay R17. The cycle relay R20 is connected to be energized through a normally open contact R16f connected in series with normally open contacts R2e, R4e and R6e of the relays R2, R4 and R6, respectively; the same being the unequal master sequence relay, the unequal detail sequence relay, and the equal cross-comparison relay, respectively. The cycle relay R20 is held through its normally open contact R20a, which is connected in series with a cam-operated contact C21.

The drum read-in relay R17 is connected to be energized through a normally open contact R20c connected in series with a cam-operated contact C20 which, in turn, is connected to the +45 volt supply. The cam-operated contact C20 closes at approximately 74° of a cycle and remains closed until approximately 108° of the same cycle. The drum read-in relay R17 is held through a latch coil R17L connected to be energized through a normally open contact R17e, connected in series with the cam-operated contact C17. The dropout coil R17D for the relay R17 is connected to ground through a back circuit eliminating diode D2 connected in series with a cam-operated contact C18 and to the +45 volt supply through a normally open contact R21a of a cycle relay R21 which, in turn, is connected to the cam-operated contact C21. The cycle relay R21 functions to permit energization of the drum read-in relay R18. The cycle relay R21 is connected to be energized through a normally open contact R17f of the drum read-in relay R17. The cycle relay R21 remains energized through its normally open contact R21a, which is connected to the cam-operated contact C21.

The drum read-in relay R18 is connected to be energized through a normally open contact R21b of the cycle relay R21, connected in series with the cam-operated contact C20. The drum read-in relay R18 is held by means of a latch coil R18L connected to be energized through a normally open contact R18e, connected in series with the cam-operated contact C17. The relay R18 is dropped out by means of a dropout coil R18D connected to ground through back circuit eliminating diode D3, connected in series with the cam-operated contact C18 and connected to the +45 volt supply through the normally open contact R22a of cycle relay R22. The cycle relay R22 functions to permit energization of the drum read-in relay R19. The cycle relay R22 is connected to become energized through a normally open contact R18f of the drum read-in relay R18. The cycle relay R22 is held through its normally open contact R22a, which is connected in series with the cam-operated contact C21. The drum read-in relay R19 is connected to be energized through a normally open contact R22b of the cycle relay R22 which, in turn, is connected in series with the cam-operated contact C20.

The drum read-in relay R19 is held energized through a latch coil R19L connected to be energized through a normally open contact R19e, connected in series with the cam-operated contact C17. The relay R19 is dropped out by means of a dropout coil R19D connected to ground through a back circuit eliminating diode D4, connected in series with a cam-operated contact C18 and to the +45 volt supply through a normally open contact R23a of the cycle relay R23 which, in turn, is connected to the cam-operated contact C21. The cycle relay R23 functions to permit energization of the drum read-in relay R16 after the run-in switch RIS has been closed and is subsequently permitted to open, because the normally closed card reader contacts CC1 and CC2 are opened as the master and detail cards pass through the card readers 110 and 120. The cycle relay R23 is connected to become energized through a normally open contact R19f connected in series with the series-connected normally open contacts R2e, R4e and R6e of the relays R2, R4 and R6 which, in turn, are connected in series with the cam-operated contact C19. The cycle relay R23 is held through its normally open contact R23a connected in series with the cam operated contact C21. The read-in relay R16 is also connected to become energized through a normally open contact R23b of the cycle relay R23 which, in turn, is connected to the cam-operated contact C20.

From the circuitry just described, it is seen that the drum read-in relays R16, R17, R18 and R19 become energized through the facility of the cycle relays R20, R21, R22 and R23. The cycle relays R20, R21, R22 and R23 become energized under control of the collating relays R2, R4 and R6. It is by this arrangement that the read-in switching circuitry 500 functions in a manner that the information derived from the name and address or master cards 60 and the detail cards 50 forming the card groups remains distinct. Hence, information of one card group will be recorded upon one drum track and that of another card group will be recorded on another track; and, of course, the recording takes place during the scans 2 through 5. Since a card group may consist of one or more data or detail cards associated with one or more master cards, any one of the drum read-in relays R16, R17, R18 and R19 may be energized for one or more machine cycles. It is seen, in FIG. 4d, that the normally open contacts R16a and R18a are commonly connected to the input of an amplifier 511 having its output connected to a magnetic write head 512 disposed to record data in the form of magnetized spots upon drum track T4. The normally open contacts R17a and R19a of the drum read-in relays R17 and R19 are commonly connected to the input of an amplifier 513 having its output connected to a magnetic write head 514 disposed to record data in the form of magnetized spots upon drum track T5. The logical OR circuit 441, having inputs from the normally open contacts R9a and R9b of the scan 2 relays R9, has its output connected to the input of an amplifier 515 whose output is connected to a magnetic write head 516 disposed to record data in the form of magnetized spots upon drum track T14. The normally opened contacts R16b and R18b of the drum read-in relays R16 and R18 are commonly connected to the input of an amplifier 517 having its output connected to a magnetic write head 518 disposed to record data in the form of magnetized spots upon drum track T6. The normally open contacts R17b and R19b of the drum read-in relays R17 and R19 are commonly connected to the input of an amplifier 519 having its output connected to a magnetic write head 520 disposed to record data in the form of magnetized spots upon drum track T7. The normally open contacts R16c, R18c, R17c and R19c of drum read-in relays R16, R18, R17 and R19 are connected to the inputs of amplifiers 521, 522, 523 and 524, respectively. The outputs of the amplifiers 521, 522, 523 and 524 are connected to magnetic write heads 525, 526, 527 and 528 disposed to record data in the form of magnetized spots upon drum tracks T8, T9, T10 and T11, respectively. The normally open contacts R16*d* and R18*d* are commonly connected to the input of an amplifier 529, FIG. 4*f*, having its output connected to a magnetic write head 530, FIG. 4*d*, disposed to record data in the form of magnetized spots upon the drum track T12. The normally open contacts R17*d* and R19*d* are commonly connected to the input of an amplifier 531 having its output connected to a magnetic write head 532 disposed to record data in the form of magnetized spots upon drum track T13.

From the above, it is seen that the drum read-in control circuitry 500 is under control of the collating circuitry 127. Further, it is seen that the drum read-in switching circuitry 500 functions so that the information of one card group will be recorded upon one drum track associated with a particular data recording device and that of another card group will be recorded upon another drum track associated with the same particular data recording device.

*Accumulator*

The accumulator 600, shown in FIGS. 2 and 4*f*, is part of the electronic control unit 200. The requirements of the accumulator 600 are dependent upon the type of instrument to be prepared by the card document preparation unit 1000. In this example, for preparation of the utility bill, it is only necessary for the accumulator to add and subtract. The detail cards will furnish net amounts. However, if net amounts were to be computed, this would impose upon the accumulator 600 the requirements of being able to perform the mathematical computation of multiplication and, in some instances, the mathematical computation of division.

Data derived by the static sensing units 150 is transferred during scan 2 via the logical OR circuit 441, FIG. 4*d*, and the amplifier 550 to the magnetic write head 516 which records the data in the form of magnetized spots upon drum track T14. A magnetic read head 610 is disposed relative to the track T14 to read the data recorded thereon in the form of magnetized spots in coded form. The magnetic read head 610 is connected to the input of an amplifier 611 having its output connected to a logical OR circuit 612, FIG. 4*f*. The output of the logical OR circuit 612 is connected to true and complement circuitry 613. The true and complement circuitry 613 functions to pass data either in true or complement form and is controlled by sign control circuitry 614. The sign control circuitry 614 controls the true and complement circuitry 613 in the manner that information passed thereto from drum track T14 passes in true form to a serial-binary adder 615, if accompanied by a plus sign, whereas, if accompanied by a minus sign, the information is complemented on the way to the serial-binary adder 615. Information flows from the serial-binary adder to the sign control circuitry 614, to a serial-to-parallel converter 616, and to a decimal carry circuit 617. The serial-binary adder 615 essentially consists of two binary serial full adders and a shifting register for a decimal carry recognition, not shown. The first binary adder develops sum and carry outputs on two different lines. Since the sum of two binary numbers in the code utilized in this example may be greater than 10, but less than 16, the sum line must feed the shifting register which stores the sum for a sufficient period of time; i.e., one digit time to determine whether a decimal carry impulse must be generated. If the sum is greater than 10, a corrective "6" is added to it in the second binary adder, whose sum output then enters the serial-to-parallel converter 616. Simultaneously, a carry impulse is generated at 1 bit time of the next digit; and this is the decimal carry to the next higher order. The carry impulse from the high order digit field is ignored insofar as arithmetic operations are concerned. However, the carry impulse is used to set the sign of a field in a trigger, not shown.

The serial-to-parallel converter 616 is of conventional form and functions to permit the entry of data into a core register 618 in parallel form. It will be recalled that information is normally flowing serial by bit and serial by digit. The output of the serial-to-parallel converter 616 is connected to a logical OR circuit 619 having its output connected to the core register 618. The core register 618 is a 3-dimensional array of ferrite cores and the readout therefrom is destructive. Accordingly, regeneration takes place through the adder 615 whereby, if the other adder input lines are held off, the same number returns to storage as was read out. Information, or data, flowing from the core register 618 does not enter the serial-binary adder 615 through the true and complement circuitry 613. Information flowing from the core register 618 accompanied by a plus sign indicates that the information is in true form, whereas that accompanied by a minus sign is an indication that the information is in complement form.

The output of the core register 618 is connected to a parallel-to-serial converter 620 and to a logical AND circuit 621. The output of the logical AND circuit 621 is connected as an input to the logical OR circuit 619. The logical AND circuit 621 also has an input for receiving a signal indicating that information from the core register 618 should be read out to appropriate tracks of the magnetic drum from which the information will be subsequently transferred to the print setup mechanisms 810, 820 and 830 and to the punch setup mechanisms 910 and 920. The output of the parallel-to-serial converter 620 is connected to logical AND circuits 622 and 623 and to the input of the logical OR circuit 624. The logical AND circuit 622 also has an input for receiving a signal indicating that the information flowing from the parallel-to-serial converter 620 is to be transferred to the drum track T15. Accordingly, the output of the logical AND circuit 622 is connected to the input of an amplifier 625 having its output connected to a magnetic write head 626 disposed relative to drum track T15 for recording the data thereon in the form of magnetized spots. A magnetic read head 627 is disposed relative to the drum track T15 so as to read data recorded thereon. The magnetic read head 627 is connected to the input of an amplifier 628 having its output connected to the logical OR circuit 612. The output of the logical AND circuit 623 is connected to the serial-binary adder 615. When information is to be passed from the core register 618 to the serial-binary adder 615, an add signal is developed and is transmitted as an input to the logical AND circuit 623.

The output of the logical OR circuit 624 is connected as inputs to logical AND circuits 629, 630 and 631. The output of the logical AND circuit 629 is connected as an input to the logical OR circuit 444 which functions to pass information, during scan 5, through the drum read-in switching circuitry 500 to drum tracks T12 or T13. The logical AND circuit 629 also has an input for receiving a signal indicating that information from the core register 618 should pass to the drum tracks T12 or T13. The output of the logical AND circuit 630 is connected as an input to the logical OR circuit 443 which passes information during scan 4 via the drum read-in switching circuitry 500 to drum tracks T8 or T9 or T10 or T11. The logical AND circuit 630 also has an input for receiving a signal indicating that the information in the core register 618 should be read out to the punch tracks T8 or T9 or T10 or T11. The output of the logical AND circuit 631 is connected as an input to the logical OR circuit 442 for passing information during scan 3 via the drum read-in switching circuitry 500 to drum tracks T6 or T7. The logical AND circuit 631 also has an input for receiving a signal indicating that the information in the core register 618 is to be read out to the print tracks T6 or T7.

The core register 618 is a 3-dimensional core matrix of eight words; each word is a plane matrix of 16 cores, four bits by four digits. Total storage then equals 32 numerical digits divided into eight words of four digits each. These words may be combined to develop eight or 12-digit fields. Triggers, not shown, are utilized to store the sign of each field in order that it may be available at either high or low order digit time. This method simplifies the testing for negative balance. A plus sign is associated with the numeric zero. The use of the core register 618 for storage in the accumulator 600 permits arithmetic operations with the information presented serial by digit, low order first. When data is read out from the core register 618 into the logical AND circuits 629, 630 and 631, the information flows in reverse order; i.e., high order digit first, to facilitate zero print or punch suppression. Further, during readout of data from the core register 618 to the logical AND circuits 629, 630 and 631, zeros are inserted in all blank digits. Readout is controlled by plugboard wiring of synchronization impulses coming from the timing track T1 on the magnetic drum 201. The "home" impulse from timing track T1 is utilized to develop special timing pulses within the accumulator 600. Accumulator timing control is indicated by the block 632 in FIG. 4f. Accumulator timing control 632 essentially controls readout from the core register 618 and also controls a character insertion unit 633. The character insertion unit 633 is adapted to provide special characters in the appropriate places in the information flowing from the core register 618. When information is to be read out from the core register 618 to the logical AND circuits 629, 630 and 631 and special characters are to be inserted in this information, the accumulator timing control 632 interrupts the readout of the information from the core register 618 to permit the insertion of characters from the character insertion unit 633. The output of the character insertion unit 633 is connected to the logical OR circuit 624 which also has an input for receiving the information from the core register 618.

Accumulator timing control 632 essentially consists of a program ring and a special digit ring, not shown. The program ring steps along for each drum revolution. The program ring is the 7-point ring and, by the use of logical AND and OR circuits, not shown, nine program steps are developed. Steps 1, 6, 7, 8 and 9 are a full drum revolution; while steps 2, 3, 4 and 5 are a one-half drum revolution. Since a drum revolution is 6.4 milliseconds, the nine program steps occupy or take 44.8 milliseconds. The program ring is an open end ring and is started once each cycle with a "home" impulse coming from the drum track T1. The ring outputs are combined by logical AND and OR circuits, not shown, as desired with other gates to produce the program steps. By restricting the initiation of the internal program steps at "home" pulse time, the maximum delay will be one revolution after the beginning of process time before accumulator operations start.

The special digit ring, not shown, is a 5-point open end ring which provides digit impulses utilized for read-in and readout of the core register 618. It is started with the same plugged digit impulses that start all field gates. The fifth position of the ring is necessary to accommodate read-in to the core register 618 after one digit of delay is picked up during the time the information flows through the serial-binary adder 615. The special digit ring also facilitates the readout to the logical AND circuit 629, 630 and 631 during which time the digit sequence of a field must be reversed over that for normal operation of read-in and readout from the core register 618. This latter readout requires high order digit first whereas, in normal operation, information is flowing low order digit first. This special digit ring also facilitates character insertion which permits the insertion of characters, such as commas or periods, between digits of an accumulator field. When character insertion is required, a one digit delay is established between successive digits. This delay is accomplished by holding the special digit ring at one position for more than one digit time. Further, since the machine operator plugwires the field start impulses, it is possible to allow as many digits of time between the fields as there are spaces inserted for special characters. The total permissible number of spaces inserted during any one readout from the core register is the difference between the number of character pulses per drum revolution and the number of digits stored in the register. The principal restriction on flexibility imposed by this method is that readout of any one field must be completed before readout of another field is started.

During an accumulating operation, in step 1 thereof, card fields are added to fields contained in the core register 618. During step 2, selective fields of the core register are transferred to the drum track T15; while, during step 3, the fields from drum track T15 and from the core register 618 are added. For step 4, destructive readout from the core register 618 to drum track T15 takes place. For step 5, the core register 618 receives the true information from the drum track T15. Steps 6, 7 and 8 are utilized to read out data from the core register 618 to the logical AND circuits 629, 630 and 631, respectively. Specifically, during step 6, data is read out from the core register 618 to the logical AND circuit 631. The information is also regenerated during step 6 so that, during step 7, information will be read out from the core register 618 to the logical AND circuit 630. The information is also regenerated during step 7 to permit the readout of information from the core register 618 during step 8 to the logical AND circuit 629.

There is no regeneration of the information during step 8. In step 9, the core register 618 is emptied and, by means of plugwiring, selective fields may be re-entered into core register storage 618. These fields are contained on a drum track T15. Steps 4 and 5 are necessary in order to change the negative numbers in the core register 618 from complement to true form for readout to the logical AND circuits 629, 630 and 631. At step 4 time, destructive readout from the core register occurs and the information is transferred to the drum track T15. During step 5 time, the information is taken from the drum track T15 to the true and complement circuitry 613, through the adder 615 and back to the core register 618 in true form.

As indicated earlier herein, each drum track stores 80 digits of information, one digit for each card column. Those columns assigned to accumulator readout would not be plugged during read-in to the drum tracks for scans 3, 4 and 5. Hence, there are adequate spaces on the drum tracks to permit the insertion of data coming from the accumulator 600.

From the foregoing description, it is seen that information from the accumulator 600 will be transferred via the logical AND circuits 629, 630 and 631 and the logical OR circuits 444, 443 and 442 and the drum read-in switching circuitry 500 to the drum 201 so as to be associated with information relating to the same card group. Complete details of the accumulator, such as details of the program and digit rings, are not given because the accumulator really may be one of a type well known in the art or one which could easily be modified by those skilled in the art to meet the requirements stated above.

Drum Readout Control Circuitry

The drum readout switching circuitry 700, FIGS. 2a, 4a, 4d and 10, under control of the drum read-in switching circuitry 500, functions to permit the simultaneous read-in and readout of data from the magnetic drum 201. With reference to FIG. 4d, it is seen that magnetic read heads 710 to 719, inclusive, for reading data recorded on drum tracks T5 to T13, inclusive, in the form of magnetized spots, are connected to the inputs of amplifiers 720 to 729, inclusive, respectively. The output of the amplifier 720 is connected to normally open contacts R24a and R26a of drum readout print relays R24 and R26, respectively. The amplifier 721 has its output connected to normally open contacts R25a and R27a of drum readout print relays R25 and R27, respectively, FIG.

4a. The normally open contacts R24a and R26a of relays R24 and R26, FIG. 4d, and the normally open contacts R25a and R27a of relays R25 and R27, FIG. 4a, are connected to a conductor or information line 730, which leads to the right and into FIG. 4b, to furnish data to the print setup or control mechanism 810, which controls the print mechanism 1210 for printing the name and address upon the obverse face of the card documents 10.

The output of the amplifier 722 is connected to normally open contacts R24b and R26b of relays R24 and R26, respectively, while the output of the amplifier 723 is connected to normally open contacts R25b and R27b of relays R25 and R27, respectively. The normally open contacts R24b, R25b, R26b and R27b of relays R24, R25, R26 and R27 are connected to a common conductor or information line 731, FIG. 4a, which leads to the right into FIG. 4b and then downward into FIG. 4e to the print setup or control mechanism 820 for controlling the print mechanism 1220 which prints billing data upon the reverse face of the card documents 10. The outputs of the amplifiers 724, 725, 726 and 727 are connected to normally open contacts R28a, R29a, R30a and R31a of drum readout even punch relays R28, R29, R30 and R31, respectively. The normally open contacts R28a, R29a, R30a and R31a are connected to a common conductor or information line 732, which leads downward into FIG. 4d and then to the right into FIG. 4e and then downward into FIG. 4g and to an even punch translator 930.

The amplifiers 724, 725, 726 and 727 also have their outputs connected to normally open contacts R32a, R33a, R34a and R35a of drum readout odd punch relays R32, R33, R34 and R35, respectively. The normally open contacts R32a, R33a, R34a and R35a are connected to a common conductor or information line 733, which leads from FIG. 4a downward into FIG. 4d and to the right into FIG. 4e and in FIG. 4e to an odd punch translator 960. The output of the amplifier 728 is connected to normally open contacts R24c and R26c of the drum readout print relays R24 and R26, respectively. The output of the amplifier 729 is connected to normally open contacts R25c and R27c of the drum readout print relays R25 and R27, respectively. The normally open contacts R24c, R25c, R26c and R27c are commonly connected to a conductor or information line 734, which leads to the right from FIG. 4d into FIG. 4e and downward in FIG. 4e to the continuous forms print setup or control mechanism 830, in FIG. 4g, for controlling the print mechanism 1520 for printing upon the continuous forms 1510.

The circuitry for controlling the energization of the drum readout relays is shown in FIG. 10. The drum readout print relays R24, R25, R26 and R27 are of the latch type and are connected to be energized through normally open contacts R21c, R22c, R23c and R20c connected in parallel with each other and in series with a cam-operated contact C22 which, in turn, is connected to the plus potential supply. The cam-operated contact C22 closes at approximately 9° of one cycle and opens at approximately 36° of the same cycle. The drum readout print relays R24, R25, R26 and R27 are dropped out through the facility of dropout coils R24D, R25D, R26D and R27D, respectively. The dropout coils R24D, R25D, R26D and R27D are connected in parallel with each other and in series with a cam-operated contact C23. The cam-operated contact C23 closes at approximately 273° of a cycle and opens at approximately 294° of the same cycle. It is thus seen that the drum readout print relays R24, R25, R26 and R27 are under the control of the drum read-in cycle relays R21, R22, R23 and R20, respectively. Further, the drum readout print relays R24, R25, R26 and R27 are utilized to cycle the energization of the drum readout even punch relays R28, R29, R30 and R31.

The drum readout even punch relays R28, R29, R30 and R31 are the latch type and are connected to be energized through parallelly connected normally open contacts R24d, R25d, R26d and R27d of relays R24, R25, R26 and R27 which, in turn, are connected in series with a cam-operated contact C24. The cam-operated contact C24 closes at approximately 156° of a cycle and remains closed until approximately 180° of the same cycle. The drum readout even punch relays R28, R29, R30 and R31 remain energized until dropout coils R28D, R29D, R30D and R31D are energized. The dropout coils R28D, R29D, R30D and R31D are connected in parallel with each other and in series with a cam-operated contact C25, which closes at approximately 60° of a cycle and opens at approximately 84° of the same cycle. Hence, the drum readout even punch relays become energized upon the drum readout print relays R24, R25, R26 and R27 being energized and the simultaneous closure of the cam-operated contact C24 and remain energized until the dropout coils R28D, R29D, R30D and R31D become energized upon closure of the cam-operated contact C25. Further, the drum readout even punch relays R28, R29, R30 and R31 function to cycle the drum readout odd punch relays R32, R33, R34 and R35, respectively.

The drum readout odd punch relays R32, R33, R34 and R35 are connected in parallel with parallelly connected normally open contacts R28b, R29b, R30b and R31b which are connected in series with the cam-operated contact C26. The cam-operated contact C26 closes at approximately 162° of a cycle and opens at approximately 186° of the same cycle. The drum readout odd punch relays R32, R33, R34 and R35 are the latch type and remain energized until dropped out through the facility of the dropout coils R32D, R33D, R34D and R35D, respectively. The dropout coils R32D, R33D, R34D and R35D are connected in parallel with each other and in series with a cam-operated contact C27. The cam-operated contact C27 closes at approximately 78° of one cycle and opens at approximately 102° of the same cycle. Hence, the drum readout odd punch relays become energized upon the drum readout even punch relays R28, R29, R30 and R31 being energized and the simultaneous closure of the cam-operated contact C26 and remain energized until the dropout coils R32D, R33D, R34D and R35D become energized upon closure of the cam-operated contact C27.

*Print Setup Controls*

The print setup circuitry 800 consists of print setup mechanisms 810, 820 and 830 for the print mechanisms 120, 1220 and 1520, respectively. The print control mechanisms 810, 820 and 830 are substantially identical, the main difference being the number of print thyratrons to a bank of thyratrons and the number of banks of print thyratrons. Also, the zero suppression circuitry for each of the print control mechanisms 810, 820 and 830 is substantially identical. Hence, a typical print control mechanism for a typical print unit will be described. The typical print control mechanism is shown in FIG. 12. Information is presented to the typical print control mechanism via the information line 850. Information line 850 leads to inputs of logical AND circuits 851 and to the input of the logical AND circuit 852. The logical AND circuits 851 are associated with the typical print thyratrons, while the logical AND circuit 852 is associated with the zero suppression circuitry.

There are seven logical AND circuits 851 associated with seven thyratrons 853 for the bit positions X, 0, 1, 2, 4, 8 and R. The thyratrons 853 have print magnets 854 connected in their plate circuits. Because information on the information line 850 is flowing serial by bit and serial by digit, the thyratrons 853 are permitted to fire under control of a cam-operated contact C36, which makes at approximately 30° of one cycle and breaks at approximately 93° of the same cycle. With the thyratrons 853 fired, the magnets 854 will not become energized but are permitted to become energized when the cam-operated contact C37 closes. The cam-operated contact C37 makes at approximately 81° of a cycle and breaks at approximately 102° of the same cycle. Of course, in order for the thyratrons 853 to fire, impulses must be applied to both the control grid and the shield grid thereof. The outputs of the logical AND circuits 851 are connected to the control grids of the thyratrons 853. The shield grids of the thyratrons are connected to receive bit impulses corresponding to the bit position of the thyratrons; i.e., the X-position thyratron 853 receives an X bit upon its shield grid, while the 0-position thyratron 853 receives a 0 bit upon its shield grid, and so forth. The logical AND circuits 851 are selectively conditioned to pass the information coming over the information line 850. The selective conditioning of the logical AND circuits 851 is accomplished through subcycle relay circuitry, shown in FIG. 14.

Printing takes place on a subcycle basis under control of subcycle relays, shown in FIG. 14. Since printing is accomplished in three subcycles while the fourth subcycle is utilized to return the print mechanism to a "home" position, there are three groups of subcycle relays. These groups include relays R38, R39 and R40, respectively. The relays R38 are connected to be energized under control of a cam-operated contact C38, while the groups of relays R39 and R40 are connected to be energized under control of cam-operated contact C39. The cam-operated contacts C38 and C39 have two make and break periods. The cam-operated contact C38 makes at 18° and breaks at 81° and remakes at 108° and breaks again at 171° of a cycle. The cam-operated contact C39 makes for the first time at approximately 108° and breaks at 171°, which coincides with the second make and break periods for the cam-operated contact C38, and again makes at 198° and breaks for the second time at 271° of a cycle.

The logical AND circuits 851 are conditioned to pass information coming over the information line 850 by signals coming from the continuously operating column ring 215. Plug hubs 855 are selectively plugged to the outputs of the 80-column continuously operating column ring 215. The plug hubs 855 are connectable to the input of the logical AND circuit 851 in groups of three. Hence, each logical AND circuit 851 may be conditioned three different times by three different plug hubs according to the manner in which the subcycle relays R38, R39 and R40 are energized. For instance, the first plug hub of a group of three plug hubs is connected to a normally closed contact R39a of relay R39, while the normally open contact R39a is connected to the second plug hub in the group. The third plug hub in the group is connected to a normally open contact R40a. The normally closed contact R39a is connected by means of the transfer spring associated with the normally open and closed contacts R39a to a normally open contact R38a of the subcycle relay R38. The normally open contact R40a is connected to a normally closed contact R38a of relay R38. The transfer spring associated with the normally open and closed contacts R38a is connected to the input of the logical AND circuit 851.

Information will be passed by the logical AND circuits 851 for the first time or during the first subcycle when relays R38 become energized as the cam-operated contact C38 closes for the first time at 18°. The logical AND circuits 851 will transfer information coming over line 850 for the second time for the second subcycle printing when both relays R38 and R39 simultaneously become energized at 108° upon closure of the cam-operated contacts C38 and C39. Although the relays R40 will also become energized at this time, there will not be a complete circuit to the logical AND circuits 851. The logical AND circuits 851 will be conditioned for the third time to pass information coming over the information line 850 to permit the subcycle 3 printing to take place when the relays R40 are energized upon closure of the cam-operated contact C39 at 198° of a cycle. Again, although relays R39 also become energized at this time, a circuit path will not be completed to the logical AND circuits 851, as a result of the relays R39 becoming energized. Hence, the control grids of the thyratrons 853 will be conditioned to permit the thyratrons 853 to be fired at three different time intervals, where each interval lasts for approximately 63° of a cycle. During these time intervals, the bit impulses X, 0, 1, 2, 4, 8 and R will be flowing to the corresponding thyratrons for bit positions X, 0, 1, 2, 4, 8 and R. Hence, if there is information on the information line 850 containing corresponding bits, the thyratrons 853 will become energized upon closure of the cam-operated contact C36.

While the subcycle lasts for approximately 30 milliseconds, print time occurs while within the 70 milliseconds during which the card documents 10 are arrested at the print station 1200, because the code rods are set to form a new character while the previously formed character is being printed. Printing occurs at 105°, 195° and 285° while the card documents 10 are in the print station 1200 from 90° until 291°.

The zero print suppression circuitry for the typical print setup or control mechanism, shown in FIG. 12, includes a logical OR circuit 856 having inputs from the continuously operating bit ring 225 of X, 1, 2, 4 and 8 and an input for receiving an end-of-field signal. The output of the logical OR circuit 856 is connected as an input to the logical AND circuit 852, which also has an input from the information line 850. The output of the logical AND circuit 852 is connected to an inverter 857 having its output capacitively coupled to the set side of a trigger 858. The output of the trigger 858, associated with the reset side thereof, is connected to a logical AND circuit 859 also having an input from the 0 position of the continuously operating bit ring 225. The output of the logical AND circuit 859 is connected to the control grids of the thyratrons 853 for the 0 positions. Hence, the 0 bit will pass to the control grids of the thyratrons 853 for the 0 positions only if the logical AND circuit 859 is conditioned to pass the 0 bits. Whether or not the logical AND circuit 859 is conditioned to pass the 0 bits is dependent upon the condition or state of the trigger 858. The reset side of the trigger 858 is capacitively coupled to the output of the single-shot multivibrator 860 having an input from a differentiating circuit 861. The differentiating circuit 861 receives its input from the output of a logical OR circuit 862. The inputs of the logical OR circuit 862 are connected to field start plug hubs 863. The logical OR circuit 856 will pass the bits X, 1, 2, 4 and 8 and the end-of-field signal if the end-of-field hub is plugged. Hence, the logical AND circuit 852 will be conditioned, during the times that the signals are passed by the logical OR circuit 856, to pass any corresponding data coming over the information line 850. If information is passed, the inverter 857 is caused to conduct, whereby a negative signal will be transferred to the set side of the trigger 858; the trigger 858 is of the type which will be transferred by a negative signal. Hence, the output, associated with the reset side of the trigger, will be switched to become positive. With the trigger 858 in this condition, the logical AND circuit 859 is conditioned to pass the 0 bit impulse. By this arrangement, if a zero were the only bit present on the information line 850, the logical AND circuit 852 would not be conditioned to cause conduction of the inverter 857 and, consequently, the transfer of the trigger 858. Hence, the logical AND circuit 859 would not be conditioned to pass the 0 bit. When the 0 bit has been preceded in the immediate field by bits of the digit other than zero, or, if the end-of-the-field is plugged, the trigger 858 will be transferred and the 0 bit for the particular digit will be passed by the logical AND circuit 859. Once the trigger 858 is transferred to condition the logical AND circuit 859, the same will remain conditioned until the trigger 858 is reset. The trigger 858 is reset by field start impulses plugged to the field start plug hubs 863. The field start signal will be transferred by the logical OR circuit 862 to the differentiating circuit 861 which will effect a signal from the single-shot multivibrator 860 to reset the trigger 858. Hence, the trigger 858 will be reset between fields if desired.

By the arrangement just described, printing will take place on a subcycle basis. The columns or line positions in which printing takes place depends upon how the plug hubs 855 are plugged to the continuously operating column ring 215. During the first subcycle, reference to FIGS. 31*a*, 31*b* and 31*c*, it is seen that columns 1, 4, etc., would be printed; while, during the second subcycle, columns 2, 5, etc., would be printed, whereas, during the third subcycle, columns 3, 6, etc., would be printed so as to complete the total line of printing.

*Punch Setup Controls*

The even and odd punch setup control mechanisms 910 and 920 for the punch units 1310 and 1320 of the card document preparation unit 1000 are shown in FIG. 13. A maximum of 80 characters may be represented by perforations in the card documents 10. Accordingly, punch control mechanism 910 for the even punch unit, located at the first punching station 1310, consists of a bank of 80 thyratrons 911. The shield grids of the thyratrons 911 are commonly connected to the information line leading from the even punch translator 930, while the control grids are connected to plug hubs which are connected by plugwiring to the column positions of the 80-column continuously operating column ring 215.

The thyratrons 911 have the punch magnets 1370 connected in their plate circuits. The firing of the thyratrons 911 is under the control of a cam-operated contact C40, which makes for every 25°; for instance, starting at 184°, it remains made until 209° and then breaks for every 15°. Hence, it would break at 209° and remain broken until 224°, at which time it would again make and remain made until 249°, etc. Although the thyratrons 911 are energized or fired under control of the cam-operated contact C40, the even punch magnets 1370 are energized under control of the cam-operated contact C41. The cam-operated contact C41 does not make until 20° after the cam-operated contact C40 makes. Hence, this 20° difference, or 6.67 milliseconds, permits a complete drum revolution whereby the 80-column continuously operating column ring 215 will run through all its positions before the punch magnets 1370 become energized. The cam-operated contact C41 makes, for instance, at 204° and remains made for 16°, or until 220°, and then breaks for 24°, or until 244°, when again it makes and remains made for 16° and then breaks for 24° before being made again, etc.

Information flows to the odd punch control mechanism 920 from the odd punch translator 960 to a bank of 80 thyratrons 921 having the odd punch magnets 1395 connected in their plate circuits. The control grids of the thyratrons 921 are connected by plugwiring to the positions of the 80-column continuously operating column ring 215, while the shield grids are commonly connected to the odd punch translator 960. The firing of the thyratrons 921 is controlled by cam-operated contact C42, while energization of the odd punch magnets 1395 is under the control of cam-operated contact C43. The cam-operated contact C42 makes, for instance, a 204° of a cycle and remains made for 25°, or until 229° of that cycle, and then breaks until 244°, or remains broken for 15°, and then remakes to remain made for another 25°, or until 269°, and so on. The cam-operated contact C43 makes 20° after each make of the cam-operated contact C42; or, in other words, the cam-operated contact C43 makes at 224° and remains in the make condition for 16°, or until 240°, and then breaks for 24°, or until 264°, at which time it makes again and remains made until 280°, and so on. Hence, the thyratrons 921 will be conditioned for firing through the cam-operated contact C42 for six different time intervals to permit the odd punching for rows 11, 1, 3, 5, 7 and 9; while the cam-operated contact C43 will condition the magnets 1395 for energization for the periods of time to permit the punching of the rows just mentioned.

*Translator for Punch Setup Controls*

The information line 732, FIG. 4*a*, leads downward into FIG. 4*d* and from FIG. 4*d* to the right into FIG. 4*e* and downward in FIG. 4*e* to the even punch translator 930 in FIG. 4*g*. The output of the translator 930, which functions to translate the information from binary code to IBM code, is connected to a bank of punch thyratrons 911. The translator 930 is connected to receive the even digits from a digit emitter 931 and to receive the bit impulses X, 0, 1, 2, 4, 8 and R, respectively. The details of the even translator 930 are shown in FIG. 15. The translator 930 consists of the decoder portion 932, a gating portion 933 for gating the data coming over the information line 732, a compare portion 934 for comparing the decoded information with the gated information, and a compare gate portion 935.

The decoder portion 932 is adapted to receive the even digits from the digit emitter 931. The digit 12 terminal of the digit emitter 931 is connected to the input of the logical AND circuit 936 and to the input of the logical OR circuit 937. The logical AND circuit 936 also has a bit input from the X position of the continuously operating bit ring 225. The logical OR circuit 937 also has an input connected to the digit 0 terminal of the digit emitter 931. The output of the logical OR circuit 937 is connected to the input of the logical AND circuit 938 having also an input from the 0 position of the bit ring 225. The digit 2 terminal of the digit emitter 931 is connected as an input to a logical OR circuit 939 also having an input from the digit 6 terminal of the digit emitter 931. The output of the logical OR circuit 939 is connected to an input of a logical AND circuit 940 also having an input from the 2 position of the bit ring 225. A logical OR circuit 941 has an input from the digit 4 terminal of the digit emitter 931 and an input from the digit 6 terminal of the digit emitter 931. The output of the logical OR circuit 941 is connected as an input to a logical AND circuit 942 also having an input from the 4 position of the bit ring 225. A logical AND circuit 943 has an input from the digit 8 position of the digit emitter 931 and also has an input from the 8 position of the bit ring 225. The logical AND circuits 936, 938, 940, 942 and 943 are commonly connected by conductor 944 which leads to the compare portion 934.

However, before describing the compare portion 934, the portion for gating the data passing over the information line 732 will be described. The portion 933 for gating the data passing over the information line 732 consists of logical AND circuits 946 and 947 having inputs from the information line 732. The logical AND circuit 946 also receives an input from the output of a logical OR circuit 948 having inputs from the X and 0 positions of the bit ring 225. The logical AND circuit 946 also has an input from a conductor commonly connecting digit terminals 12, 11 and 0 of a digit emitter 949. The logical AND circuit 947 has an input from a logical OR circuit 950 which has inputs from the 1, 2, 4 and 8 positions of the bit ring 225. The logical AND circuit 947 also has an input from a conductor commonly connecting the digit terminals 1 through 9 of the digit emitter 949. The outputs of the logical AND circuits 946 and 947 are commonly connected by a conductor 951 which leads to the compare portion 934. The conductor 944 is connected to the input of an inverter 952 and to the input of a logical AND circuit 953, while the conductor 951 is connected to the input of an inverter 954 and to the input of a logical AND circuit 955. The output of the inverter 952 is connected as an input to the logical AND circuit 955, and the output of the inverter 954 is connected as an input to the logical AND circuit 953. The outputs of the logical AND circuits 953 and 955 are commonly connected to the set side of a trigger 956 of the compare gate portion 935. The reset side of the trigger is connected to the S position of the bit ring 225. The output of the trigger 956, associated with the set side thereof, is connected to the input of the logical AND circuit 957 also having an input from the R bit position of the bit ring 225. The trigger 956, when in the reset condition, conditions the logical AND circuit 957 to pass the R bit coming from the bit ring 225. However, when the trigger 956 is in the set condiiton, the logical AND circuit 957 will not be conditioned to pass the R bit. The R bit may be considered as a punch gate which, if passed by the logical AND circuit 957, will condition the thyratrons 911 for firing. The output of the logical AND circuit 957 is connected as an input to a cathode follower 958. The output of the cathode follower 958 is connected to the shield grids of the thyratrons 911.

The principles of operation and function of the translator 930 will be readily understood with reference to FIGS. 17 and 18. In FIG. 17, it is seen that the drum track character positions are shown together with the bit positions for each character position, and it will be recalled that there are 80 character positions around the drum track and that each character position is made up of eight bit positions. For instance, the character position 70 includes the bits X and 0. Since this is an even number of bits, the redundancy bit R is not present. For a punching operation at the even punch station 1310, all of the character positions C–0 through C–79, or 80 character positions, will be looked at six different times, or, in other words, for the row 12 position, the row 0 position, the row 2 position, the row 4 position, the row 6 position, and the row 8 position.

In FIG. 17, the character positions C–0 through C–79 are looked at for 12's and 8's. Character positions C–79, C–78, C–75, C–74, C–71 and C–0 each contain a "12." Since the serial read data coming from the drum 201, or the gated data, compares with the decoded data, the compare gate remains up to pass a punch gate at R time for each of the character positions C–79 and C–78. In position C–77, it is seen that the gated data does not compare with the decoded data and, consequently, the compare gate is not up at R time to pass the R bit to form a punch gate. However, in positions C–75 and C–74, the gated data does compare with the decoded data, and the compare gate is up at R time to pass the R bit which forms the punch gate. Character positions C–78, C–72, C–71 and C–0 each contain an "8"; and, by examining these character positions, it is seen that a punch gate is developed since the compare gate is up as a result of a comparison between the gated data and the decoded data so as to pass an R bit at R time to develop a punch gate.

Information flows to the odd punch setup or control mechanism 920 over information line 733. Information line 733, FIG. 4a, leads downward into FIG. 4d and then to the right into FIG. 4e to the translator 960, which has an output connected to the punch thyratrons for the odd rows, or a bank of punch thyratrons 921 for the punch setup mechanism 920. The odd punch translator 960 receives the odd digit impulses from the digit emitter 931 and also has inputs from the X, 0, 1, 2, 4, 8 and R positions of the bit ring 225. Except for the decoder portion, the odd punch translator 960 is substantially identical to the even punch translator 930. The decoder portion of the odd punch translator 960 is shown in FIG. 16. The digit 11 terminal of the digit emitter 931 is connected as an input to a logical AND circuit 961 also having an input from the X position of the bit ring 225. A digit 1 terminal of the digit emitter 931 is connected to a logical OR circuit 962 also having inputs from the digit 3, digit 7 and digit 9 terminals of the digit emitter 931. The output of the logical OR circuit 962 is connected as an input to the logical AND circuit 963 also having an input from the bit 1 position of the bit ring 225. The digits 3 and 7 terminals of the digit emitter 931 are connected as inputs to a logical OR circuit 964. The output of the logical OR circuit 964 is connected to the input of a logical AND circuit 965 also having an input from the bit 2 position of the bit ring 225. The digit 5 and 7 terminals of the digit emitter 931 are connected to the inputs of a logical OR circuit 966. The output of the logical OR circuit 966 is connected to the input of a logical AND circuit 967 also having an input from the bit 4 position of the bit ring 225. The digit 9 terminal of the digit emitter 931 is connected as an input to a logical AND circuit 968 also having an input from the bit 8 position of the bit ring 225. The outputs of the logical AND circuits 961, 963, 965, 967 and 968 are commonly connected by a conductor 969. The conductor 969 would lead to a compare unit similar to that of the compare unit 934 for the even punch translator. The odd punch translator would also include units similar to the units 933 and 935 of the even punch translator.

CONTINUOUS FORMS PRINT UNIT

The continuous forms print unit 1500 functions to list data in printed form upon continuous forms 1510, FIGS. 1 and 3, by means of a print mechanism 1520. The printed data, of course, is derived from the source cards or master and detail cards 60 and 50, respectively, which is stored in drum tracks T12 or T13. The continuous forms print unit 1500 may take the form of a typical high speed listing machine including a wire printer unit of the type described in the patent to R. Johnson, U.S. Patent No. 2,802,414, and a form transporting carriage of the type disclosed in the patent to J. Cunningham et al., U.S. Patent No. 2,747,717. The print mechanism 1520 comprises 20 print heads spaced apart, FIG. 31c, so as to cover 60 characters by subcycle printing.

CARD DOCUMENT PREPARATION UNIT

Card Feed and Transport

The card document preparation unit 1000 functions to compose utility bills, premium notices, and other like types of documents and instruments in the form of record cards. The card document preparation unit, shown in FIGS. 1, 3 and 29, may be considered in separate portions or groups. There is the card document feed and transport portion 1100, the card document print portion 1200 and a card document punch portion 1300.

With particular reference to FIGS. 29, 35a, 35b and 35c, blank record cards 10, or cards having some preprinted and/or prepunched information therein, are contained in a card hopper 1101 of the card document feed portion 1100. Card feeding mechanism 1102, for feeding the blank cards 10 from the hopper 1101 in seriatim, is clutch controlled. The record cards residing in the card hopper "12" edge first, obverse face down, are fed at a rate of approximately 500 cards per minute; and, therefore, each card cycle of the card document preparation unit 1000 is approximately 120 milliseconds. As the record cards 10 leave the card hopper 1101, card transport mechanism 1103, consisting of spaced apart feed rolls, conveys the cards to the first static sensing station 1104. The first static sensing station 1104 functions to read any prepunched information present in the card documents 10 so as to permit a check of the sequence of the record cards 10, as will be seen shortly, or to permit the record cards to be interpreted. The transport mechanism 1103 advances the record cards from the first static sensing station 1104 to a second static sensing station 1105 spaced therefrom along the card path and having the function to cooperate with the first sensing station for checking the sequence of the record cards. For example, the record cards 10 could contain prepunched information relating to account numbers. Then, the first and second static sensing units would be utilized to check the presentation of the account numbers in the record cards 10.

The card documents 10 are arrested at the sensing stations 1104 and 1105 by solenoid-operated card gates 1106 and 1107. The card gate 1106 lies normally out of the car path by means of a spring 1115 and is cammed into the card path by a cam 1116. The card gate 1106, after being cammed into the card path by the cam 1116, will or will not remain in the card path depending upon whether or not the solenoid S1 is energized. Likewise, the card gate 1107 is normally biased out of the card path by a spring 1117 and is moved into the card path under action of the cam 1118. The card gate 1107 will remain in the card path depending upon whether or not a solenoid S2 is energized.

Upon leaving the second sensing station 1105, the record cards 10 are conveyed to the print portion or station 1200. The cards 10 are arrested at the print station 1200 by means of a gate 1108 normally biased out of the card path by a spring 1119 and moved into the card path by a cam 1120 at approximately 90° of a cycle and remains in the card path until approximately 300° of the same cycle. A single print station is utilized for simultaneously printing the name and address information upon the obverse face of the record card and billing or data information on the reverse face. The card is held in the printing station for approximately 70 milliseconds to permit the printing operation to take place. The record cards 10 leave the print station 1200 after a print operation and are conveyed to a first punch station 1310 of the punch mechanism 1300 where data is recorded in the even rows of the record cards while the same are in flight. Before the record cards enter the first punch station 1310, they are aligned by aligning rolls 1121. The cards 10 continue along the card path to a second punching station 1320 wherein data is recorded in the odd rows of the cards while the same are moving relative to the punch unit at the second punch station 1320. The record cards 10 are aligned before entering the second punching station 1320 by aligning rolls 1122. The cards 10 continue in their movement to card stackers 1110 and 1111. The card deflector 1112 is interposed between the two card stackers 1110 and 1111 so as to permit card segregation. It may be desirable to select certain cards, such as duplicate cards or cards containing errors, and segregate the same from the rest of the cards. Card errors may be detected by the first and second sensing units 1104 and 1105, respectively. The card documents 10 flow through the continuous forms print unit 1000 in a manner indicated in FIGS. 30a and 30b.

*Print Mechanism*

Printing of the card documents 10 takes place at a single print station 1200 disposed within the card document preparation unit 1000. At this print station, the name and address information is printed upon the obverse face of the card document 10 while the billing information is printed upon the reverse face. The name and address may occupy three lines, each line may be 30 characters in length. Printing is accomplished by print heads of the wire printing types. The print heads are located on fixed centers. For name and address printing, there are three rows of print heads with ten print heads per row. Printing takes place while the record is held in an arrested position relative to the print heads. Printing takes place on a subcycle basis and the print heads are indexed relative to the card documents so as to print three lines with 30 characters per line.

The billing information contained upon the reverse face of the card documents is accomplished by two spaced apart rows of 20 print heads per row. Similar to the print heads of the name and address printing, the print heads for printing the billing information are contained on fixed centers. Each of the two rows of billing information may contain 60 characters of information. Hence, in order to print the 60 characters of information, the print heads for each row will be indexed relative to the card documents in the direction of the printed line. Likewise, printing for the billing information takes place on a subcycle basis. The print heads are located on .003 inch centers, while printing is on .001 inch centers. The print heads are shifted in increments of .001 inch.

Typical print mechanism is a serial-parallel type of printing mechanism, such as the type described in the patent to R. Johnson, Patent No. 2,802,414, dated August 13, 1957. The print ends of the matrix wires for forming the characters are carried in movable print heads; while the control ends of the matrix wires are positioned in line to be preset, whereby print ends form the desired character by means of a code rod. The code rod facilitates the selective displacement of the matrix wires axially. After the selected matrix wires are displaced axially to form the desired character, all of the matrix wires are locked against free endwise movement relative to the print heads in order for the matrix wires to hold their setting after the characters are formed, because the code rods are withdrawn for adjustment to a new character setting. The print heads are then moved toward a platen to carry the print ends of the matrix wires against an inked ribbon disposed adjacent to the record card document. The control ends of the matrix wires, or the ends which are associated with the code rods, are held by a rigid guide means; and, from this guide means, the control ends of the wires extend within guide tubes which are secured at their ends to the print heads; the print ends of the matrix wires forming the character patterns project from their associated guide tubes so that they will be the only matrix wires to engage the ribbon and thereby create print impressions as the print heads are moved toward the platen.

The print heads of the print mechanism 1210 for printing the name and addresses upon the obverse face of the card documents 10 are driven toward the platen in the conventional manner, as described in the aforementioned patent to Johnson et al. However, the print heads of the print mechanism 1220 for printing the billing information upon the reverse face of the card documents lie above the card line in the card document preparation unit 1000. The martix wires, or the print ends, are quite flexible and are looped over the card document preparation unit side frame members without any problem. Because of the desirability to retain the print setup mechanism and the drive mechanism for the print heads below the card line and reduce the amount of mechanism necessary for driving the print heads, the print heads of the print mechanism 1220 are driven toward the platens by means of "Bowden" wires, as shown in FIG. 32. Hence, it is unnecessary to provide mechanism above the card line for driving the print heads of the print mechanism 1220 towards the reverse face of the card documents. This arrangement provides extreme flexibility and conserves upon mechanism which would otherwise be duplicated above the card line.

After the preset matrix wires have been carried forward by the print heads to form the print impressions, the matrix wires are restored to a nonset condition. The control end of the matrix wires extends through inertia slugs which aid the matrix wires both in forming print impressions and in the restoration or resetting of the matrix wires to the nonset condition. During the time the print impressions are effected, the code rods are adjusted to form the new characters. After the code rods have been set with their new character settings, they are moved against the control ends of the restored matrix wires to form new character patterns on the print ends of the matrix wires. The code rod is movable in an axial direction to one of eight positions, and it is also rotated to one of seven angular positions. The code rods for presetting the matrix wires are set up through linkage arrangements described in the patents to Johnson, No. 2,785,627 and No. 2,802,414. The linkages therein described are actuated through six magnets, such as the typical print magnets 854 shown in FIG. 12.

Punch Mechanism

The first and second punch stations 1310 and 1320 of the punch mechanism 1300, FIGS. 3, 29, 30a, 30b and 33, have the function of recording selective information into the card documents 10 in the form of perforations. In this example, a maximum of 80 digits of information may be entered into the card documents 10. The particular kind of information which will be entered into the card documents 10 is at the discretion of the machine operator. More than likely, the account number for each card document being prepared will be entered therein in the form of perforations. The information which is to be entered into the card documents in the form of perforations will be coming from either drum tracks T8, T9, T10 or T11, FIG. 4d. The information is made available in such a manner that a portion of the information may be entered into one of the card documents at the first punch station 1310 and the remainder of the information is entered at the second punch station 1320. This arrangement is quite significant because this permits a higher output rate of the completed card documents 10. Each of the individual punch units at the corresponding first and second punch stations 1310 and 1320 will be operating at 4000 strokes per minute at eight strokes per card. Normally, it is quite difficult to provide a punch unit which is capable of performing selective punching of record cards at the rate of 4000 strokes per minute and, for the most part, punch units for selectively punching record cards at higher speeds have not been successfully developed. Therefore, by this arrangement, it is possible to achieve the higher punching rate by proportioning the amount of information punched into the card documents at any one punch station. In this example, the punch unit at the first punch station 1310 punches the index positions of the card documents 10 in flight for the even rows, or row 12, 0, 2, 4, 6 and 8; and the punch unit at the second punch station 1320 punches the index positions of the record card documents in flight for the odd rows, or rows 11, 1, 3, 5, 7 and 9. The punch units at the first and second punch stations 1310 and 1320 are identical in principle of operation and substantially identical in structure. The punch and die assembly 1350 of each punch unit operates to oscillate back and forth while a vertically reciprocating punch element 1351 moves up and down, FIG. 33, both the vertical and horizontal movements being timed with the feeding of the card documents 10 so as to make it unnecessary to the card documents during the punching operation. These types of punch units are already known in the prior art and the type of punch unit in the present invention is quite similar to the punch units described in the patents to C. D. Lake et al., No. 2,451,752, and No. 2,845,122, and the patent to G. F. Daly et al., No. 2,547,445.

Referring to FIG. 33, it is seen that the punch units comprise the punch and die assembly 1350 supported by a pivot 1352 having oscillatory motion. Oscillations of the punch and die assembly 1350 are effected by complementary cams 1353 and 1354 fixed to be rotated by shafts 1355 and 1356, respectively. The complementary cams 1353 and 1354 are adapted to act upon a roller 1357 carried or supported by the punch and die assembly 1350 and thereby oscillate the same about the pivot 1352 in a pendulum-like manner. The rate of angular oscillation is such that the cutting end of a vertically reciprocable punch member 1351 is moving at the speed of the card documents 10 while in contact therewith on the forward stroke or oscillation. This rate of oscillation is provided by the particular contour of the complementary cams 1353 and 1354. The forward stroke occupies approximately two-thirds of a cycle point, while the return stroke requires only one-third of a cycle point. The punch member 1351 is guided in a frame 1358 of the punch and die assembly 1350 for vertical reciprocable movement. The punch member 1351 is provided with a notch 1359 at its upper end and limited in its upward movement by a fixed projection 1360 extending inwardly from the frame which engages the lower side of the notch 1359. However, it should be pointed out that the punch member 1351 is never driven against the fixed projection 1360; it is merely carried thereagainst by its own inertia. A punch interposer element 1361 permits selective reciprocation of the punch member 1351. The interposer 1361 is provided with a ball end 1362 adapted to reside in an outwardly opening socket 1363 of a punch selector lever 1364 pivotally mounted intermediate of its ends by a pin 1365. A spring 1366, attached at one end to the punch selector lever 1364 and at its other end to the punch interposer lever 1361, holds the punch interposer in a slightly elevated position and against the cam surface of a punch cam 1367, the ball end 1362 being capable of pivoting in the socket 1363. The punch selector lever 1364 is provided with a forked end 1368 adapted to be engaged by the end of an armature 1369 of a punch selector magnet 1370. The other end of the punch selector lever 1364 is adapted to engage a selector cam 1371. Additionally, the punch selector lever 1364 is urged to pivot in a counterclockwise direction by means of a compression spring 1372 residing in a bore 1373 within a fixed block 1374 with one end engaging a block 1375 to seal off the bore 1373, and the other end in engagement with the shoulder 1376 of the selector lever 1364. The armature 1369 of the magnet 1370, with the magnet energized, prevents the spring 1372 from moving the punch selector lever 1364 counterclockwise about the pivot 1365. With the punch selector lever 1364 in its restrained or latched position, a depending projection 1377 on the punch interposer 1361 lies out of engagement with the top or upper end 1378 of the punch member 1351. However, when the magnet 1370 is energized to attract its armature 1369, the punch selector lever 1364 is free to be pivoted counterclockwise by the spring 1372. The selector cam 1371 is mounted on a shaft 1379 to be rotated counterclockwise. The impulses for energizing the magnet 1370 come at a predetermined time and, therefore, the selector cam 1371 is timed to actuate the punch selector lever 1364 so as to free the forked end 1368 of the armature 1369 and thereby permit the magnet 1370 to attract the armature 1369 rapidly. While the armature 1369 is held attracted to the magnet 1370, the punch selector lever 1364 is urged by the spring 1372 to follow the selector cam 1371. Following the punch selector cam 1371, the punch selector lever 1364 is pivoted counterclockwise and the punch interposer 1361 is shifted to the right to bring the depending projection 1377 over the top end 1378 of the punch member 1351.

The punch interposer 1361 has a surface 1380 which follows the punch cam 1367 fixed to be rotated counterclockwise by a shaft 1381. As the surface 1380 of the punch interposer 1361 follows the cam 1367, the punch interposer 1361 will be displaced downwardly. It is thus seen that, if the depending projection 1377 on the punch interposer 1361 is not over the top end 1378 of the punch member 1351, the same will not be moved through a punch stroke. However, with the depending projection 1377 over the top end 1378 of the punch member 1351, the punch member 1351 will be displaced downwardly by the punch cam 1367 and enter a die member 1382 of the punch and die assembly 1350. The die member 1382 is supported to withstand the downward pressure of the punch member 1351 during a punching operation by a rotatable die support roll 1383. The linear velocity of the die member 1382 during the time the punch member 1351 enters therein matches the peripheral velocity of the support roll 1383.

As the punch member 1351 reaches the end or limit of its downward stroke, the punch selector lever 1364 is pivoted clockwise by the selector cam 1371 which overcomes the urging of the spring 1372 to pivot the punch selector lever 1364 counterclockwise. The punch selector lever 1364, as it pivots clockwise, by action of the selector cam 1371, is shifted to the left and thereby displaces the depending projection 1377 from its position over the top end 1378 of the punch member 1351. Furthermore, as the punch selector lever 1364 is pivoted clockwise, the left fork of the forked end 1368 of the punch selector lever 1364 contacts the beveled end of the armature 1369 to carry it away from the magnet 1370 if it happens to remain attracted thereto through residual magnetism. In this manner, the punch selector lever 1364 will again be restrained from pivotal movement by the armature 1369.

The punch member 1351 is positively restored or withdrawn from the die member 1382 by means of a bell crank 1384 pivotally mounted by a pin 1385 and having an arm 1386 which carries the projection 1387 for engaging the upper surface of the notch 1359 in the punch member 1351 and a projection 1388 for engaging an arcuate surface 1389 of the punch interposer 1361. A spring 1390, attached on one end to the bell crank 1384 and on its other end to a fixed pin, not shown, tends to pivot the bell crank 1384 clockwise to hold the projection 1388 in constant contact with the arcuate surface 1389 of the punch interposer 1361. The bell crank 1384 also has an arm 1391 provided with a curved surface 1392 to be engaged by the punch cam 1367. As the punch cam 1367 engages the curved surface 1392, the bell crank 1384 is pivoted clockwise so that the projection 1387 engages the upper surface of the notch 1359 in the punch member 1351 and carries the punch member 1351 upward. The punch member 1351 is thereby restored in position to permit the depending projection 1377 of the punch interposer 1361 to be brought over the top end 1378 thereof by the punch selector lever 1364 when the magnet 1370 is again energized.

From the foregoing, it is seen that the punch and die assembly 1350 is oscillated about the pivot 1352 by the complementary cams 1353 and 1354 at a rate so that the cutting end of the punch 1351 is moving at the speed of the card document 10 while in contact therewith on a forward stroke of the oscillation. The punch cam 1367 is rotated in a particular manner to actuate the punch member 1351 through a punch stroke at the time the punch and die assembly 1350 is moving at the same rate as the card documents 10. The punch cam 1367 also functions to restore the punch member 1351 through the bell crank 1384. Additionally, it is seen that the selector cam 1371 performs three distinct functions. The selector cam 1371 controls the positioning of the depending projection 1377 of the punch interposer 1361 over the top end 1378 of the punch member 1351, it controls the withdrawal or the shifting of the punch interposer 1361, and it provides positive restoration of the armature 1369 when the punch magnet 1370 is de-energized.

The punch members 1351 are carried spacedly apart and in line in the frame member 1358 and each punch member 1351 is associated with its own punch magnet 1370, punch selector lever 1364, punch interposer 1361, and bell crank 1384. Hence, by selectively energizing the punch magnets 1370, selected punch members 1351 will be actuated through a punch stroke.

The punch magnets 1370 at the first and second punch stations 1310 and 1320 are selectively energized by information coming from the drum tracks T8, T9, T10 or T11, respectively, to enable selective punching of the card documents 10. However, the information coming from these drum tracks is in the 7-bit code and must be translated to the IBM code so as to enable the proper energization of the punch magnets.

While the invention has been particularly shown and described with reference to a preferred embodiment thereof, it will be understood by those skilled in the art that various changes in form and details may be made therein without departing from the spirit and scope of the invention.

What is claimed is:

1. An arrangement of apparatus for furnishing data derived from a plurality of data sources at different predetermined times to a plurality of data operably controlled devices comprising: a plurality of data operably controlled devices for recording data in printed and punched form on record media; a magnetic drum having a plurality of drum tracks for containing data in coded form, said drum tracks being divided into groups of drum tracks, each group being connected with a particular one of said data operably controlled devices; a plurality of recording devices for recording data upon said drum tracks; data sensing means for sensing and temporarily storing the data from said data sources so as to permit the selective transfer of data from said data sources to said groups of drum tracks; first switching means for selectively connecting said sensing means with said recording devices whereby data temporarily stored by said sensing means is selectively transferred to said groups of drum tracks; a plurality of reading devices for reading data recorded upon said drum tracks; and second switching means for selectively connecting said reading devices with said data operably controlled devices whereby data is transferred from the groups of drum tracks to the associated data operably controlled devices at different predetermined times.

2. An arrangement of apparatus for controlling data operably controlled apparatus for recording data on records in printed and punched form comprising: a plurality of data sources; sensing means for sensing data at said plurality of data sources, said sensing means being adapted to temporarily store the data sensed; data storage means having a plurality of storage areas; a plurality of data recording devices, each associated with one of said storage areas and selectively connectable to said sensing means; first circuit means for repeatedly selectively connecting said plurality of data recording devices to said sensing means to enable the selective transfer of data temporarily stored by said sensing means to any of said storage areas; a plurality of data operably controlled recording devices for recording data on records in printed and punched form, each recording device being connected to a particular storage area of said data storage means whereby data stored in said particular storge area controls the operation of said associated recording device; a plurality of data reading devices associated with said plurality of data storage areas; and second circuit means for selectively connecting said data reading devices with said data operably controlled recording devices.

3. An arrangement of apparatus according to claim 2 further comprising: collating means operably connected to said sensing means at a predetermined time for determining the relationship of data sensed at said plurality of data sources, and means under control of said collating means for controlling said first circuit means.

4. An arrangement of apparatus for selectively transferring data sensed at a plurality of data sources to selected storage areas of a data storage device comprising: a plurality of data sources; a plurality of sensing means for sensing data at said plurality of data sources, each of said sensing means being adapted to temporarily store the data sensed; a data storage device having a plurality of data storage areas; a plurality of data recording devices connected to record data in said plurality of data storage areas; a series of means for repeatedly scanning the data temporarily stored by each of said sensing means; and a series of means selectively connectable to said series of scanning means and connected to said data recording devices for selectively transferring predetermined portions of the data derived during each scan to said data recording devices whereby said predetermined portions of data are recorded in selected storage areas.

5. An arrangement of apparatus according to claim 4 further comprising: collating means for determining the relationship between the data sensed at said plurality of data sources, and means for operatively connecting said collating means to said sensing means while data is temporarily stored therein and before any data is transferred to said data recording devices.

6. An arrangement of apparatus according to claim 5 further comprising: means for connecting said collating means to control said means for repeatedly scanning the data temporarily stored by said sensing means whereby said sensing means is repeatedly scanned under control of said collating means.

7. An arrangement of apparatus comprising: a master card reader having first and second sensing stations for sensing data held by master cards as the same are brought into sensing position; master static sensing units positioned at said first and second sensing stations of the master card reader, each having the facility to temporarily store the data sensed; master card feeding means for selectively bringing master cards into said first and second sensing stations, respectively; a detail card reader having first and second sensing stations for sensing data held by detail cards as the same are brought into sensing position; detail card static sensing units positioned at said first and second sensing stations of the detail card reader, each having the facility to temporarily store the data sensed; detail card feeding means for selectively bringing detail cards into said first and second sensing positions, respectively; collating circuitry selectively connectable to the sensing units of said master and detail card readers for performing sequence checking between the first and second sensing stations and cross-comparison checking between the second sensing stations of the master and detail card readers; groups of scan relays connected to be sequentially energized under control of said collating circuitry; readout means cyclically operable to gate out the information temporarily stored in said second sensing units of the master and detail card readers; first circuit connections selectively connecting said readout means with contacts of said scan relays; second circuit connections selectively connecting contacts of said scan relays with said second sensing units; data storage means having a plurality of storage areas; and circuitry connecting contacts of said scan relays with said storage areas whereby data from said sensing units transfers to different storage areas as said scan relays are sequentially energized.

8. An arrangement of apparatus according to claim 7 wherein said circuitry connecting contacts of said scan relays with said storage areas includes first switching circuitry for connecting said contacts with one group of storage areas for one complete sequential energization of the scan relays and with another group of storage areas for another complete sequential energization of the scan relays.

9. An arrangement of apparatus according to claim 8 further comprising: circuit connections putting said first switching circuitry under control of said collating circuitry.

10. An arrangement of apparatus according to claim 9 further comprising: a plurality of data recording devices located at separate work stations and operable to record data on instruments presented thereto, and circuit means connecting preselected storage areas of said storage areas of said data storage means with preselected data recording devices of said data recording devices whereby the preselected data recording devices operate according to the data contained in said preselected storage areas.

11. An arrangement of apparatus according to claim 10 wherein said circuit means includes second switching circuitry connected to control the time that said preselected data recording device will be operated according to the data contained in said preselected storage areas.

12. An arrangement of apparatus according to claim 11 further comprising: circuit connections operably connecting said second switching circuitry under control of said first switching circuitry.

13. An arrangement of apparatus for furnishing data to a plurality of data operably controlled devices comprising: storage means having a plurality of storage areas for containing data in coded form, said storage areas being divided into groups of storage areas; a plurality of data operably controlled devices settable for recording data upon record media in printed and punched form; and gating means for connecting each device to one of said groups of storage areas whereby said devices are set in a manner according to the data in said associated groups of storage areas.

14. An arrangement of apparatus for furnishing data derived to a plurality of data operably controlled devices comprising: data storage means having a plurality of data storage areas for containing data in coded form; a plurality of data operably controlled devices settable for recording data upon record media; and gating means for connecting each of said devices to one of said storage areas whereby the associated settable device is set to represent data contained in the associated storage area.

15. An arrangement of apparatus according to claim 14 wherein each of said data operably controlled devices is under control of more than one storage area and further comprising: switching means operable to connect said each of said data operably controlled devices to more than one of said storage areas.

16. An arrangement of apparatus according to claim 14 wherein at least one of said data operably controlled devices is under control of more than one storage area and further comprising: switching means operable to connect at least one of said data operably controlled devices to more than one storage area.

17. An arrangement of apparatus for furnishing data derived from a plurality of data sources to a plurality of data operably controlled devices comprising: a plurality of data sources; data storage means having a plurality of data storage areas for containing data in coded form; data transferring means for transferring data from at least one of said data sources to at least one of said data storage areas; and a plurality of data operably controlled devices, each of said devices being connected to one of said storage areas.

18. An arrangement of apparatus according to claim 17 further comprising: switching means operable to connect at least one of said data operably controlled devices to more than one storage area.

19. An arrangement of apparatus according to claim 18 wherein said switching means includes first elements for connecting said at least one of said data operably controlled devices to one storage area and, second elements for connecting said at least one of said data operably controlled devices to another storage area.

20. An arrangement of apparatus according to claim 18 further comprising: means for connecting said switching means under control of said data transferring means.

21. In an arrangement of apparatus comprising: data operably controlled print mechanism for printing data upon record media positioned relative thereto, first data operably controlled punch mechanism for entering a first portion of data in the form of perforations in said record media, and second data operably controlled punch mechanism for entering a second portion of data related to said first portion of data in the form of perforations in said record media to complete the recording of data therein in the form of perforations, the improvement comprising: a plurality of data sources; data storage means having a first storage area for containing data to be printed upon said record media, a second storage area for containing said first portion of data to be entered in the record media in the form of perforations by said first punch mechanism, and a third storage area for containing said second portion of data to be entered in the record media in the form of perforations by said second punch mechanism; first data transferring means for successively transferring data from said plurality of data sources to said data storage means, whereby related data is stored in said first, second and third data storage areas; second data transferring means operable to transfer data from said first, second and third data storage areas to said print mechanism and said first and second punch mechanism, whereby said print mechanism is operably controlled to print data upon said record media at one instant, said first punch is operably controlled to perforate said record media representing data related to said printed data at another instant and said second punch mechanism is operably controlled to perforate said record media representing data related to said printed data at still another instant.

22. In an arrangement of apparatus according to claim 21 further comprising: comparing means for determining the relationship of data to be transferred from said plurality of data sources to said data storage means; and means for connecting said first data transferring means under control of said comparing means, whereby data is transferred to said data storage means so that related data is contained in said first, second and third data storage areas.

23. In an arrangement of apparatus comprising data operably controlled print mechanism for printing data upon record media positioned relative thereto, first data operably controlled punch mechanism for entering first portions of data in the form of perforations in said record media, and second data operably controlled punch mechanism for entering second portions of data related to said first portions of data in the form of perforations in said record media to complete the recording of data therein in the form of perforations, the improvement comprising: a plurality of data sources; data storage means having first and second storage areas for containing data to be printed upon different record media, third and fourth storage areas for containing said first portions of data to be entered into different record media in the form of perforations, and fifth and sixth storage areas for containing said second portions of data to be entered in different record media in the form of perforations; first data transferring means operable to successively transfer from said plurality of data sources to said data storage means, whereby related data is alternately stored in said first, second, third and fifth storage areas and in said second, fourth and sixth storage areas, respectively; and second data transferring means for transferring data from said data storage means to said print mechanism and to said first and second punch mechanisms, whereby data is transferred from said first, third and fifth storage areas during one interval of operation and is transferred from said second, fourth and sixth storage areas during another interval of operation.

24. In an arrangement of apparatus according to claim 23 further comprising: comparing means for determining the relationship of data to be transferred from said plurality of data sources to said data storage means; and means for connecting said first data transferring means under control of said comparing means, whereby data is transferred from said plurality of data sources to said data storage means so that related data is contained in said first, third and fifth data storage areas and in said second, fourth and sixth data storage areas.

25. In an arrangements of apparatus according to claim 24 further comprising: means connecting said first data transferring means under control of said second data transferring means so as to enable at one instant the simultaneous transfer of data from said plurality of data sources to said first, third and fifth storage areas and from the second, fourth and sixth storage areas to the print mechanism, the first punch mechanism and the second punch mechanism and at another instant the simultaneous transfer of data from said plurality of data sources to said second, fourth and sixth data storage areas and from the first, third and fifth storage areas to the print mechanism, first punch mechanism and the second punch mechanism.

26. An arrangement of apparatus for furnishing data derived from a plurality of data sources at different predetermined times to a plurality of data operably controlled devices comprising: a plurality of data operably controlled devices for recording data in printed and punched form on record media; a magnetic drum having a plurality of drum tracks for containing data in coded form, said drum tracks being divided into groups of drum tracks, each group being associated with a particular one of said data operably controlled devices; a plurality of recording devices for recording data upon said drum tracks; data sensing means for sensing and temporarily storing the data from said data sources so as to permit the selective transfer of data from said data sources to said groups of drum tracks; first switching means for selectively connecting said sensing means with said recording devices whereby data temporarily stored by said sensing means is selectively transferred to said groups of drum tracks, said first switching means including a plurality of first switch elements sequentially operable whereby said data sensing means is sequentially connected to different groups of drum tracks and a plurality of second switch elements connected to said first switch elements and selectively operable to connect said data sensing means to different drum tracks within a group of drum tracks; a plurality of reading devices for reading data recorded upon said drum tracks; and second switching means connected to said first switching means to be controlled thereby and for selectively connecting said reading devices with said data operably controlled devices whereby data is transferred from the groups of drum tracks to the associated data operably controlled devices at different predetermined times.

References Cited in the file of this patent

UNITED STATES PATENTS

| | | |
|---|---|---|
| 2,324,438 | Thomas et al. | July 13, 1943 |
| 2,493,858 | Carroll et al. | Jan. 10, 1950 |
| 2,603,416 | Bryce et al. | July 15, 1952 |
| 2,702,380 | Brustman et al. | Feb. 15, 1955 |
| 2,889,110 | Johnson et al. | June 2, 1959 |
| 2,905,930 | Golden | Sept. 22, 1959 |
| 2,918,658 | Hoberg et al. | Dec. 22, 1959 |
| 2,918,659 | Gaddis et al. | Dec. 22, 1959 |
| 2,944,733 | Austin | July 12, 1960 |
| 2,972,296 | Haug | Feb. 21, 1961 |
| 3,029,414 | Schrimpf | Apr. 10, 1962 |